(12) United States Patent
Li et al.

(10) Patent No.: US 10,446,852 B2
(45) Date of Patent: Oct. 15, 2019

(54) FUEL-CELL SYSTEM AND METHOD OF GENERATING ENERGY FROM CRUDE FUEL

(71) Applicant: Iowa State University Research Foundation, Inc., Ames, IA (US)

(72) Inventors: Wenzhen Li, Ames, IA (US); Neeva Benipal, Ames, IA (US); Ji Qi, Ames, IA (US); Yang Qiu, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 149 days.

(21) Appl. No.: 15/458,202

(22) Filed: Mar. 14, 2017

(65) Prior Publication Data
US 2017/0263945 A1 Sep. 14, 2017

Related U.S. Application Data

(60) Provisional application No. 62/307,903, filed on Mar. 14, 2016.

(51) Int. Cl.
| | |
|---|---|
| *H01M 4/92* | (2006.01) |
| *H01M 4/90* | (2006.01) |
| *H01M 8/0239* | (2016.01) |
| *H01M 8/1009* | (2016.01) |
| *H01M 4/96* | (2006.01) |

(52) U.S. Cl.
CPC ......... *H01M 4/926* (2013.01); *H01M 4/9041* (2013.01); *H01M 4/9083* (2013.01); *H01M 4/96* (2013.01); *H01M 8/0239* (2013.01); *H01M 8/1009* (2013.01)

(58) Field of Classification Search
CPC ...... H01M 4/926; H01M 4/96; H01M 8/1009; H01M 4/9083; H01M 8/0239; H01M 4/9041
See application file for complete search history.

(56) References Cited

U.S. PATENT DOCUMENTS

| | | | | |
|---|---|---|---|---|
| 2007/0180992 A1* | 8/2007 | Kang | ............... | H01M 8/04164 96/4 |
| 2011/0123902 A1* | 5/2011 | Zhang | ................... | H01M 8/08 429/506 |

(Continued)

OTHER PUBLICATIONS

"Catalysis is a Major Science Behind Sustainable Energy," http://djchadde.public.iastate.edu/index.html, (accessed Oct. 29, 2014).

(Continued)

*Primary Examiner* — Stewart A Fraser
(74) *Attorney, Agent, or Firm* — Pepper Hamilton LLP

(57) ABSTRACT

The present invention relates to a fuel-cell system. This system includes an anode electrode; a cathode electrode; a separator positioned between the anode electrode and the cathode electrode, wherein the separator is not an ion exchange membrane; an anode catalyst; and a cathode catalyst, wherein the cathode catalyst is a non-precious metal catalyst or metal-free catalyst. The present invention also relates to a method of generating energy from crude fuel. This method involves providing a fuel-cell system and contacting the fuel-cell system with a crude fuel under conditions effective to generate energy from the crude fuel.

21 Claims, 48 Drawing Sheets

(56) References Cited

U.S. PATENT DOCUMENTS

2016/0240861 A1* 8/2016 Kurungot ............... C01B 32/15
2018/0123140 A1* 5/2018 Dai ........................ H01M 4/96

OTHER PUBLICATIONS

Cheng et al., "Lignocelluloses Feedstock Biorefinery as Petrorefinery Substitutes," Darko, Biomass Now—Sustainable Growth and Use, Intech (2013).

Knupp et al., "The Effect of Experimental Parameters on the Synthesis of Carbon Nanotube/Nanofiber Supported Platinum by Polyol Processing Techniques," Carbon 46:1276-1284 (2008).

Li et al., "Advanced Electrocatalysts and Electrochemical Systems for Energy and Sustainability," Iowa State University College of Engineering Advisor Board Meeting (Apr. 16, 2015).

Li et al., "Carbon Nanotubes as Support for Cathode Catalyst of a Direct Methanol Fuel Cell," Carbon 40:791-794 (2002).

Li et al., "Carbon Nanotube Film by Filtration as Cathode Catalyst Support for Proton-Exchange Membrane Fuel Cell," Langmuir 21:9386-9389 (2005).

Li et al., "Homogeneous and Controllable Pt Particles Deposited on Multi Wall Carbon Nanotubes as Cathode Catalyst for Direct Methanol Fuel Cells," Carbon 42:436-439 (2004).

Li et al., "Nano-Structured Pt—Fe/C as Cathode Catalyst in Direct Methanol Fuel Cell," Electrochimica Acta 49:1045-1055 (2004).

Li et al., "Nanostructured Pt—Fe/C Cathode Catalysts for Direct Methanol Fuel Cell: the Effect of Catalyst Composition," International Journal of Hydrogen Energy 35:2530-2538 (2010).

Li et al., "Preparation and Characterization of Multiwalled Carbon Nanotube-Supported Platinum for Cathode Catalysts of Direct Methanol Fuel Cells," J. Phys. Chem. B. 107:6292-6299 (2003).

Li et al., "Pt—Ru Supported on Double-Walled Carbon Nanotubes as High-Performance Anode Catalysts for Direct Methanol Fuel Cells," J. Phys. Chem. B 110:15353-15358 (2006).

Li et al., "A Solution-Phase Synthesis Method to Highly Active Pt—Co/C Electrocatalysts for Proton Exchange Membrane Fuel Cell," Journal of Power Sources 195:2534-2540 (2010).

Winjobi et al., "Carbon Nanotube Supported Platinum-Palladium Nanoparticles for Formic Acid Oxidation," Electrochimica Acta 55:4217-4221 (2010).

Qi et al., "Electrocatalytic Selective Oxidation of Glycerol to Tartronate on Au/C Anode Catalysts in Anion Exchange Membrane Fuel Cells with Electricity Cogeneration," Applied Catalysis B: Environmental 154-155:360-368 (2014).

Qi et al., "Surface Dealloyed Pt Nanoparticles Supported on Carbon Nanotubes: Facile Synthesis and Promising Applications for Anion-Exchange Membrane Direct Crude Glycerol Fuel Cell," 13AIChE Annual Meeting (2013).

Qi et al., "Surface Dealloyed PtCo Nanoparticles Supported on Carbon Nanotube: Facile Synthesis and Promising Application for Anion Exchange Membrane Direct Crude Glycerol Fuel Cell," Green Chemistry 15:1133-1137 (2013).

Qiu et al., "Integrated Electrocatalytic Processing of Levulinic Acid and Formic Acid to Biofuel Intermediate Valeric Acid," Green Chem. 16:1305-1315 (2014).

Xin et al., "Electrocatalytic Oxidation of Ethylene Glycol (EG) on Supported Pt and Au Catalysts in Alkaline Media: Reaction Pathways Investigation in Three-Electrode Cell and Fuel Cell Reactors," Applied Catalysis B: Environmental 125:85-94 (2012).

Xin et al., "Simultaneous Generation of Mesoxalic Acid and Electricity from Glycerol on a Gold Anode Catalyst in Anion-Exchange Membrane Fuel Cells," ChemCatChem 4:1105-1114 (2012).

Xin et al., "Electricity Storage in Biofuels: Selective Electrocatalytic Reduction of Levulinic Acid to Valeric Acid or γ-Valerolacetone," ChemSusChem 6:674-686 (2013).

Zhang et al., "Electrocatalytic Oxidation of Glyerol on Pt/C in Anion-Exchange Membrane Fuel Cell: Cogeneration of Electricity and Valuable Chemicals," Applied Catalysis B: Envommental 119-120:40-48 (2012).

Zhang et al., "Preparation and Characterizarion of PdFe Nanoleaves as Electrocatalysts for Oxygen Reduction Reaction," Chemistry of Materials 23:1570-1577 (2011).

Zhang et al., "Selective Electro-Conversion of Glycerol to Glycolate on Carbon Nanotube Supported Gold Catalyst," Green Chemistry 14(8):2150-2152 (2012).

Zhang et al., "Selective Electro-Oxidation of Glycerol to Tartonate or Mesoxalate on Au Nanoparticle Catalyst via Electrode Potential Tuning in Anion-Exchange Membrane Electro-Catalytic Flow Reactor," Applied Catalysis B: Environmental 147:871-878 (2014).

Zhang et al., "Supported Pt, Pd and Au Nanoparticle Anode Catalysts for Anion-Exchange Membrane Fuel Cells with Glycerol and Crude Glycerol Fuels," Applied Catalysis B: Environmental 136-137:29-39 (2013).

Zhang et al., "Ultra-Thin PtFe-Nanowires as Durable Electrocatalysts for Fuel Cells," Nanotechnology 22:1-5 (2011).

Zhang et al., "Supported Gold Nanoparticles as Anode Catalyst for Anion Exchange Membrane-Direct Glycerol Fuel Cell (AEM-DGFC)," International Journal of Hydrogen Energy 37:9393-9401 (2012).

Yang et al., "N- and S-Doped Mesoporous Carbon as Metal-Free Cathode Catalysts for Direct Biorenewable Alcohol Fuel Cells," J. Meter. Chem. A 4:83-95 (2016).

Qi et al., "PdAg/CNT Catalyzed Alcohol Oxidation Reaction for High-Performance Anion Exchange Membrane Direct Alcohol Fuel Cell (Alcohol = Methanol, Ethanol, Ethylene Glycol and Glycerol)," Applied Catalysis B: Environmental 199:494-503 (2016).

Li et al., "Electrocatalytic Reduction of $CO_2$ to Small Organic Molecule Fuels on Metal Catalysts," ACS Book: Advances in $CO_2$ Conversion and Utilization, Editor: Yun Hang Hu, 55-76 (2010).

Li., "Wenzhen Li Group: Research Directions," (Mar. 27, 2015 and Mar. 19, 2016).

Li et al., "Advanced Electrocatalysts and Electrochemical Systems for Energy and Sustainability," Poster Presentation, Iowa State University College of Engineering Advisor Board Meeting (Apr. 16, 2015).

* cited by examiner

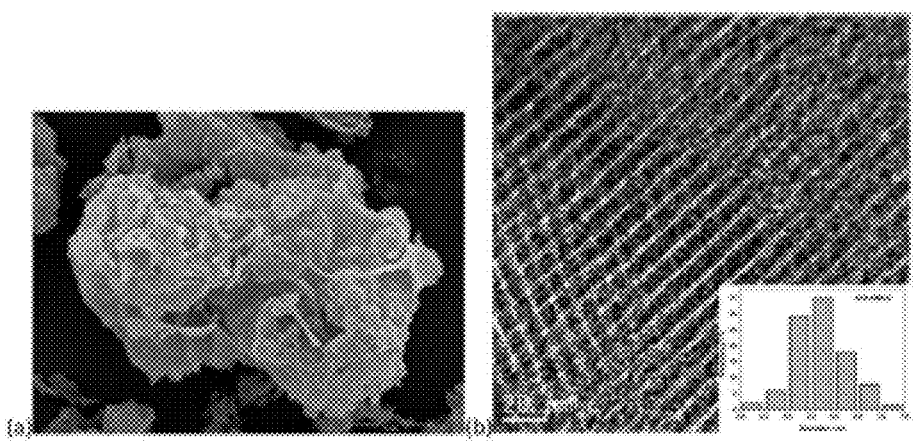
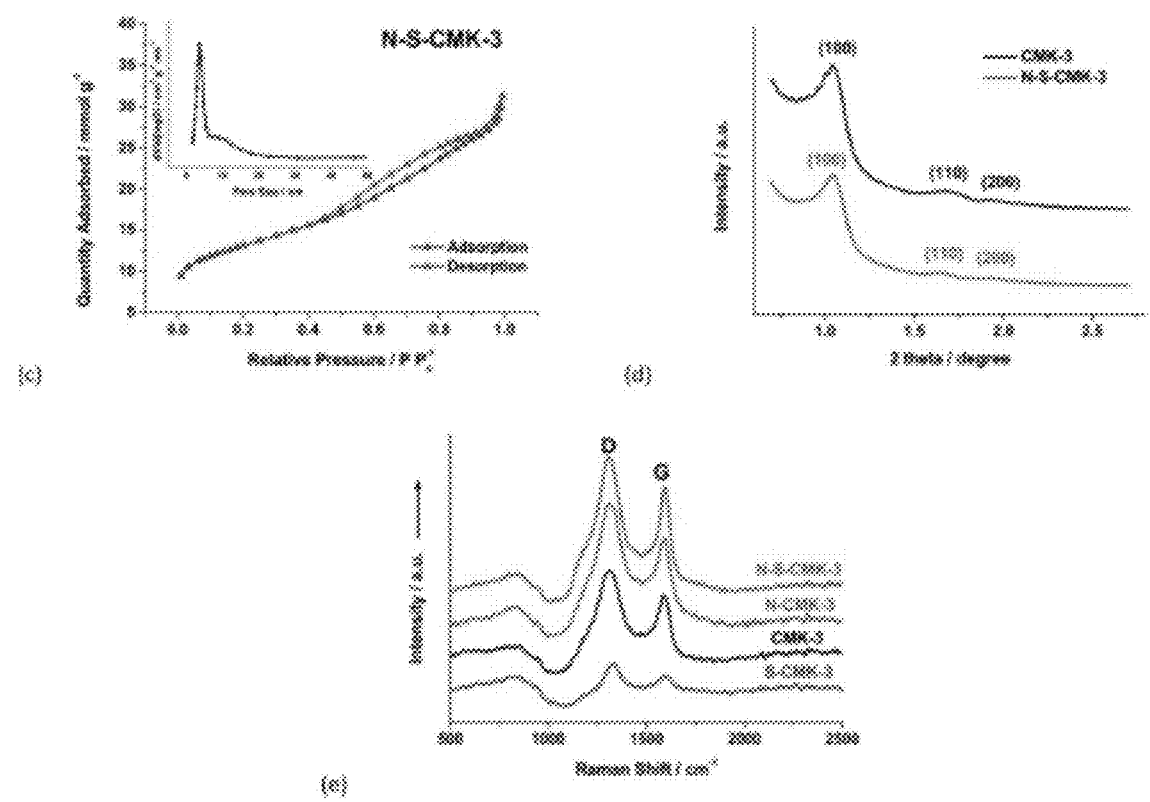
FIGs. 3A-E

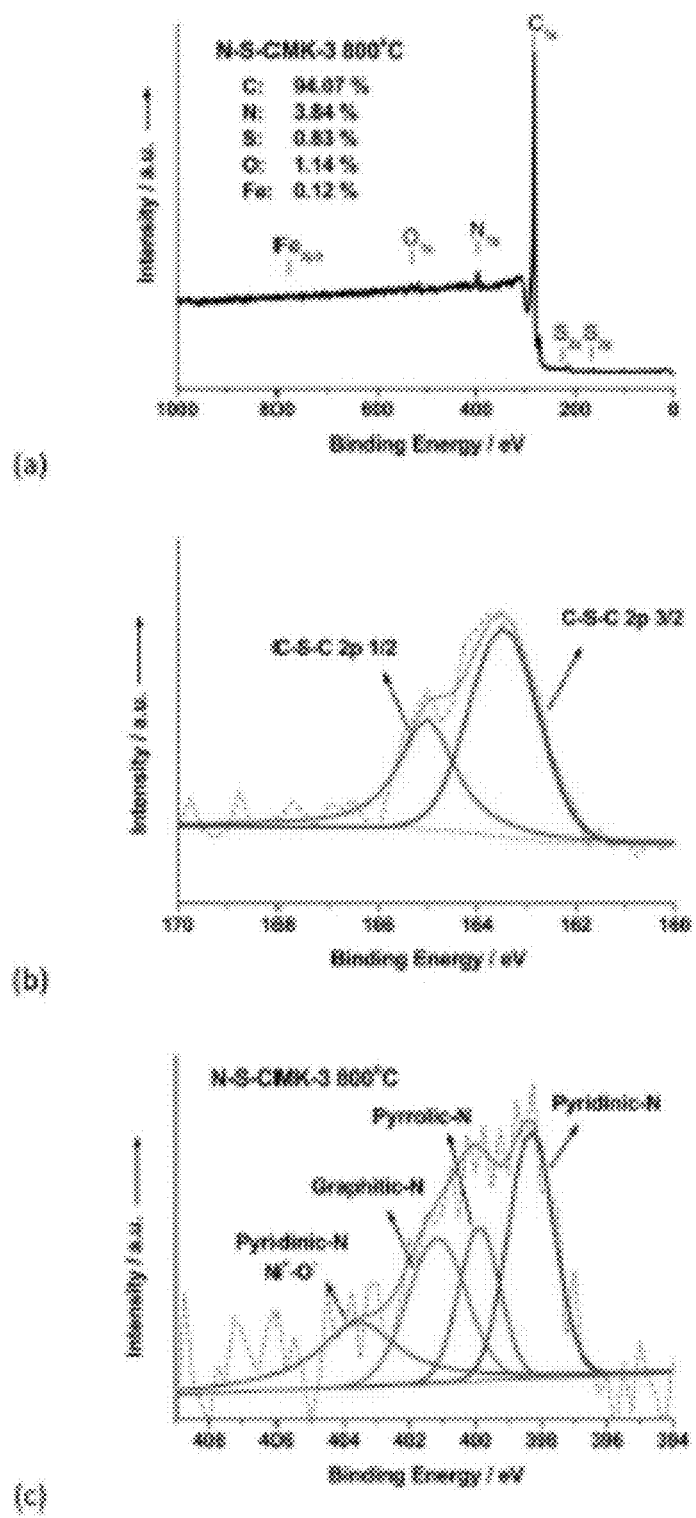
FIGs. 4A-C

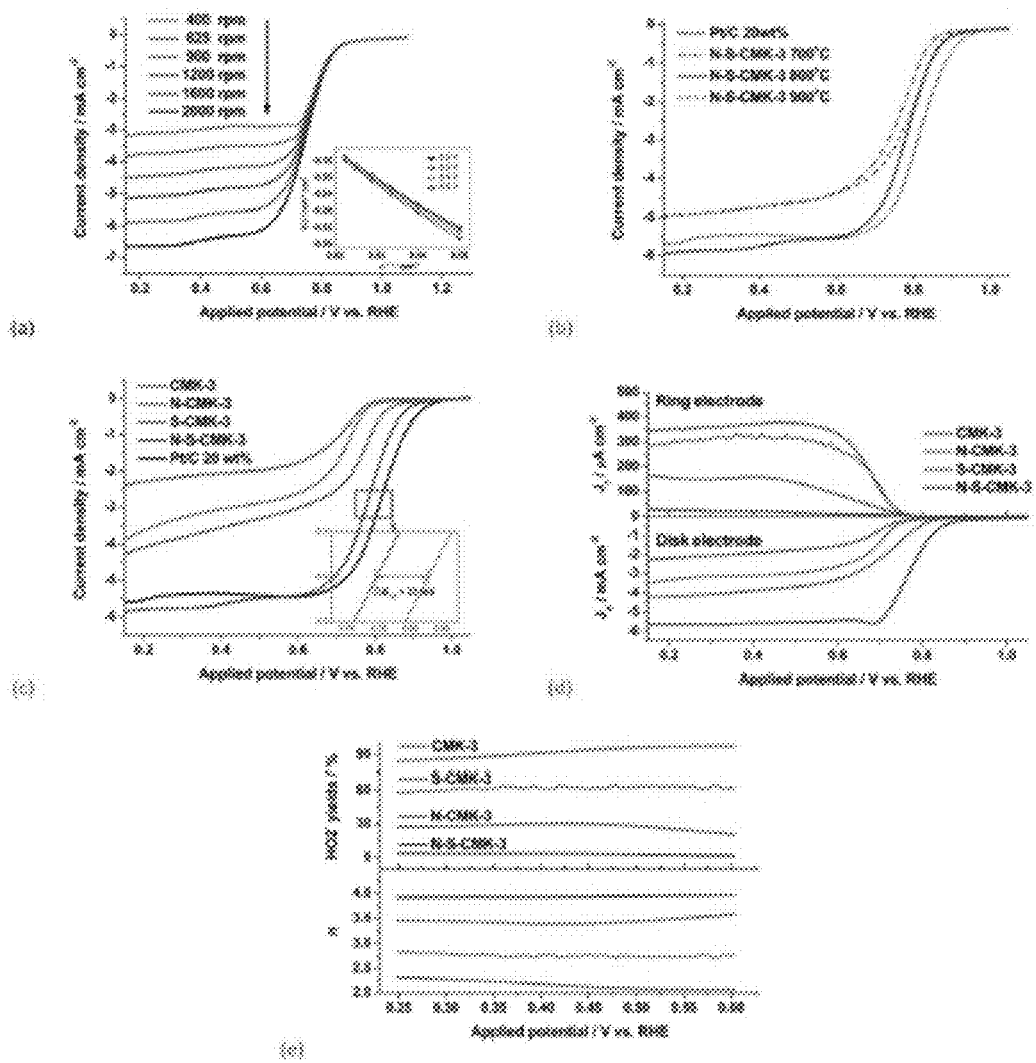
FIGs. 5A-E

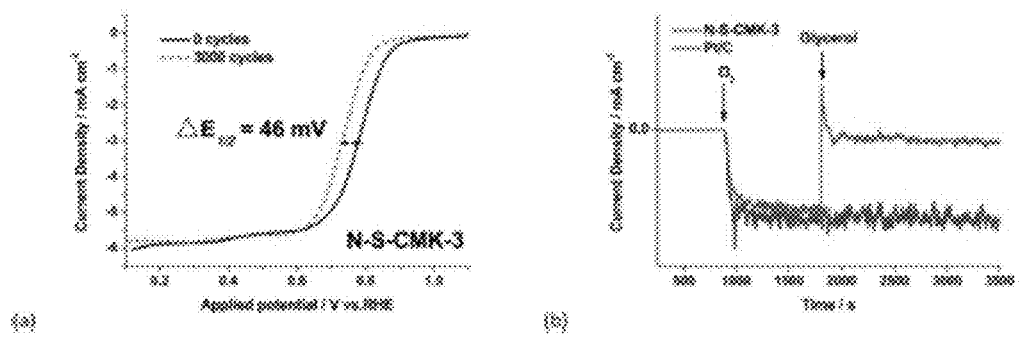
FIGs. 6A-B
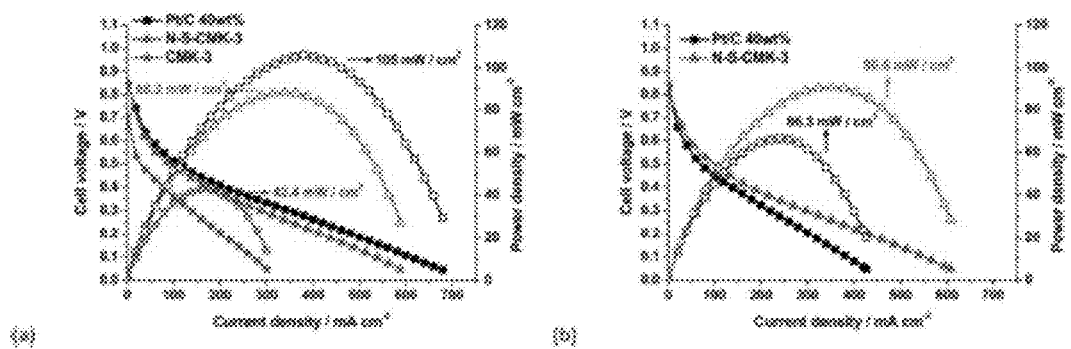
FIGs. 7A-B

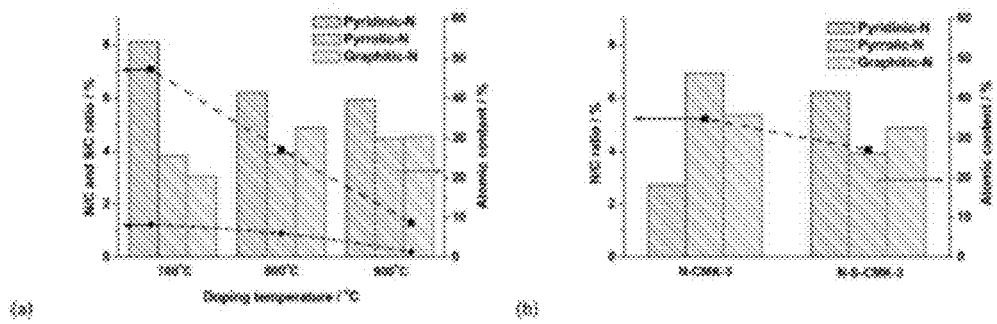
FIGs. 8A-B
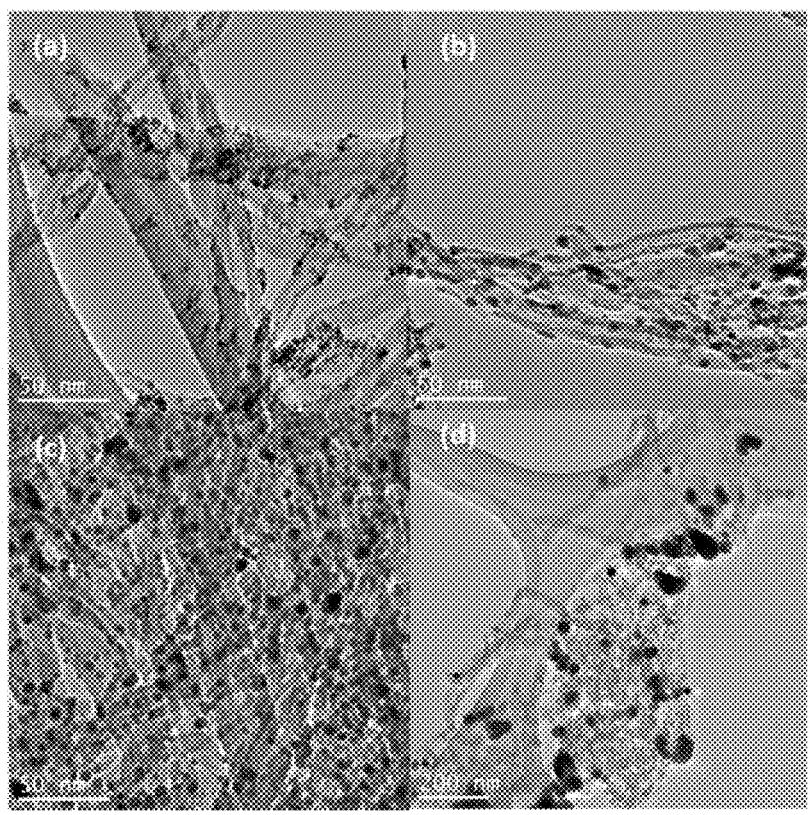
FIGs. 9A-D

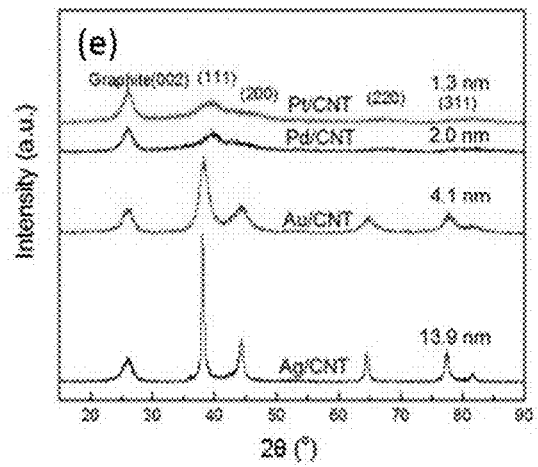
FIG. 9E
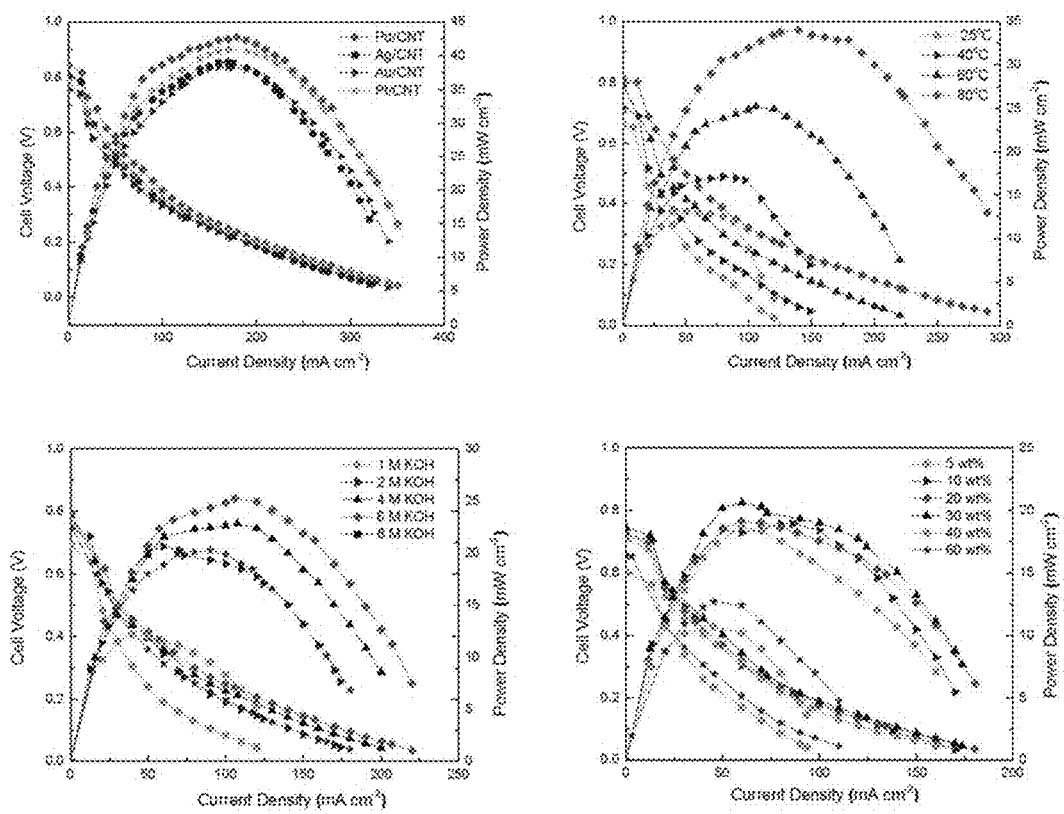
FIGs. 10A-D

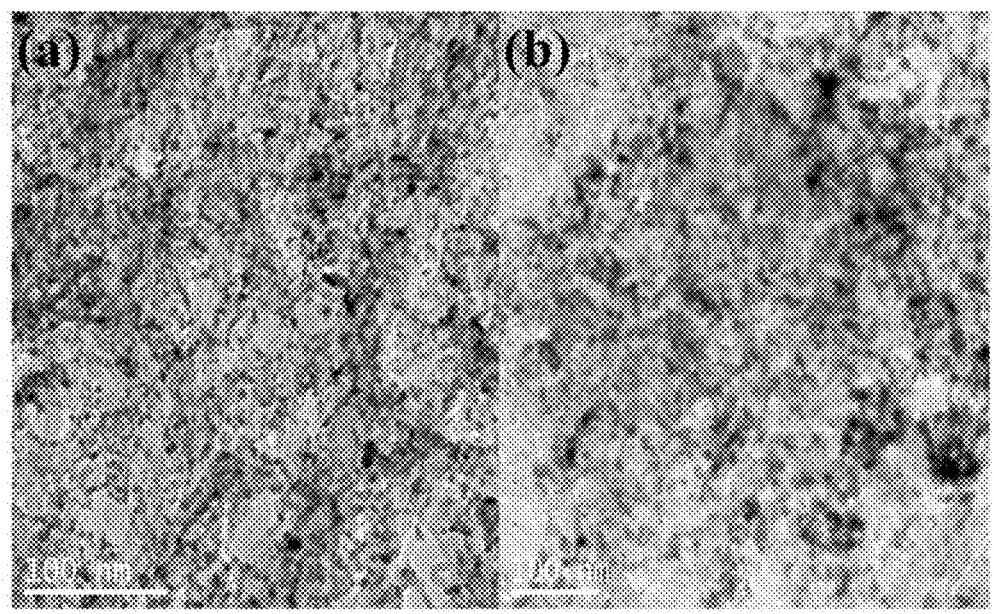
FIGs. 22A-B
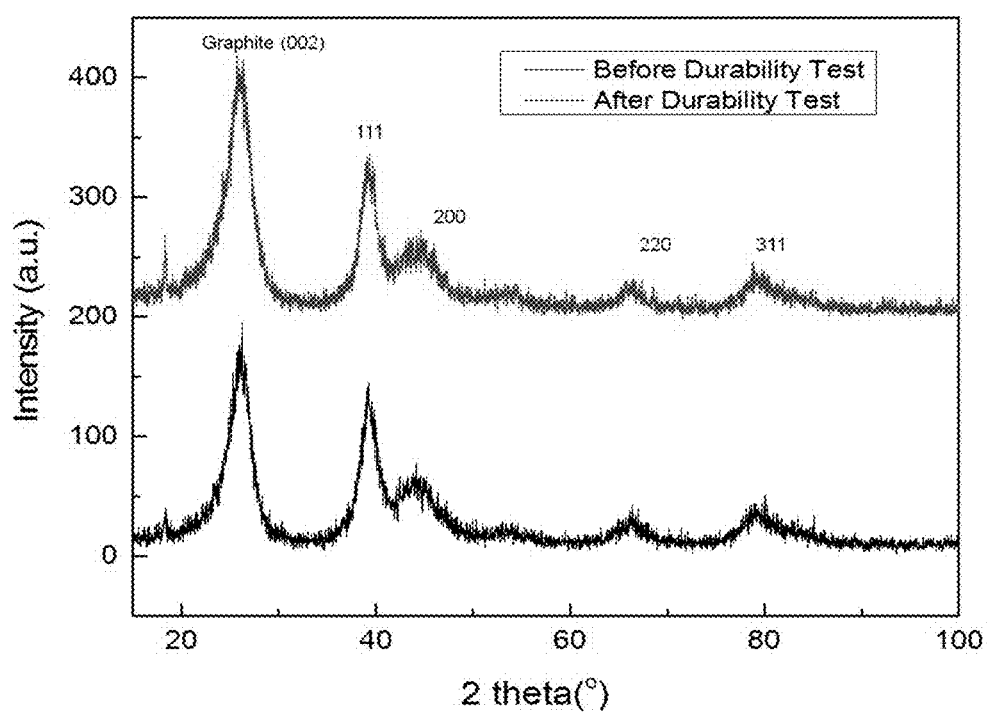
FIG. 23

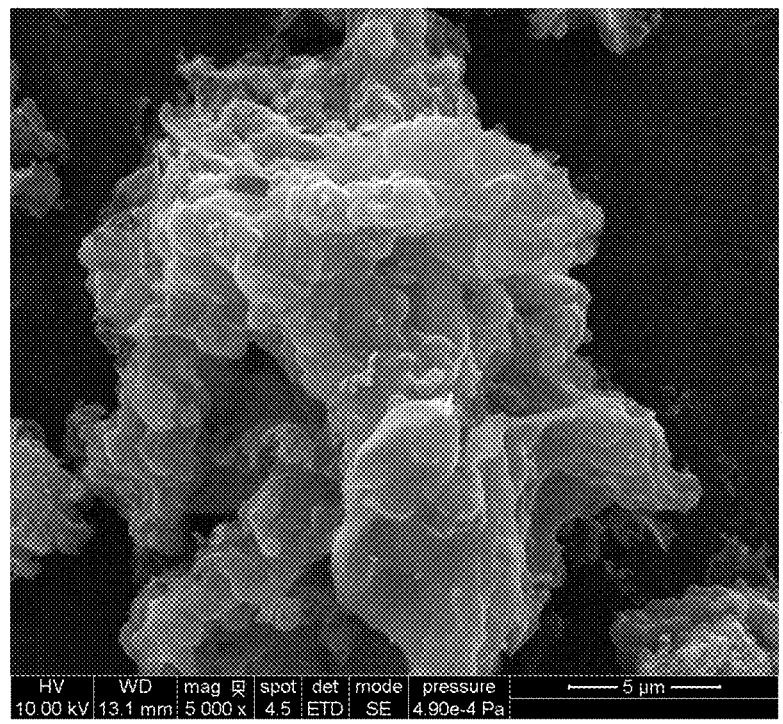
FIG. 26
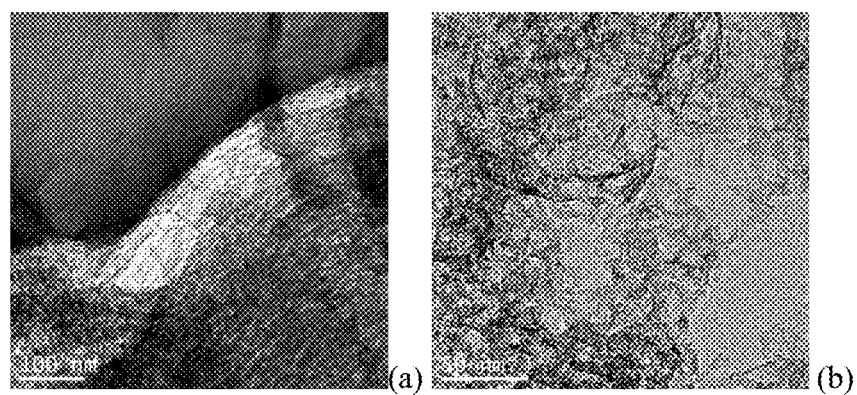
FIGs. 27A-B

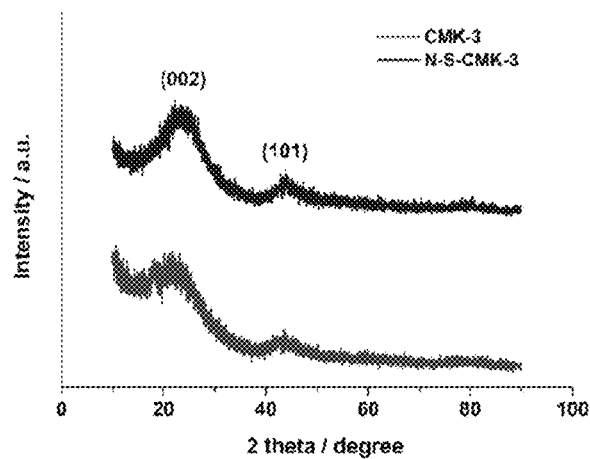
FIG. 29
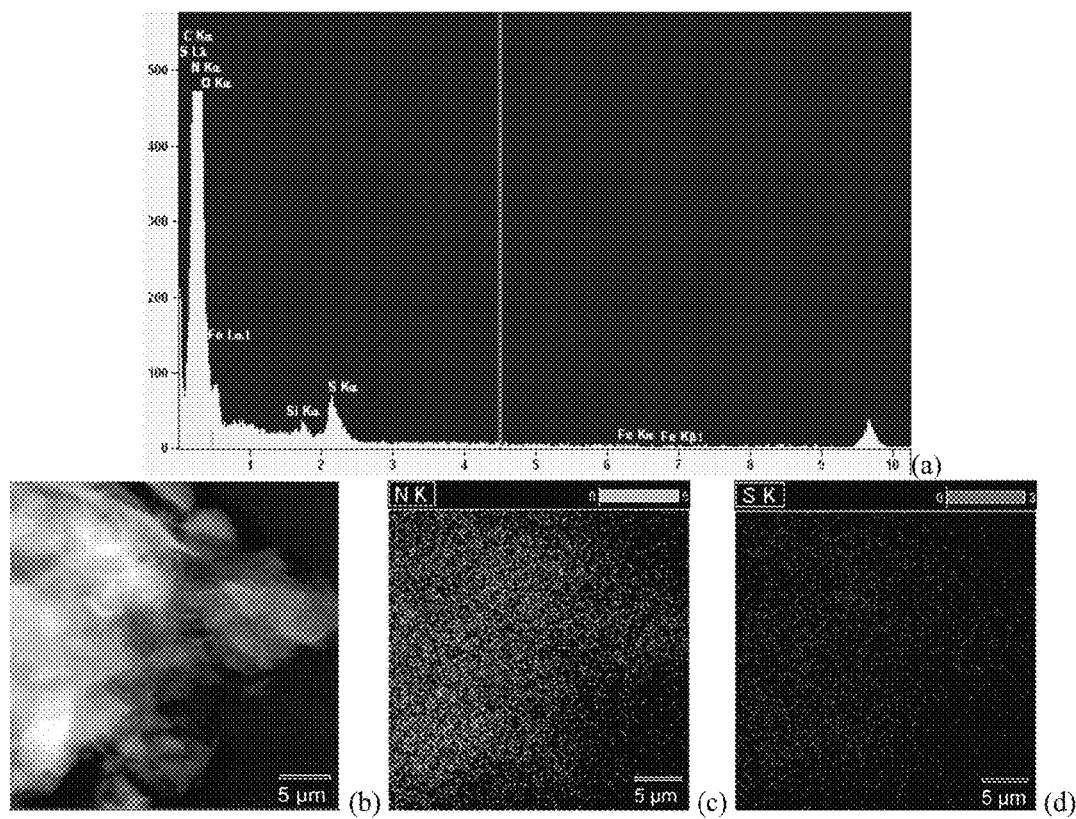
FIGs. 30A-D

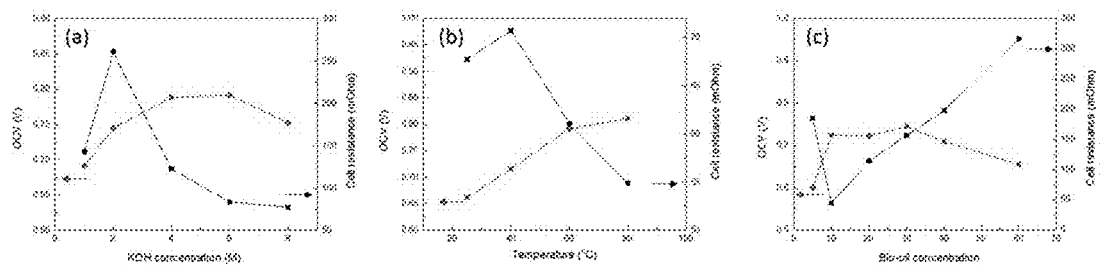
FIGs. 43A-C
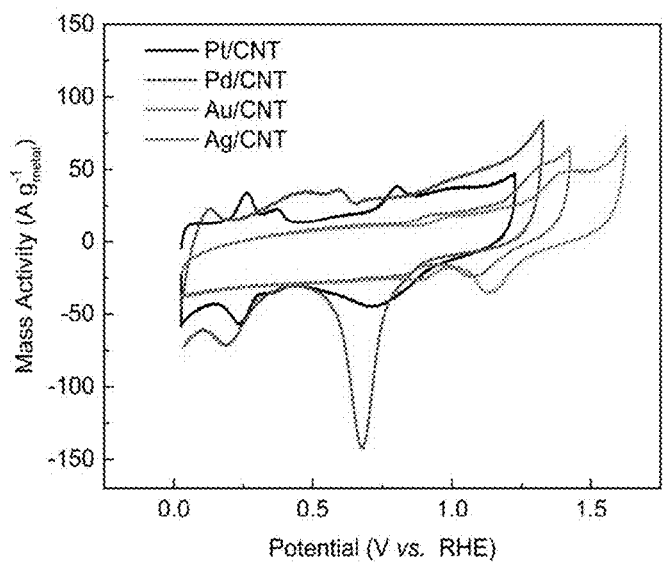
FIG. 44

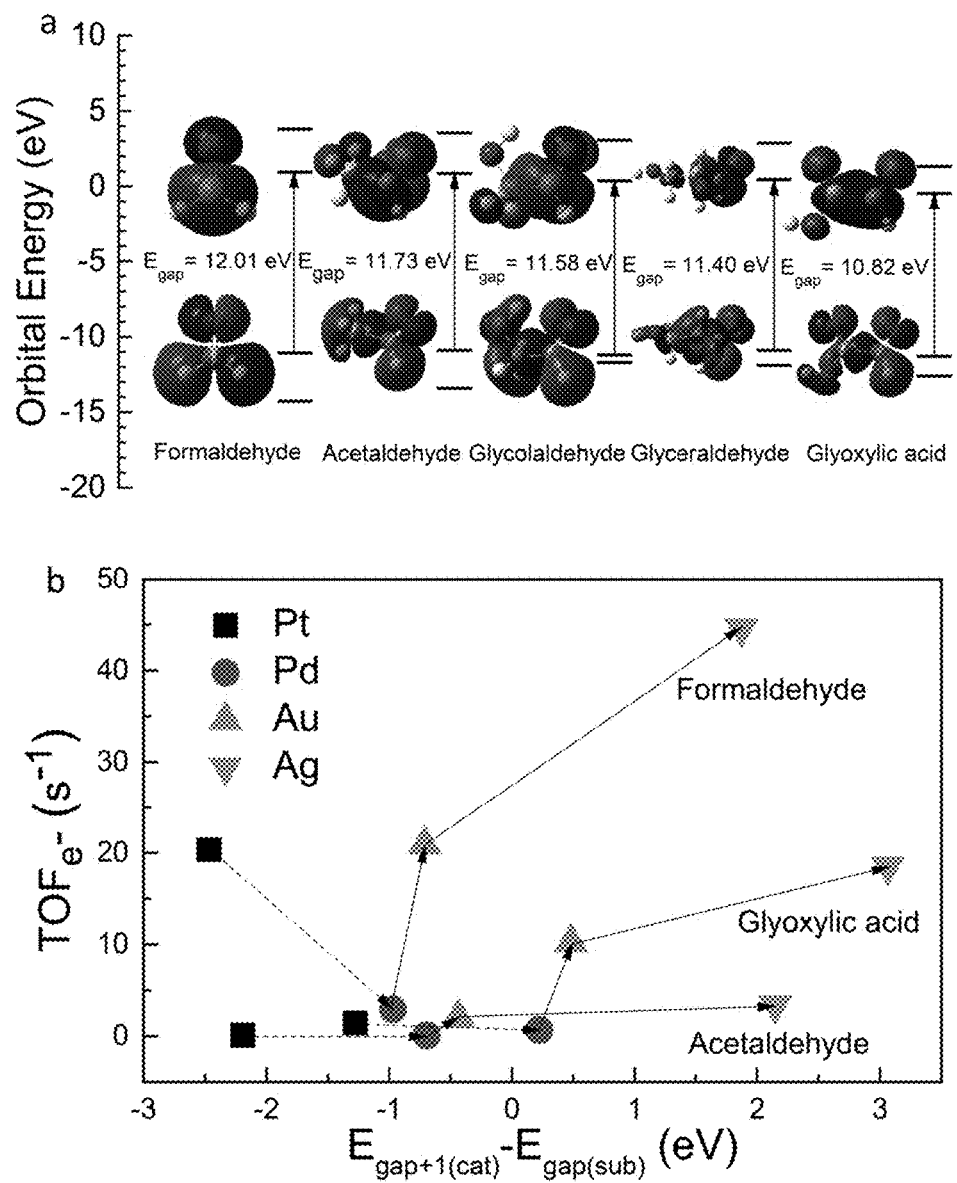
FIGs. 56A-B

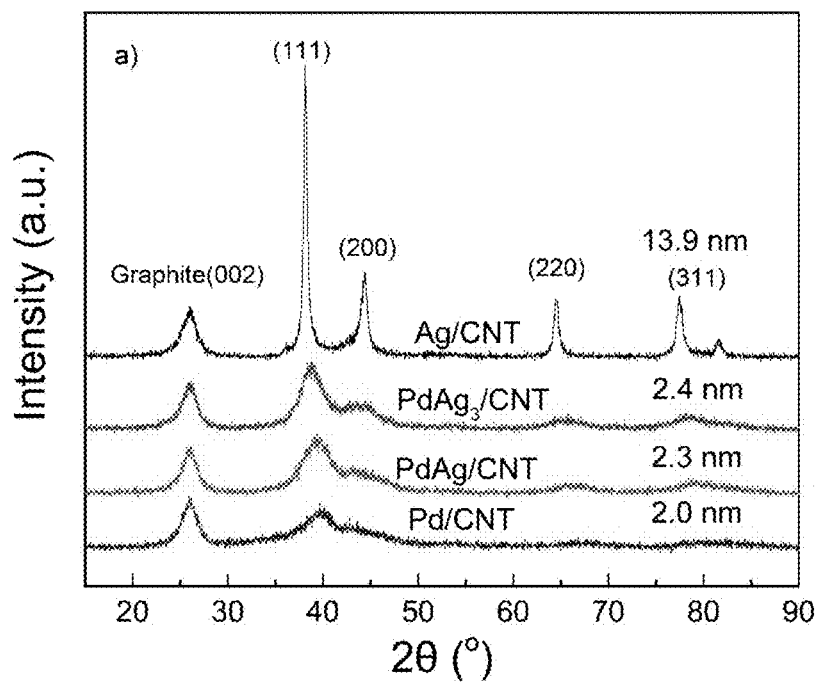
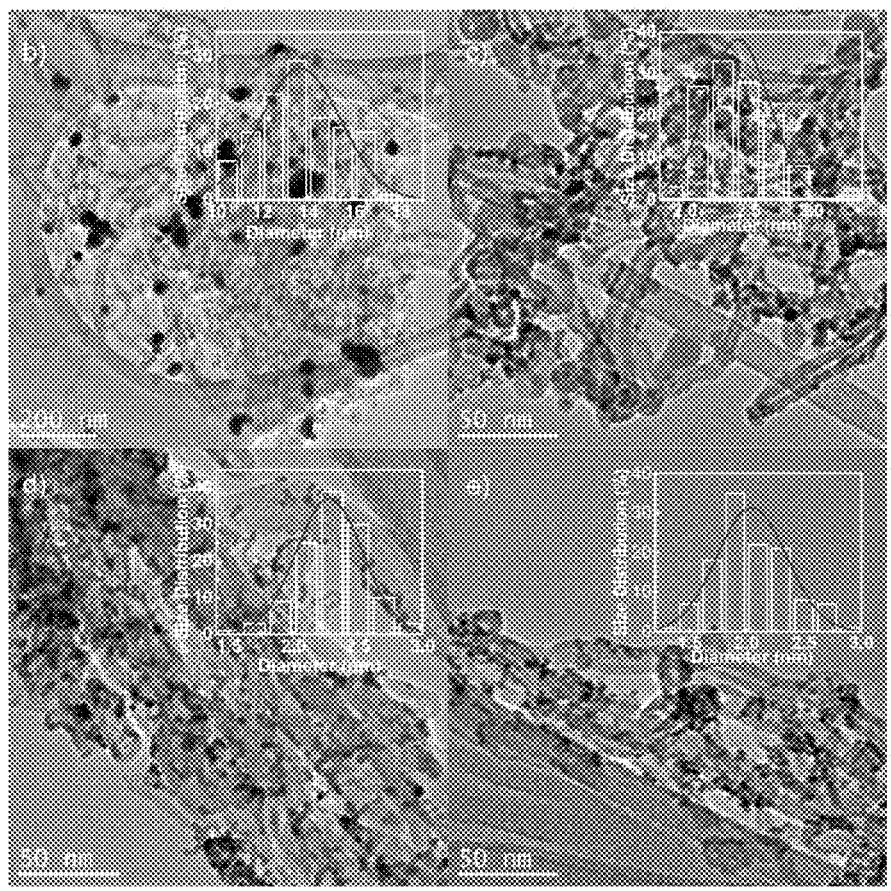
FIGs. 57A-E

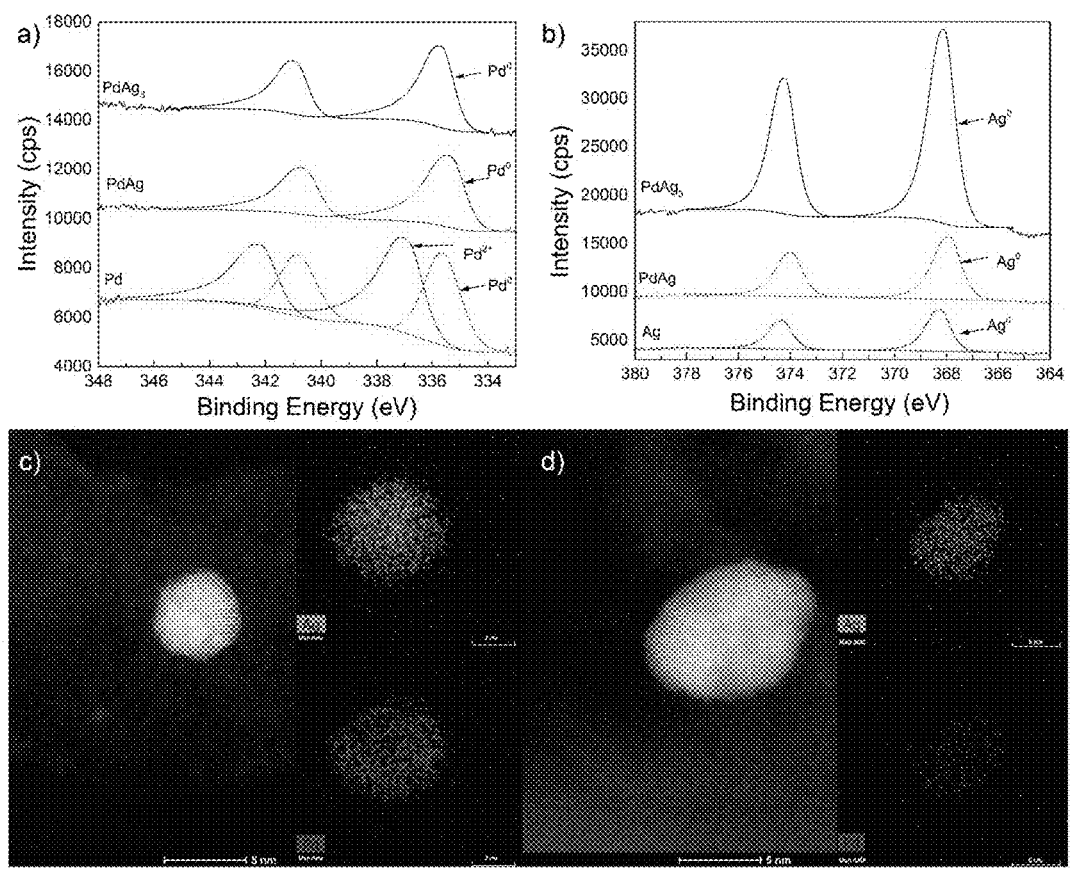
FIGs. 58A-D

Table S1. Atomic coordinates for formaldehyde.

| Center Number | Atoms | X | Y | Z |
|---|---|---|---|---|
| 1 | C | 0.607 | 0 | 0 |
| 2 | O | -0.6 | 0 | 0 |
| 3 | H | 1.147 | 0.935 | 0.002 |
| 4 | H | 1.147 | -0.935 | 0.002 |

Table S2. Atomic coordinates for acetaldehyde.

| Center Number | Atoms | X | Y | Z |
|---|---|---|---|---|
| 1 | C | -0.133 | 0.453 | 0 |
| 2 | O | -1.113 | -0.252 | 0 |
| 3 | C | 1.241 | -0.167 | 0 |
| 4 | H | -0.24 | 1.528 | 0 |
| 5 | H | 1.36 | -0.783 | 0.89 |
| 6 | H | 1.36 | -0.783 | -0.89 |
| 7 | H | 1.993 | 0.62 | 0 |

Table S3. Atomic coordinates for glycolaldehyde.

| Center Number | Atom | X | Y | Z |
|---|---|---|---|---|
| 1 | C | 1.6897 | 0.8125 | 2.4915 |
| 2 | C | 1.0753 | 1.3484 | 1.2143 |
| 3 | O | 1.6228 | 0.9192 | 0 |
| 4 | O | 2.5857 | 0 | 2.5117 |
| 5 | H | 1.2714 | 1.2047 | 3.4318 |
| 6 | H | 1.149 | 2.4518 | 1.1964 |
| 7 | H | 0 | 1.0849 | 1.1949 |
| 8 | H | 2.207 | 0.1895 | 0.1676 |

Table S4. Atomic coordinates for glyceraldehyde.

| Center Number | Atom | X | Y | Z |
|---|---|---|---|---|
| 1 | C | 0.715 | 0.353 | 0.999 |
| 2 | O | 0.412 | -0.251 | 2.257 |
| 3 | C | -0.179 | -0.248 | -0.085 |
| 4 | O | -1.55 | -0.007 | 0.24 |
| 5 | C | 0.14 | 0.389 | -1.412 |
| 6 | O | 0.525 | -0.291 | -2.332 |
| 7 | H | 0.54 | 1.427 | 1.06 |
| 8 | H | 1.761 | 0.169 | 0.75 |
| 9 | H | 0.997 | 0.153 | 2.911 |
| 10 | H | -0.004 | -1.322 | -0.146 |
| 11 | H | -1.662 | 0.952 | 0.284 |
| 12 | H | 0.025 | 1.455 | -1.541 |

Table S5. Atomic coordinates for glyoxylic acid:

| Center Number | Atoms | X | Y | Z |
|---|---|---|---|---|
| 1 | C | -0.637 | 0 | -0.873 |
| 2 | O | 0.02 | 0 | -1.885 |
| 3 | C | 0.038 | 0 | 0.455 |
| 4 | O | 1.249 | 0 | 0.519 |
| 5 | O | -0.695 | 0 | 1.583 |
| 6 | H | -1.716 | 0 | -0.93 |
| 7 | H | -0.257 | 0 | 2.445 |

Table S8. Calculated orbital energy and chemical hardness of aldehydes with different substituent groups

| Substrate (Substituent) | Molecular and structure with Mulliken charge distribution | HOMO energy (eV) | LUMO energy (eV) | $\eta^a$ (eV) | $\eta_e^b$ (eV) | $E_{gap(sub)}^c$ (eV) |
|---|---|---|---|---|---|---|
| Formaldehyde (–H) | | −11.07 | 0.94 | 6.01 | 6.2 | 12.02 |
| Acetaldehyde (–CH$_3$) | | −10.88 | 0.86 | 5.87 | 5.7 | 11.74 |
| Glycolaldehyde (–CH$_2$OH) | | −11.20 | 0.38 | 5.79 | N/A | 11.58 |
| Glyceraldehyde (–CH$_2$OHCHOH) | | −10.94 | 0.45 | 5.70 | N/A | 11.40 |
| Glyoxylic acid (–COOH) | | −11.28 | −0.46 | 5.41 | N/A | 10.82 |

$^a$ $\eta$ is the calculated chemical hardness of aldehyde molecules; $^b$ $\eta_e$ is the experimental chemical hardness of aldehyde molecules (Pearson, *Inorganic Chemistry* 27:734-740 (1988), which is hereby incorporated by reference in its entirety; $^c$ $E_{gap(sub)}$ is the frontier orbital energy difference (HOMO-LUMO gap) of different substrates

FIG. 68

FUEL-CELL SYSTEM AND METHOD OF GENERATING ENERGY FROM CRUDE FUEL

This application claims the benefit of U.S. Provisional Patent Application Ser. No. 62/307,903, filed Mar. 14, 2016, which is hereby incorporated by reference in its entirety.

This invention was made with government support under grant number CBET1501124 awarded by National Science Foundation. The government has certain rights in the invention.

FIELD OF THE INVENTION

The present invention relates to a fuel-cell system and a method of generating energy from crude fuel.

BACKGROUND OF THE INVENTION

With increasing energy demands, declining petroleum reserves, and increasing environmental pressure, having clean, sustainable, reliable, and technically viable energy resources is one of the most significant challenges facing human society, industry, and the economy (Ragauskas et al., "The Path Forward for Biofuels and Biomaterials," *Science* 311:484 (2006); Hoffert et al., "Advanced Technology Paths to Global Stability: Energy for a Greenhouse Planet," *Science* 298:981 (2002)). Sustainable energy conversion and storage technologies, such as fuel cells, metal-air batteries, etc., attract enormous attention and have been intensively studied and developed given their potential for high energy-conversion efficiency and environmental advantages (Steele et al., "Materials for Fuel-cell Technologies," *Nature* 414: 345 (2001); Cheng et al., "Metal-air Batteries: From Oxygen Reduction Electrochemistry to Cathode Catalysts," *Chem. Soc. Rev.* 41:2172 (2012); Yu et al., "Direct Oxidation Alkaline Fuel Cells: From Materials to Systems," *Energ. Environ. Sci.* 5:5668 (2012); Varcoe et al., "Anion-exchange Membranes In Electrochemical Energy Systems," *Energ. Environ. Sci.* 7:3135 (2014)). However, the sluggish oxygen reduction reaction ("ORR"), one of the half electrochemical reactions occurring at the cathode side, results in significant overpotential even at open circuit voltage operation (>250 mV), and largely limits the fuel cell's working efficiency and output power density (Varcoe et al., "Anion-exchange Membranes In Electrochemical Energy Systems," *Energ. Environ. Sci.* 7:3135 (2014); Varcoe et al., "Prospects for Alkaline Anion-exchange Membranes In Low Temperature Fuel Cells," *Fuel Cells* 5:187 (2005)). The noble metal-based catalysts, e.g. Pt, have been found to be the best ORR catalysts at low temperatures, but they suffer from several serious limitations including their limited reserves on the earth, high cost, and instability under the fuel cell operation environment (Cheng et al., "Metal-air Batteries: From Oxygen Reduction Electrochemistry to Cathode Catalysts," *Chem. Soc. Rev.* 41:2172 (2012); Varcoe et al., "Prospects for Alkaline Anion-exchange Membranes In Low Temperature Fuel Cells," *Fuel Cells* 5:187 (2005)). For direct alcohol fuel cells, noble metal-based ORR catalysts further have an alcohol poisoning issue, which is originated from the crossover of alcohol fuel from the anode to cathode (Li et al., "Nano-structured Pt—Fe/C as Cathode Catalyst in Direct Methanol Fuel Cell," *Electrochim. Acta* 49:1045 (2004); Varcoe et al., "Anion-exchange Membranes In Electrochemical Energy Systems," *Energ. Environ. Sci.* 7:3135 (2014)). With the alcohol crossover, electrochemical oxidation of alcohol competes with the ORR at the cathode and results in a mixing potential, thus reducing the fuel cell operating voltage and efficiency. Therefore, there is a clear and urgent need to seek for alternative noble metal-free or even metal-free cathode catalysts with high ORR activity, low economic cost, robust stability, and high tolerance towards alcohol fuels.

One strategy is to lower the noble metal content in the ORR catalysts. Adzic and co-workers reported the underpotential deposition method to fabricate a Pt monolayer on Au and Co (Brankovic et al., "Metal Monolayer Deposition by Replacement of Metal Adlayers on Electrode Surfaces," *Surf. Sci.* 474:L173 (2001); Adzic et al., "Platinum Monolayer Fuel Cell Electrocatalysts," *Top. Catal.* 46:249 (2007)). MPt (M=Fe, Co, etc.) alloys and core-shell (noble metal core) catalysts were also investigated to reduce the noble metal content (Li et al., "Nano-structured Pt—Fe/C as Cathode Catalyst in Direct Methanol Fuel Cell," *Electrochim. Acta* 49:1045 (2004); Guo et al., "Tuning Nanoparticle Catalysis for the Oxygen Reduction Reaction," *Angewandte Chemie-International Edition* 52:8526 (2013)). Another strategy is to replace Pt by transition metal macrocycle catalysts prepared through pyrolysis processes. Although these catalysts demonstrated competitive ORR activity relative to Pt, they suffer significant activity loss due to instability of the transition metal in the acid electrolyte (Wu et al., "Nanostructured Nonprecious Metal Catalysts for Oxygen Reduction Reaction," *Accounts Chem. Res.* 46:1878 (2013)). Recently, nitrogen doped carbon has been discovered as a metal-free ORR catalyst in a high pH medium. For example, metal-free nitrogen-doped carbon nanotubes were shown to have remarkable ORR activity and durability (Gong et al., "Nitrogen-doped Carbon Nanotube Arrays with High Electrocatalytic Activity for Oxygen Reduction," *Science* 323:760 (2009)). It has been reported that the carbon materials could become non-electron-neutral by incorporating N atoms into the graphitic framework. The electronic property tuning effect of N atoms can significantly change the charge density and spin density of carbon atoms; thus benefiting the adsorption of oxygen and subsequent reduction reaction on carbon (Gong et al., "Nitrogen-doped Carbon Nanotube Arrays with High Electrocatalytic Activity for Oxygen Reduction," *Science* 323:760 (2009); Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012)). Besides nitrogen, other elements, such as S, B, and P, can also be incorporated into the carbon framework as a dopant or co-dopant with N to further enhance the ORR activity based on the synergistic effects between the two dopants (Wang et al., "Vertically Aligned BCN Nanotubes as Efficient Metal-free Electrocatalysts for the Oxygen Reduction Reaction: A Synergetic Effect by Co-doping with Boron and Nitrogen," *Angewandte Chemie-International Edition* 50:11756 (2011); Zhang et al., "A Metal-free Bifunctional Electrocatalyst for Oxygen Reduction and Oxygen Evolution Reactions," *Nat. Nanotechnol.* 10:444 (2015); Yang et al., "Sulfur-doped Graphene as an Efficient Metal-free Cathode Catalyst for Oxygen Reduction," *Acs Nano* 6:205 (2012); Wu et al., "High-performance Electrocatalysts for Oxygen Reduction Derived from Polyaniline, Iron, and Cobalt," *Science* 332:443 (2011); Jiang et al., "Nitrogen and Phosphorus Dual-doped Hierarchical Porous Carbon Foams as Efficient Metal-free Electrocatalysts for Oxygen Reduction Reactions," *Chem.-Eur. J.* 20:3106 (2014)). Unfortunately, some undesired structures/phases (e.g., boron nitride) could be formed under high temperature annealing conditions, and can significantly lower the ORR activity of the catalysts (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012); Yang et al., "Boron-doped Carbon Nanotubes as Metal-free Electrocatalysts for the Oxygen Reduction Reaction," *Angewandte Chemie-International Edition* 50:7132 (2011)). Thus, rational choice of dual-dopants and corresponding precursors play an important role in obtaining high ORR activity. However, few reports explain the criterion for choosing heteroatom precursors or investigate the precursor effect on ORR activity over heteroatom-doped nanocarbons.

Among nanocarbon materials, heteroatom-doped carbon nanotubes and graphene, one or two dimensional carbon networks with outstanding electric conductivity, have demonstrated excellent ORR performance, and have emerged as promising ORR catalyst candidates (Higgins et al., "Oxygen Reduction on Graphene-Carbon Nanotube Composites Doped Sequentially with Nitrogen and Sulfur," *ACS Catal.* 4:2734 (2014); Zhang et al., "Substitutional Doping of Carbon Nanotubes with Heteroatoms and Their Chemical Applications," *Chemsuschem* 7:1240 (2014); Gaoa et al., "One-step Pyrolytic Synthesis of Nitrogen and Sulfur Dual-doped Porous Carbon with High Catalytic Activity and Good Accessibility to Small Biomolecules," *ACS Appl. Mater. Inter.* 6:19109 (2014)). However, their relatively low electrochemical surface area ("ECSA") and randomly formed oxygen-inaccessible microspores may lead to internal diffusion issues in practical single fuel cell cathode applications (Varcoe et al., "Anion-exchange Membranes in Electrochemical Energy Systems," *Energ. Environ. Sci.* 7:3135 (2014); Merle et al., "Anion Exchange Membranes for Alkaline Fuel Cells: A Review," *J. Membrane Sci.* 377:1 (2011)). In comparison, mesoporous carbon nanostructures are more advantageous to serve as the cathode catalyst in a real fuel cell setting, because they feature not only high conductivity, but also well-ordered pore structure and tunable uniform mesopores (e.g., 4-20 nm) with a high ECSA (>1000 $m^2$ $g^{-1}$) (Jun et al., "Synthesis of New, Nanoporous Carbon with Hexagonally Ordered Mesostructure," *J. Am. Chem. Soc.* 122:10712 (2000); Joo et al., "Ordered Nanoporous Arrays of Carbon Supporting High Dispersions of Platinum Nanoparticles," *Nature* 412:169 (2001); Jun et al., "Synthesis of New, Nanoporous Carbon with Hexagonally Ordered Mesostructure," *J. Am. Chem. Soc.* 122:10712 (2000)). Heteroatom (e.g., N) containing hydrocarbons are potentially attractive to serve as the carbon precursor, but some of them are very expensive, with prices comparable to noble metals (Liang et al., "Mesoporous Metal-Nitrogen-doped Carbon Electrocatalysts for Highly Efficient Oxygen Reduction Reaction," *J. Am. Chem. Soc.* 135:16002 (2013); Xu et al., "Sulfur- and Nitrogen-doped, Ferrocene-derived Mesoporous Carbons with Efficient Electrochemical Reduction of Oxygen," *ACS Appl. Mater. Inter.* 5:12594 (2013); Liu et al., "Nitrogen-doped Ordered Mesoporous Graphitic Arrays with High Electrocatalytic Activity for Oxygen Reduction," *Angewandte Chemie-International Edition* 49:2565 (2010)). Thus, carbon precursor cost should also be taken into consideration for the catalyst preparation and utilization in fuel cells.

Heteroatom-doped carbons are rarely directly employed as cathode catalysts in $H_2/O_2$ fuel cells, which is probably due to membrane-electrode-assembly ("MEA") fabrication issues (Varcoe et al., "Prospects for Alkaline Anion-exchange Membranes in Low Temperature Fuel Cells," *Fuel Cells* 5:187 (2005); Jaouen et al., "Recent Advances in Non-precious Metal Catalysis for Oxygen-reduction Reaction in Polymer Electrolyte Fuel Cells," *Energ. Environ. Sci.* 4:114 (2011)), related to underperforming electricity generation of $H_2/O_2$ fuel cells. For low temperature fuel cells directly fed with biomass-derived alcohols, such as ethanol and polyols, heteroatom-doped carbons are also attractive because they do not need a fuel reforming system and rigorous MEA fabrication process (Bambagioni et al., "Ethylene Glycol Electrooxidation on Smooth and Nanostructured Pd Electrodes in Alkaline Media," *Fuel Cells* 10:582 (2010); Antolini, E., "Catalysts for Direct Ethanol Fuel Cells," *J. Power Sources* 170:1 (2007)). In addition, the direct biorenewable alcohol fuel cells can simultaneously convert chemical energy into electrical energy and co-produce desirable biobased chemicals with the advantages of high efficiency, quiet operation and low $CO_2$ emission (Yu et al., "Direct Oxidation Alkaline Fuel Cells: From Materials to Systems," *Energ. Environ. Sci.* 5:5668 (2012); Li et al., "Nano-structured Pt—Fe/C as Cathode Catalyst in Direct Methanol Fuel Cells," *Electrochim. Acta* 49:1045 (2004)). Therefore, such fuel cells are poised to take a significant role in the future energy landscape. The U.S. Department of Energy has identified in their top ten important chemicals ethanol and polyols (glycerol, sorbitol, etc.) (Bozell et al., "Technology Development for the Production of Biobased Products from Biorefinery Carbohydrates—The U.S. Department of Energy's 'Top 10' Revisited," *Green Chem.* 12:539 (2010)), which can be economically derived from biomass, and can serve as building blocks for chemicals, fuels, and energy production in the future.

The present invention is directed to overcoming deficiencies in the art.

SUMMARY OF THE INVENTION

One aspect of the present invention relates to a fuel-cell system. This system includes an anode electrode; a cathode electrode; a separator positioned between the anode electrode and the cathode electrode, where the separator is not an ion exchange membrane; an anode catalyst; and a cathode catalyst, where the cathode catalyst is a non-precious metal catalyst or metal-free catalyst.

Another aspect of the present invention relates to a method of generating energy from crude fuel. This method involves providing a fuel-cell system according to the present invention and contacting the fuel-cell system with a crude fuel under conditions effective to generate energy from the crude fuel.

The present invention relates to a membrane-free, metal-free cathode direct fed fuel cell system with crude glycerol and bio-oil. In one embodiment illustrated herein, a nitrogen and sulfur dual-doped, metal-free mesoporous carbon (N—S-CMK-3) with outstanding electrocatalytic activity for ORR is used as a cathodic catalyst in a direct biorenewable alcohol fuel cell. This fuel cell exhibits remarkable performance and its operation stability is comparable to a noble metal Pt/C cathode fuel cell. A ubiquitous environment-friendly renewable biomass compound, glucose, served as the carbon source. Highly active N and S were introduced from ammonia ($NH_3$) and thiophene precursors, which can efficiently prevent N—S-CMK-3 from having clogged inside pores and channels, thereby obtaining a highly organized mesoporous structure with high surface area. Simultaneously generating macropores (pore diameter >200 nm) together with mesopores improved the adsorption of $O_2$ and increased the electrocatalytic activity for ORR. After ruling out the transition metal (Fe) effect, high ORR activity and fuel cell performance can be largely ascribed to the synergistic effect of N and S atoms with specific structures (e.g., graphitic-N and C—S—C). The high ORR activity of N—S-CMK-3 with robust stability and excellent tolerance of alcohol crossover in the direct alcohol alkaline fuel cell was superior to that of noble metals, and as a cathode catalyst for other energy conversion and storage devices, such as the $H_2/O_2$ fuel cells and metal-air batteries.

Also described herein is an ion exchange membrane-free Direct Alcohol Fuel Cell ("DAFC") with polytetrafluoroethylene ("PTFE") thin film without any further preparation and modified synthesis on thin films. Various pore sizes of PTFE thin films were investigated and evaluated as a potential separator that favored the DAFC operations, which shows that they have higher $OH^-$ ion conductivity and thermal properties. In addition, comparison of physical properties and fuel cell performance on the effects of various parameters of ion exchange membrane-free DAFCs is provided.

BRIEF DESCRIPTION OF THE DRAWINGS

FIGS. 3A-E show an SEM image (FIG. 3A); a TEM image (FIG. 3B); a graph of Nitrogen adsorption-desorption isotherms and pore size distribution (inset) of N—S-CMK-3 800° C. (FIG. 3C); a graph of small-angle XRD patterns of N—S-CMK-3 800° C. and CMK-3 (FIG. 3D); and Raman spectra of N—S-CMK-3 800° C., N—SCMK-3, S-CMK-3, and CMK-3 (FIG. 3E).

FIGS. 4A-C show XPS survey spectrum (FIG. 4A), high-resolution spectra of S2p (FIG. 4B), and Nls of N—S-CMK-3 800° C. (FIG. 4C).

FIGS. 5A-E show polarization curves of LSV tests at different rotating speeds for N—S-CMK-3 800° C. conducted in $O_2$-saturated 0.1M KOH solution at a scan rate of 10 mV s-1 (inset shows the corresponding K-L plots) (FIG. 5A); comparative polarization (RDE) curves for N—S-CMK-3 catalysts with different doping temperatures (FIG. 5B); comparative polarization curves for different catalysts with the same loading measured at 1600 rpm in $O_2$-saturated 0.1M KOH solution (FIG. 5C); comparative polarization curves (RRDE) for different catalysts with the same loading measured at 1600 rpm in O2-saturated 0.1M KOH solution (FIG. 5D); $HO_2$ yields (top) during the ORR and the corresponding electron transfer number (n, bottom) of the prepared catalysts measured by RRDE (FIG. 5E).

FIGS. 6A-B show polarization curves of N—S-CMK-3 800° C. before and after 3000 potential cycles in $O_2$-saturated 0.1M KOH solution (FIG. 6A) and glycerol crossover tolerance test of N—S-CMK-3 800° C. and commercial Pt/C conducted by chronoamperometic response at 0.6 V vs RHE (FIG. 6B).

FIGS. 7A-B show polarization and power density curves before (FIG. 7A) and after (FIG. 7B) 2 hour continuous current scanning of direct glycerol fuel cell with the N—S-CMK-3 cathode catalysts (loading 2.0 mg cm-2) and Pt/C 40 wt % anode catalysts (loading 1.0 mgpt cm-2) at 50° C.

FIGS. 8A-B show histograms of different nitrogen-based functional groups content (right y axis) and N/C, S/C atomic ratios (left y axis) characterized on the N—S-CMK-3, versus doping temperature (FIG. 8A) and a histogram of different nitrogen-based functional groups content (right y axis) and N/C atomic ratios (left y axis) characterized on the N-CMK-3 and N—S-CMK-3, respectively (FIG. 8B).

FIGS. 9A-E show TEM images of Pt/CNT (FIG. 9A), Pd/CNT (FIG. 9B), Au/CNT (FIG. 9C), Ag/CNT (FIG. 9D), and XRD patterns of Pt/CNT, Pd/CNT, Au/CNT, and Ag/CNT (FIG. 9E).

FIGS. 10A-D show polarization and power density curves of bio-oil AEMFC with noble metal anode catalyst and Fe-based Acta 4020 cathode catalyst. FIG. 10A shows a comparison of different noble metals Pd/CNT, Pt/CNT, Au/CNT, and Ag/CNT as the anode catalyst on fuel cell performance at 80° C.; anode fuel: 6.0 M KOH+30.0 wt % bio-oil. FIG. 10B shows the effect of temperature on fuel cell performance with a Pd/CNT anode catalyst; anode fuel: 6.0 M KOH+20 wt % bio-oil. FIG. 10C shows the effect of KOH concentration on fuel cell performance with a Pd/CNT anode catalyst at 60° C.; anode fuel: 6.0 M KOH+20.0 wt % bio-oil. FIG. 10D shows the effect of bio-oil concentration on fuel cell performances with a Pd/CNT anode catalyst at 60° C.; KOH concentration 2.0 M.

Anode fuel: 6.0 M KOH+3.0 M glycerol (99.8 wt %); 4.0 mL min$^{-1}$; cathode fuel: 200 sccm $O_2$, ambient pressure.

Figure 20:
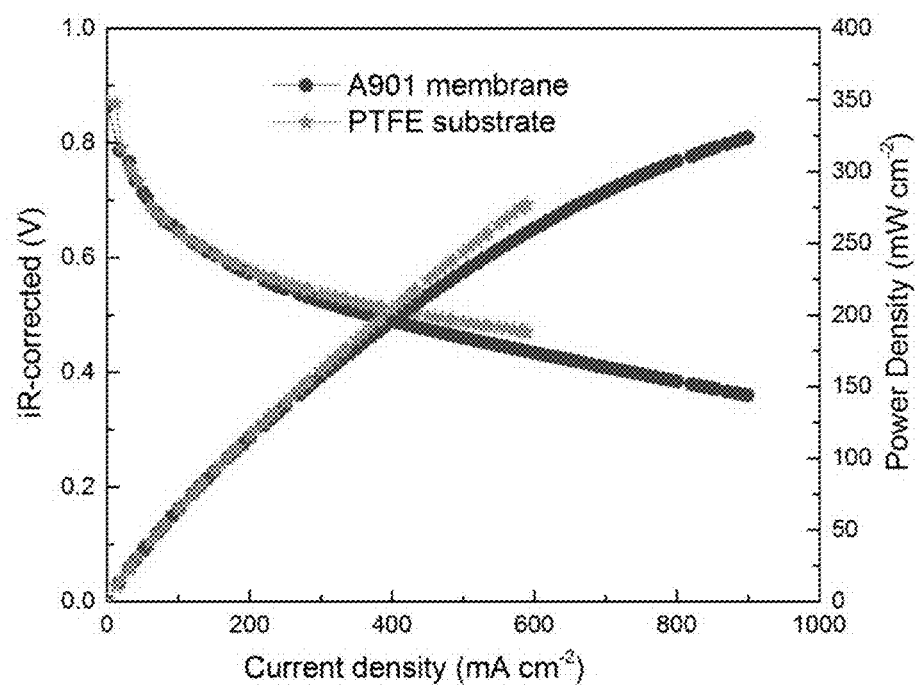

FIG. 20 is a graph showing transient cell voltage curves at a constant current density of 50 mA cm$^{-2}$ over an 80 hour period of ion exchange membrane-free DAFC at 80° C. Anode: PdAg/CNT (20 wt %), 1.0 mg$_{pdag}$ cm$^{-2}$; cathode: 4020 Acta, 3.0 mg cm$^{-2}$, PTFE thin film (pore size 0.45 μm). Anode fuel: 6.0 M KOH+1.0 M glycerol (99.8 wt %), 1.0 mL min$^{-1}$; cathode fuel: 100 sccm $O_2$, ambient pressure.

Figure 21:
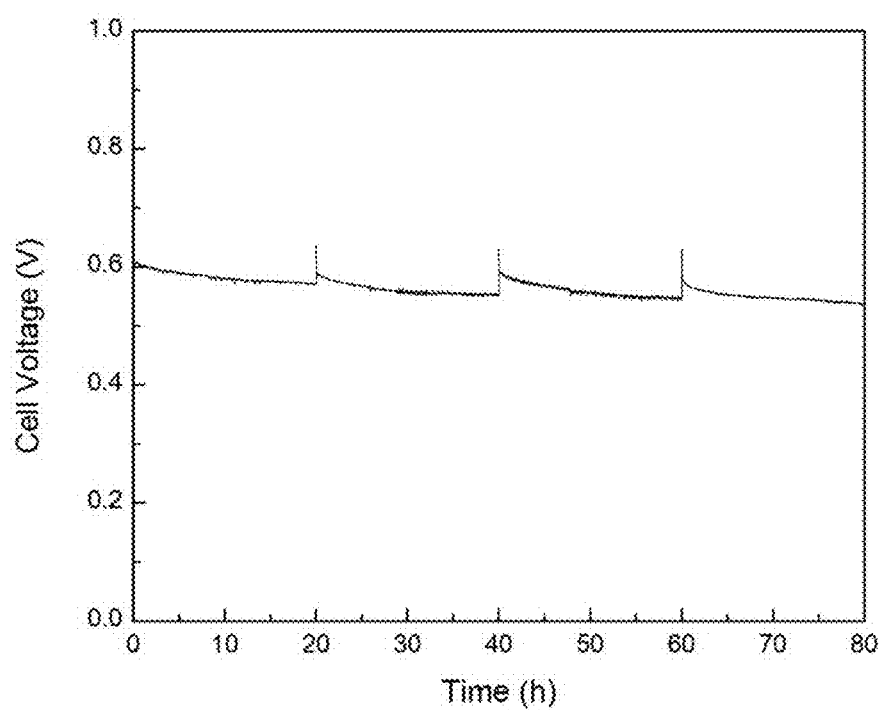

FIG. 21 is a graph showing variation in cell voltage with the internal resistance corrected for the fuel cell with the discharge time.

FIGS. 22A-B are TEM images of PdAg/CNT (20 wt %) before (FIG. 22A) and after (FIG. 22B) a durability test.

FIG. 23 is a graph showing an XRD image of PdAg/CNT (20 wt %) before (black lines) and after (gray lines) the durability test.

Figure 24:
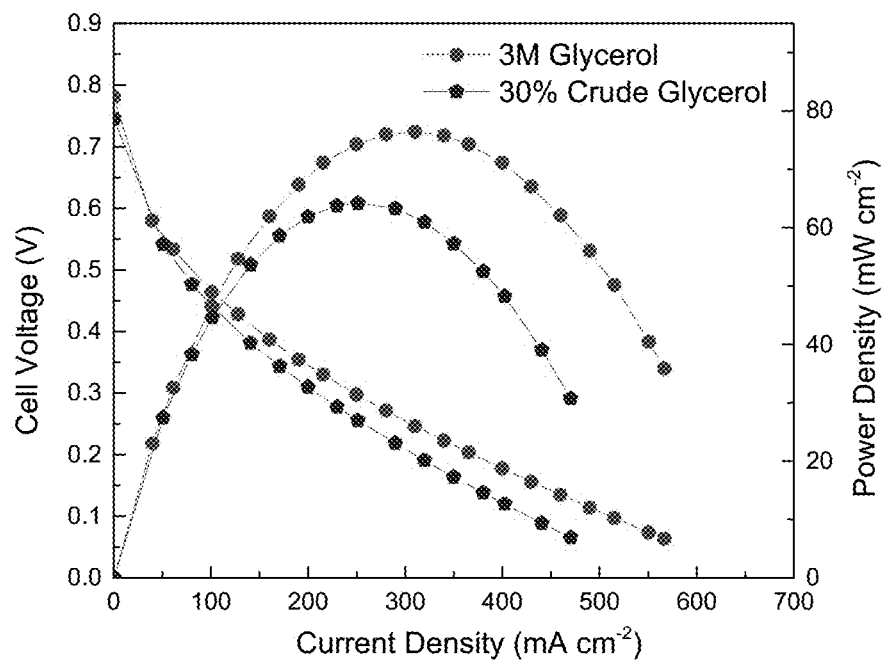

FIG. 24 is a graph showing polarization and power density curves of a membrane-free, metal-free cathode direct biomass fuel cell. Comparison of high purity glycerol (99.9%) and crude glycerol. Conditions: Anode: PdAg/CNT (20 wt %), PTFE substrate (1.0 μm), 1.0 mg$_{pdag}$ cm$^{-2}$; cathode: N—S-CMK-3, 2.0 mg cm$^{-2}$, Anode fuel: 6.0 M KOH+3.0 M glycerol and 6.0 M KOH+2.9 M crude glycerol, 4.0 ml min$^{-1}$; Cathode fuel: 200 sccm $O_2$, ambient pressure.

Figure 25:
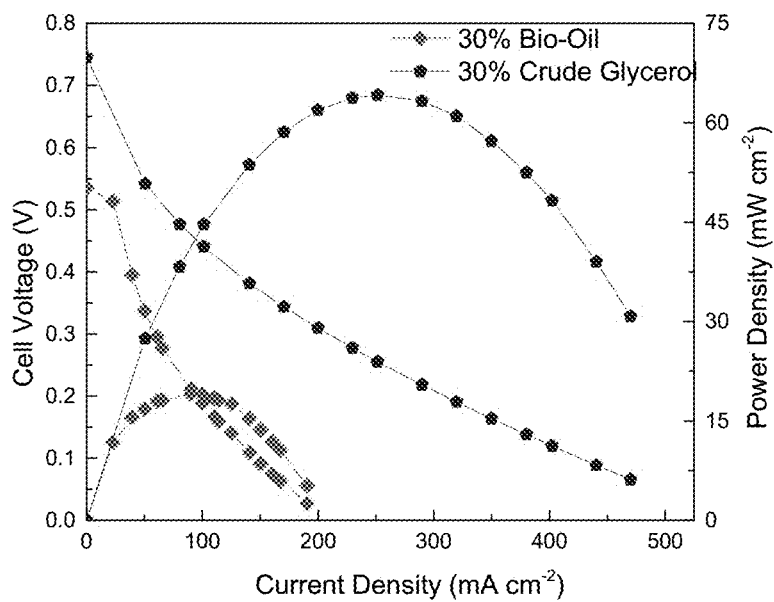

FIG. 25 is a graph showing polarization and power density curves of a membrane-free, metal-free cathode direct biomass fuel cell. Comparison of crude glycerol and bio-oil. Conditions: Anode: PdAg/CNT (20 wt %), PTFE substrate (1.0 μm), 1.0 mg$_{pdag}$ cm$^{-2}$; cathode: N—S-CMK-3, 2.0 mg cm$^{-2}$, Anode fuel: 6.0 M KOH+30 wt % bio-oil, 6.0 M KOH+30 wt % crude glycerol, 4.0 ml min$^{-1}$; Cathode fuel: 200 sccm $O_2$, ambient pressure.

FIG. 26 is an SEM image of CMK-3.

FIGS. 27A-B are TEM images of N—S-CMK-3 700° C. (FIG. 27A) and N—S-CMK-3 900° C. (FIG. 27B).

Figure 28A:
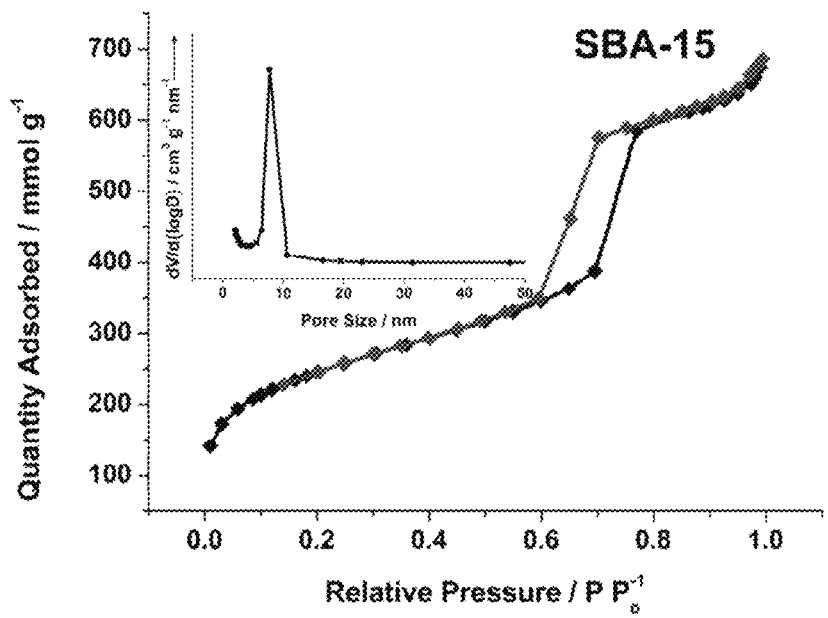
Figure 28B:
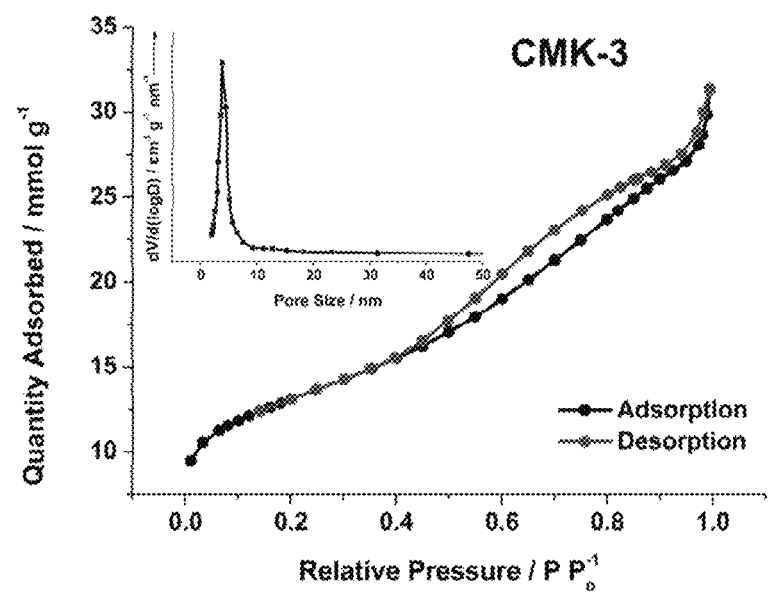

FIGS. 28A-B are graphs showing nitrogen adsorption-desorption isotherms and pore size distribution (Inset) of SBA-15 (FIG. 28A) and CMK-3 (FIG. 28B).

FIG. 29 is a graph showing wide-angle XRD patterns of N—S-CMK-3 800° C. and CMK-3 catalysts.

FIGS. 30A-D show EDS spectrum of N—S-CMK-3 800° C. (FIG. 30A) and EDS elemental mapping in conjunction with the TEM images of N and S in N—S-CMK-3 800° C. (FIGS. 30B-D).

Figure 31A:
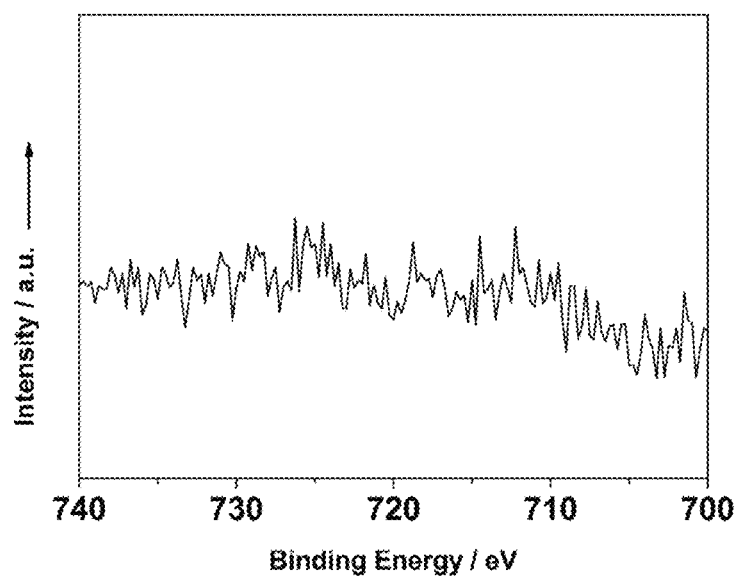
Figure 31B:
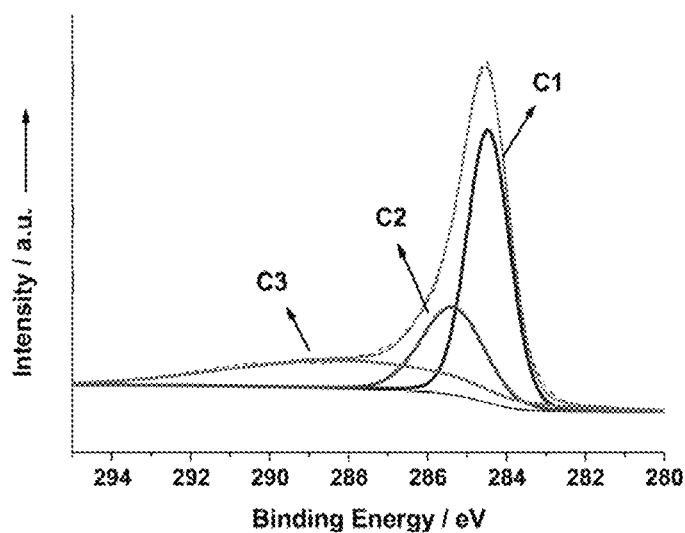

FIGS. 31A-B show XPS high-resolution spectrum of $Fe_{2p}$ (FIG. 31A) and $C_{1s}$ of N—S-CMK-3 800° C. (FIG. 31B).

Figure 32:
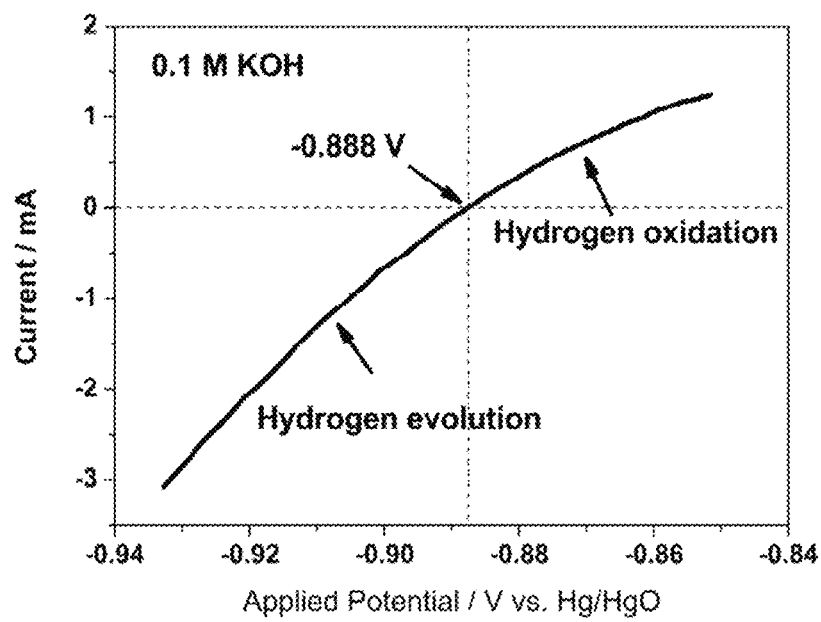

FIG. 32 is a graph showing potential calibration of the Hg/HgO reference electrode in 0.1 M $H_2$-saturated KOH solution. In this case, the potentials showed were calculated by the following equation: E(RHE)=E(Hg/HgO)+0.888 V.

Figure 33:
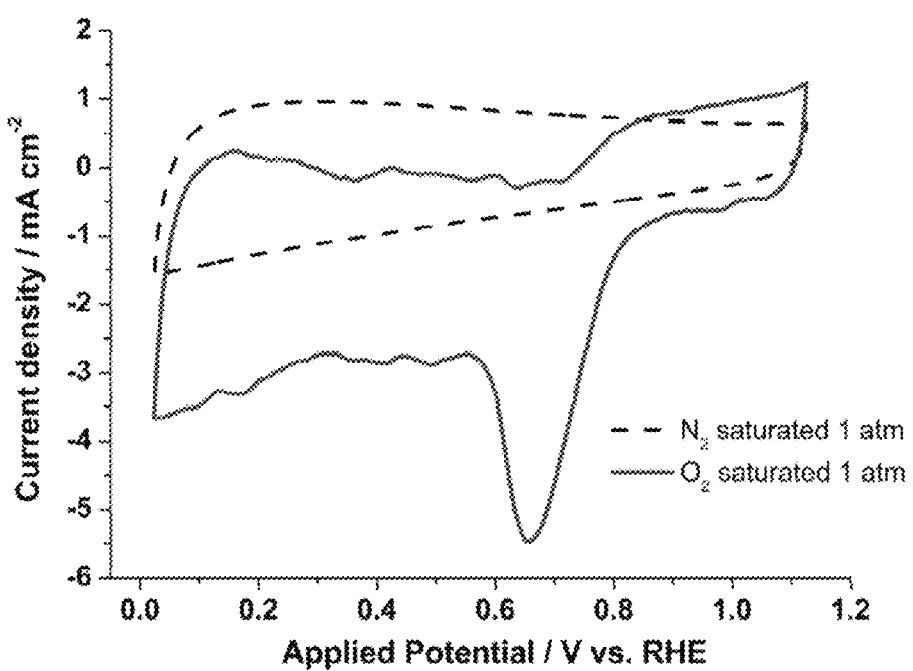

FIG. 33 shows polarization curves of cyclic voltammetry (CV) tests for N—S-CMK-3 800° C. in 0.1M KOH solution saturated with $N_2$ (dash line) and $O_2$ (solid line) at a scan rate of 50 mV s$^{-1}$.

Figure 34:
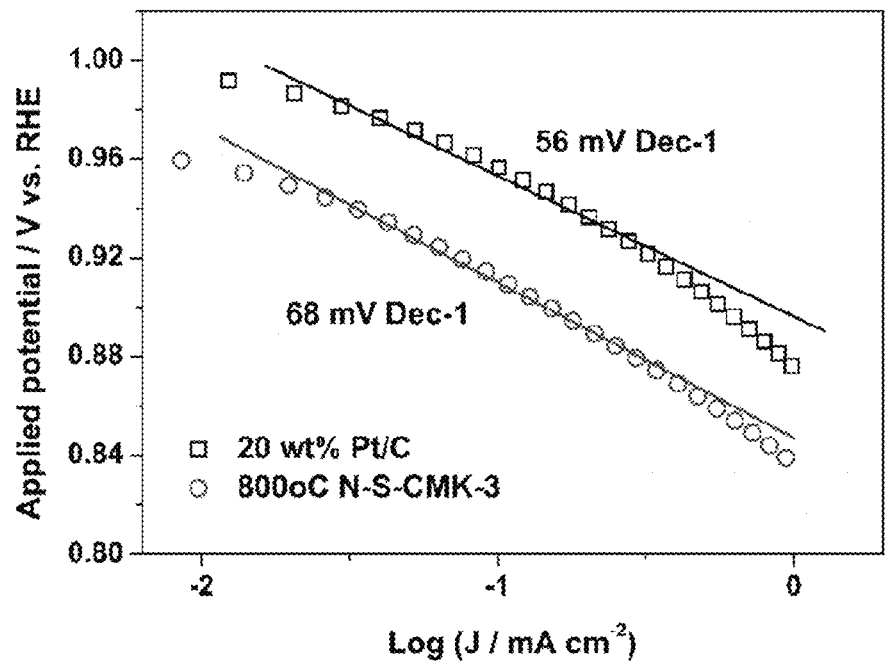

FIG. 34 shows Tafel plots of ORR currents for N—S-CMK-3 800° C. and commercial Pt/C catalysts.

Figure 35:
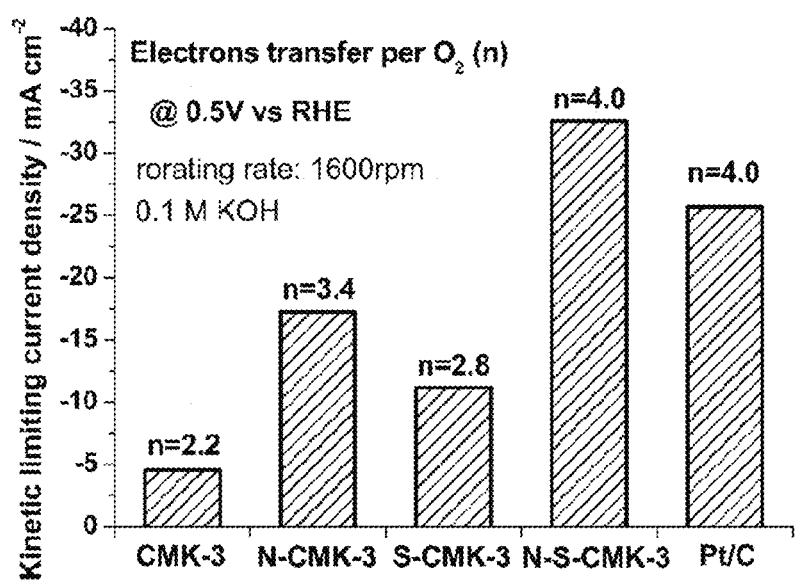

FIG. 35 is a bar graph showing kinetic limiting current density ($j_k$) and the calculation of electron transfer number for CMK-3 based and commercial Pt/C catalysts at 0.5V.

Figure 36:
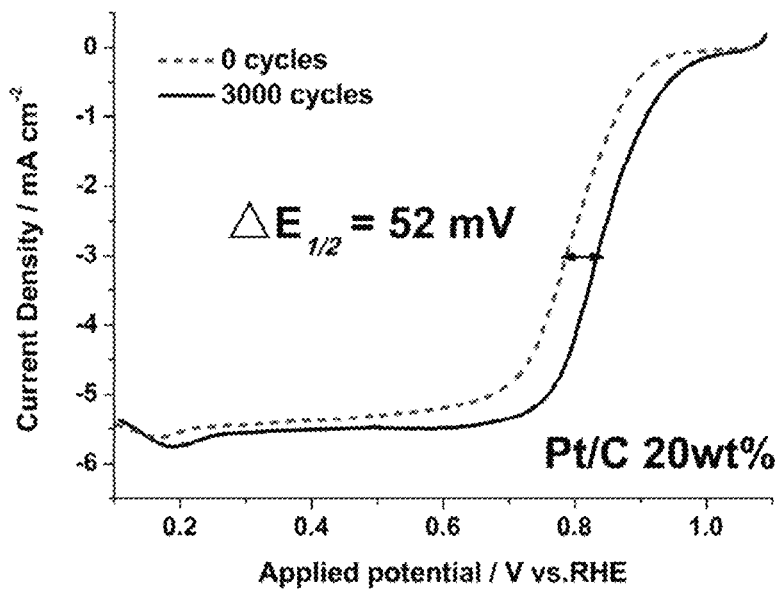

FIG. 36 is a graph showing polarization curves of commercial Pt/C before and after 3000 potential cycles in $O_2$-saturated 0.1M KOH solution.

Figure 37:
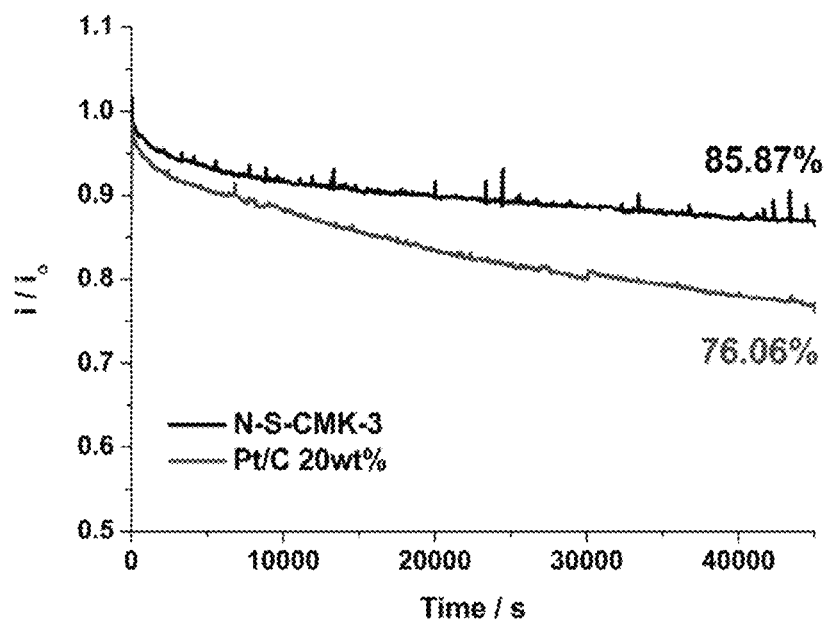

FIG. 37 is a graph showing time-drifting stability of the N—S-CMK-3 800° C. and commercial Pt/C at 0.5 V vs. RHE for 45000 s with a rotating rate of 1600 rpm.

Figure 38:
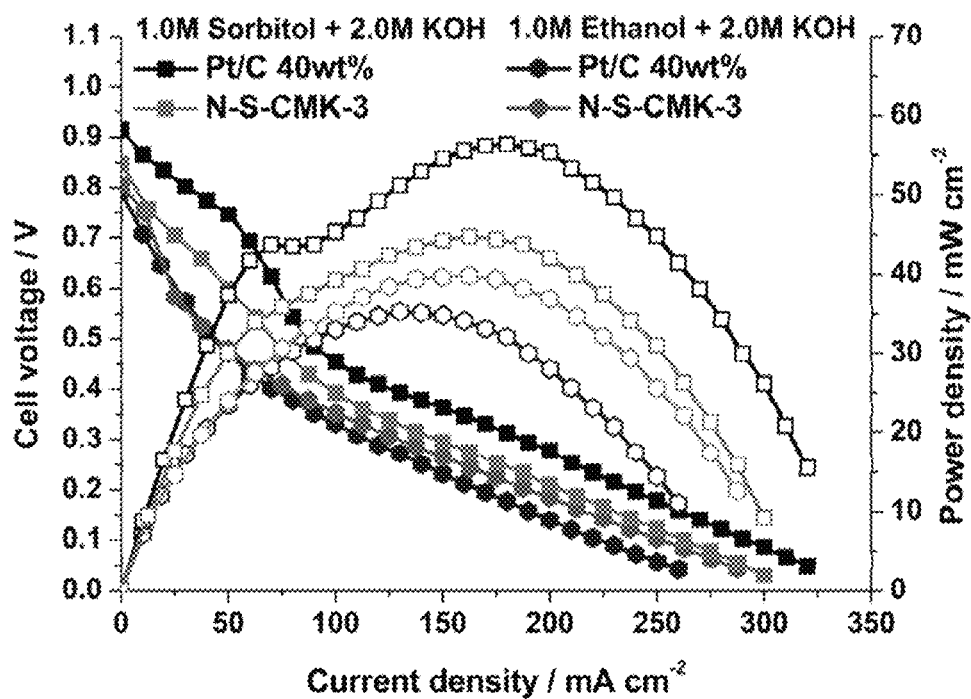

FIG. 38 is a graph showing polarization and power density curves of a direct biorenewable alcohol fuel cell with the N—S-CMK-3 800° C. (loading 2.0 mg cm$^{-2}$) and commercial Pt/C (loading 1.0 mg$_{Pt}$ cm$^{-2}$) cathode fed by 1.0 M ethanol+0.1 M KOH or 1.0 M sorbitol+0.1 M KOH at 50° C.

Figure 39:
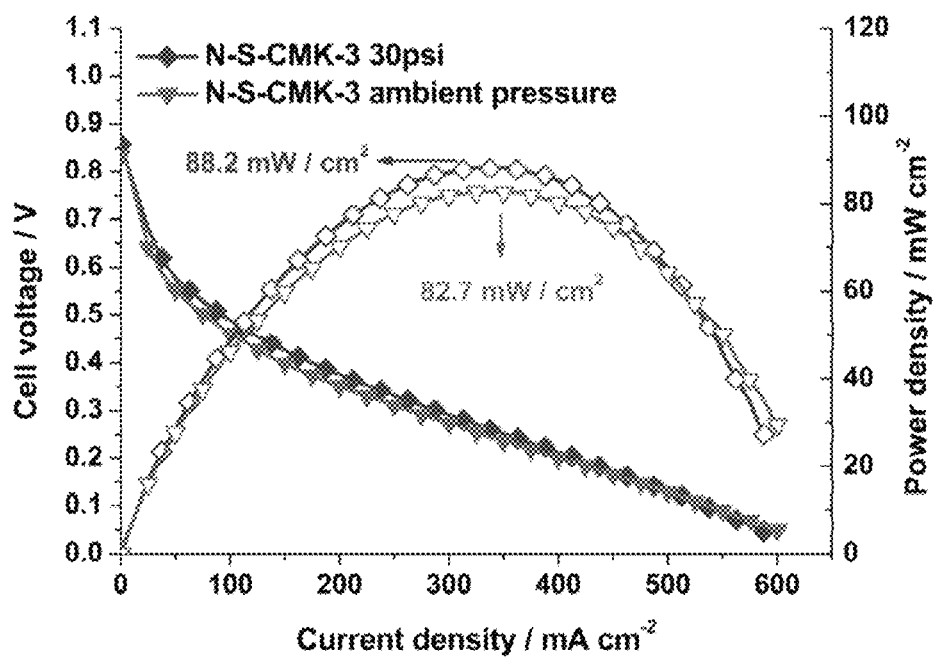

FIG. 39 is a graph showing polarization and power density curves of direct glycerol fuel cell with the N—S-CMK-3 800° C. cathode (loading 2.0 mg cm$^{-2}$) at 50° C. and different $O_2$ back pressures.

Figure 40A:
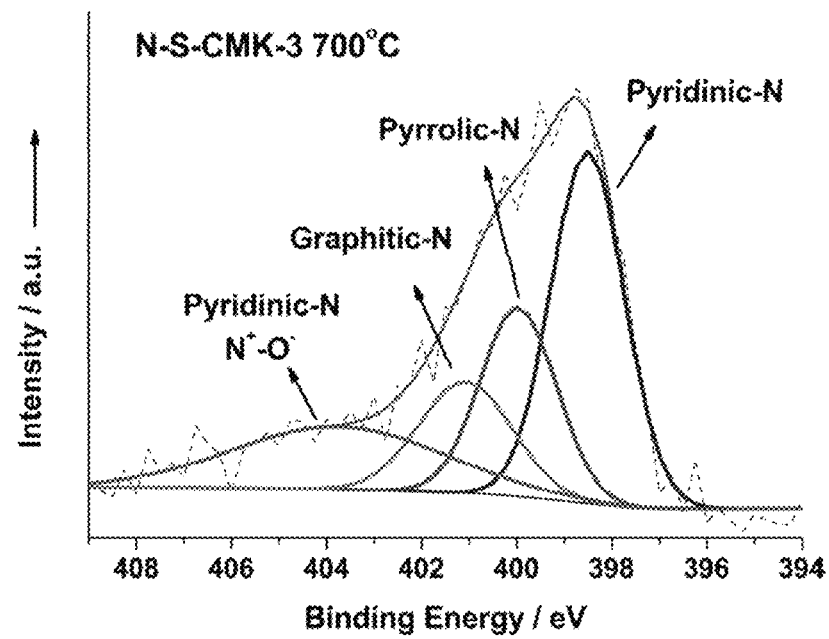
Figure 40B:
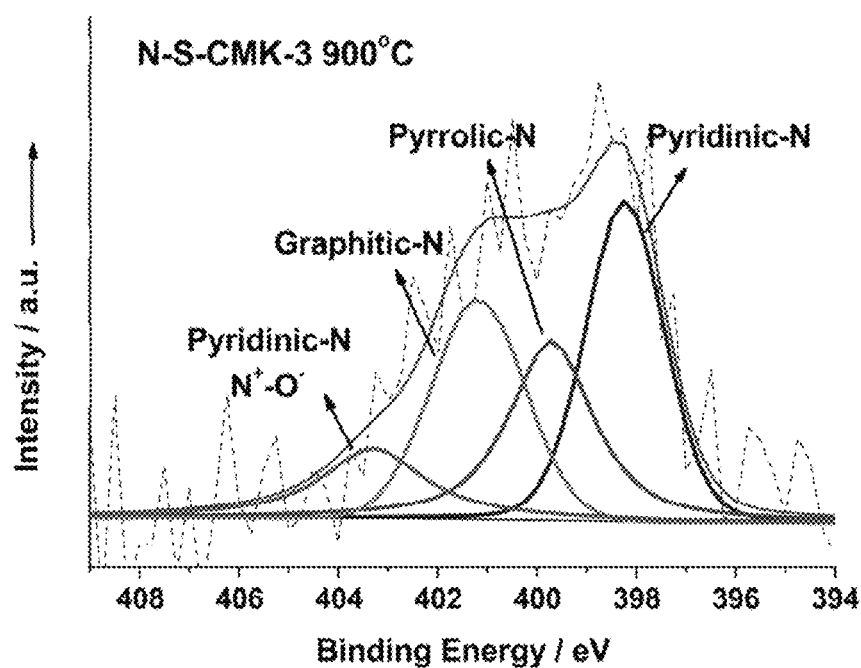

FIGS. 40A-B are graphs showing high-resolution spectra of $N_{1s}$ for N—S-CMK-3 700° C. (FIG. 40A) and N—S-CMK-3 900° C. (FIG. 40B).

Figure 41:
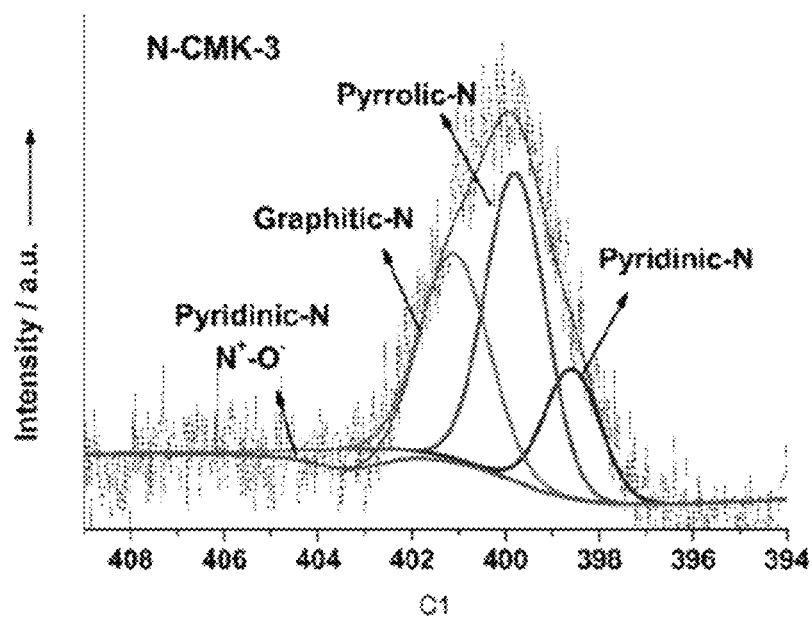

FIG. 41 is a high-resolution spectra of $N_{1s}$ for N-CMK-3.

Figure 42:
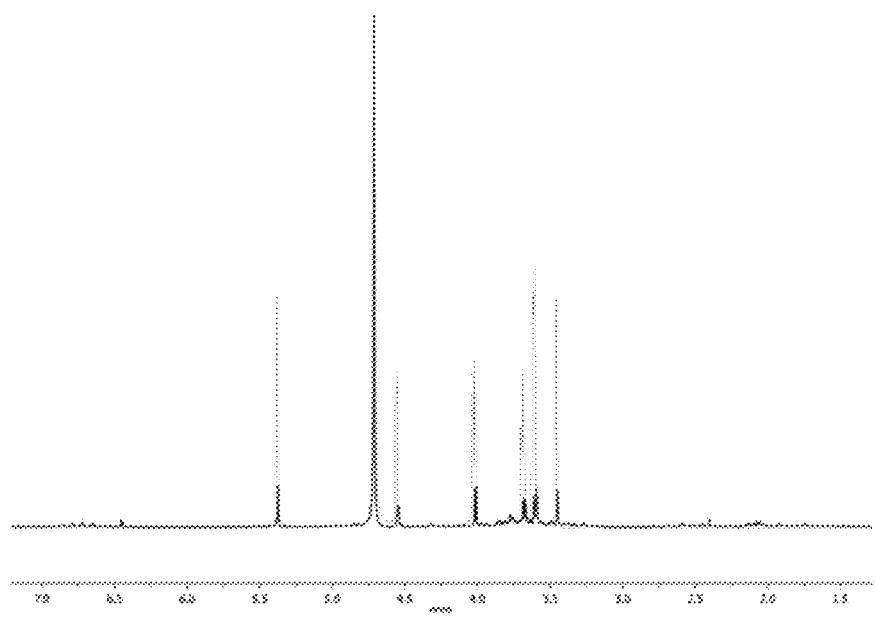

FIG. 42 is an NMR spectrum which identifies the presence of Bio-oil.

FIGS. 43A-C are graphs showing open-circuit voltages and cell resistance curves of AEMFC with direct bio-oil. Anode: 6.0 M KOH aqueous solution and 20.0 wt % bio-oil, 4.0 ml min-1. Cathode: pure oxygen, 200 sccm. FIG. 43A shows effect of temperature on open-circuit voltage and cell resistance. FIG. 43B shows effect of KOH concentration on open-circuit voltage and cell resistance. FIG. 43C shows effect of bio-oil concentration on open-circuit voltage and cell resistance.

FIG. 44 shows cyclic voltammograms of Pt/CNT, Pd/CNT, Au/CNT, and Ag/CNT catalysts in 1.0 M KOH, at 50 mV s-1, 25° C.

Figure 45:
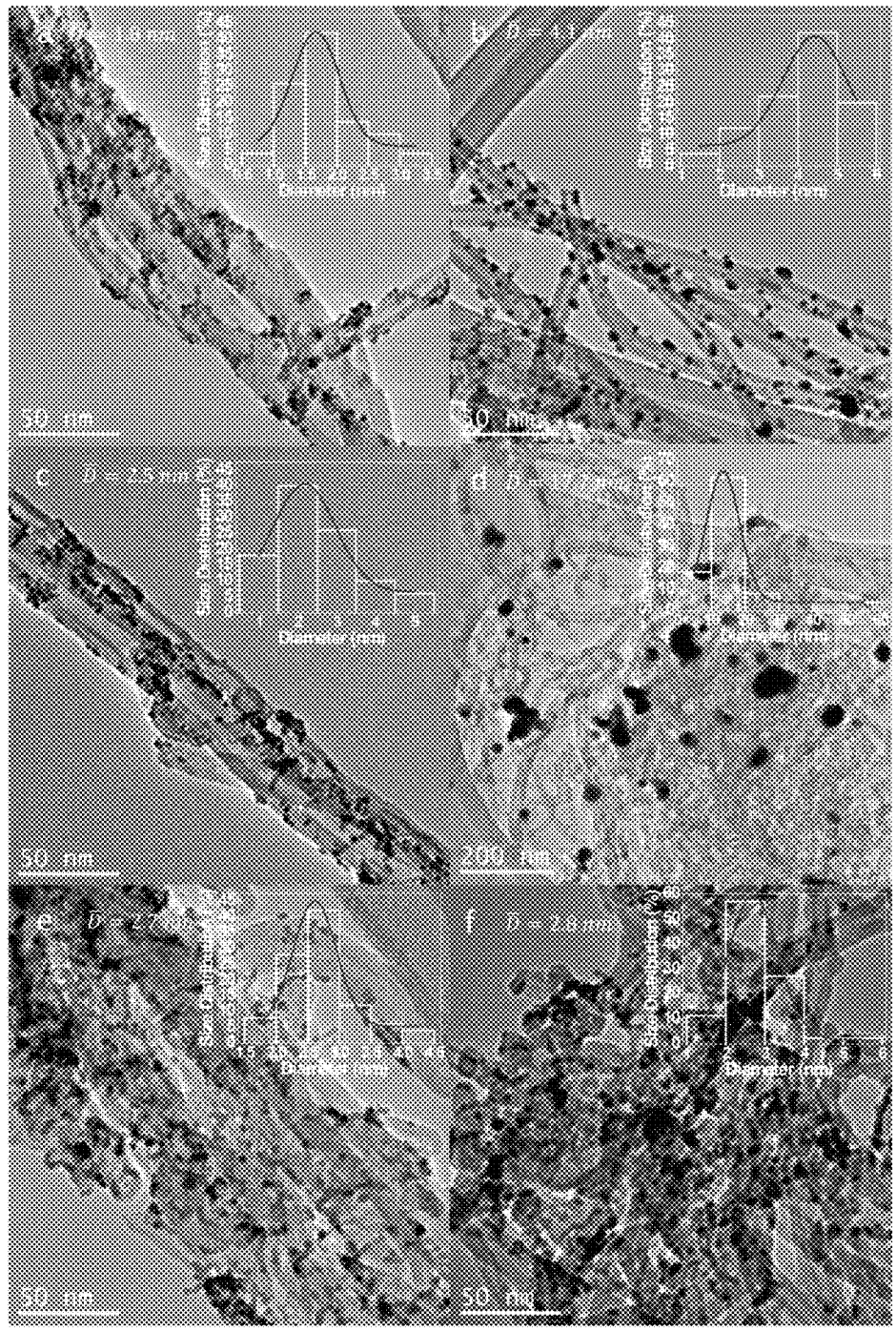

FIGS. 45A-F are right field transmission electron microscopy (TEM) images and corresponding particle size histograms of Pt/CNT (FIG. 45A), Au/CNT (FIG. 45B), Pd/CNT (FIG. 45C), Ag/CNT (FIG. 45D), PdAg/CNT (FIG. 45E), and PdAg$_3$/CNT (FIG. 45F).

Figure 46:
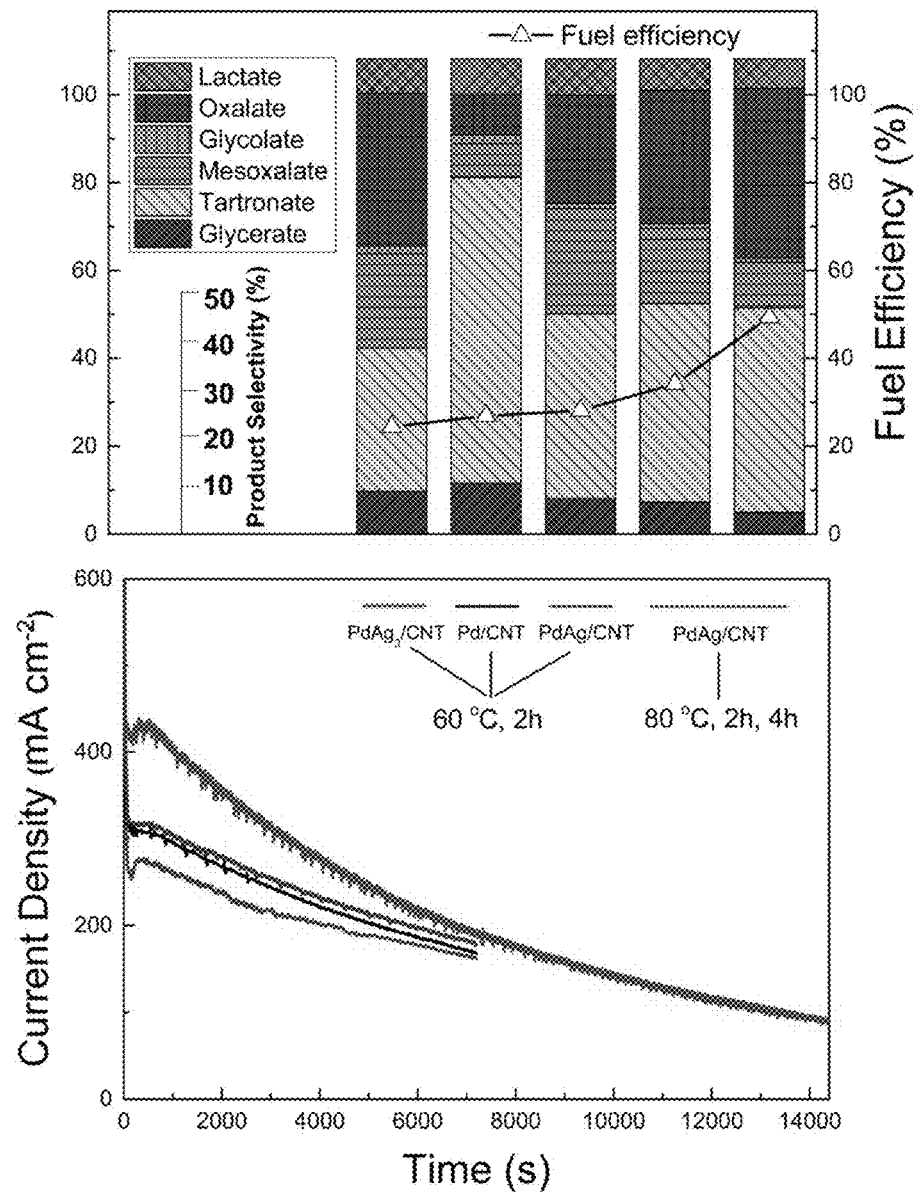

FIG. 46 is a graphical illustration of electrocatalytic selective oxidation of glycerol on Pd/CNT, PdAg/CNT, and PdAg3/CNT in DGFC for C—C bond cleavage and fuel efficiency analysis. Anode catalyst: Pd/CNT, PdAg/CNT, or PdAg$_3$/CNT (0.5 mgPd cm-2); Cathode catalyst: Fe—Cu-based catalyst (Acta 4020, 3 mg cm-2), anion exchange membrane (A901, Tokuyama Inc.). Anode fuel: 6.0 M KOH+1.0 M glycerol, 23.5 ml, 1.0 ml min-1; Cathode fuel: high purity $O_2$, 100 ml min-1, ambient pressure; cell voltage: 0.2 V; cell temperature: 60° C. or 80° C. reaction time: 2 h or 4 h.

Figure 47:
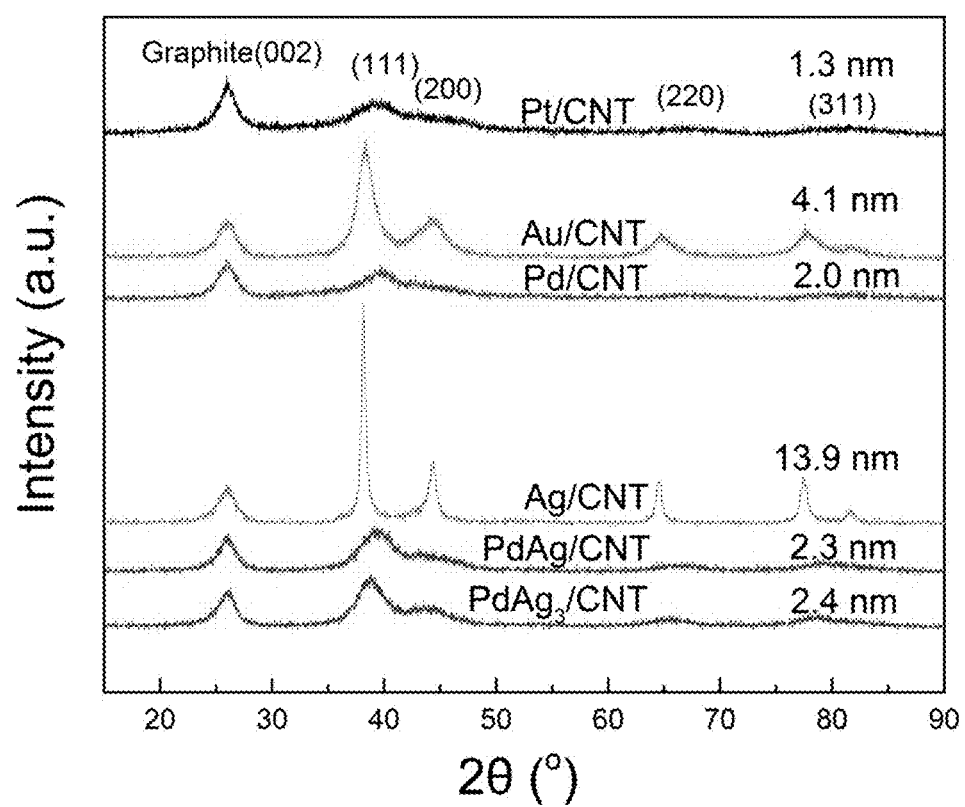
Figure 48:
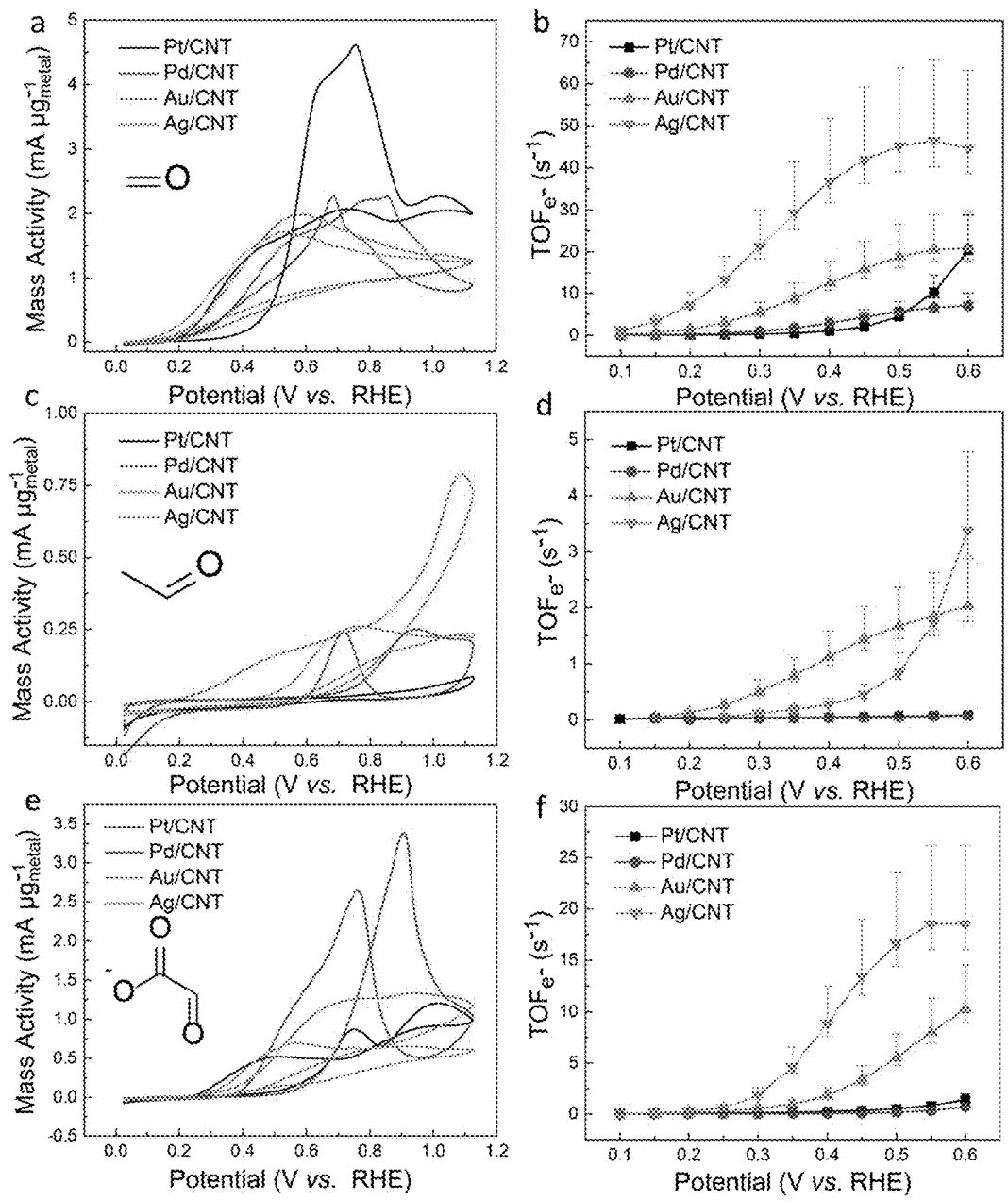
Figure 49:
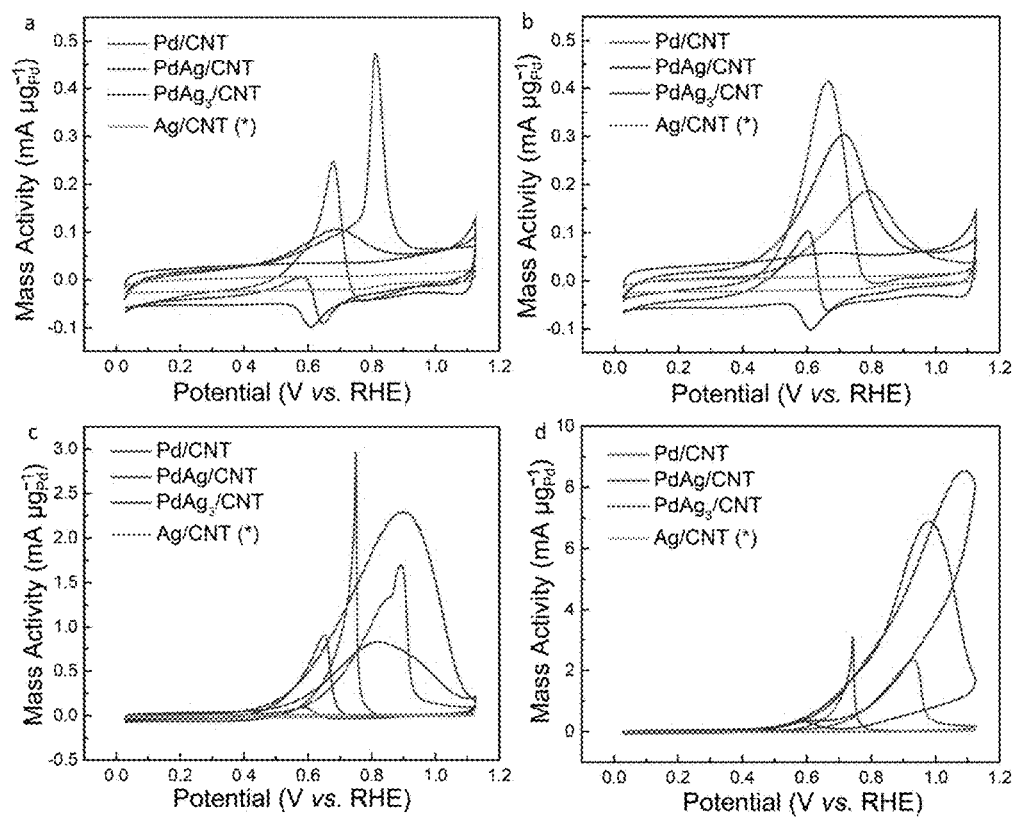
Figure 50:
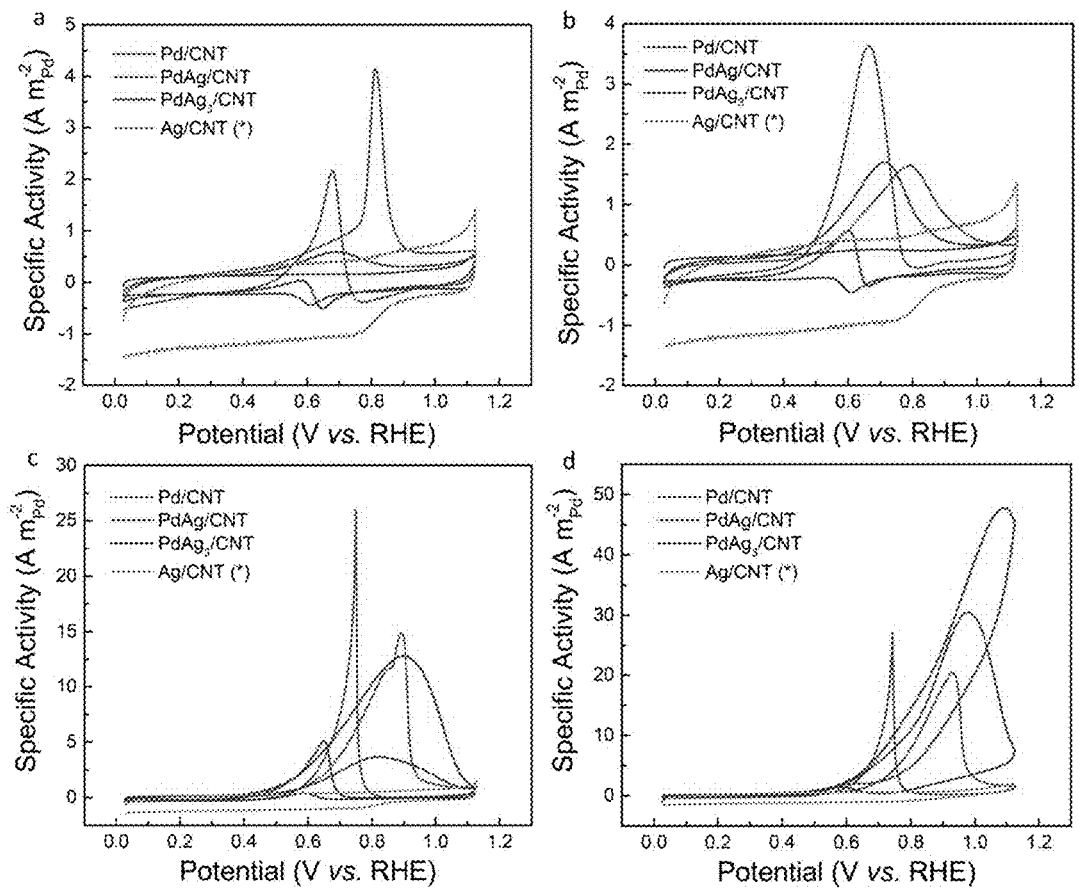

FIG. 47 is a graph showing XRD patterns of Pt/CNT, Au/CNT, Pd/CNT, Ag/CNT, PdAg/CNT, and PdAg$_3$/CNT (20% total metal loading) with their particle sizes calculated from (220) diffraction peak.

FIGS. 48A-F are cyclic voltammograms and corresponding TOFe– range in low temperature direct alcohol fuel cell anode potential window (<0.7 V vs. RHE) of Pt/CNT, Pd/CNT, Au/CNT, and Ag/CNT for aldehyde oxidation in $N_2$ purged 1.0 M KOH+0.1 M formaldehyde (FIGS. 48A-B), acetaldehyde (FIGS. 48C-D), and glyoxylate (FIGS. 48E-F) at 50 mV s-1, room temperature.

FIGS. 49A-D are cyclic voltammograms of Pd/CNT, PdAg/CNT, PdAg$_3$/CNT and Ag/CNT for alcohol oxidation in $N_2$ purged 1.0 M KOH+0.1 M methanol (FIG. 49A), ethanol (FIG. 49B), ethylene glycol (FIG. 49C), glycerol (FIG. 49D) at 50 mV s-1, room temperature. (*) Unlike mass activity of Pd/CNT, PdAg/CNT, and PdAg$_3$/CNT, mass activity of Ag/CNT (mA μgAg-1) is calculated based on the mass of Ag instead of mass of Pd since there's no Pd on the electrode.

FIGS. 50A-D are cyclic voltammograms of Pd/CNT, PdAg/CNT, PdAg$_3$/CNT, and Ag/CNT for alcohol oxidation with respect to specific activity in $N_2$ purged 1.0 M KOH+

0.1 M methanol (FIG. 50A), ethanol (FIG. 50B), ethylene glycol (FIG. 50C), glycerol (FIG. 50D) at 50 mV s-1, room temperature. (*) Unlike specific activity of Pd/CNT, PdAg/CNT, and PdAg$_3$/CNT, the specific activity of Ag/CNT (A mAg-2) is calculated based on the ECSA of Ag instead of ECSA of Pd since there is no Pd on the electrode.

Figure 51:
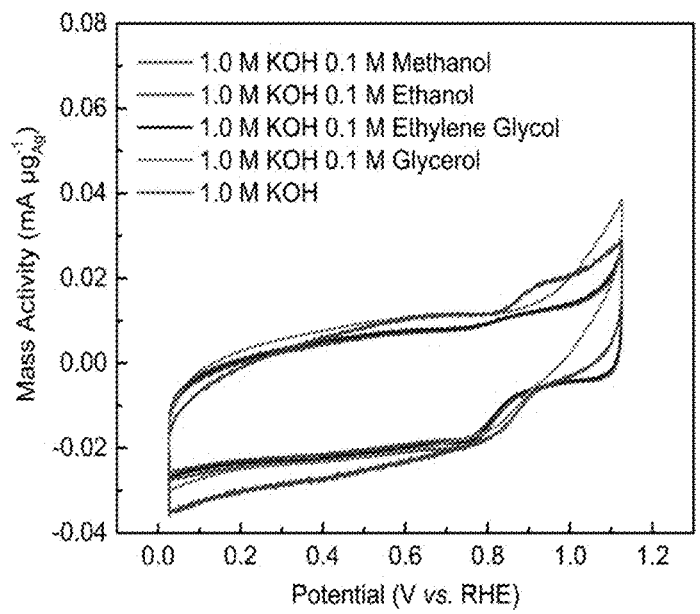

FIG. 51 shows cyclic voltammograms of Ag/CNT for blank test in 1.0 M KOH and alcohol oxidation tests in N$_2$ purged 1.0 M KOH+0.1 M methanol, ethanol, ethylene glycol, and glycerol at 50 mV s-1, room temperature.

Figure 52:
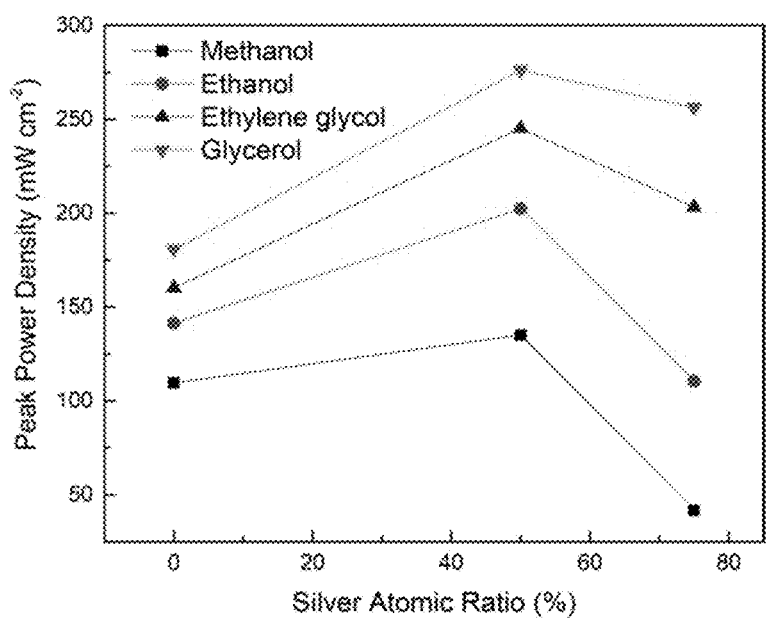
Figure 53:
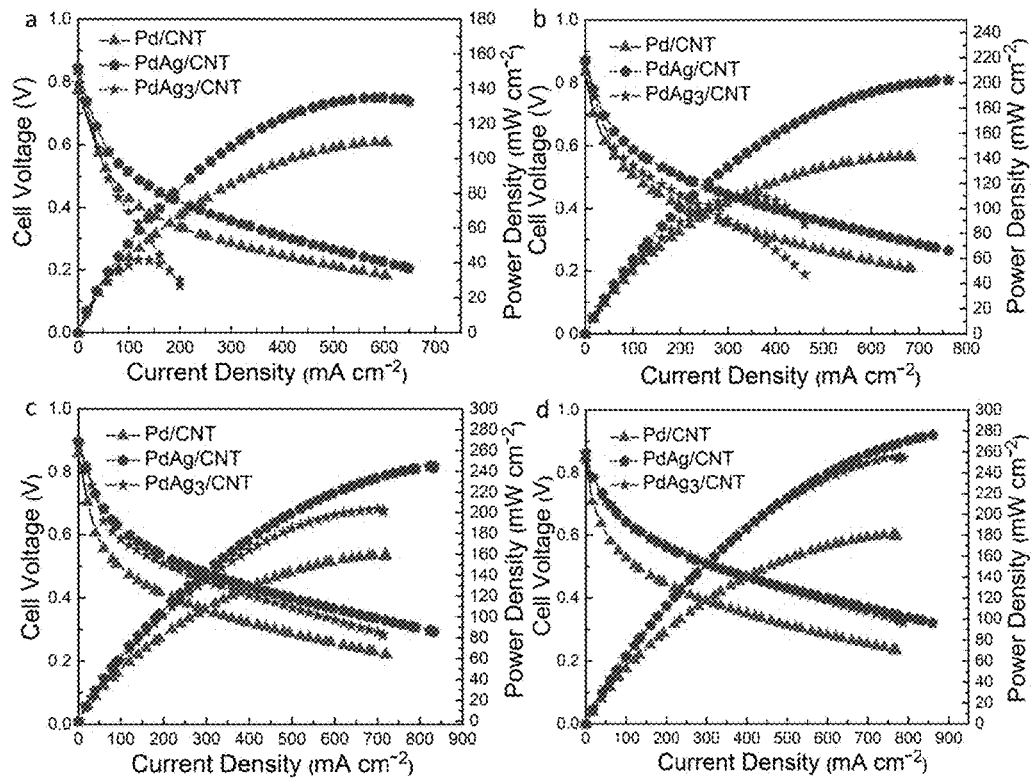
Figure 54:
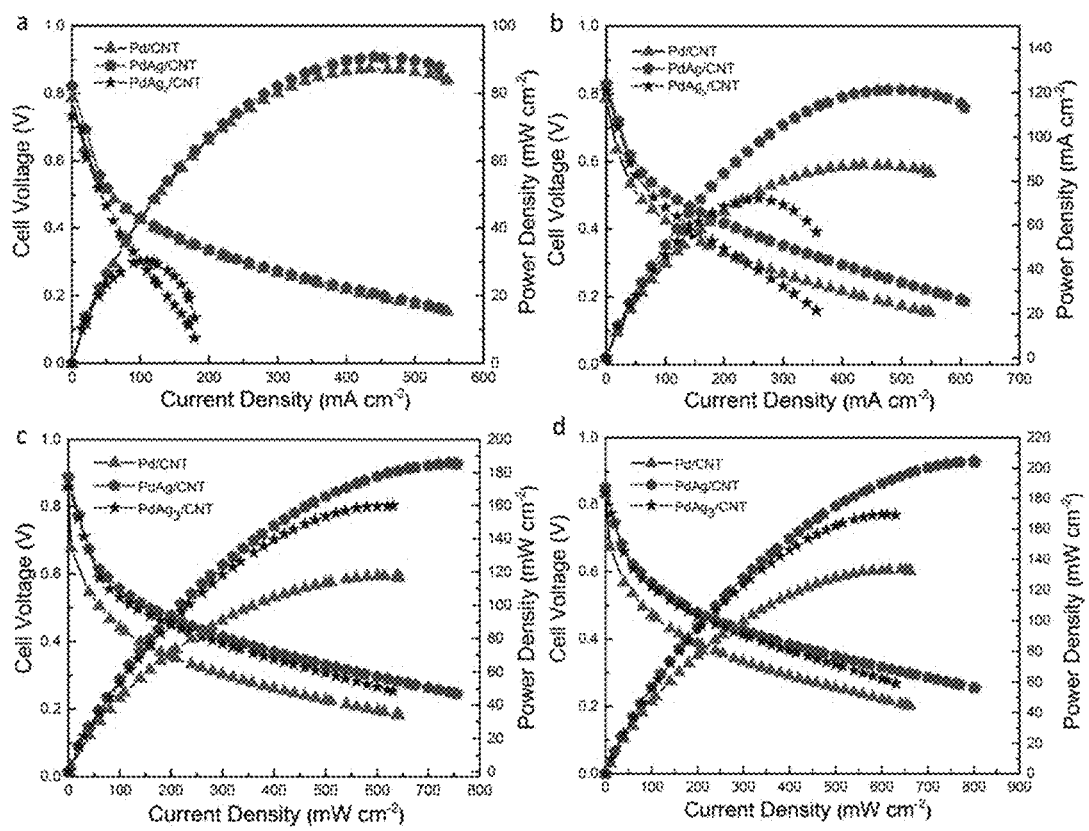

FIG. 52 is a graph showing the relationship between silver atomic ratio in PdAg bimetallic catalysts and total electron releasing rate reflected by peak power density in direct alcohol fuel cells corresponding to FIG. 51.

FIGS. 53A-D are polarization and power density curves of direct alcohol AEMFCs with different anode catalysts (Pd/CNT, PdAg/CNT, and PdAg$_3$/CNT, 0.5 mgPd cm-2) at optimized operating conditions. AEM: Tokuyama A901; cathode catalyst: Fe-based catalyst (Acta 4020), 3.0 mg catalyst cm-2; anode fuel: 6.0 M KOH+3.0 M methanol (FIG. 53A), ethanol (FIG. 53B), ethylene glycol (FIG. 53C), and glycerol (FIG. 53D), 4.0 ml min-1; cathode fuel: 200 sccm O$_2$, ambient pressure; temperature (anode fuel/cathode fuel/cell): 25/80/80° C.

FIGS. 54A-D are polarization and power density curves of direct alcohol AEMFC with different anode catalysts (Pd/CNT, PdAg/CNT, and PdAg$_3$/CNT, 0.5 mgPd cm-2) at optimized operating conditions. AEM: Tokuyama A901; cathode catalyst: Fe—Cu—N4/C (Acta 4020), 3.0 mg catalyst cm-2; anode fuel: 6.0 M KOH+3.0 M methanol (FIG. 54A), ethanol (FIG. 54B), ethylene glycol (FIG. 54C), and glycerol (FIG. 54D), 4.0 ml min-1; cathode fuel: 200 sccm O$_2$, ambient pressure; temperature (anode fuel/cathode fuel/cell): 25/60/60° C.

Figure 55:
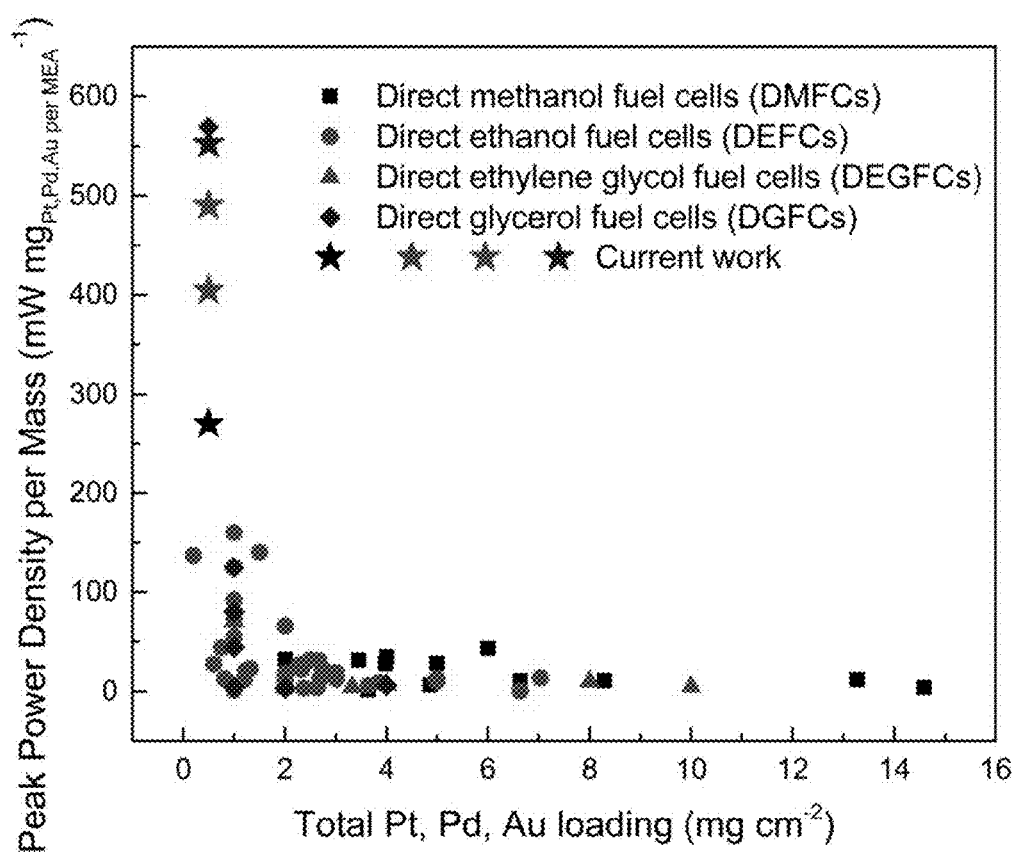

FIG. 55 is a graph showing state-of-the-art performances of low temperature (<100° C.) oxygen or air based DAFCs fed with methanol, ethanol, ethylene glycol, and glycerol. Peak power density per mass (Pt, Pd, Au) versus total Pt, Pd, Au loading in the MEA is exhibited for the major DAFC systems, including direct methanol fuel cells (DMFCs) (Dohle et al., "Development of a Compact 500 W Class Direct Methanol Fuel Cell Stack," *Journal of Power Sources* 106:313-322 (2002); Liu et al., "Studies on Performance Degradation of a Direct Methanol Fuel Cell (DMFC) in Life Test," *Phys. Chem. Chem. Phys.* 6:134-137 (2004); Xie et al., "Development of a 2 W Direct Methanol Fuel Cell Power Source," *Journal of Power Sources* 136:55-65 (2004); Matsuoka et al., "Alkaline Direct Alcohol Fuel Cells Using an Anion Exchange Membrane," Journal of Power Sources 150:27-31 (2005); Kim et al, "Operational Characteristics of a 50 W DMFC Stack," *Journal of Power Sources* 155:203-212 (2006); Scott et al., "Performance of a Direct Methanol Alkaline Membrane Fuel Cell," *Journal of Power Sources* 175:452-457 (2008); Wang et al., "Catalyst Failure Analysis of a Direct Methanol Fuel Cell Membrane Electrode Assembly," *Journal of Power Sources* 177:386-392 (2008); Park et al, "Dynamic Response and Long-Term Stability of a Small Direct Methanol Fuel Cell Stack," *Journal of Power Sources* 195:4080-4089 (2010); Prabhuram et al., "Long-term Durability Test for Direct Methanol Fuel Cell Made of Hydrocarbon Membrane," *International Journal of Hydrogen Energy* 35:6924-6933 (2010); Prakash et al., "Study of Operating Conditions and Cell Design on the Performance of Alkaline Anion Exchange Membrane Based Direct Methanol Fuel Cells," *Journal of Power Sources* 196:7967-7972 (2011); Kang et al., Long-term Durability of Radiation-Grafted PFA-g-PSSA Membranes for Direct Methanol Fuel Cells," *Journal of Membrane Science* 447:36-42 (2013); Joghee et al., "High-Performance Alkaline Direct Methanol Fuel Cell using a Nitrogen-Post-doped Anode," *ChemSusChem* 7:1854-1857 (2014), which are hereby incorporated by reference in their entirety), direct ethanol fuel cells (DEFCs) (Chen et al., "Direct Alcohol Fuel Cells: Toward the Power Densities of Hydrogen-Fed Proton Exchange Membrane Fuel Cells," *ChemSusChem* 8:524-533 (2015); Wang et al., "High Performance Direct Ethanol Fuel Cell With Double-Layered Anode Catalyst Layer," *Journal of Power Sources* 177:142-147 (2008); Vigier et al., "Development of Anode Catalysts for a Direct Ethanol Fuel Cell," *Journal of Applied Electrochemistry* 34:439-446 (2004); Zhou et al., "Bi- and Tri-Metallic Pt-Based Anode Catalysts for Direct Ethanol Fuel Cells," *Journal of Power Sources* 131:217-223 (2004); Zhou et al., "Performance Comparison of Low-Temperature Direct Alcohol Fuel Cells With Different Anode Catalysts," 126: 16-22 (2004); Jiang et al., "Structure and Chemical Composition of Supported Pt—Sn Electrocatalysts for Ethanol Oxidation," *Electrochimica Acta* 50:5384-5389 (2005); Liu et al., Preparation and Characterization of Pt/C and Ru/C Electrocatalysts for Direct Ethanol Fuel Cells," *Journal of Power Sources* 149:1-7 (2005); Song et al., "The Effect of Methanol and Ethanol Cross-Over on the Performance of PtRu/C-Based Anode DAFCs," *Applied Catalysis, B: Environmental* 55:65-72 (2005); Verma et al., "Direct Use of Alcohols and Sodium Borohydride as Fuel in an Alkaline Fuel Cell," *Journal of Power Sources* 145:282-285 (2005); Verma et al, "Manganese Dioxide as a Cathode Catalyst for a Direct Alcohol or Sodium Borohydride Fuel Cell With a Flowing Alkaline Electrolyte,"*Journal of Power Sources* 141:30-34 (2005); Zhou et al., "Direct Ethanol Fuel Cells Based on PtSn Anodes: the Effect of Sn Content on the Fuel Cell Performance," *Journal of Power Sources* 140:50-58 (2005); Rousseau et al., "Direct Ethanol Fuel Cell (DEFC): Electrical Performances and Reaction Products Distribution Under Operating Conditions With Different Platinum-Based Anodes," *Journal of Power Sources* 158:18-24 (2006); Colmati et al., "Ethanol Oxidation on a Carbon-Supported Pt$_{75}$ Sn$_{25}$ Electrocatalyst Prepared by Reduction With Formic Acid: Effect of Thermal Treatment,"*Applied Catalysis B: Environmental* 73:106-115 (2007); Li et al., Comparison of Different Promotion Effect of PtRu/C and PtSn/C Electrocatalysts for Ethanol Electro-Oxidation," *Electrochimica Acta* 52:6622-6629 (2007); Ribeiro et al., Carbon-Supported Ternary PtSnIr Catalysts for Direct Ethanol Fuel Cell, *Electrochimica Acta* 52:6997-7006 (2007); Tsiakaras, "PtM/C (M=Sn, Ru, Pd, W) Based Anode Direct Ethanol—PEM-FCs: Structural Characteristics and Cell Performance," *Journal of Power Sources* 171:107-112 (2007); Varcoe et al., "Investigations Into the Ex Situ Methanol, Ethanol and Ethylene Glycol Permeabilities of Alkaline Polymer Electrolyte Membranes," *Journal of Power Sources* 173:194-199 (2007); Verma et al., "Direct Alkaline Fuel Cell for Multiple Liquid Fuels: Anode Electrode Studies," *Journal of Power Sources* 174:180-185 (2007); Xue et al., Enhancement of the Electrooxidation of Ethanol on Pt—Sn—P/C Catalysts Prepared by Chemical Deposition Process," *Journal of Power Sources* 172:560-569 (2007); Basu et al., "Improvement in Performance of a Direct Ethanol Fuel Cell: Effect of Sulfuric Acid and Ni-Mesh," *Electrochemistry Communications* 10:1254-1257 (2008); Fujiwara et al., "Direct Ethanol Fuel Cells Using an Anion Exchange Membrane," *Journal of Power Sources* 185:621-626 (2008); Hou et al., "Alkali Doped Polybenzimidazole Membrane for High Performance Alkaline Direct Ethanol Fuel Cell," *Journal of Power*

Sources 182:95-99 (2008); Lopes et al., "Carbon Supported Pt—Pd Alloy as an Ethanol Tolerant Oxygen Reduction Electrocatalyst for Direct Ethanol Fuel Cells," *International Journal of Hydrogen Energy* 33:5563-5570 (2008); Ribeiro et al, "Effect of W on PtSn/C Catalysts for Ethanol Electrooxidation," *J Appl. Electrochem.* 38:653-662 (2008); Yang et al., Study of Poly(Vinyl Alcohol)/Titanium Oxide Composite Polymer Membranes and Their Application on Alkaline Direct Alcohol Fuel Cell," *Journal of Power Sources* 184:44-51 (2008); Yang et al., "Preparation of a PVA/HAP Composite Polymer Membrane for a Direct Ethanol Fuel Cell (DEFC)," *Journal of Applied Electrochemistry* 38:1329-1337 (2008); Bambagioni et al., "Pd and Pt—Ru Anode Electrocatalysts Supported on Multi-Walled Carbon Nanotubes and Their use in Passive and Active Direct Alcohol Fuel Cells With an Anion-Exchange Membrane (Alcohol=Methanol, Ethanol, Glycerol)," *Journal of Power Sources* 190:241-251 (2009); Bianchini et al., "Selective Oxidation of Ethanol to Acetic Acid in Highly Efficient Polymer Electrolyte Membrane-Direct Ethanol Fuel Cells," *Electrochemistry Communications* 11:1077-1080 (2009); Neto et al., "Preparation of PtSn/C Electrocatalysts Using Citric Acid as Reducing Agent for Direct Ethanol Fuel Cell (DEFC)," *Ionics* 16:85-89 (2009); Varela et al., "Ethanol-Tolerant Pt-alloy Cathodes for Direct Ethanol Fuel Cell (DEFC) Applications," *Asia-Pacific Journal of Chemical Engineering* 4:17-24 (2009); Rao et al., "ORR Activity and Direct Ethanol Fuel Cell Performance of Carbon-Supported Pt—M (M=Fe, Co, and Cr) Alloys Prepared by Polyol Reduction Method," *J. Phys. Chem. C,* 113:18907-18913 (2009); Zhu et al., "Effect of Alloying Degree in PtSn Catalyst on the Catalytic Behavior for Ethanol Electro-Oxidation," *Electrochimica Acta* 54:1511-1518 (2009); Gaurava et al., "Development of Direct Alcohol Alkaline Fuel Cell Stack," *Fuel Cells* 10(4):591-596 (2010); Lee et al, "Effect of Mo Addition on the Electrocatalytic Activity of Pt—Sn—Mo/C for Direct Ethanol Fuel Cells," *Electrochimica Acta* 56:1611-1618 (2011); Xu et al., "Stabilization of the Palladium Electrocatalyst With Alloyed Gold for Ethanol Oxidation," *International Journal of Hydrogen Energy* 35:6490-6500 (2010); An et al., An Alkaline Direct Ethanol Fuel Cell With a Cation Exchange Membrane," *Energy Environ. Sci.* 4:2213-2217 (2011); Hou et al., "Durability study of KOH Doped Polybenzimidazole Membrane for Air-Breathing Alkaline Direct Ethanol Fuel Cell," *Journal of Power Sources* 196:3244-3248 (2011); Hou et al., KOH Modified Nafion112 Membrane for High Performance Alkaline Direct Ethanol Fuel Cell," *International Journal of Hydrogen Energy* 36:5104-5109 (2011); Li et al., A High-Performance Integrated Electrode for Anion-Exchange Membrane Direct Ethanol Fuel Cells," *Journal of Hydrogen Energy* 36:7707-7713 (2011); Shen et al., "High Performance of a Carbon Supported Ternary PdIrNi catalyst for Ethanol Electro-Oxidation in Anion-Exchange Membrane Direct Ethanol Fuel Cells," *Energy Environ. Sci.* 4:1428-1433 (2011); Ünlü et al., "Analysis of Double Layer and Adsorption Effects at the Alkaline Polymer Electrolyte-Electrode Interface," *Journal of the Electrochemical Society* 158:B1423-B1431 (2011); Datta et al., "Enhancement of Functional Properties of PtPd Nano Catalyst in Metal-Polymer Composite Matrix: Application in Direct Ethanol Fuel Cell," *Electrochemistry Communications* 20:56-59 (2012); Purgato et al., "Direct Ethanol Fuel Cell: Electrochemical Performance at 90° C. on Pt and PtSn/C electrocatalysts," *Journal of Power Sources* 198:95-99 (2012); Zignani et al., "Performance and Selectivity of PtxSn/C Electro-Catalysts for Ethanol Oxidation Prepared by Reduction With Different Formic Acid Concentrations," *Electrochimica Acta* 70:255-265(2012), which are hereby incorporated by reference in their entirety), direct ethylene glycol fuel cells (DEGFCs) (Livshits et al., "Progress in the Development of a High-Power, Direct Ethylene Glycol Fuel Cell (DEGFC)," *Journal of Power Sources* 161:1187-1191 (2006); Matsuoka et al., "Alkaline Direct Alcohol Fuel Cells Using an Anion Exchange Membrane," *Journal of Power Sources* 150:27-31 (2005); Chetty et al., "Catalysed Titanium Mesh Electrodes for Ethylene Glycol Fuel Cells," *J. Appl. Electrochem.* 37:1077-1084 (2007); Livshits et al., "Direct Ethylene Glycol Fuel-Cell Stack—Study of Oxidation Intermediate Products," *Journal of Power Sources* 178:687-691 (2008); Xin et al., "Electrocatalytic Oxidation of Ethylene Glycol (EG) on Supported Pt and Au Catalysts in Alkaline Media: Reaction Pathway Investigation in Three-Electrode Cell and Fuel Cell Reactors," *Applied Catalysis B: Environmental* 125:85-94 (2012), which are hereby incorporated by reference in their entirety), and direct glycerol fuel cells (DGFCs) (Han et al., "Numerical Analysis of Anion-Exchange Membrane Direct Glycerol Fuel Cells Under Steady State and Dynamic Operations," *International Journal of Hydrogen Energy* 39:19767-19779 (2014); Qi et al, "Surface Dealloyed PtCo Nanoparticles Supported on Carbon Nanotube: Facile Synthesis and Promising Application for Anion Exchange Membrane Direct Crude Glycerol Fuel Cell," *Green Chem.* 15:1133-1137 (2013); Matsuoka et al., "Alkaline Direct Alcohol Fuel Cells Using an Anion Exchange Membrane," *Journal of Power Sources* 150:27-31 (2005); Bambagioni et al., "Pd and Pt—Ru Anode Electrocatalysts Supported on Multi-Walled Carbon Nanotubes and Their use in Passive and Active Direct Alcohol Fuel Cells With an Anion-Exchange Membrane (Alcohol=Methanol, Ethanol, Glycerol)," *Journal of Power Sources* 190:241-251 (2009); Ragsdale et al., "Direct-Glycerin Fuel Cell for Mobile Applications," *ECS Trans.* 16:1847-1854 (2008); Ilie et al., "Influence of Operational Parameters and of Catalytic Materials on Electrical Performance of Direct Glycerol Solid Alkaline Membrane Fuel Cells," *Journal of Power Sources* 196:4965-4971 (2011); Zhang et al., "Supported Pt, Pd and Au Nanoparticle Anode Catalysts for Anion-Exchange Membrane Fuel Cells With Glycerol and Crude Glycerol Fuels," *Applied Catalysis B: Environmental* 136/137:29-39 (2013), which are hereby incorporated by reference in their entirety).

FIGS. 56A-B show a calculated orbital energy diagram of HOMO-1, HOMO, LUMO, and LUMO+1 for different aldehydes with frontier HOMO-LUMO gaps (Egap(sub)) as orbital energy differences (FIG. 56A) and TOFe– (at 0.6 V vs RHE) as a function of orbital energy difference matching represented by Egap+1(cat)-Egap(sub) (FIG. 56B). Experimental points of the same substrate are linked with arrows. The solid arrows link points follow an obvious mutual trend, while the dotted ones link points that need further clarifications.

FIGS. 57A-E show XRD patterns of Ag/CNT, PdAg$_3$/CNT, PdAg/CNT, and Pd/CNT catalysts (FIG. 57A). Also, TEM images and corresponding particle size histograms of Ag/CNT (FIG. 57B), PdAg$_3$/CNT (FIG. 57C), PdAg/CNT (FIG. 57D), and Pd/CNT (FIG. 57E) catalysts are shown.

FIGS. 58A-D show XPS spectra of as-prepared catalysts before 2 h glycerol oxidation in AEMFC Pd 3d for Pd/CNT, PdAg/CNT, and PdAg$_3$/CNT (FIG. 58A), Ag 3d for Ag/CNT, PdAg/CNT, and PdAg$_3$/CNT (FIG. 58B). HAADF-STEM-EDS mapping images of a single PdAg and PdAg$_3$ nanoparticle PdAg/CNT (FIG. 58C), PdAg$_3$/CNT (FIG. 58D).

Figure 59:
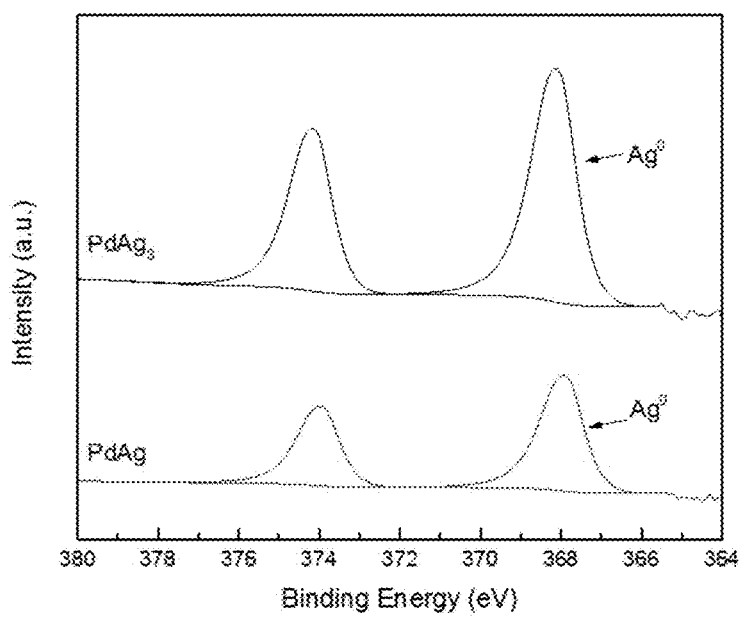

FIG. 59 is an XPS spectra of as-prepared catalysts after 2 h glycerol oxidation in AEMFC (a) Ag 3d for PdAg/CNT and PdAg₃/CNT, (b) Pd 3d for PdAg/CNT, Pd/CNT, and PdAg₃/CNT.

Figure 60:
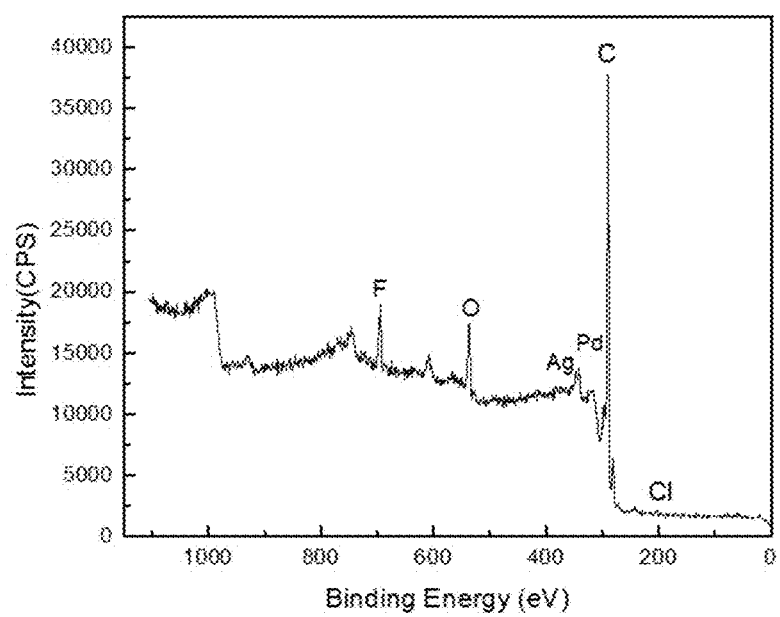

FIG. 60 is an XPS broad-scan spectra for Pd after 2 h glycerol oxidation in AEMFC.

Figure 61:
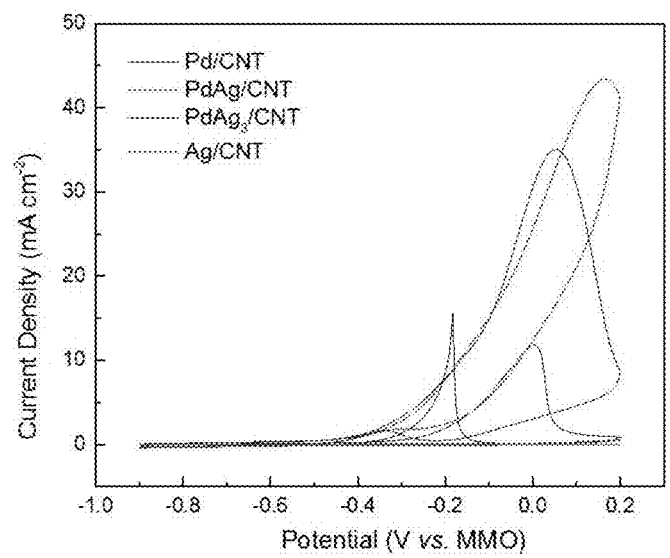

FIG. 61 shows cyclic voltammograms of glycerol oxidation reaction on Pd/CNT, PdAg/CNT, PdAg₃/CNT, and Ag/CNT catalysts in 1.0 M KOH+0.1 M glycerol, 50 mV s⁻¹, 25° C.

Figure 62:
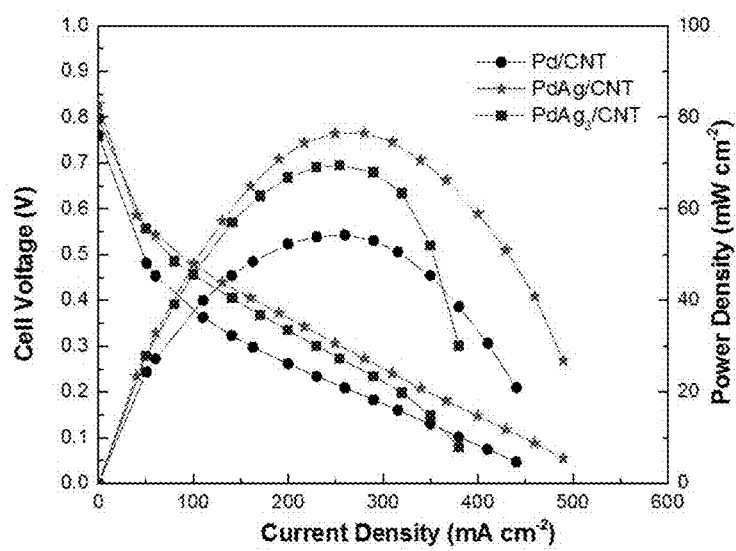

FIG. 62 shows polarization and power density curves of direct glycerol AEMFC with different anode catalysts (Pd/CNT, 0.5 mg cm⁻²; PdAg/CNT, 1.0 mg cm⁻²; PdAg₃/CNT, 2.0 mg cm⁻²). AEM: Tokuyama A201; cathode catalyst: Fe-based catalyst (Acta 4020), 3.0 mg cm-2; anode fuel: 2.0 M KOH+1.0 M glycerol, 2.0 mL min⁻¹, cathode fuel: O₂, 200 sccm, ambient pressure, 60° C.

FIGS. 63A-F are cyclic Voltammograms of Pd/CNT, PdAg/CNT, PdAg₃/CNT, and Ag/CNT for glycerol oxidation products and intermediates in 1.0 M KOH+0.1 M glycerate (FIG. 63A), mesoxalate (FIG. 63B), tartronate (FIG. 63C), lactate (FIG. 63D), oxalate (FIG. 63E), and glycolate (FIG. 63F) at 50 mV s⁻¹, 60° C.

FIGS. 64A-F are cyclic Voltammograms of Pd/CNT, PdAg/CNT, PdAg₃/CNT, and Ag/CNT for glycerol oxidation products and intermediates in 1.0 M KOH+0.1 M glycerate (FIG. 64A), mesoxalate (FIG. 64B), tartronate (FIG. 64C), lactate (FIG. 64D), oxalate (FIG. 64E), and glycolate (FIG. 64F) at 50 mV s⁻¹, 60° C.

Figure 65:
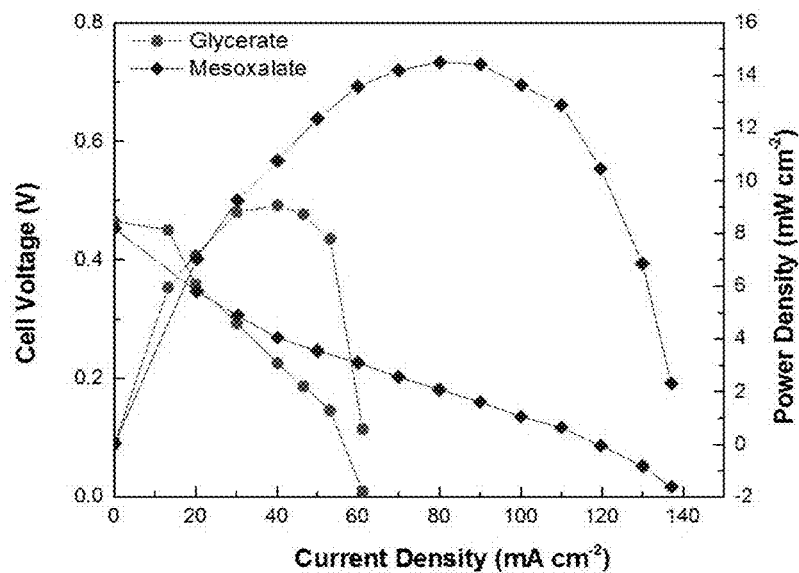

FIG. 65 is a graph showing polarization and power density curves of direct glycerol oxidation products (C₃) with PdAg/CNT anode catalyst at optimized operating conditions. AEM: Tokuyama A901; cathode catalyst: Fe-based catalyst (Acta 4020), 3.0 mg cm⁻²; anode fuel: 2.0 M KOH+0.3 M fuel (mesoxalate, glycerate).

Figure 66:
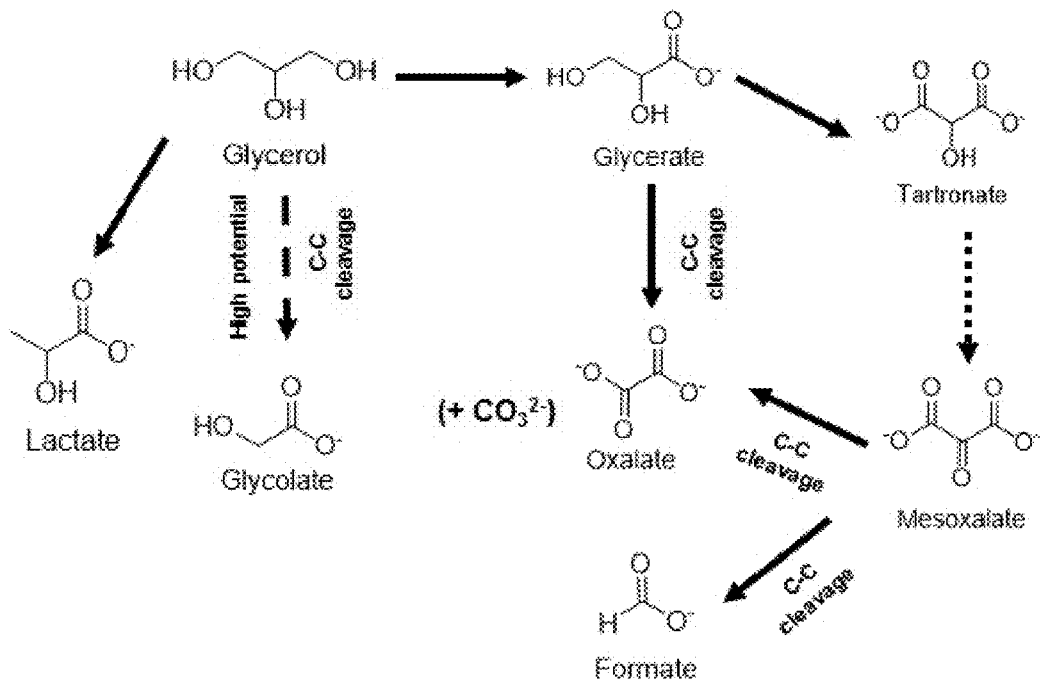
Figure 67A:
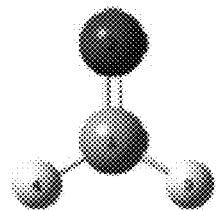
Figure 67B:
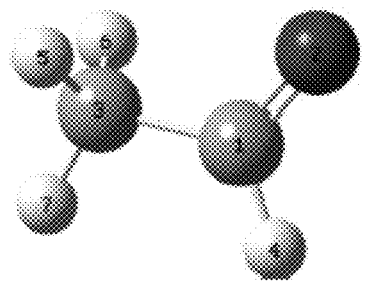
Figure 67C:
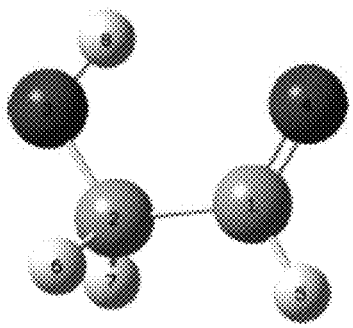
Figure 67D:
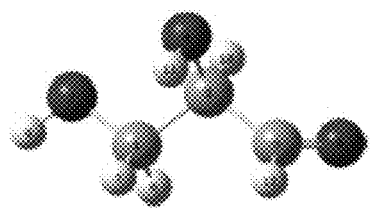
Figure 67E:
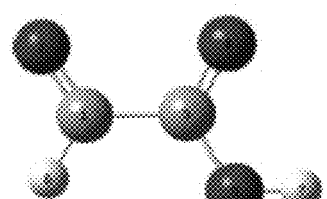

FIG. 66 is an illustration showing the proposed reaction pathway for oxidation of glycerol on PdAg/CNT in alkaline media. These reaction pathways do not necessarily indicate elementary reaction steps.

FIGS. 67A-E are illustrations and tables showing orbital energy levels and the isosurfaces of the frontier orbitals of aldehydes containing C, H, and O atoms, with atomic coordinates listed in the tables. These were computed at Modified Neglect of Diatomic Overlap (MNDO) (Dewar et al., *J. Am. Chem. Soc.* 99:4899-4907 (1977), which is hereby incorporated by reference in its entirety) level of theory to properly fit the experimental data of ionization energy and electron affinity.

FIG. 68 is a table and illustrations showing calculated orbital energy and chemical hardness of aldehydes with different substituent groups.

DETAILED DESCRIPTION OF THE INVENTION

The present invention relates to a fuel-cell system and a method of generating energy from crude fuel.

A first aspect of the present invention is directed to a fuel-cell system. This system includes an anode electrode; a cathode electrode; a separator positioned between the anode electrode and the cathode electrode, where the separator is not an ion exchange membrane; an anode catalyst; and a cathode catalyst, where the cathode catalyst is a non-precious metal catalyst or metal-free catalyst.

In the following description, reference is made to the accompanying drawings that form a part thereof, and in which is shown by way of illustration specific embodiments which may be practiced. These embodiments are described in sufficient detail to enable those skilled in the art to practice the invention, and it is to be understood that other embodiments may be utilized and that structural, logical, mechanical, and other changes may be made without departing from the scope of the present invention. The following description of exemplary embodiments is, therefore, not to be taken in a limited sense.

Figure 1:
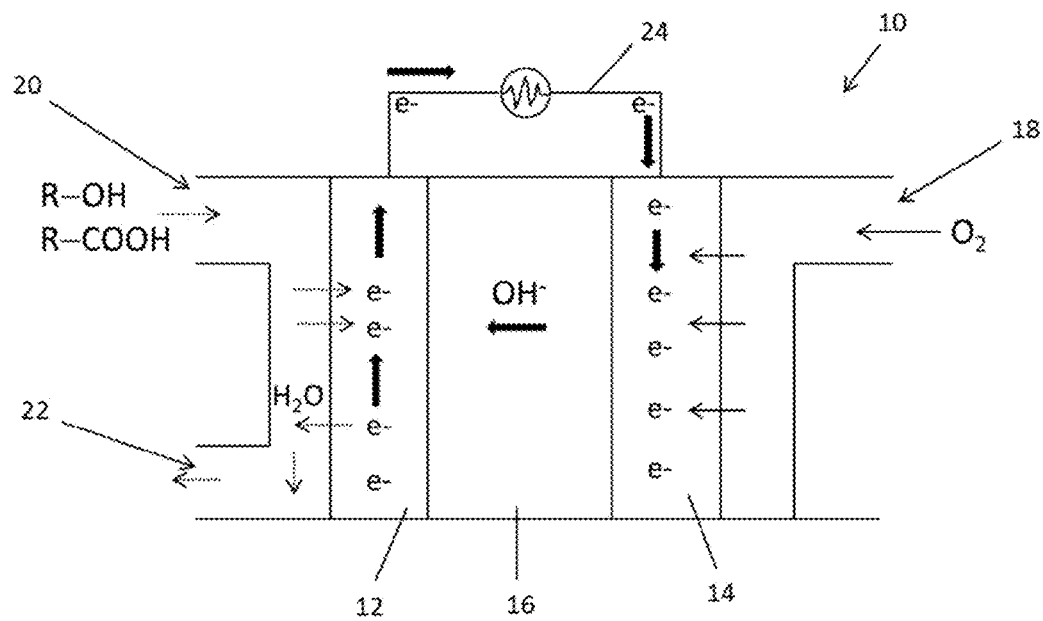
FIG. 1 is a schematic illustration of a fuel cell system according to one embodiment of the present invention.

FIG. 1 is a schematic illustration of one embodiment of a fuel-cell system according to one aspect of the present invention. Fuel-cell system 10 includes anode electrode 12 and cathode electrode 14 separated by separator 16. Oxygen is supplied to the fuel-cell system through oxygen entry port 18 and biomass fuel (R—OH, R—COOH) is supplied to the fuel-cell system through hydrogen entry port 20. Anode electrode 12 is connected to cathode electrode 14 through external circuit 24. Water and heat exit fuel-cell system through water and heat exit port 22.

A fuel cell is an electrochemical device in which electrical energy is generated by a chemical reaction without altering the basic components of the fuel cell, i.e., the electrodes and the electrolyte. Fuel cells combine small organic compounds and oxygen without combustion to form water, and also produce direct current electric power. The process can be described as electrolysis in reverse. The fuel cell is unique in that it converts chemical energy continuously into electrical energy without an intermediate conversion to heat energy.

The operation of a fuel cell (e.g., fuel cell 10 of FIG. 1) involves supplying fuel (R—OH, R—COOH) to anode electrode 12, where the fuel is ionized to free electrons and hydrogen ions. The free electrons flow through external circuit 24 to cathode electrode 14. The free hydrogen ions pass through the electrolyte (separator 16) to the cathode electrode 14, which is supplied with oxygen. The oxygen at cathode electrode 14 is ionized by the electrons, which flows into cathode electrode 14 from external circuit 24 connected to anode electrode 12. The ionized oxygen and hydrogen ions react to form water. The chemical reactions occurring in the fuel cell can be summarized, as follows:

Anode: $H_2 + 2OH^- \rightarrow 2H_2O + 2e^-$

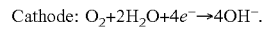

Cathode: $O_2 + 2H_2O + 4e^- \rightarrow 4OH^-$.

As used herein, the term "fuel cell" refers to a device used for the generation of electricity from a chemical reaction. The reaction can proceed naturally or can be facilitated with electrical input from, for example, a potentiostat. As illustrated in FIG. 1, the fuel cell is comprised of anode (12) and cathode (14) electrodes connected through a conductive material (separator 16). The electrodes may be housed in a single or double chamber and are separated by a separator (16) positioned between the anode (12) and cathode (14) electrodes. In the present invention, the separator (16) is not an ion exchange membrane.

Anode electrode 12 and cathode electrode 14 may be constructed of a metal or alloy material. Suitable metals and alloys for anodes and cathodes are known to those of ordinary skill in the art. Alternatively, one or both electrode materials may be an electronically conductive green ceramic, which are also known to those of ordinary skill in the art. According to one embodiment, the anode material may be a partially sintered metallic nickel coated with yttria-stabilized zirconia, and the cathode material may be a modified lanthanum manganite, which has a perovskite structure.

The electrode (anode and/or cathode) may further include a microporous layer configured to increase reactant diffusion effects. The microporous layer generally includes conductive powders with a particular particle diameter, for example a carbon powder, carbon black, acetylene black, activated carbon, a carbon fiber, fullerene, carbon nanotube, carbon nano wire, a carbon nano-horn, carbon nano ring, or a combination thereof. The microporous layer may be formed by coating a composition including a conductive powder, a binder resin, and a solvent on the electrode substrate. The binder resin may include, for example and without limitation, polytetrafluoroethylene, polyvinylidenefluoride, polyhexafluoropropylene, polyperfluoroalkylvinylether, polyperfluorosulfonylfluoride, alkoxyvinyl ether, polyvinylalcohol, celluloseacetate, a copolymer thereof, or the like. The solvent may include alcohols such as ethanol, isopropyl alcohol, n-propylalcohol, and butanol, water, dimethyl acetamide, dimethylsulfoxide, N-methylpyrrolidone, tetrahydrofuran, or the like. The coating method may include, but is not limited to, screen printing, spray coating, doctor blade methods, gravure coating, dip coating, silk screening, painting, direct writing (e.g., as an ink) and so on, depending on the viscosity of the composition.

According to one embodiment of this and other aspects of the present invention, the separator comprises perfluorinated hydrocarbon. Suitable non-limiting examples of perfluorinated hydrocarbons include fluoroheptanes, fluorocycloheptanes, fluoromethylcycloheptanes, fluorohexanes, fluorocyclohexanes, fluoropentanes, fluorocyclopentanes, fluoromethylcyclopentanes, fluorodimethylcyclopentanes, fluoromethylcyclobutanes, fluorodimethylcyclobutanes, fluorotrimethylcyclobutanes, fluorobutanes, fluorocyclobutanse, fluoropropanes, fluoroethers, fluoropolyethers, fluorotributylamines, fluorotriethylamines, perfluorohexanes, perfluoropentanes, perfluorobutanes, perfluoropropanes, and sulfur hexafluoride.

In one embodiment of this and other aspects of the present invention, the separator is porous. For example, and without limitation, pores of the porous separator have an average diameter of less than 1.0 micrometer, or less than about 1.1 micrometer, 1.2 micrometer, 1.3 micrometer, 1.4 micrometer, 1.5 micrometer, 1.6 micrometer, 1.7, micrometer, 1.8 micrometer, 1.9 micrometer, 2.0 micrometer, 0.9 micrometer, 0.8 micrometer, 0.7 micrometer, 0.6 micrometer, or 0.5 micrometer. Pores provide transport of the anions (OH−) and cations (Na+, K+, etc.) between the two electrodes, and link the external circuit to a closed loop.

The anode catalyst of the fuel cell system of the present invention is, according to one embodiment, a low-loading precious metal anode catalyst. For example, and without limitation, the anode catalyst may be selected from a noble metal alloy; dealloyed Pt-M, where M is a transition metal; nanoparticles supported on carbon nanotubes or carbon black; noble metal or a mixture of noble metals supported on carbon nanotubes or carbon black; or mixtures thereof.

The term "noble metal" refers to metals that are resistant to corrosion and oxidation in moist air. For example, noble metals include ruthenium, rhodium, palladium, silver, osmium, iridium, platinum, gold, mercury, rhenium, and copper.

The term "transition metal" refers to an element whose atom has an incomplete d sub-shell, or which can give rise to cations with an incomplete d sub-shell. For example, transition metals include Sc, Tl, V, Cr, Mn, Fe, Co, Ni, Cu, Zn, Y, Zr, Nb, Mo, Tc, Ru, Rh, Pb, Ag, Cd, La, Hf, Ta, W, Re, Os, Ir, Pt, Au, Hg, Ac, Rf, and Ha.

According to one embodiment, the anode catalyst may be a noble metal supported on carbon nanotubes or carbon black, and the noble metal may be selected from Pd, Ag, Au, Pt, and mixtures thereof. Suitable carbon nanotubes include, without limitation, single-wall carbon nanotubes, double-wall carbon nanotubes, multi-wall carbon nanotubes, and surface-functionalized carbon nanotubes. Suitable carbon black materials include, without limitation, XC-72, Black pearl 3000, and KETJENBLACK activated carbon with sphere morphology.

In another embodiment, the anode catalyst is a mixture of noble metals supported on carbon nanotubes or carbon black, and the mixture of noble metals is selected from the group consisting of Pd/A, Pd/Au, and Pd/Pt.

In one embodiment of this and other aspects of the present invention, the cathode catalyst is a non-precious metal catalyst. For example, and without limitation, the cathode catalyst may comprise Fe, Co, Ni, Cu, and mixtures thereof, or is made of Fe, Co, Ni, Cu, or mixtures thereof.

In another embodiment of this and other aspects of the present invention, the cathode catalyst is a metal-free catalyst. For example, and without limitation, the cathode catalyst may comprise a doped carbon material or is made of a doped carbon material. In one embodiment, the doped carbon material is a heteroatom doped carbon material cathodic catalyst, which can significantly decrease costs compared to noble metal cathodic catalysts. The heteroatom may include N, S, P, B, or Cl. N and S are used herein as doped elements, because carbon materials with such dual doped elements exhibit impressive oxygen reduction reaction performance without any poisoning effect at the cathodic side during reaction.

According to another embodiment, the doped carbon material is selected from mesoporous carbon, carbon nanotubes, and graphene, and the carbon material is doped with nitrogen or is duel-doped with nitrogen and sulfur or nitrogen and phosphorous.

In one embodiment of this and other aspects of the present invention, the fuel-cell system further includes a fuel source comprising carbon fuel.

Carbon fuel is any fuel whose energy derives principally from the oxidation or burning of carbon. Carbon fuel is of two main kinds, biofuels and fossil fuels. Whereas biofuels are derived from recent-growth organic matter (e.g., biomass, plant biomass, or lignocellulosic biomass) and are typically harvested, as with logging of forests and cutting of corn, fossil fuels are of prehistoric origin and are extracted from the ground, the principal fossil fuels being oil, coal, and natural gas. Carbon fuels are well known, and may include, for example and without limitation, plant materials, animal materials, and/or materials produced biologically, oil, coal, and natural gas.

The term "biomass" as used herein, refers in general to organic matter harvested or collected from a renewable biological resource as a source of energy. The renewable biological resource can include plant materials, animal materials, and/or materials produced biologically.

The term "plant biomass" or "lignocellulosic biomass" as used herein, is intended to refer to virtually any plant-derived organic matter (woody or non-woody) available for energy on a sustainable basis. Plant biomass can include, but is not limited to, agricultural crop wastes and residues such as corn stover, wheat straw, rice straw, sugar cane bagasse, and the like. Plant biomass further includes, but is not limited to, woody energy crops, wood wastes and residues such as trees, including fruit trees, such as fruit-bearing trees (e.g., apple trees, orange trees, and the like), softwood forest thinnings, barky wastes, sawdust, paper and pulp industry waste streams, wood fiber, and the like. Additionally, grass crops, such as various prairie grasses, including prairie cord grass, switchgrass, big bluestem, little bluestem, side oats grama, and the like, have potential to be produced large-scale as additional plant biomass sources. For urban areas, potential plant biomass feedstock includes yard waste (e.g., grass clippings, leaves, tree clippings, brush, etc.) and vegetable processing waste. Plant biomass is known to be the most prevalent form of carbohydrate available in nature and corn stover is currently the largest source of readily available plant biomass in the United States. Lignocelluloses Feedstock Biorefinery is described in "Biomass Now—Sustainable Growth and Use" Edited by M. D. Matovic, 552 pages, Publisher: InTech, published Apr. 30, 2013, chapter 14: "Lignocelluloses Feedstock Biorefinery as Petrorefinery Substitutes," which is hereby incorporated by reference in its entirety.

The term "biofuel" as used herein, refers to any renewable solid, liquid, or gaseous fuel produced biologically, for example, those derived from biomass. Most biofuels are originally derived from biological processes such as the photosynthesis process and can therefore be considered a solar or chemical energy source. Other biofuels, such as natural polymers (e.g., chitin or certain sources of microbial cellulose) are not synthesized during photosynthesis, but can nonetheless be considered a biofuel because they are biodegradable. Biofuels can be derived from biomass synthesized during photosynthesis. These include, for example and without limitation, agricultural biofuels, such as biodiesel fuel. Biofuels can also be derived from other sources, such as algae, to produce algal biofuels (e.g., biodiesel fuel). Biofuels can also be derived from municipal wastes (residential and light commercial garbage or refuse, with most of the recyclable materials such as glass and metal removed) and from forestry sources (e.g., trees, waste or byproduct streams from wood products, wood fiber, and pulp and paper industries). Biofuels produced from biomass not synthesized during photosynthesis also include, but are not limited to, those derived from chitin, which is a chemically modified form of cellulose known as an N-acetyl glucosamine polymer. Chitin is a significant component of the waste produced by the aquaculture industry because it comprises the shells of seafood.

The term "biodiesel fuel" or "biodiesel" as used herein refers generally to long-chain ($C_{12}$-$C_{22}$) fatty acid alkyl esters, which can be either fatty acid methyl (FAMEs) or ethyl (FAEEs) esters. Biodiesel fuel can be produced from both agricultural and algal oil feedstocks. Biodiesel fuel is chemically analogous to petrochemical diesel, which fuels compression engines and can be mixed with petrodiesel to run conventional diesel engines. Petrodiesel is a fuel mixture of $C_9$ to $C_{23}$ hydrocarbons of average carbon length of 16, having approximately 75% of linear, branched, and cyclic alkanes and 25% aromatic hydrocarbons. In general, biodiesel and petrodiesel fuels have comparable energy content, freezing temperature, vapor pressure, and cetane rating. Biodiesel fuel also has higher lubricity and reduced emissions. The longer chain in FAEEs increases the cetane rating and energy content of the fuel, while decreasing its density, and pour and cloud points. As a result, combustion and flow properties (including cold flow properties) are improved, as is fuel efficiency. Once combusted, emissions and smoke densities are also minimized.

The term "agricultural biofuel", as used herein, refers to a biofuel derived from agricultural crops (e.g., grains, such as corn), crop residues, grain processing facility wastes (e.g., wheat/oat hulls, corn/bean fines, out-of-specification materials, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinse/cleansing streams, etc.), value-added agricultural facility byproducts (e.g., distiller's wet grain (DWG) and syrup from ethanol production facilities, etc.), and the like. Examples of livestock industries include, but are not limited to, beef, pork, turkey, chicken, egg, and dairy facilities. Examples of agricultural crops include, but are not limited to, any type of non-woody plant (e.g., cotton), grains such as corn, wheat, soybeans, sorghum, barley, oats, rye, and the like, herbs (e.g., peanuts), short rotation herbaceous crops such as switchgrass, alfalfa, and so forth.

The term "pyrolysis," as used herein, means to break bonds in a material by the application of heat energy. Pyrolysis can occur while the subject material is under vacuum, or immersed in a gaseous material, such as an oxidizing gas, e.g., air or oxygen, or a reducing gas, such as hydrogen.

According to one particular embodiment, the fuel is a crude carbon fuel selected from, for example, and without limitation, biomass/biorefinery/pyrolytic feedstock, wastes, and residuals; biomass/biorefinery/pyrolytic streams; bio-oils; and unrefined biomass-derived feedstocks.

In another embodiment, the crude fuel is crude glycerol, crude pyrolytic streams, or crude bio-ethanol.

In yet another embodiment, the crude fuel is bio-oil derived from the pyrolysis of lignocellulosic biomass.

In one embodiment, the fuel cell system of the present invention is able to achieve a peak power density of at least about 100 mW $cm^{-2}$, at least about 150 mW $cm^{-2}$, at least about 200 mW $cm^{-2}$, at least about 250 mW $cm^{-2}$, at least about 300 mW $cm^{-2}$, at least about 350 mW $cm^{-2}$, or at least about 400 mW $cm^{-2}$, with non-direct biomass fuel (e.g., purified methanol). In another embodiment, the fuel cell system of the present invention is able to achieve a peak power density of at least about 100-400 mW $cm^{-2}$, 150-350 mW $cm^{-2}$, 200-250 mW $cm^{-2}$, with non-direct biomass fuel (e.g., purified methanol).

In another embodiment, the fuel cell system of the present invention is able to achieve a peak power density of at least about 10 mW $cm^{-2}$, at least about 25 mW $cm^{-2}$, at least about 50 mW $cm^{-2}$, at least about 100 mW $cm^{-2}$, at least about 150 mW $cm^{-2}$, at least about 200 mW $cm^{-2}$, at least about 250 mW $cm^{-2}$, at least about 300 mW $cm^{-2}$, or at least about 350 mW $cm^{-2}$ with a direct biomass fuel. In another embodiment, the fuel cell system of the present invention is able to achieve a peak power density of at least about 10-350 mW $cm^{-2}$, at least about 25-325 mW $cm^{-2}$, at least about 50-300 mW $cm^{-2}$, at least about 75-275 mW $cm^{-2}$, at least about 100-250 mW $cm^{-2}$, or at least about 150-200 mW $cm^{-2}$, with a direct biomass fuel.

Another aspect of the present invention relates to a method of generating energy from crude fuel. This method involves providing a fuel-cell system according to the present invention and contacting the fuel-cell system with a crude fuel under conditions effective to generate energy from the crude fuel.

Any and all descriptions related to the aspects of the invention described supra, are also applicable to the method of this aspect of the present invention.

EXAMPLES

Example 1: N- and S-Doped Mesoporous Carbon as Metal-Free Cathode Catalysts for Direct Biorenewable Alcohol Fuel Cells Material Preparation Synthesis of CMK-3 Used SBA-15 as the Template For the synthesis of SBA-15 (Zhao et al., "Triblock Copolymer Syntheses of Mesoporous Silica with Periodic 50 to 300 Angstrom Pores," *Science* 279:548 (1998), which is hereby incorporated by reference in its entirety), Pluronic P123 (5.0 g) was dissolved in a hydrochloric solution (190 mL, 1.6 M) with 350 rpm stirring at 35° C. After the dissolution of P123, tetraethyl orthosilicate (11.0 g) was added into the solution and stirred at 35° C. for another 24 hours. The solution was then moved into a polytetrafluoroethylene bottle for an additional 24 hour treatment at 100° C. After that, the solid was filtered and washed with deionized water (18.2 Me) and dried in an oven overnight. A final calcination in air at 550° C. for 6 hours was used to remove the surfactant. Then, SBA15 (2.8 g) was mixed with deionized water (15 g), glucose (3.5 g), and sulfuric acid (0.39 g). The mixture was treated at 100° C. for 6 hours, and then at 160° C. for another 6 hours. Deionized water (15 g), glucose (2.24 g), and sulfuric acid (0.25 g) was again added, mixed, and treated under the same conditions described above. The sample was then heated to 900° C. and kept for 10 hours under flowing nitrogen. The sample was treated with 10% hydrofluoric acid in ethanol solution (50% by volume) to remove silica. After filtration and drying, the base CMK-3 was obtained.

The nitrogen and sulfur dual-doped N—S-CMK-3 catalysts were synthesized under high temperature annealing. 0.5 g thiophene and 0.5 g iron chloride ($FeCl_3$) were dissolved into 15 ml of ethanol with magnetic stirring, followed by directly adding 0.5 g CMK-3, and the mixture was left under magnetic stirring at ambient temperature for 12 hours. The pre-treated CMK-3 was obtained by filtrating and washing with deionized water 5 times to remove iron chloride residue, followed by drying at 80° C. for 12 hours. After completely removing the liquid solution, the pre-treated CMK-3 was annealed in ambient pressure $NH_3$ gas with a 60 ml $min^{-1}$ flow rate. The temperature was kept at 700, 800, and 900° C. for 2 hours, respectively, after a heating at a rate of 5° C. $min^{-1}$. After cooling down to room temperature, the sample was subjected to a 6 M hydrochloric acid treatment to further remove the Fe residue, and the final N—S-CMK-3 was obtained by washing with deionized water to a pH of 7 and drying at 60° C. for 12 hours. Single-doped N-CMK-3 and S-CMK-3 were synthesized by using similar methods discussed above without thiophene or $NH_3$ dopants, respectively.

Material Characterization

The composition was measured using an inductively coupled plasma mass spectrometer (ICP-MS, PerkinElmer). The sample was prepared by dissolving 10 mg of catalyst in 4 mL of fresh aqua regia, followed by diluting to 250 mL with deionized water (18.2 Me). The XRD patterns were obtained from a Rigaku Ultima IV X-ray diffraction (XRD) system with Cu Kα radiation (λ=1.5406 Å), with a tube current of 44 mA and a tube voltage of 40 kV. JEOL 2100 200 kV scanning and transmission electron microscope (STEM) and corresponding element energy-dispersive X-ray spectrometer (EDS) were utilized to determine the catalyst structure and element concentration. JEOL 5800LV and FEI Quanta 250 field-emission scanning electron microscope (SEM) were used for macro morphology determination. X-ray photoelectron spectroscopy (XPS) with Mg K alpha X-ray (1253.6 eV) (Kratos Amicus/ESCA 3400) was also used to determine the heteroatom concentrations and its corresponding status through different binding energy peak. Surface area and porosity characterization were performed via nitrogen physisorption in a Micromeritics ASAP 2020 operated at −196° C. The specific surface areas were calculated using the Brunauer-Emmett-Teller (BET) equation and the pore volume was determined at a relative pressure of 0.973. A DXR Raman microscope (Thermo Scientific, Waltham, Mass.) was used for spectra acquisition with 780 nm excitation at 14 mW laser power, 10× objective, and 50 μm slit aperture (resolution is 4-8 $cm^{-1}$). The exposure time was 30 s.

Electrocatalytic Characterization

The electrochemical tests were carried out both in the half-cell and fuel cell reactors. The half-cell test was conducted in a three-electrode setup comprising a rotating disk electrode (working electrode), a coiled platinum counter electrode, which was isolated by a fritted glass tube from the main test electrolyte, and a Hg/HgO reference electrode with 0.1 M KOH filling solution. Potential was applied by using a multi-channel potentiostat (Biological). To fabricate the working electrode, a 2.0 mg $ml^{-1}$ solution of catalyst ink was prepared by dispersing N—S-CMK-3 in a mixture of isopropanol and 5 wt % Nafion solution (one-propanol:Nafion=9:1), followed by ultrasonication until no aggregation was visible. Then, 30 μL of ink was dropped onto the surface of a glassy carbon electrode with a catalyst loading of 0.306 mg $cm^{-2}_{geo}$ (Pt loading of 61.2 $μg_{Pt}$ $cm^{-2}_{geo}$), and a uniform catalyst film was obtained after 30 min ambient temperature drying in air. To compare the ORR performance of N—S-CMK-3 to other control samples, the electrodes of 20 wt % Pt/C, CMK-3, and mono-element doped CMK-3 were fabricated by using the same method discussed above. The ORR performance of the catalyst was investigated by a cyclic voltammetry (CV) test, which was performed at a scan rate of 50 mV $s^{-1}$ after purging the electrolyte with $N_2$ and $O_2$ for 30 min respectively, followed by the linear sweep voltammetry (LSV) toward ORR activity evaluation in $O_2$-saturated electrolyte with a 10 mV $s^{-1}$ scan rate at different rotating rates from 2000 rpm to 400 rpm.

Rotating ring-disk electrode (RRDE) was employed to measure the concentration of $HO_2^-$ intermediate and electron transfer number per oxygen (n) with a scanning rate of 10 mV $s^{-1}$ at rotating rate of 1600 rpm. The $HO_2$ intermediated, generated on the surface of disk electrode (0.19625 $cm^2$ geometric surface area), can be immediately oxidized on Pt-ring electrode surface at 0.8 V vs. RHE applied potential. The electron transfer number n and $HO_2$ intermediate production percentage ($HO_2^-$ %) were determined as follows:

$$n = 4 \times \frac{I_d}{I_d + I_r/N} \quad (1)$$

$$HO_2^- \% = 200 \times \frac{I_r/N}{I_d + I_r/N} \quad (2)$$

where $I_d$ is the disk current,
$I_r$ is the ring current, and
N is the ring current collection efficiency which was determined to be 23%.

All experimental results for the ORR activity were reported as current density versus applied potential (vs RHE), and the current densities were normalized using geometric surface area of a glassy carbon electrode with a 5 mm diameter. The Hg/HgO reference electrode was calibrated with respect to the reversible hydrogen electrode (RHE) before use. The calibration was conducted in a standard three-electrode system with Pt wire as the working and counter electrodes, and the Hg/HgO electrode as the reference electrode. The 0.1 M KOH electrolyte was purged and saturated with high purity $H_2$ for 30 min before calibration, and an LSV test was then run at a scan rate of 0.5 mV $s^{-1}$ and the potential range of −0.93 V to −0.85 V vs Hg/HgO, where the current crossed zero is taken to be the thermodynamic potential for the hydrogen electrode reactions. The result is E(RHE)=E(Hg/HgO)+0.888 V in 0.1 M KOH electrolyte.

The fuel cell tests were performed on a Scribner Fuel Cell System 850e (Scribner Associates, USA), and the fuel cell fixture with an active area of 5 $cm^2$ was purchased from Fuel Cell Technology, Inc. The cathode electrode was composed of a 70 wt % N—S-CMK-3 catalyst and 30 wt % AS-4 ionomer, which was mixed and directly sprayed onto an A-201 anion exchange membrane to obtain a catalyst loading of 2.0 mg $cm^{-2}$, while a commercial Pt/C blended with a 5 wt % PTFE solution (Pt/C:PTFE=9:1) was sprayed onto a PTFE-untreated carbon cloth liquid diffusion layer with a 1.0 $mg_{pt}$ $cm^{-2}$ catalyst loading. The membrane electrode assembly (MEA) was constructed by pressing the anode carbon cloth with an ion exchange membrane, which has been sprayed with a cathode catalyst. 2.0 M KOH with 1.0 M fuel (glycerol, ethanol, or sorbitol) was pumped into the anode compartment at 1.0 ml $min^{-1}$, while high purity $O_2$ (99.999%) regulated at 400 ml $min^{-1}$ was fed to the cathode side with 30 psi backpressure (Wang et al., "Carbon Supported Ag Nanoparticles with Different Particle Size as Cathode Catalysts for Anion Exchange Membrane Direct Glycerol Fuel Cells," *Renew Energ.* 62:556 (2014), which is hereby incorporated by reference in its entirety). The cell temperature was kept at 50° C., and the relative humidity for both anode and cathode was 100%. The MEA was activated at 0.1 V cell voltage until the current density got stable. The I-V polarization curve was obtained by applying a constant voltage and collecting corresponding current density.

The overall electron transfer numbers per oxygen molecule involved in the typical ORR process were calculated from the slopes of the Koutecky-Levich plots using the following equations (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012); Liu et al., "Nitrogen-doped Mesoporous Graphitic Arrays with High Electrocatalytic Activity for Oxygen Reduction," *Angewandte Chemie-International Edition* 49:2565 (2010), which are hereby incorporated by reference in their entirety):

$$\frac{1}{J} = \frac{1}{J_L} + \frac{1}{J_k} = \frac{1}{B\omega^{1/2}} + \frac{1}{J_k} \quad (3)$$

$$B = 0.2 n F C_o (D_o)^{2/3} v^{-1/6} \quad (4)$$

$$J_k = n F k C_o \quad (5)$$

where J is the measured current density,
$J_k$ and $J_L$ are the kinetic and mass-transport limiting current densities,
ω is the electrode rotating speed in rpm,
B is the reciprocal of the slope,
n is the number of electrons transferred per oxygen molecule,
F is the Faraday constant (96485 C $mol^{-1}$),
$D_o$ is the diffusion coefficient of $O_2$ in 0.1 M KOH (1.9×$10^{-5}$ $cm^2$ $s^{-1}$),
v is the kinetic viscosity (0.01 $cm^2$ $s^{-1}$), and
$C_o$ is the concentration of $O_2$ (1.2×$10^{-3}$ mol $L^{-1}$).
The constant 0.2 is adopted when the rotating speed is in rpm, and k is the electron transfer rate constant.

Results and Discussion

Material Synthesis and Characterization

Figure 2:
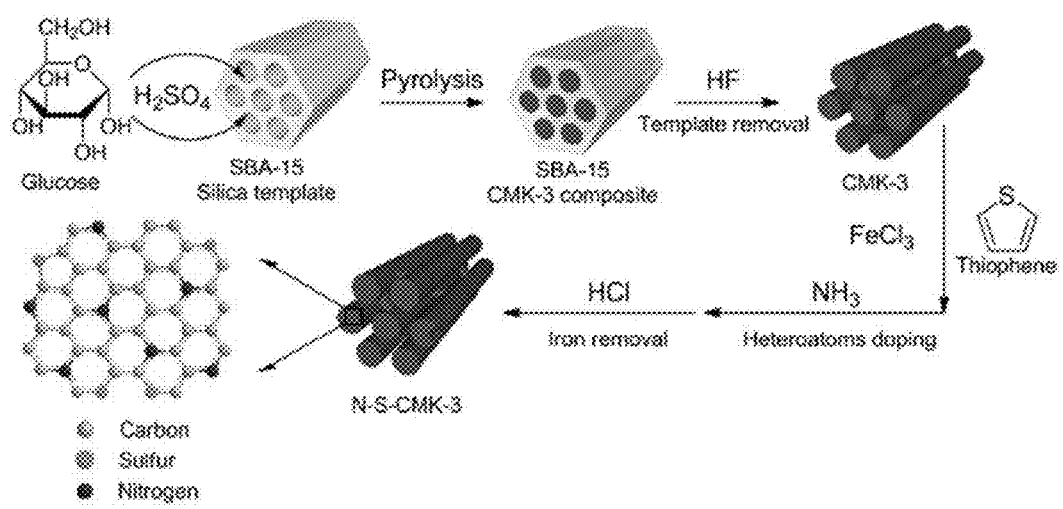
FIG. 2 is a schematic illustration of the synthesis of metal-free mesoporous N—S-CMK-3 catalysts (Scheme 1).

The well-ordered mesoporous carbons, N—S-CMK-3, were synthesized via carbonization and subsequent N and S doping processes, as shown in the schematic illustration of FIG. 2. Glucose served as the carbon source to mix with the mesoporous SBA-15 silica template (Zhao et al., "Triblock Copolymer Syntheses of mesoporous Silica with Periodic 50 to 300 Angstrom Pores," *Science* 279:548 (1998), which is hereby incorporated by reference in its entirety) prior to calcination. Hydrofluoric acid (HF) was used to etch away the SBA15 template to obtain pure CMK-3 mesoporous carbons. Then, a mixture of CMK-3 and thiophene as well as iron(III) chloride ($FeCl_3$) was annealed at 800° C. under anhydrous ammonia ($NH_3$) gas purging, to facilitate heteroatom N and S doping into the graphitic framework of CMK-3. The N—S-CMK-3 mesoporous carbons were finally exposed to hydrochloric acid (HCl), washing, and overnight vacuum drying.

Glucose was chosen as the carbon precursor for mesoporous carbon synthesis owning to its unbranched carbon structure that facilitates formation of a stable and well-ordered mesoporous structure with narrow pore size distribution through carbonization (Jun et al., "Synthesis of New, Nanoporous Carbon with Hexagonally Ordered Mesostructure," *J. Am. Chem. Soc.* 122:10712 (2000), which is hereby incorporated by reference in its entirety). Glucose can be ubiquitously obtained in large quantities at low price, while some previously reported heteroatom-containing carbon precursors (e.g., Ferrocene, Vitamin B12, PDI) have a 10-fold higher price (Liang et al., "Mesoporous Metal-Nitrogen-doped Carbon Electrocatalysts for Highly Efficient Oxygen Reduction Reaction," *J. Am. Chem. Soc.* 135:16002 (2013); Xu et al., "Sulfur- and Nitrogen-doped, Ferrocene-derived Mesoporous Carbons with Efficient Electrochemical Reduction of Oxygen," *Acs Appl. Mater Inter.* 5:12594 (2013); Liu et al., "Nitrogen-doped Ordered Mesoporous Graphitic Arrays with High Electrocatalytic Activity for Oxygen Reduction," *Angewandte Chemie-International Edition* 49:2565 (2010), which are hereby incorporated by reference in their entirety). Together with its additional advantages of non-toxicity and non-volatility, glucose is a promising green carbon precursor for mesoporous carbon synthesis. Ammonia and thiophene were chosen as the N and S dopant precursors based on consideration of their small molecular weight, simple molecular structure, and high N/C and S/C ratios (1.0 and 0.5, respectively). These precursors can not only largely prevent pore clogging by CN and CS species in the doping process, but also facilitate formation of high N and S content mesoporous carbon with a very large surface area (>1000 $m^2$ $g^{-1}$), since ammonia etching can assist in the formation of extra macropores (pore diameter >200 nm) (Chen et al., "Nitrogen-doped Nanoporous Carbon Nanosheets Derived from Plant Biomass: An Efficient Catalyst for Oxygen Reduction Reaction," *Energ. Environ. Sci.* 7:4095 (2014), which is hereby incorporated by reference in its entirety). Single and multi-doped CMK-3 carbons were prepared for comparison through the same processes as described above, and a commercial Pt/C, the best-known ORR catalyst, was also studied as the baseline performance in this work.

The as-synthesized mesoporous N—S-CMK-3 catalysts were first characterized using scanning electron microscopy (SEM) (FIG. 3A). The morphology of the N—S-CMK-3 was irregular with visible macropores on the surface, which had no distinguishable morphology change compared with that of CMK-3 (FIGS. 27A-B). The underlying highly organized hierarchical porous structures were observed by transmission electron microscopy (TEM) characterization (FIG. 3B). The TEM images revealed an average carbon rod diameter of 6 nm, which is consistent with the pore size of the SBA-15 template (inset in FIG. 28A), indicating successful carbonization of glucose within the silica template. However, the carbon structure varied when the heteroatom doping temperature increased from 700° C. to 900° C. (FIGS. 27A-B). At a doping temperature of 700° C., apparent clogging that originated from the thiophene derived CS species during the doping process became more serious and the carbon sheets were randomly formed, which could undesirably decrease the surface area and pore volume of carbon catalysts, leading to an ORR performance drop (Wang et al., "Sulfur-doped Ordered Mesoporous Carbon with High Electrocatalytic Activity for Oxygen Reduction," *Electrochim. Acta* 108:404 (2013), which is hereby incorporated by reference in its entirety). The doping temperature of 900° C. appeared to facilitate the decomposition of the mesoporous carbon and a resulting porous structure was dominantly observed instead of the organized hierarchical porous structures (FIGS. 27A-B), because of the overreaction of ammonia with carbon during the heteroatom doping process. Ammonia etching of the carbon may follow the reactions shown below (Chen et al., "Nitrogen-doped Nanoporous Carbon Nanosheets Derived from Plant Biomass: An Efficient Catalyst for Oxygen Reduction Reaction," *Energ. Environ. Sci.* 7:4095 (2014), which is hereby incorporated by reference in its entirety):

$$2NH_3 \rightarrow N_2 + 3H_2 \quad (6)$$

$$C + 2H_2 \rightarrow CH_4 \quad (7).$$

The ammonia etching can be regulated by tuning the doping temperature. A moderate etching rate at around 800° C. (doping temperature) favors the formation of macropores and not only diminishes the CS species clogging effect, but also significantly increases the surface area of the resulting N—S-CMK-3 mesoporous carbon. To better investigate the temperature effect on catalyst structure, the BET surface areas of the N—S-CMK-3 catalysts were measured to be 784 m$^2$ g$^{-1}$ with (N—S-CMK-3 700° C.), 1023 m$^2$ g$^{-1}$ (N—S-CMK-3 800° C.), and 921 m$^2$ g$^{-1}$ (N—S-CMK-3 900° C.), all of which were lower than the 1126 m$^2$ g$^{-1}$ of CMK-3, but much higher than previously reported carbon nanotube and graphene ORR catalysts, such as mesoporous graphene and carbon hybrids (Guo et al., "Tuning Nanoparticle Catalysis for the Oxygen Reduction Reaction," *Angewandte Chemie-International Edition* 52:8526 (2013); Yang et al., "Sulfur-doped Graphene as an Efficient Metal-free Cathode Catalyst for Oxygen Reduction," *ACS Nano* 6:205 (2012), which are hereby incorporated by reference in their entirety) (the BET surface area and total pore volume of all the as-synthesized CMK-3 based catalysts are shown in Table 1). Therefore, 800° C. was determined to be the optimal doping temperature to prepare well-ordered mesoporous N—S-CMK-3. The surface texture of the N—S-CMK-3 catalysts was investigated by N$_2$ adsorption-desorption isotherms (type IV), and the typical hysteresis loops were observed to reveal the mesoporous nature of the well-ordered N—S-CMK-3 catalysts. The pore diameter of N—S-CMK-3 was centered at 3.7 nm according to the Barrett-Joyer-Halenda (BJH) model (inset in FIG. 3C) (Zhao et al., *J. Am. Chem. Soc.* 120:6024 (1998), which is hereby incorporated by reference in its entirety), which is close to the dominant pore diameter of 3.8 nm for pure CMK-3 (inset in FIG. 28B), whereas larger mesopores with pore sizes ranging from 4.8 nm to 15.0 nm and macropores (>200 nm) were only obtained in N—S-CMK-3 after heteroatom doping. This wide pore size distribution further confirmed the ammonia etching reaction with the N—S-CMK-3 mesoporous carbon. Zhang et al. reported that the combination of macropores and large mesopores could enhance the rate of desolvation and adsorption of O$_2$ and increase the electrocatalytic activity for ORR (Zhang et al., "Ionic Liquid Derived Carbons as Highly Efficient Oxygen Reduction Catalysts: First Elucidation of Pore Size Distribution Dependent Kinetics," *Chem. Commun.* 50:1469 (2014), which is hereby incorporated by reference in its entirety). Consistent with that report, the N—S-CMK-3 (800° C.) with the unique mesoporous and extra macroporous structures exhibited the highest ORR performance among all investigated CMK-3 based catalysts.

TABLE 1

The Textural Parameters and Element Atomic Concentrations of Different Catalysts

| Catalyst | BET surface area/m$^2$ g$^{-1}$ | Total pore volume/cm$^3$ g$^{-1}$ | Element atomic concentration/atom % | | | | |
|---|---|---|---|---|---|---|---|
| | | | C | N | S | O | Fe |
| CMK-3 | 1126 | 1.215 | 96.51 | N/A | N/A | 3.33 | N/A |
| N—S-CMK-3 700° C. | 784 | 0.821 | 90.12 | 6.40 | 1.11 | 2.29 | 0.08 |
| N—S-CMK-3 800° C. | 1023 | 0.973 | 94.07 | 3.84 | 0.83 | 1.14 | 0.12 |
| N—S-CMK-3 900° C. | 921 | 0.701 | 97.64 | 1.27 | 0.20 | 0.87 | 0.02 |
| N-CMK-3 800° C. | N/A | N/A | 93.31 | 4.88 | N/A | 1.77 | 0.04 |
| S-CMK-3 800° C. | N/A | N/A | 97.07 | N/A | 1.21 | 1.57 | 0.15 |

From the High-Resolution XPS Spectrum, Slight Si Signal was Observed on CMK-3. For Element Atomic Concentration Calculations, Si was Eliminated from Catalysts Except the CMK-3.

The well-ordered mesoporous carbon structure was also verified by small-angle XRD measurement (FIG. 3D). Three well-resolved diffraction peaks were observed in the small-angle XRD pattern of N—S-CMK-3, which can be assigned to (100), (110), and (200) reflections of 2D-hexagonal arrangements, and was very similar to that of the pristine CMK-3. Furthermore, two broad diffraction peaks centered at 25° C. and 44° C., corresponding to the graphite (002) and (101) facets (Liu et al., "Nitrogen-doped Ordered Mesoporous Graphitic Arrays with High Electrocatalytic Activity for Oxygen Reduction," *Angewandte Chemie-International Edition* 49:2565 (2010)) were observed in both the N—S-CMK-3 and CMK-3 wide-angle XRD patterns (FIG. 29), indicating no significant structure change during the N-, S-doping process, and these are in good agreement with the results observed from TEM images. More structural information for N—S-CMK-3 was obtained from Raman spectroscopy (FIG. 3E). Two typical bands observed at 1340 cm$^{-1}$ and 1580 cm$^{-1}$ can be assigned to the D- and G-bands, corresponding to the disordered carbon structure and interplane sp$^2$-hybridized graphitic carbon sheet, respectively (Liu et al., "Nitrogen-doped Ordered Mesoporous Graphitic Arrays with High Electrocatalytic Activity for Oxygen Reduction," *Angewandte Chemie-International Edition* 49:2565 (2010); Lu et al., "Nanocasting: A Versatile Strategy for Creating Nanostructured Porous Materials," *Adv. Mater.* 18:1793 (2006), which are hereby incorporated by reference in their entirety). The $I_D/I_G$ ratio of N—S-CMK-3 was similar to that of CMK-3 and lower than that of N-CMK-3 and S-CMK-3, suggesting a more graphitic structure with relatively low defect sites for the N—S-CMK-3 sample.

To determine heteroatoms content in as-synthesized N—S-CMK-3, catalysts were characterized by energy-dispersive X-ray spectroscopy (EDS). The EDS spectra reveal the presence of N, S, and O atoms in the graphitic framework, while no Fe signal was observed (FIG. 30A), indicating that Fe was removed by hydrochloric acid (HCl) washing and the high ORR activity could only be ascribed to the N—S-CMK-3 catalyst. Moreover, the EDS elemental mapping in conjunction with the TEM images illustrates a homogeneous distribution of N and S in the N—S-CMK-3 catalyst (FIGS. 30B-D). X-ray photoelectron spectroscopy (XPS) was further used to characterize N, S, and O valence states. From FIG. 4A, the content of the elements were determined by XPS to be 3.84 atom % of N, 0.83 atom % of S, and 1.14 atom % of O, and negligible 0.12 atom % of Fe in N—S-CMK-3 for the 800° C. heteroatom doping temperature. Although the small amounts of Fe were quantified, no Fe signal was observed using the high resolution spectrum of XPS (FIG. 31A), suggesting the removal of Fe through HCl washing.

The Fe result from XPS could be due to the signal to noise resolution limitation of XPS. The high-resolution $S_{2p}$ spectrum was found to be fitted into two peaks centered at 163.5 eV and 165.0 eV, representing $S_{2p\ 3/2}$ and $S_{2p\ 1/2}$, whereas $SO_x$ groups, which have been reported inactive for ORR, were not found (FIG. 4B) (Kicinski et al., *Carbon* 68:1 (2014); Zhang et al., *J. Mater Chem. A* 1:7584 (2013), which are hereby incorporated by reference in their entirety). Similarly, the high-resolution $N_{1s}$ spectra showed three nitrogen forms existed, which can be illustrated typically as pyridinic-N(398.3 eV), pyrrolic-N(399.9 eV), graphitic-N (401.2 eV), and N$^+$—O$^-$ (403.6 eV) structures (FIG. 4C) (Jiang et al., *Chem.-Eur.* 1 20:3106 (2014); Liang et al., *J. Am. Chem. Soc.* 135:16002 (2013); Lin et al., *J. Am. Chem. Soc.* 136:11027 (2014), which are hereby incorporated by reference in their entirety). The $C_{1s}$ high-resolution spectrum was deconvoluted into single peaks corresponding to 284.5 eV (C1) for sp$^2$-hybridised carbon atoms bonded to neighboring carbon and hydrogen atoms, 285.5 eV (C2) for C—N—C and C—S—C, and 288.0 eV (C3) for different oxygen-containing groups (e.g., COOH, C=O, and C—OH) (Liang et al., *J. Am. Chem. Soc.* 135:16002 (2013), which is hereby incorporated by reference in its entirety), further confirming that N and S were successfully doped into the CMK-3 carbon framework (FIG. 31B). Inductively coupled plasma-mass spectrometry (ICP-MS) was also used to further test the content of Fe residue in N—S-CMK-3 catalysts. The Fe concentration was detected as only 0.09 wt %, which is close to the ICP-MS detection limit, further indicating successful Fe elimination for the N—S-CMK-3 mesoporous carbon.

Electrocatalytic Analysis in Half Cell

Before electrocatalytic ORR activity investigation, the Hg/HgO reference electrode was calibrated with respect to the reversible hydrogen electrode (RHE), and the result is E(RHE)=E(Hg/HgO)+0.888 V in 0.1 M KOH electrolyte, as shown in FIG. 32. All applied potential reported here was versus the reversible hydrogen electrode (RHE).

The ORR electrocatalytic activity of N—S-CMK-3 was first investigated by cyclic voltammetry (CV) tests, as shown in FIG. 32. Featureless voltammetric currents without an obvious redox peak were obtained when the 0.1 M KOH electrolyte was saturated with N$_2$ (short dash curve), as a result of the well-known typical capacitance effect on porous carbon materials. In contrast, when an O$_2$-saturated electrolyte was used, a well-defined cathodic ORR peak, centered at 0.66 V with 5.45 mA cm$^{-2}$ current density, was observed over as-synthesized N—S-CMK-3, demonstrating obvious ORR electrocatalytic activity. To obtain deeper insight of ORR steps on the N—S-CMK-3 catalysts, linear sweep voltammetry (LSV) tests were carried out at different rotating rates ranging from 2000 rpm to 400 rpm in 0.1 M KOH electrolyte saturated with O$_2$ (FIG. 5A). The voltammetric profiles demonstrated that the current density increased as the applied potential became more negative, and the CMK-3 based catalysts were first investigated with different annealing temperature.

N—S-CKM-3 800° C. exhibited the best ORR performance with the highest limiting current density of 5.50 mA cm$^{-2}$ at 0.5V and the most positive onset potential of 0.92 V among three N—S-CMK-3 catalysts annealed by different temperature (FIG. 5B). The possible reason is that the N—S-CMK-3 800° C. maintained the largest surface area (1023 m$^2$ g$^{-1}$) after heteroatom doping, while 700° C. and 900° C. led to surface area reduction to 784 m$^2$ g$^{-1}$ and 921 m$^2$ g$^{-1}$, respectively (Table 1). In addition, an apparent clogging with the thiophene derived CS species occurred at a 700° C. doping process, which could undesirably decrease the surface area and pore volume of carbon catalysts, and lead an O$_2$ diffusion issue for ORR; while a 900° C. doping temperature can cause overreaction of ammonia with mesoporous carbon and result in decomposition of porous structure, which was predominantly observed instead of the organized hierarchical porous structures in SEM images (FIGS. 27A-B). Thus, the highly ordered mesoporous structure with extra macropores was formed by moderate etching reaction of NH$_3$ at the 800° C. doping temperature, which provided the largest surface area and benefited the best ORR performance among these three N—S-CMK-3 catalysts.

Comparative studies of solely doped N-CMK-3, S-CMK-3, and pristine CMK-3 as well as with Pt/C were also conducted using the same LSV method. With N or S solely doped into CMK-3 carbon frameworks, the onset potential (potential at which J=0.1 mA cm$^{-2}$) increased from 0.79 V (CMK-3) to 0.83 V (S-CMK-3) and 0.87 V (N-CMK-3) (FIG. 5C), respectively, and their corresponding ORR current density at 0.5 V raised from 1.98 (CMK-3) to 2.88 (S-CMK-3) and 3.30 (N-CMK-3) mA cm$^{-2}$, respectively. Evidently, the ORR activity of CMK-3 was improved with involvement of heteroatoms, which could be attributed to the positive change in the charge density and/or spin density of neighbor carbon atoms (serving as ORR active sites), facilitating 4C transfer ORR. Furthermore, by simultaneously incorporating N and S, the ORR activity of N—S-CMK-3 was further enhanced, and exhibited an ORR current density of 5.50 mA cm$^{-2}$ at 0.5V and an onset potential of 0.92 V with Tafel slope of 68 mV dec$^{-1}$, which were comparable to the best-known ORR catalyst, Pt/C (FIG. 34). In addition, only a 33 mV half-wave potential difference ($E_{1/2}$) was observed between the N—S-CMK-3 and Pt/C, indicating promising potential of N—S-CMK-3 to be an alternative to Pt/C as ORR catalysts.

The ORR catalytic activity of various catalysts was further compared in Table 2, including transition-metal based carbon materials (e.g., Fe—N/C, Mn$_3$O$_4$/porous glassy carbon) and metal free carbon materials (e.g., N—S mesoporous graphene, N—S doped graphene/CNT) (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012); Higgins et al., "Oxygen Reduction on Graphene-Carbon Nanotube Composites Doped Sequentially with Nitrogen and Sulfur," *ACS Catal* 4:2734 (2014); Lin et al., "Noble-Metal-Free Fe—N/C Catalyst for Highly Efficient Oxygen Reduction Reaction Under Both Alkaline and Acidic Conditions," *J. Am. Chem. Soc.* 136:11027 (2014); Ma et al., "Phosphorus-doped Graphitic Carbon Nitrides Grown In Situ on Carbon-Fiber Paper: Flexible and Reversible Oxygen Electrodes," *Angewandte Chemie-International Edition* 54(15):4646-4650 (2015); Shi et al., "Nitrogen and Sulfur Co-doped Mesoporous Carbon Materials as Highly Efficient Electrocatalysts for Oxygen Reduction Reaction," *Electrochim. Acta* 145:259-269 (2014); Gorlin et al., "Mn$_3$O$_4$ Supported on Glassy Carbon: An Active Non-Precious Metal Catalyst for the Oxygen Reduction Reaction," *ACS Catal.* 2(12):2687-2694 (2012), which are hereby incorporated by reference in their entirety). Chen et al. reported the N and S doped graphene-CNT with an onset potential of 0.85 V and electron transfer number of 3.8 (Higgins et al., "Oxygen Reduction on Graphene-Carbon Nanotube Composites Doped Sequentially with Nitrogen and Sulfur," *ACS Catal.* 4:2734 (2014), which is hereby incorporated by reference in its entirety), which are lower than that of N—S-CMK-3 reported in this work, probably due to the uniform mesoporous structure with high surface area (1023 m$^2$ g$^{-1}$). One group synthesized the heteroatom doped carbon materials (FeSO$_4$-PEI) that exhibited a decent Tafel slope (Shi et al., "Nitrogen and Sulfur Co-doped Mesoporous Carbon Materials as Highly Efficient Electrocatalysts for Oxygen Reduction Reaction," *Electrochim. Acta* 145:259-269 (2014), which is hereby incorporated by reference in its entirety), but its onset potential, 0.79 V, with electron transfer number of 3.8 affects its feasibility as a highly active ORR catalyst. Among the catalysts summarized in Table 2, N—S-CMK-3 provided more positive onset potential, higher ORR limiting current density, and sharper Tafel plot, all of which further confirmed its intrinsic high catalytic activity towards ORR. The onset potential and Tafel slope exhibited by ORR catalysts were very sensitive to its loading, and the reported catalyst loading was significantly varied from 0.0001 to 0.4 mg cm$^{-2}$, as summarized in Table 2 (or to even higher value). Thus, the electron transfer number (n), obtained from RDE and RRDE, and mass-transport limiting current were investigated to further evaluate the intrinsic ORR kinetics of different ORR catalysts.

TABLE 2

Comparison of the ORR Activity of N—S-CMK-3 with Other Electrocatalysts

| Catalysts | ORR onset potential (vs. RHE) | ORR Tafel slope (mV dec$^{-1}$) | Potential at −3 mA cm$^{-2}$ (vs. RHE) | Catalysts loading (mg cm$^{-2}$) | Electron transfer number (n) at 0.5 V vs. RHE | Electrolyte | Ref. |
|---|---|---|---|---|---|---|---|
| 800° C. N—S-CMK-3 | 0.92 | 68 | 0.78 | 0.306 | 3.96 | 0.1M KOH | This work |
| N—S-G | 0.91 | N.A | N.A. | ~0.2 | 3.6 | 0.1M KOH | 1 |
| PCN-CFP | 0.94 | 122.3 | N.A. | ~0.2 | 3.9 | 0.1M KOH | 2 |
| N—S doped graphene/CNT | 0.85 | N.A. | 0.72 | 0.407 | 3.8 | 0.1M KOH | 3 |
| Fe—N/C | 0.92 | N.A | 0.81 | 0.1 | 4.0 | 0.1M KOH | 4 |
| FeSO$_4$-PEI | 0.79 | 58 | 0.68 | 0.4 | 3.8 | 0.1M KOH | 5 |
| Mn$_8$O$_4$/pGC | 0.75 | ~85 | ~0.7 | ~0.0001 | 4.0 | 0.1M KOH | 6 |

The electron transfer number (n) at a given applied potential was calculated by the Koutecky-Levich (K-L) equation. The K-L plots ($J^{-1}$ vs $\omega^{1/2}$) of the N—S-CMK-3 800° C. catalyst exhibited a high linearity, and the slopes within investigated applied potentials (0.2 to 0.5V) were approximately constant (inset in FIG. 5A), implying a close n value for ORR at such potential range. Consequently, the n value of N—S-CMK-3 800° C. was determined to be 4.0 at such applied potential range, which is same as the n value of Pt/C (FIG. 35), suggesting a complete ORR process with 4C transfer reduction to H$_2$O. In addition, the n value of solely doped N-CMK-3, S-CMK-3, and blank CMK-3 were also calculated by using the K-L equation. As shown in FIG. 35, the n value of CMK-3, S-CMK-3, and N-CMK-3 were calculated to be 2.2, 2.8, and 3.4 at 0.5V vs RHE, respectively, which were in good accordance to the trend of their corresponding limiting current density as discussed above. The kinetic limiting current density ($J_k$) at 0.5 V was also determined by the K-L equation and is displayed in FIG. 35. Although both N-CMK-3 and S-CMK-3 showed moderate performance for ORR, only N—S-CMK-3 exhibited an elegant ORR activity with complete 4C pathway (n=4) as comparable to Pt/C. Remarkably, the $J_k$ of N—S-CMK-3 (32.6 mA cm$^{-2}$) slightly surpassed that of Pt/C (25.6 mA cm$^{-2}$) at 0.5 V and was much higher than that of N-CMK-3, S-CMK-3, and CMK-3 samples.

To further investigate the ORR activity of N—S-CMK-3 and its corresponding reaction mechanism, RRDE tests were conducted to directly measure the concentration of $HO_2^-$ intermediate and determine the electron transfer number (n) of catalysts. The generated $HO_2^-$ intermediate on the surface of disk electrode can be immediately oxidized on the surface of a Pt ring electrode at 0.8 V vs. RHE applied potential, thus RRDE is reliable to in-situ determine n toward the N—S-CMK-3 catalysts. As shown in FIG. 5D, N—S-CMK-3 showed the lowest ring current density ascribing to the $HO_2^-$ oxidation, and the $HO_2^-$ yield on the disk electrode was below 1.5% in the potential range from 0.25 V to 0.6 V, while the average $HO_2^-$ yield of other CMK-3 based catalysts were 92% (CMK-3), 62% (S-CMK-3), and 27% (N-CMK3), respectively (FIG. 5E). The large amount of $HO_2$ intermediate production could decrease the n and drastically reduce the ORR performance toward catalysts. Consequently, the average n value of N—S-CMK-3 at investigated potential was determined to be 3.96 without apparent change in such potential range (FIG. 5E). This is much higher than those over other investigated catalysts (e.g., n=3.45 for N-CMK-3, n=2.76 for S-CMK-3, and n=2.15 for CMK-3), which is in good accordance with the results obtained from the K-L equation calculation in RDE tests.

The performance of non-doped and mono-doped CMK-3 were far from satisfactory. However, with both N and S heteroatoms doping into carbon structure of mesoporous CMK-3, the catalyst ORR activity was significantly improved. This could be ascribed to the additional S atoms doping into N-CMK-3, further leading the positive charge and asymmetric spin density of neighboring carbon atoms, which are serving as the ORR active sites (see Insights into the synergistic effect of N and S on ORR) (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012); Li et al., "0- and N-doped Carbon Nanowebs as Metal-free Catalysts for Hybrid Li-Air Batteries," *Adv. Energy. Mater* 4:1301795 (2014), which are hereby incorporated by reference in their entirety). The synergistic effect between N and S heteroatoms on neighbor carbons could facilitate the complete oxygen reduction reaction with 4C transfer, and decrease the $HO_2^-$ intermediate yield. On the other hand, the high surface area (1023 m$^2$ g$^{-1}$) of N—S-CMK-3 with a uniform structure combining mesopores and macropores could provide more active sites, which is beneficial to the utilization of $O_2$ fuel, leading to a higher ORR activity. However, when only S was doped, the clogging issue could severely decrease the surface area of S-CMK-3. Together with these possible reasons, the N—S-CMK-3 exhibited a higher ORR limiting current density, and showed the best ORR activity among all investigated CMK-3 catalysts in this work, which is competitive to the that for Pt/C, suggesting its great potential to serve as a Pt/C alternative for ORR at the cathode side of fuel cells, Li-ion battery, and other energy storage and conversion devices.

Since the N—S-CMK-3 will be used as the cathode catalyst in a direct alcohol fuel cell, the catalyst durability and alcohol fuel-crossover influence on ORR should be considered. The durability of the catalysts was first tested by cycling the catalyst between 0.1 V and 1.2 V at 10 mV s$^{-1}$ scan rate under oxygen purging. After 3000 potential cycles, the N—S-CMK-3 exhibits a robust stability with only 46 mV of half-wave potential shift (FIG. 6A), which is superior to 52 mV for the commercial Pt/C catalyst (FIG. 36). The stability of N—S-CMK-3 was further measured at a constant voltage of 0.5 V for 45000 s (12.5 hours). The results indicate slowly decreasing ORR performance with N—S-CMK-3 as 85.9% of the current was maintained after 45000 s. Conversely, Pt/C exhibited more serious performance degradation as only 76.1% of the current remained after an identical stability test (FIG. 37). For fuel crossover tolerance, glycerol, the coproduct (about 10 wt %) from biodiesel manufacturing, was added into the half cell reactor with the N—S-CMK-3 catalysts after 1800 s (chronoamperometry test at 0.6 V); comparative study of Pt/C catalysts was also carried out using the same method. When glycerol was added into electrolyte, the current density of N—S-CMK-3 had nearly no change, strongly indicating its high catalytic activity for ORR while being nearly inert towards glycerol oxidation (FIG. 6B). Conversely, Pt/C exhibited an instantaneous current density spike due to its high activity toward glycerol oxidation, and thus its vulnerability to glycerol crossover.

Electrocatalytic Analysis in a Single Fuel Cell

Single fuel cell performance is considered the ultimate catalyst evaluation method from both engineering and application points of view. The N—S-CMK-3 was fabricated into an alkaline membrane fuel cell, and its electrocatalytic activity toward ORR and single glycerol fuel cell performance was tested. The steady-state polarization curves with different cathodic catalysts in the glycerol alkaline fuel cell are shown in FIG. 7A. It was observed that the open circuit potential of the fuel cell with N—S-CMK-3, CMK-3, and Pt/C were 0.86 V, 0.70 V, and 0.85 V, respectively. Due to the outstanding ORR electrocatalytic activity and apparent $O_2$ diffusion advantage, the glycerol alkaline membrane fuel cell with N—S-CMK-3 cathode yields a high peak power density of 88.2 mW cm$^{-2}$, which is much higher than that with the CMK-3 cathode, 42.4 mV cm$^{-2}$, and 84% of the fuel cell performance when compared with the best-known ORR catalyst, Pt/C, at cathode (105 mW cm$^{-2}$ peak power density). The Fe loading would be extremely low (2.4 μg cm$^{-2}$ cathode) as converted from 0.12 wt % of Fe determined by XPS. Based on the I-V curve analysis, the fuel cell with N—S-CMK-3 cathode displays Pt-like behavior both in a kinetic dominated regime (current density <50 mA cm$^{-2}$) and ohmic resistance controlled regime (current density >50 mA cm$^{-2}$) (Wang et al., "Carbon Supported Ag Nanoparticles with Different Particle Size as Cathode Catalysts for Anion Exchange Membrane Direct Glycerol Fuel Cells," *Renew. Energ.* 62:556 (2014); He et al., "High-loading Cobalt Oxide Coupled with Nitrogen-doped Graphene for Oxygen Reduction in Anion-Exchange-Membrane Alkaline Fuel Cells," *J. Phys. Chem. C* 117:8697 (2013), which are hereby incorporated by reference in their entirety), implying a considerably high ORR activity and less performance loss owing to the resistance to ionic current.

The fuel cell performance using other bioalcohol fuels, ethanol and sorbitol were also tested. Ethanol is a first generation biofuel, and has been widely used as a gasoline additive (Bozell et al., "Technology Development for the Production of Biobased Products from Biorefinery Carbohydrates—The U.S. Department of Energy's 'Top 10' Revisited," *Green Chem.* 12:539 (2010), which is hereby incorporated by reference in its entirety), while sorbitol is an important sugar alcohol that can be produced from cellulose hydrolysis and potentially used as a precursor to generate biorenewable chemicals (Bozell et al., "Technology Development for the Production of Biobased Products from Biorefinery Carbohydrates—The U.S. Department of Energy's 'Top 10' Revisited," *Green Chem.* 12:539 (2010); Xin et al., "Electricity Storage in Biofuels: Selective Electrocatalytic Reduction of Levulinic Acid to Valeric Acid or γ-Valerolactone," *Chemsuschem* 6:674 (2013); Kunkes et al., "Catalytic Conversion of Biomass to Monofunctional Hydrocarbons and Targeted Liquid-fuel Classes," *Science* 322:417 (2008), which are hereby incorporated by reference in their entirety). The N—S-CMK-3 cathode alkaline fuel cell reached 80% of that with the Pt/C cathode alkaline fuel cell using sorbitol, and even higher than that of Pt/C when ethanol is used as the fuel (FIG. 38). The catalyst layer for the N—C-CMK-3 cathode is thicker than that for the Pt/C catalyst, which could affect the $O_2$ diffusion toward ORR on the fuel cell's cathode side, leading to a slightly lower peak power density for the N—S-CMK-3 cathode fuel cell relative to the Pt/C cathode one. To further study the $O_2$ diffusion effect, different backpressures (30 psi and ambient pressure) were used. The peak power density of N—S-CMK-3 cathode glycerol fuel cell was obtained as 82.7 mW $cm^{-2}$, which has only 6.2% performance dropping in contrast to the 88.2 mW $cm^{-2}$ achieved by using 30 psi backpressure (FIG. 39). Thus, the $O_2$ diffusion issue is negligible when the backpressure changes from 30 psi to ambient pressure. This good $O_2$ diffusion property can likely be attributed to its uniform mesoporous structure with a wide range of mesopores and macropores as well as the high surface area.

The durability of catalyst also serves as an important criterion to determine the suitability of N—S-CMK-3 in the cathodic side for ORR. As shown in FIG. 7B, the glycerol fuel cell shows 90.6 mW $cm^{-2}$ of peak power density after the 2 hour scan current test, which is even slightly higher than the 88.2 mW $cm^{-2}$ during initial performance and indicates robust stability and high selectivity to ORR in a cathode of glycerol fuel cell. In contrast, the performance of the Pt/C cathode glycerol fuel cell was decreased dramatically from 105 mW $cm^{-2}$ to 66.3 mW $cm^{-2}$ (36.9% performance dropping) after 2 hours, consistent with the ORR performance drop in the half cell fuel-crossover test, because glycerol could be readily oxidized on the Pt/C catalysts surface thereby decreasing the fuel cell performance and the fuel-crossover. Together with the excellent ORR performance in the glycerol alkaline fuel cell, good $O_2$ diffusion and expected durability, the as-synthesized N—S-CMK-3 could effectively serve as the cathodic catalyst in an alkaline fuel cell.

Insights into the Synergistic Effect of N and S on ORR

To acquire the insight into synergistic effect of N and S heteroatoms on ORR activity, all of the CMK-3-based catalysts were characterized by XPS. The N/C and S/C atomic ratios were both significantly decreased from 6.40 atom % to 1.27 atom % and 1.11 atom % to 0.20 atom %, respectively, when the doping temperature was increased from 700° C. to 900° C. (FIG. 8A and Table 1), which is similar to previous reports. The broad N1s peak was then deconvoluted into four peaks, assigned to pyridinic-N, pyrrolic-N, graphitic-N, and $N^+$—$O^-$ (inactive to ORR) structures, respectively (FIGS. 40A-B and FIG. 4C) (Jiang et al., "Nitrogen and Phosphorous Dual-doped Hierarchical Porous Carbon Foams as Efficient Metal-free Electrocatalysts for Oxygen Reduction Reactions," *Chem. Eur. J.* 20:3106 (2014); Lin et al., "Noble-Metal-Free Fe—N/C Catalyst for Highly Efficient Oxygen Reduction Reaction Under Both Alkaline and Acidic Conditions," *J. Am. Chem. Soc.* 136:11027 (2014), which are hereby incorporated by reference in their entirety). Interestingly, when combined with the ORR performance and electron transfer number, n, for the N—S-CMK-3 catalysts (FIG. 5B), FIGS. 8A-B reveal a correlation between the graphitic-N species and the ORR activity. For example, the N—S-CMK-3 (800° C.) with a higher proportion of graphitic-N centers favors higher ORR activity with complete 4C transferred reaction, whereas those containing a lower portion of graphitic-N sites exhibit lower ORR activity for both the 4C and $2e^-$ reactions. In addition, although the graphitic-N content has been found to be close for N-CMK-3 and N—S-CMK-3 (FIG. 8B and FIG. 41), the N-CMK-3 without S doping exhibits moderate ORR activity with n of 3.4 at 0.5 V, which is much lower than that of N and S dual-doped N—S-CMK-3. Thus, it could be hypothesized that the doped graphitic-N and S atoms can increase both the catalyst activity toward ORR and the synergistic effect between N and S, thus greatly enhancing the ORR activity when combined in the N—S-CMK-3 catalysts.

The ORR activity of these catalytic materials has been found to be determined by atomic charge densities and spin densities, with the latter playing a more important role than the former (Zhang et al., "Mechanisms of Oxygen Reduction Reaction on Nitrogen-doped Graphene for Fuel Cells," *J. Phys. Chem. C* 115:11170-11176 (2011), which is hereby incorporated by reference in its entirety). Previous work has been reported that the carbon atoms with (i) a positive spin density and a charge density larger than 0.15 or (ii) a relatively small negative spin density of ≥−0.01 and a large charge density of ≥0.2, were most likely to serve as ORR active sites (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012); Zhang et al., "Mechanisms of Oxygen Reduction Reaction on Nitrogen-doped Graphene for Fuel Cells," *J. Phys. Chem. C* 115:11170-11176 (2011), which are hereby incorporated by reference in their entirety). For solely doped N—C, the incorporated graphitic-N atom can significantly change the charge density of neighbor carbon atoms due to the larger electronegativity of N (3.04) than that of carbon (2.55). The neighbor carbon atoms near the graphitic-N atom in the N—C structure shows the non-uniform charge density and spin density value, while the carbon atom spin density is zero and the charge density is small and uniformly distributed in pure carbon materials, such as graphene (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012); Wang et al., "BCN Graphene as Efficient Metal-free Electrocatalyst for the Oxygen Reduction Reaction," *Angewandte Chemie-International Edition* 51:4209-4212 (2012), which are hereby incorporated by reference in their entirety). Thus, some neighbor carbon atoms become catalytic active sites favoring $4e^-$ transfer ORR. On the other hand, for S—C, the small electronegativity difference between S (2.58) and C (2.55) leads to a negligible charge transfer. But a big sulfur atom incorporated into the carbon networks can induce the strain and stress of carbon rings, resulting in a change in charge density of neighbor carbon atoms. In addition, the mismatch of the outermost orbitals of sulfur and carbon features a highly asymmetric spin density. Hence, the carbon atoms near the S atom possess a positive spin density, and serve as ORR active sites. Meanwhile, the substituting S atoms in S—C structure also have a positive spin density, thus making them possible to be catalytic active sites toward ORR (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012), which is hereby incorporated by reference in its entirety).

For N- and S-dual doped carbon materials, the atomic charge density and spin density of carbon atoms were simultaneously affected by incorporated graphitic-N and S atoms, and more active sites were obtained. Therefore, the ORR performance of N—S-CMK-3 mesoporous carbon was significantly improved when both N and S were incorporated into carbon networks. The previous DFT calculation results as well as the experimental results in this work can well explain the synergistic effect of N and S on neighbor carbon atoms, and further highlight the remarkable ORR activity of N—S-CMK-3 with the highest electron transfer number, n=3.96, as compared to that on solely doped and pristine CMK-3 catalysts (Liang et al., "Sulfur and Nitrogen Dual-doped Mesoporous Graphene Electrocatalyst for Oxygen Reduction with Synergistically Enhanced Performance," *Angewandte Chemie-International Edition* 51:11496 (2012); Kicinski et al., "Sulfur-doped Porous Carbons: Synthesis and Applications," *Carbon* 68:1 (2014); Zhang et al., "Mechanisms of Oxygen Reduction Reaction on Nitrogen-doped Graphene for Fuel Cells," *J. Phys. Chem. C* 115:11170-11176 (2011), which are hereby incorporated by reference in their entirety).

Conclusion

The experiments described here in Example 1 demonstrated the successful synthesis of novel N- and S-dual-doped N—S-CMK-3 mesoporous carbons using biorenewable glucose as the carbon source and ammonia and thiophene as highly efficient N and S dopants. The high surface area (1023 $m^2 g^{-1}$), derived from a moderate $NH_3$ etching effect, and the synergistic effect of graphitic-N and S atoms resulted in remarkable electrocatalytic ORR activity. N—S-CMK-3 annealed at 800° C. exhibits the highest ORR activity (close to that of Pt/C) with the onset potential of 0.92 V vs. RHE, a Tafel slope of 68 mV $dec^{-1}$, and a 3.96 electron transfer number per oxygen molecule in 0.1M KOH. Using the N—S-CMK-3 cathode catalyst in a single direct glycerol fuel cell exhibited 88.2 mW $cm^{-2}$ peak power density without obvious $O_2$ diffusion limitation, which represents 84% of the initial performance of the one with a Pt/C cathode. Moreover, the peak power density of the fuel cell with N—S-CMK-3 can maintain a peak power density at 90.6 mW $cm^{-2}$ after two hours of operation, while the one with the Pt/C cathode lost its peak power density to 66.3 mW $cm^{-2}$. The robust stability and alleviation of the fuel-crossover issue (resistance to alcohol oxidation) demonstrated in both half cell and single fuel cell tests strongly indicate that the N—S-CMK-3 is a promising substitute to replace noble metal and serve as a cathodic catalyst for alcohol alkaline fuel cells, $H_2/O_2$ fuel cells, and likely other energy conversion and storage devices.

Example 2: Direct Bio-Oil Fuel Cell

Experimental

Chemicals

Palladium (II) nitrate dehydrate, silver nitrate, gold (III) chloride, polytetrafluoroethylene (PTFE), 1-propanol (99.5%), sodium borohydride (99%), sodium citrate dehydrate (99%), glucose (99%), sucrose (99%), potassium hydroxide (85%), and potassium sulfate (99%) were purchased from Sigma-Aldrich. Carboxyl-group functionalized multi-walled carbon nanotubes (8-15 nm outer diameter, 0.5-2 μm length) were obtained from Cheaptubes Inc. The catalyst 4020 was bought from Actna, Inc. Levoglucosan, cellobiosan, and maltosan were obtained from Carbosynth. Xylose was purchased from Thermo Fisher Scientific. Stage fraction 2 bio-oil was obtained from Iowa State University BioCentury Research Farm. All the chemicals were used as received without further purifications.

Catalyst Synthesis and Physical Characterizations

Carbon nanotube supported Pd, Pt, Ag, and Au nanoparticles were synthesized by an aqueous phase reduction method (Qi et al., "Electrocatalytic Selective Oxidation of Glycerol to Tartronate on Au/C Catalysts in Anion Exchange Membrane Fuel Cells with Electricity Cogeneration," *Applied Catalysis B: Environmental* 154-155(0):360-8 (2014); Qi et al., "Surface Dealloyed PtCo Nanoparticles Supported on Carbon nanotube: Facile Synthesis and Promising Application for Anion Exchange Membrane Direct Crude Glycerol Fuel Cell," *Green Chem.* 15(5):1133-7 (2013), which are hereby incorporated by reference in their entirety). To make Pd/CNT, palladium (II) nitrate (105 mg) was dissolved in distilled water (1500 mL), followed by stirring at a speed of 600 rpm to ensure the solution was well dispersed. Sodium citrate dihydrate (200 mg) and sodium borohydride (40 mg) were each dissolved in distilled water (50 mL) separately, and then carboxyl-group functionalized multi-wall carbon nanotubes (181 mg) were dispersed in 100 mL distilled water by ultrasonication. All were then combined in the solution to reduce metal precursors and to deposit the Pd nanoparticles onto the surface of the CNT. The final product Pd/CNT (20 wt %) was cleaned with an additional 1 L of distilled water, collected by vacuum filtration, and dried overnight in a vacuum oven. Pt/CNT, Ag/CNT, and Au/CNT were synthesized via a similar process as Pd/CNT, but with different metal precursors. Transmission electron microscopy (TEM) images of catalysts were collected on JEOL JEM-4000FX with an operating voltage of 200 kV. X-ray diffraction (XRD) analyses of catalysts were carried on a Scintag XDS-2000 diffractometer with a Cu Kα source (λ=1.5406 Å).

Cyclic Voltammetry of Pure Sugars

A traditional three-electrode, water jacket integrated glass cell (AFCELL3, Pine Instrument) with a glassy carbon working electrode (AFE3T050GC, Pine Instrument), a Hg/HgO reference electrode (MMO, CHI152, CH Instruments), and a platinum wire counter electrode (AFCTR1, Pine Instrument) were used for cyclic voltammetry (CV). All tests were prepared and performed at ambient temperatures. All potentials were specified to MMO (1.0M KOH, 0.098 V vs. SHE). The prepared catalysts were dispersed in 1-propanol by ultrasonication to form a uniform ink (0.5 mg $mL^{-1}$). The working electrode was prepared by polishing a glassy carbon electrode (GCE) with alumina micropolish solution and grinding paper in order to have a mirror-polished surface. 10 μL of ink were deposited dropwise onto the surface of GCE. The electrolytes were composed of 1.0 M KOH+0.1 M glucose, levoglucosan, or sucrose in deionized water. Cyclic voltammetry was performed at a constant sweep rate of 50 mV $s^{-1}$ with nitrogen gas purging.

Direct Bio-Oil AEMFC

The fuel cell tests were performed on a Scribner Fuel Cell System 850e (Scribner Associates, USA) (Qi et al., "Surface Dealloyed PtCo Nanoparticles Supported on Carbon nanotube: Facile Synthesis and Promising Application for Anion Exchange Membrane Direct Crude Glycerol Fuel Cell," *Green Chem.* 15(5):1133-7 (2013); Qi et al., "Carbon Nanotubes as Catalysts for Direct Carbohydrazide Fuel Cells," *Carbon* 89:142-7 (2015); Qi et al., "Back Cover: Metal- Catalyst-Free Carbohydrazide Fuel Cells with Three-dimensional Graphene Anodes," *ChemSusChem* 8(7):1288 (2015), which are hereby incorporated by reference in their entirety), and the fuel cell fixture with an active area of 5 cm$^2$ was purchased from Fuel Cell Technology, Inc. The anode catalyst layers were prepared by spraying catalyst ink onto untreated carbon cloth with catalyst loading of 0.5 mg$_{metal}$ cm$^{-2}$ with ratio of 9:1 PTFE binder. The cathode catalyst substrate was constructed by spraying 3 mg cm$^{-2}$ non-noble metal loading commercial catalyst (4020 Acta) with ratio of 7:3 of ionomer (AS-4, Tokuyama Corp.) onto an anion exchange membrane (A901, Tokuyama Corp.). The liquid fuel was pumped into the anode compartment at a flow rate of 4.0 ml$^{-1}$, while high purity O$_2$ was fed into the cathode compartment at a flow rate of 0.2 L min$^{-1}$ under a backpressure of 0 psig. The liquid fuel, O$_2$, and the reactor were maintained at a constant temperature.

Chemical Analysis

High Performance Liquid Chromatography:

Non-volatile sugars were characterized using HPLC equipped with a refractive index (RI). Bio-Rad Aminex HPX-87P with a guard column was used for this set up. The column temperature was 75° C. with a flow rate of 0.6 mL/min 18.2Ω distilled water. The RI detector was needed to be calibrated with the non-volatile sugars diluted into five concentrations (0-10 mg/ml) with distilled water. Approximately 1.0 g of bio-oil sample was dissolved in 5 mL of distilled water and well mixed with a votex mixer for 20 min. The well mixed solution was then filtered through a Whatman® 0.45 micron glass microfiber filter. 25 μL were injected into the HPLC and the total run of each sample was 70 min. The chemical analysis of bio-oil used similar methods developed by Pollard (Pollard et al., "Characterization of Bio-oil Recovered as Stage Fractions with Unique Chemical and Physical Properties," *J. Analytical and Applied Pyrolysis* 93:129-38 (2012), which is hereby incorporated by reference in its entirety) and Choi (Choi et al., "Detailed Characterization of Red Oak-derived Pyrolysis Oil: Integrated Use of GC, HPLC, IC, GPC and Karl-Fischer," *J. Analytical and Applied Pyrolysis* 110:147-54 (2014), which is hereby incorporated by reference in its entirety).

Ion Chromatography:

Thermally labile organic acids were characterized by IC. Dionex ICS3000 equipped with a conductivity detector and an Anion Micromembrane Suppressor AMMS-ICE 300 were used. The suppressor regenerant was 5 mM tetrabutylammonia hydroxide at a flow rate of 4-5 mL/min. The mobile phase used was 1.0 mM heptaflourobutyric acid in an IonPac® ICE-AS1 analytical column at a flow rate of 0.120 mL/min at 19° C. The diluted mixture was filtered through a Whatman® 0.45 μm glass microfiber filter. 25 μL were injected into the IC and the total run of each sample was 70 min.

Gas Chromatography:

The volatile compounds in the bio-oil were characterized by gas chromatography with the mass spectrometer (GC-MS) for identification. The column used for this set up was a Zebron ZB-1701 coated with 14% cyanopropylphenyl and 86% dimethylpolysiloxane with dimensions of (60 m×0.25 mm ID×0.25 μm film thickness). The oven was programmed to hold at 35° C. for 3 min, ramp at 5° C./min to 300° C., and then hold for 4 min. The injector of GC was maintained at 300° C. and engaged a split ratio of 30:1. The flow rate was 1 mL/min of the helium carrier gas. The mass spectrometer was configured for electron impact ionization, with a source/interface temperature of 280° C. Full scan mass spectra were acquired from 35 to 650 m/z at a scan rate of 0.5 s per scan. The compounds were identified using a NIST mass spectra library search in conjunction with the literature.

Proton Nuclear Magnetic Resonance:

$^1$H NMR spectra were collected with a Bruker 600 MHz NMR (AVIII600). The temperature was regulated to 25° C. during the acquisition. The $^1$H NMR spectra was acquired at room temperature. The sample preparation of bio-oil was prepared by drying 50-100 mg of bio-oil for 48 hours. The dried sample was reconstituted with 1 mL Deuterium oxide (D$_2$O). The resultant solution was filtered with 0.2 um filter paper. The data was analyzed with MestReNova version 8.1 software.

Results and Discussion

Physical Characterization of Catalysts

FIGS. 9A-D show the TEM images of Pt, Pd, Au, and Ag nanoparticles supported on CNTs and the XRD patterns of Pt/CNT, Pd/CNT, Au/CNT, and Ag/CNT. Uniformly well-dispersed metal particles were observed on the CNTs. The average particle size measured from randomly measuring 100 particles was 1.3, 2.0, 4.1, and 13.9 nm for Pt/CNT, Pd/CNT, Au/CNT, and Ag/CNT, respectively. The XRD patterns in FIG. 9E show that the metal particles have the face centered cubic (FCC) structure, with the peaks at 38.2, 44.3, 64.4, and 77.5° assigned to (111), (200), (220), and (311) facets, respectively. The crystalline size of metal particles was calculated from 220 diffraction peak by the Debye-Scherrer formula.

Compositional Analysis of Bio-Oil Fraction

High performance liquid chromatograph (HPLC) was used to detect non/semi volatile sugars that have high molecular weight compounds, such as levoglucosan, cellobiosan, and xylose. Levoglucosan was found to be the major identified compound with 11.1 wt % of the bio-oil. Table 3 shows quantified distributions of sugars. Ion chromatography (IC) was used to detect carboxylic acids rather than gas chromatography, due to their thermal instability. Bio-oil included approximately 3.3 wt % organic acids including acetic, propionic, glycolic, and formic acids. Table 4 shows the distributions of the organic acids found. The complete quantification was done using IC and HPLC for the detection of carboxylic acids and heavy sugars such as mono/disaccharides. Gas chromatography (GC) was used to characterize volatile compounds of bio-oil. Table 5 shows the compounds that are majorly identified as hydroxylaldehydes, hydroxylketones, sugars, carboxylic acids, and phenolics. The findings were relatively consistent with previous work (Pollard et al., "Characterization of Bio-oil Recovered as Stage Fractions with Unique Chemical and Physical Properties," *J. Analytical and Applied Pyrolysis* 93:129-38 (2012); Rover et al., *ChemSusChem* 7(6):1662-8 (2014); Choi et al., "Detailed Characterization of Red Oak-derived Pyrolysis Oil: Integrated Use of GC, HPLC, IC, GPC and Karl-Fischer," *J. Analytical and Applied Pyrolysis* 110:147-54 (2014), which are hereby incorporated by reference in their entirety). The identification of major and active components of bio-oil were a matter of interest due to complexity of bio-oil. Therefore, further detailed quantitative identification of compounds in the bio-oil in this analysis was not intended to be exhaustive. Further investigations were carried out on analysis of bio-oil by proton nuclear magnetic resonance ($^1$H NMR) spectroscopy in order to confirm the major component present in the bio-oil. FIG. 42 shows $^1$H NMR spectra to confirm the identification of levoglucosan as the major component of bio-oil.

TABLE 3

Analysis of Pyrolysis Crude Bio-Oil by HPLC

| Compounds | wt % |
|---|---|
| Cellobiose | 0.306 |
| Cellobiosan | 3.353 |
| Xylose | 2.493 |
| Galactose | 0.503 |
| Levoglucosan | 11.083 |
| Total | 17.739 |

TABLE 4

Analysis of Pyrolysis Crude Bio-Oil by IC

| Compounds | wt % |
|---|---|
| Glycolate | 1.353 |
| Formate | 0.747 |
| Acetate | 0.557 |
| Propionate | 0.671 |
| Total | 3.329 |

TABLE 5

Analysis of Pyrolysis Crude Bio-Oil by GC Category

| |
|---|
| Furans: |
| 2-Furan methanol |
| 2(5H)-Furanone |
| 4-Methyl-5H-furan-2-one |
| 5-Hydroxymethylfurfural |
| Ketones: |
| 1-Hydroxyl-2-Propanone |
| 1-Hydroxy-2-Butanone |
| 2H-pyran-2-one |
| Aldehyde: |
| Acetaldehyde |
| Vanillin |
| Formaldehyde |
| Glycolaldehyde |
| Alcohol: |
| 1,3 Propanediol |
| Acetol |
| Methanol |
| Phenol: |
| Vanillin |
| 2-Methoxyphenol |
| 2-Methylphenol |
| 3,4-Dimethylphenol |
| Eugenol |
| Benzenediol: |
| Hydroquinone |
| t-Butylhydroquinone |

AEMFC with Bio-Oil

FIG. 10A displays the polarization and power density curves of direct bio-oil AEMFC using Pd/CNT, Ag/CNT, Au/CNT, and Pt/CNT anode catalysts. The experiments were performed at 80° C. with an aqueous solution of 30 wt % bio-oil mixed with 6.0 M KOH. The open circuit voltage (OCV) of the direct bio-oil AEMFC with Pd/CNT was 0.841 V, which is 0.038 V higher than that with Ag/CNT, 0.054 V higher than that with Pt/CNT, and 0.085 V higher than that with Au/CNT. The peak power density (PPD) of the direct bio-oil AEMFC with Pd/CNT was 42.7 mW $cm^{-2}$, which is 4.5% higher than that with Pt/CNT, 8.7% higher than that with Ag/CNT, and 10.2% higher than that with Au/CNT. Although there is no significant difference between the curves seen, Pd/CNT anode catalyst is slightly higher in performance compared to the other catalysts. Current generated on Pd/CNT was attributed to the oxidation of levoglucosan and partially to oxidizing other compounds especially including sugars and alcohols present in the bio-oil. Ag/CNT has electrocatalytic activity on the existence of aldehyde groups in the bio-oil (Aoun et al., "Electrocatalytic Oxidation of Sugars on Silver-UPD Single Crystal Gold Electrodes in Alkaline Solutions," *Electrochemistry Comm.* 5(4):317-20 (2003), which is hereby incorporated by reference in its entirety). Au/CNT is favoring aldehyde oxidation and alcohol functional groups of bio-oil (Liu et al., *Electrochimica Acta* 54(28):7286-93 (2009), which is hereby incorporated by reference in its entirety). Pt/CNT was mainly oxidizing the $C_{2+}$ alcohols of bio-oil, while spontaneously breaking C—C bonds (Lamy et al., *The Royal Society of Chemistry* p. 1-70 (2012); Li et al., "Platinum Monolayer Electrocatalysts for Anodic Oxidation of Alcohols," *J. Phys. Chem. Lett.* 3(23):3480-5 (2012), which are hereby incorporated by reference in their entirety). More than one functional group and highly active compounds in bio-oil were impulsively playing a significant role towards the performance in AEMFC.

FIG. 10B illustrates the cell polarization and power density curves of direct bio-oil AEMFC with Pd/CNT operated under different temperatures. The cell performance increased as the temperature was increased over the whole current density range. In particular, the limiting current density increased from 120 to 290 mA $cm^{-2}$ when the temperature was increased from 25° C. to 80° C. An increase in the temperature enhanced the electrochemical kinetics of both the bio-oil oxidation reactions at the anode and the oxygen reduction reaction (ORR) at the cathode. The OCVs of direct bio-oil AEMFC operating at 25, 40, 60 and 80° C. were 0.66 V, 0.72 V, 0.79 V, and 0.81 V, while the PPDs were 12.4, 17.1, 25.2, and 34.0 mW $cm^{-2}$ respectively. In addition, the electrolyte conductivity increased with increasing temperature, which reduced the ohmic loss as shown by the cell resistance in FIG. 43A. It has been demonstrated that the cell resistance is decreased as the temperature is increased. As a result, the cell performance is improved. Furthermore, both bio-oil and oxygen transport diffusivities were increased with an increase in temperature, resulting in the low mass transport polarization. Therefore, the cell performance increased as the temperature is increased, which can be attributed to the faster electrochemical kinetics, increased conductivity of hydroxyl ions, and enhanced mass transfer.

The effect of changing KOH concentration on AEMFC performance with direct bio-oil with Pd/CNT was investigated by increasing the concentration of KOH from 1.0 to 8.0 M, while fixing the bio-oil concentration at 20 wt % (FIG. 10C). The peak power densities presented a volcano-type behavior against the KOH concentration. The fuel cell performance and the cell voltage increased with increasing KOH concentration from 1.0 to 6.0 M and then decreased with the KOH concentration further increasing to 8.0 M. In general, an increase of electrolyte alkalinity leads to a higher local of $OH^-$ concentration at the anode catalyst layer and also a higher OH coverage on the catalyst surface, which facilitates electrochemical kinetics (Park et al., "Performance of Solid Alkaline Fuel Cells Employing Anion-Exchange Membranes," *J. Power Sources* 178(2):620-6 (2008); Scott et al., "Performance of a Direct Methanol Alkaline Membrane Fuel Cell," *J. Power Sources* 175(1): 452-7 (2008), which are hereby incorporated by reference in their entirety). The previous studies of other alkaline AEMFC systems have reported that a higher KOH concentration leads to the increase of internal resistance in an AEMFC (An et al., "Performance of a Direct Ethylene Glycol Fuel Cell with an Anion-exchange Membrane," *Int. Journal of Hydrogen Energy* 35(9):4329-35 (2010); Li et al., "Performance of Alkaline Electrolyte-Membrane-based Direct Ethanol Fuel Cell," *J. Power Sources* 187(2):387-92 (2009), which are hereby incorporated by reference in their entirety). It was found that the internal resistance first increased from 1.0 to 2.0 M and then decreased as KOH concentration increased from 2.0 to 8.0 M. When 2.0 M KOH was applied, the internal resistance on Pd/CNT was 261.19 mΩ, which was reduced to 83.22 mΩ when 6.0 M KOH was applied, as shown in FIG. 43B. When the KOH concentration was further increased to 8.0 M, large KOH concentrations led to excessive hydroxyl ion surface coverage, decreasing the number of active catalytic sites available for bio-oil absorption, hence causing the cell voltage and the performance to decline. The maximum KOH concentration is limited due to its solubility in bio-oil solution. It is known that the internal resistance is affected by anode membrane and the cathode due to conduct resistance of hydroxyl anions from the cathode to anode side in AEMFC. Low internal resistance was observed in these tests due to the mass transfer issue becoming dominant in high KOH concentration. In summary, it can be concluded that the single cell performance increases with increased KOH concentration until it's maximized to lead to the excessive hydroxyl ion coverage and decrease in the number of active catalytic sites.

The effect of bio-oil concentration on the AEMFCs with Pd/CNT was investigated by increasing the bio-oil concentration from 5.0 wt % to 60.0 wt %, while fixing the KOH concentration at 2.0 M. The cell voltage increases with higher concentration of bio-oil in the low current density as the local bio-oil concentration increased from 5.0 wt % to 30.0 wt % (FIG. 10D). A further increase in the bio-oil concentration from 30.0 wt % to 60.0 wt % caused the cell voltage to decrease gradually in the low current density region. In addition, higher bio-oil concentration causes more active sites of the anode catalyst to be covered by the bio-oil, which blocks the adsorption of hydroxide on the active sites and leads to a drop in performance. Essentially, the kinetics of the oxidation reaction depends on the surface concentration of both bio-oil and hydroxide ions. At higher current densities, the cell voltage dropped more rapidly with 5.0 wt % concentration than 20 to 40 wt %. This is because feeding 5.0 wt % does not supply a sufficiently high mass transfer rate required at high current densities, causing the bio-oil concentration in the anode catalyst layer to become inadequate. The cell performance also declines when the bio-oil is higher than 30 wt %; relatively, this concentration of bio-oil alleviates the diffusion limitation due to the higher driving force for mass transport. However, when the bio-oil concentration is increased, the viscosity of the electrolyte increases, which decreases the mobility of OH$^-$ and conductivity of the electrolyte. An increase in cell resistance with increasing bio-oil concentration is shown in FIG. 43C. The higher bio-oil concentration (40.0 wt % to 60.0 wt %) creates a barrier for the transfer of OH$^-$ due to covering active sites in the anode catalyst layer which leads to giving extreme rise in cell resistance from 198.3 mOhm to 316.2 mOhm. This extreme cell resistance causes a reduction in the cell voltage and hence the cell performance is reduced. In summary, OCV and the cell performance increased with an increase of bio-oil concentration up to 30 wt % because the local bio-oil concentration in the catalyst layer is too low. However, when the bio-oil fuel solution is too high at the anode catalyst layer, the coverage of hydroxide ions on catalytic sites were reduced therefore leading the cell performance and the cell voltage to a dramatically drop.

Electrooxidation of Levoglucosan and High Purity Sugars

Figure 11:
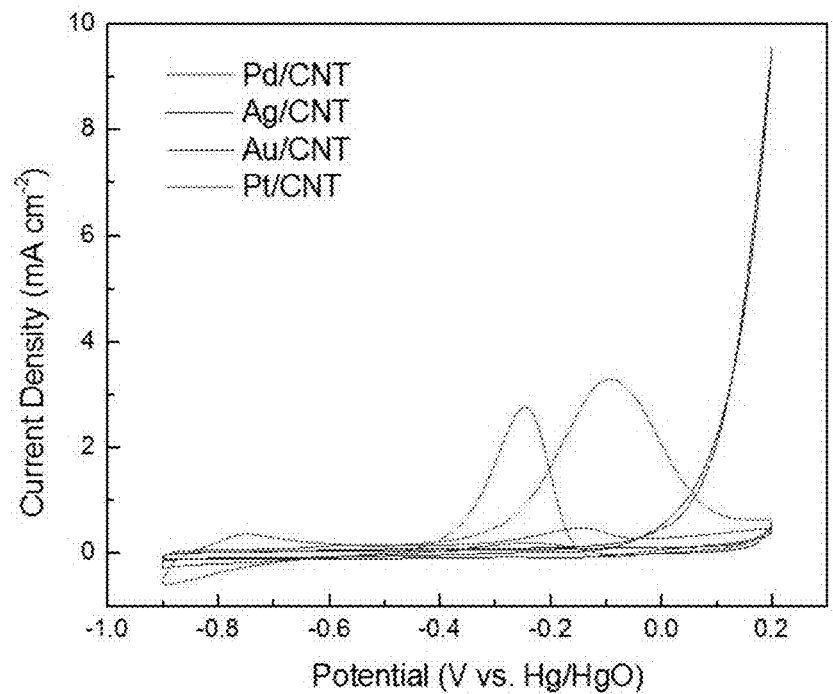
FIG. 11 is a graph showing cyclic voltammograms of levoglucosan oxidation reaction on Pd/CNT, Ag/CNT, Au/CNT, and Pt/CNT catalysts in 1.0 M KOH+0.1 M levoglucosan, 50 mV $s^{-1}$, 25° C.

To evaluate the electrocatalytic activities of catalysts toward levoglucosan, CV was conducted with Pd/CNT, Ag/CNT, Au/CNT, and Pt/CNT, respectively. The reason the effect of the catalyst was further investigated in the half-cell was for further understanding the mechanism of catalysts on identified levoglucosan of bio-oil. FIG. 11 shows the CV of levoglucosan oxidation in 1.0 M KOH+0.1 M levoglucosan on Pd/CNT, Ag/CNT, Au/CNT, and Pt/CNT catalysts at 25° C. The Pd/CNT catalyst showed higher current density than Ag/CNT, Au/CNT, and Pt/CNT at low potentials (below 0.0 V) in spite of its small hydrogen adsorption-desorption properties. Further, Pd/CNT exhibited a more negative onset potential (−0.4 V) compared to Pt/CNT (−0.3 V), Au/CNT (−0.05 V), and Ag/CNT (0.1 V). The sequence of onset potential in the forward scan was Pd/CNT<Pt/CNT<Au/CNT<Ag/CNT, which is consistent with AEMFC performance results. However, a low anode overpotential is preferred in the fuel cell operation, and the low potential region (<0.7 V vs. RHE vs. −0.2 V vs. Hg/HgO) is more important than high potential region of CV results. Au/CNT demonstrated an extremely high peak current density at high potentials, indicating that the Au catalyst can maintain its activity in a wide applied potential range. Au/CNT, Ag/CNT, and Pt/CNT catalysts showed very little activity or no activity toward levoglucosan electro-oxidation at lower potentials.

Figure 12:
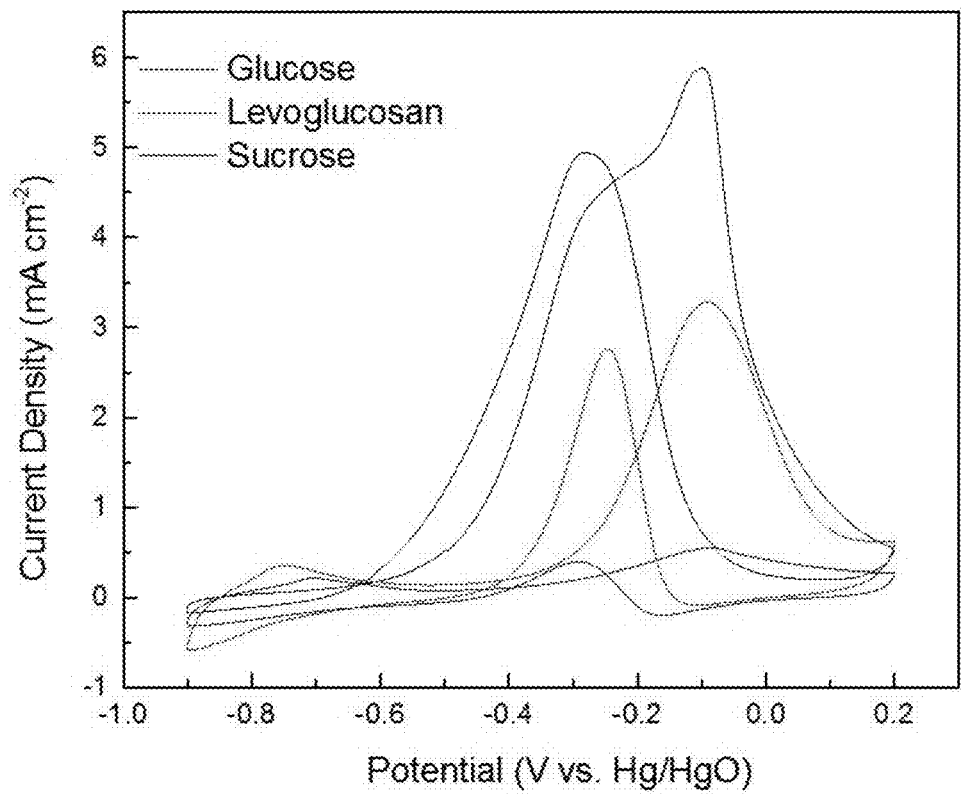
FIG. 12 is a graph showing cyclic voltammograms of Pd/CNT catalyst on electrocatalytic oxidation of glucose, levoglucosan, and sucrose in 1.0 M KOH+0.1 M fuel, 50 mV $s^{-1}$, 25° C.

The electrocatalytic activity of Pd/CNT on high purity sugars was investigated. FIG. 12 shows that the current density for glucose was slightly higher than that of levoglucosan. Generated current density from glucose and levoglucosan oxidation was much greater than from sucrose oxidation. Glucose and levoglucosan are both $C_6$ molecules and can adsorb on the catalyst layer faster than sucrose which is a $C_{12}$ molecule. Smaller species generally have better mass transfer and can be adsorbed faster on the catalyst layer compared to bigger species with poor mass transfer (Becerik et al., "The Electrocatalytic Properties of Palladium Electrodes for the Oxidation of D-glucose In Alkaline Medium," *Electrochimica Acta* 37(14):2651-7 (1992); Parpot et al., "Electrocatalytic Oxidation of Sucrose: Analysis of the Reaction Products," *J. Applied Electrochemistry* 27(1):25-33 (1997), which are hereby incorporated by reference in their entirety). Sucrose is adsorbed slower on the active sites of the catalyst layer, depleting the further oxidation to occur (Parpot et al., "Electrocatalytic Oxidation of Saccharose In Alkaline Medium," *Electrochimica Acta* 38(12):1679-83 (1993), which is hereby incorporated by reference in its entirety). However, sucrose showed a somewhat different behavior. Further, electrooxidation of glucose exhibited a lower onset potential (−0.6 V) compared to levoglucosan (−0.4 V) and sucrose (−0.3V), which can be attributed to the relatively more active aldehyde group in glucose.

Figure 13:
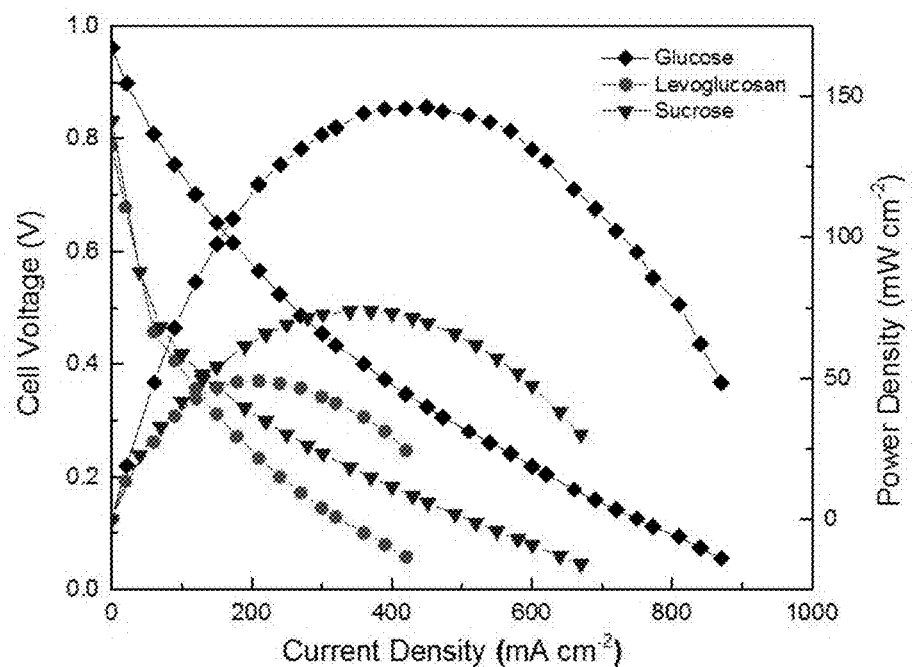
FIG. 13 is a graph showing polarization and power density curves of direct high purity sugars derived alkaline anion exchange membrane fuel cell ("AEMFC") with a Pd/CNT anode catalyst and Fe-based Acta 4020 cathode catalyst; anode fuel: 6.0 M KOH+0.5 M fuel of glucose, levoglucosan, and sucrose.

FIG. 13 shows the cell polarization and power density curves of direct high purity sugars derived AEMFCs with Pd/CNT as anode catalyst. The OCV of anode direct high purity sugars derived AEMFC operating of glucose, levoglucosan, and sucrose is 0.96 V, 0.79 V, and 0.83 V, while the PPD is 145.5 mW cm$^{-2}$, 49.1 mW cm$^{-2}$, and 73.6 mW cm$^{-2}$, respectively. As a result, the output power dramatically dropped when fueled with the higher chain of carbon sugar. The single cell results on the direct high purity sugars derived AEMFCs are consistent with the previous findings of the half-cell. Glucose and levoglucosan were both adsorbed on the anode catalyst layer faster than sucrose.

The Relationship Between Bio-Oil Fuel Cell and Sugar Fuel Cell

The peak power density of the bio-oil fuel cell was about 1.2~3 times lower than the high-purity sugar fuel cell with the same Pd loading, considering the equivalent sugar content in bio-oil is only about 0.3 M sugar. Many unknown highly active compounds containing aldehyde, furans, phenolics, and ketone groups in bio-oil play a significant role towards the performance in AEMFC. The generated current in direct bio-oil fuel cells using all four noble metals is attributed to many spontaneous oxidation reactions taking place simultaneously. The inert impurities of bio-oil do not poison the noble metal catalyst and, therefore, does not deactivate the catalyst. Also, the limiting current densities on the direct bio-oil AEMFC did not significantly drop with enormous variations (FIG. 10A), indicating that complex mixtures of bio-oil lead do not have poor mass transfer phenomenon with all tested catalysts similarly. Overall, it has been demonstrated that the direct bio-oil fuel cell can directly generate electrical energy from complex bio-oil without any purification process, and this may provide a new approach to electrochemical processing of bio-oil to chemicals from downstream of fuel cell in the future.

Conclusion

This example demonstrates that bio-oil can be directly used as a fuel for AEMFC at low temperatures. The direct bio-oil AEMFC using CNT supported noble metal nanoparticles as the anode catalyst achieved a peak power density of 42.7 mW cm$^{-2}$ at 80° C. and ambient pressure. In addition, the effect of operating conditions including the bio-oil concentration, temperature, and KOH concentration were investigated. The highest performance was achieved with 6.0 M KOH+30 wt % bio-oil at 80° C. on Pd/CNT. The experimental results show that cell performance improved with optimized operating parameters due to the improved kinetics of ORR and an increase in bio-oil diffusivity and hydroxyl ion conductivity. The major and active components in the bio-oil were also studied. Levoglucosan was measured to be the major identified compound with 11.1 wt % of the bio-oil. The electrocatalytic activities of four previous noble catalysts (Pd/CNT, Ag/CNT, Au/CNT, and Pt/CNT) on identified highly purified sugar (levoglucosan) by cyclic voltammetry showed that Pd/CNT has highest activity in the low potential region and lowest onset potential. The direct bio-oil AEMFC has potential due to its ability to use unrefined biomass-derived feedstocks as fuels. However, to enlarge its application range, future work should focus on further improving the efficiency of bio-oil oxidation.

Example 3: Ion-Exchange Membrane-Free Direct Alcohol Fuel Cell Chemicals

Palladium (II) nitrate dihydrate, silver nitrate, 1-propanol (99.5%), potassium sulfate (99%), polytetrafluoroethylene (PTFE), sodium borohydride (99%), and sodium citrate dehydrate (99%) were purchased from Sigma-Aldrich. High purity glycerol (99.8%) was bought from Thermo Fisher Scientific. Carboxyl-group functionalized multi-wall carbon nanotube (8-15 nm outer diameter, 0.5-2 μm length) was received from Cheaptubes Inc. The catalyst 4020 was bought from Actna, Inc. PTFE thin films (0.22, 0.45, 1.0 μm) were purchased from Membrane Solutions. All the chemicals were used as received without further purifications.

Synthesis of PdAg/CNT Catalyst

PdAg/CNT (20 wt %) was prepared via a self-developed aqueous phase reduction method (Qi et al., "Electrocatalytic Selective Oxidation of Glycerol to Tartronate on Au/C Anode Catalysts in Anion Exchange Membrane Fuel Cells with Electricity Cogeneration," *Applied Catalysis B: Environmental* 154-155(0): 360-368 (2014); Qi et al., "Surface Dealloyed PtCo Nanoparticles Supported on Carbon Nanotube: Facile Synthesis and Promising Application for Anion Exchange Membrane Direct Crude Glycerol Fuel Cell," *Green Chemistry* 15(5):1133-1137 (2013), which are hereby incorporated by reference in their entirety). Briefly, palladium (II) nitrate dihydrate (56 mg) and silver nitrate (35.7 mg) were dissolved together in distilled water (1500 mL). Sodium citrate dihydrate (200 mg) and sodium borohydride (40 mg) were each dissolved in distilled water (50 mL) and then carboxyl-group functionalized multiwall carbon nanotubes (171.4 mg) were separately mixed in 100 mL distilled water. The mixed solution was transferred into a beaker to reduce metal precursors and to deposit the PdAg nanoparticles onto the surface of the CNT. The final product was washed with an additional 1 L of distilled water, collected by vacuum filtration and dried overnight in a vacuum oven at room temperature.

Physical Characterizations

The X-ray diffraction (XRD) analysis of the PdAg/CNT catalyst was carried on a Scintage XDS-2000 diffractometer with a Cu Kα source ($\lambda$=1.5406 Å). The transmission electron microscopy (TEM) images of PdAg/CNT catalyst were collected on JEOL JEM-4000FX with an operating voltage of 200 kV.

Ion Exchange Membrane-Free Fuel Cell

The fuel cell tests were performed on a Scribner Fuel Cell System 850e (Scribner Associates) (Qi et al., "Carbon Nanotubes as Catalysts for Direct Carbohydrazide Fuel Cells," *Carbon* 89(0):142-147 (2015); Qi et al., "Back Cover: Metal-Catalyst-Free Carbohydrazide Fuel Cells with Three-Dimensional Graphene Anodes," *ChemSusChem* 8(7):1288-1288 (2015); Xin et al., "Simultaneous Generation of Mesoxalic Acid and Electricity from Glycerol on a Gold Anode Catalyst in Anion-Exchange Membrane Fuel Cells," *ChemCatChem* 4(8):1105-1114 (2012), which are hereby incorporated by reference in their entirety). The membrane electrode assembly (MEA), with an active area of 5 cm$^2$ included an anode electrode, PTFE thin film (pore size 0.22, 0.45, or 1.0 μm), cathode electrode, and a carbon paper. The anode electrode was created by air brushing the catalyst ink of 1 mg cm$^{-2}$ PdAg/CNT with a ratio of 9:1 5% polytetrafluoroethylene (PTFE) binder onto an untreated carbon cloth liquid diffusion layer. The cathode electrode was prepared by spraying 3 mg cm$^{-2}$ Acta 4020 with a ratio of 7:3 of ionomer (AS-4, Tokuyama Corp.) onto PTFE thin film. The surroundings of PTFE thin film area were sprayed with 100 mL of AS-4 ionomer. It was preferred that the catalyst and binder mix together homogeneously by an ink formulation process where adequate sonication and agitation was applied. The liquid fuel was pumped into the anode compartment at a flow rate of 4.0 mL min$^{-1}$, while high purity O$_2$ was fed into the cathode compartment at a flow rate of 0.2 L min$^{-1}$ under a backpressure of 0 psig.

Durability Test

The durability of the fuel cell was tested out at 80° C. for 80 hours by observing the transient voltage at a constant current (0.25 Å). The pure oxygen (99.9%) without humidification at ambient pressure at a flow rate of 0.1 L min$^{-1}$ was applied to the cathode compartment. The anode was fed with an aqueous solution containing 6.0 M KOH and 1.0 M glycerol at a flow rate of 1.0 ml min$^{-1}$ using a peristaltic pump. To test the variation in polarization curves with the discharge time, the stop/restart procedure was carried out at the time point of 20, 40, 60, and 80 hours to collect the voltage and the current. The durability tests were repeated using fresh fuel each time.

Results & Discussion

PTFE Thin Film Pore Size Effect

Figure 14:
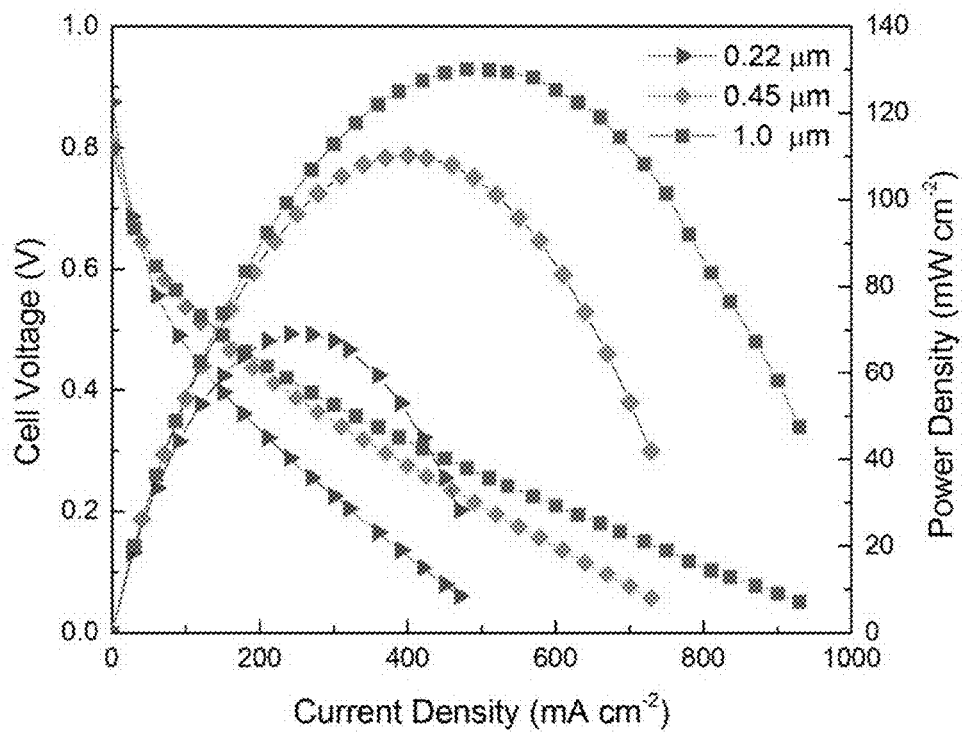
FIG. 14 is a graph showing polarization and power density curves of an ion exchange membrane-free DAFC cell for different pore sizes of a thin film (0.22, 0.45, 1.0 µm) separator. Anode: PdAg/CNT (20 wt %), 1.0 $mg_{pdag}$ $cm^{-2}$; cathode: 4020 Acta, 3.0 mg $cm^{-2}$, Anode fuel: 6.0 M KOH+1.0 M glycerol, 4.0 mL $min^{-1}$; cathode fuel: 200 sccm $O_2$, ambient pressure.
Figure 15:
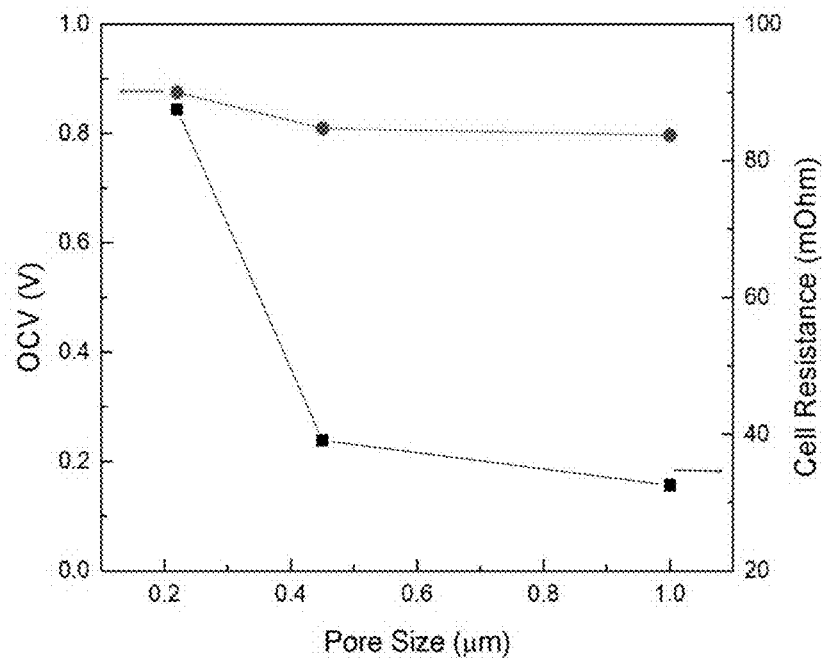
FIG. 15 is a graph showing the effect of different pore sizes of PTFE thin films on open circuit voltage and internal resistance.

FIG. 14 displays the polarization and power density curves of ion exchange membrane-free DAFC using PdAg/CNT as the anode catalyst at 80° C. The experiments were performed using three different pore sizes of PTFE thin films with an aqueous solution of 6.0 M KOH+1.0 M glycerol. The open circuit voltage (OCV) of the ion exchange membrane-free DAFC with pore size 0.22 µm PTFE thin film was 0.87 V, which is 0.06 V higher than that with 0.45 µm pore size PTFE thin film, and 0.08 V higher than that with 1.0 µm pore size PTFE thin film. The internal resistance (IR) of the ion exchange membrane-free DAFC with 0.22 µm pore size PTFE thin film separator was 87.5 mOhm, which was 55.3% higher than that with 0.45 µm pore size, and 62.9% higher than that with 1.0 µm pore size PTFE thin film (FIG. 15). The peak power density (PPD) of the ion exchange membrane-free DAFC with pore size 1.0 µm PTFE thin film was 129.9 mW cm$^{-2}$, which was 15.1% higher than that with pore size 0.45 µm PTFE thin film, and 46.9% higher than that with pore size 0.22 µm PTFE thin film. The thickness of PTFE thin film was measured with a micrometer. The range of thickness was broadly distributed between 180 to 210 µm. In theory, a thinner membrane reduces the transport time of a charge carrier. However, a thinner membrane may display higher fuel crossover that consequently leads to a loss in fuel cell performance (Sung et al., "A Membraneless Microscale Fuel Cell Using Non-Noble Catalysts in Alkaline Solution," *Journal of Power Sources* 172(1):198-208 (2007), which is hereby incorporated by reference in its entirety). An appropriate thickness of PTFE thin film can alleviate water flooding and reducing water crossover. Therefore, the thickness of the membrane can be adjusted to maximize the cell performance. The performance improvement in the present study can be attributed to the effect of pore size of the thin film separator. In summary, the large pore size of PTFE thin film distribution facilitates the OFF anion transport process to maximize the fuel cell performance.

Temperature Effect

Figure 16:
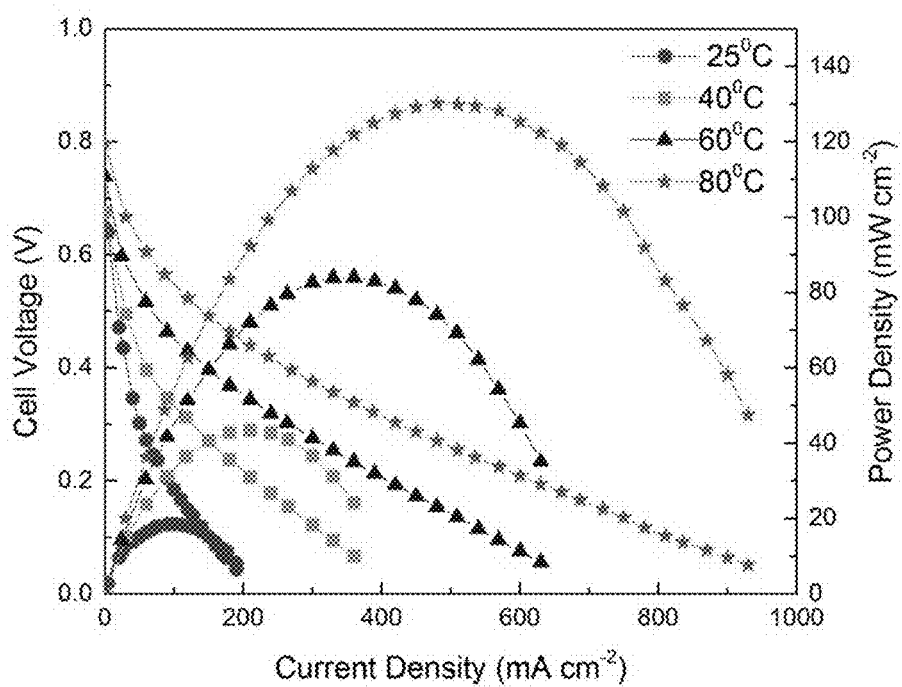
FIG. 16 is a graph showing polarization and power density curves of ion exchange membrane-free DAFC at different temperatures. Anode: PdAg/CNT (20 wt %), 1.0 $mg_{pdag}$ $cm^{-2}$; cathode: 4020 Acta, 3.0 mg $cm^{-2}$, PTFE thin film (pore size 1.0 µm). Anode fuel: 6.0M KOH+1.0 M glycerol, 4.0 mL $min^{-1}$; cathode fuel: 200 sccm $O_2$, ambient pressure.
Figure 17:
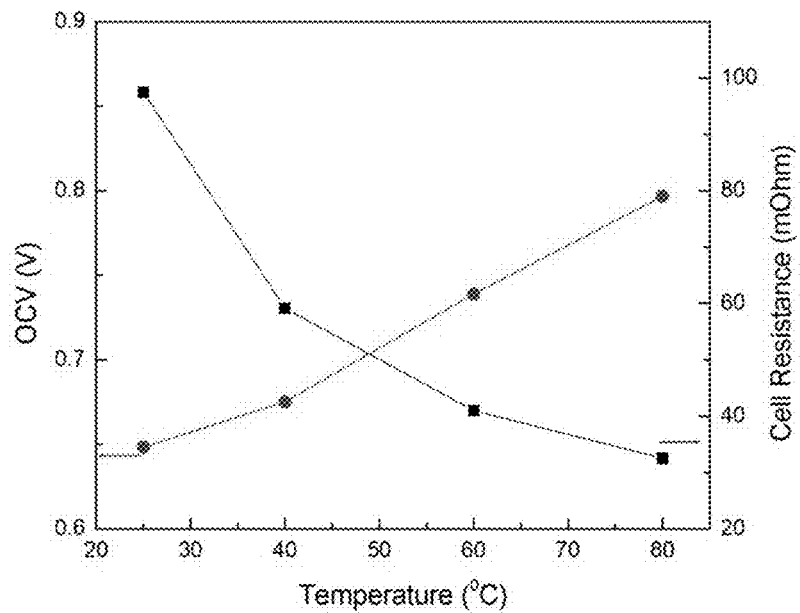
FIG. 17 is a graph showing the temperature effect of 1.0 µm pore size PTFE thin film on open circuit voltage and internal resistance.

FIG. 16 shows the cell polarization and power density curves of ion exchange membrane-free DAFC with 1.0 µm pore size PTFE thin film operated under different temperatures. It was observed that the cell performance increased with the operating temperatures. An increase in the temperature enhanced the electrochemical kinetics of both the glycerol oxidation reactions at the anode and the oxygen reduction reaction (ORR) at the cathode. The OCVs of the ion exchange membrane-free DAFC operating at 25, 40, 60, and 80° C. were 0.65 V, 0.68 V, 0.74V, and 0.79V, respectively, while the PPDs were 18.4, 42.8, 83.9, and 129.9 mW cm$^{-2}$, respectively. The conductivity of the hydroxyl ions increased with increasing temperature, which reduced the ohmic loss as shown by the cell resistance in FIG. 17. It has been demonstrated that the cell resistance was decreased as the temperature was increased. As a result, the cell performance was improved. The higher temperature improved the glycerol oxidation kinetics, thus leading to a higher fuel cell output power density. Furthermore, both glycerol and oxygen transport diffusivities were increased with an increase in temperature, resulting in low mass transport polarization. PTFE thin films are proven to have excellent endurance in alkaline media and are chemically and thermally stable. Therefore, the cell performance increased as the temperature was increased, which can be attributed to the faster electrochemical kinetics, increased conductivity of hydroxyl ions, and of reactant and products.

Comparison of A901 Anion Exchange Membrane and Porous PTFE Thin Film Separator

Figure 18:
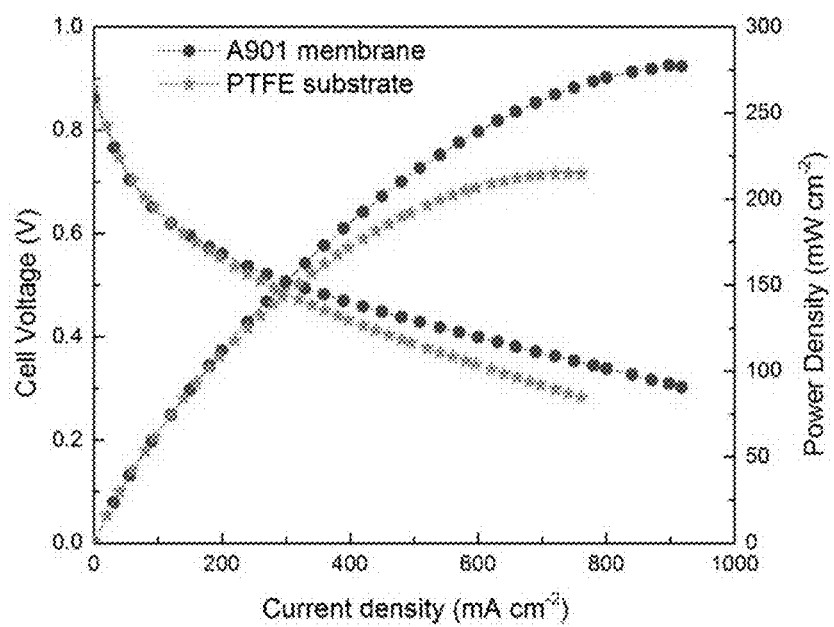
FIG. 18 is a graph showing polarization and power density curves of ion exchange membrane-free DAFC at a temperature of 80° C. Anode: PdAg/CNT (20 wt %), 1.0 $mg_{pdag}$ $cm^{-2}$; cathode: 4020 Acta, 3.0 mg $cm^{-2}$, A901 membrane and PTFE thin film (pore size 0.45 µm). Anode fuel: 6.0 M KOH+3.0 M glycerol (99.8 wt %); 4.0 mL $min^{-1}$; cathode fuel: 200 sccm $O_2$, ambient pressure.

The performances of ion exchange membrane-free DAFC employing the PTFE thin film (pore size: 0.45 µm, thickness 210 µm) and A901 membrane (no pore, thickness: 10 µm) with optimized conditions were tested. FIG. 18 illustrates polarization and power density curves of ion exchange membrane-free DAFC with PdAg/CNT anode catalyst. Various concentrations of KOH and anode fuel have been previously investigated (Qi et al., "Surface Dealloyed PtCo Nanoparticles Supported on Carbon Nanotube: Facile Synthesis and Promising Application for Anion Exchange Membrane Direct Crude Glycerol Fuel Cell," *Green Chemistry* 15(5):1133-1137 (2013); Zhang et al., "Supported Pt, Pd and Au Nanoparticle Anode Catalysts for Anion-Exchange Membrane Fuel Cells with Glycerol and Crude Glycerol Fuels," *Applied Catalysis B: Environmental* 136/137:29-39 (2013), which are hereby incorporated by reference in their entirety). It was found that 6.0 M KOH and 3.0 M fuel concentration produced the highest peak power density (Qi et al., "Surface Dealloyed PtCo Nanoparticles Supported on Carbon Nanotube: Facile Synthesis and Promising Application for Anion Exchange Membrane Direct Crude Glycerol Fuel Cell," *Green Chemistry* 15(5):1133-1137 (2013), which is hereby incorporated by reference in its entirety). Therefore, 6.0 M KOH and 3.0 M glycerol were selected as the optimal electrolytes for subsequent experiment. It was observed that the OCV of porous PTFE thin film is 0.88 V, which is 0.02 V higher than with A901 membrane due to the mass-transport limitation. Previous pore size effect tests have demonstrated that the pore size distribution of the thin film is an important parameter for mass-transport process within the electrode. The internal resistance of A901 in ion exchange membrane-free DAFC was 11.5 mOhm, which is twice as low as that with porous PTFE thin film. It was observed that as the internal resistance was decreasing, the cell performance improved. The PPD of A901 membrane was 277.7 mW cm$^{-2}$, which was 22.6% higher than the PPD of the porous PTFE thin film (0.45 µm). It is important to understand ohmic losses due to both electronic contact resistance between the flow-fields and the diffusion media as well as the ohmic resistance due to proton conducting through the membrane or porous separator (Gasteiger et al., "Activity Benchmarks and Requirements for Pt, Pt-Alloy, and non-Pt Oxygen Reduction Catalysts for PEMFCs," *Applied Catalysis B: Environmental* 56(1-2):9-35 (2005), which is hereby incorporated by reference in its entirety). The ohmically corrected cell voltage, $E_{iR-free}$, can be determined directly from the experimental data. Therefore IR-free corrected curves were plotted using Equation (8).

$$E_{iR-free} = E_{cell} + \Delta E_{ohmic} = E_{cell} + iR_\Omega \quad (8)$$

$\Delta E_{ohmic}$ (the ohmic voltage loss) can be measured directly via either current-interrupt resistance measurements. The factors that contributed to the ohmic losses are the membrane's ionic conductivity, membrane thickness (10 µm vs. 200 µm), electrolyte conductivity, and catalyst resistance layer.

Figure 19A:
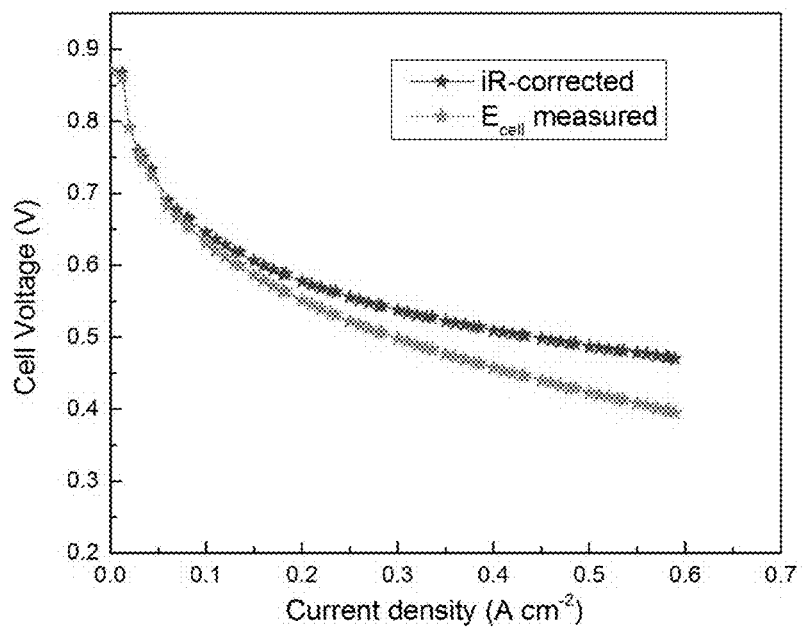
FIGS. 19A-B are graphs showing polarization and power density curves of ion exchange membrane-free DAFC with iR-corrected voltage for an A901 membrane and PTFE thin film (pore size 0.45 µm). Anode: PdAg/CNT (20 wt %), 1.0 $mg_{pdag}$ $cm^{-2}$; cathode: 4020 Acta, 3.0 mg $cm^{-2}$, 80° C.
Figure 19B:
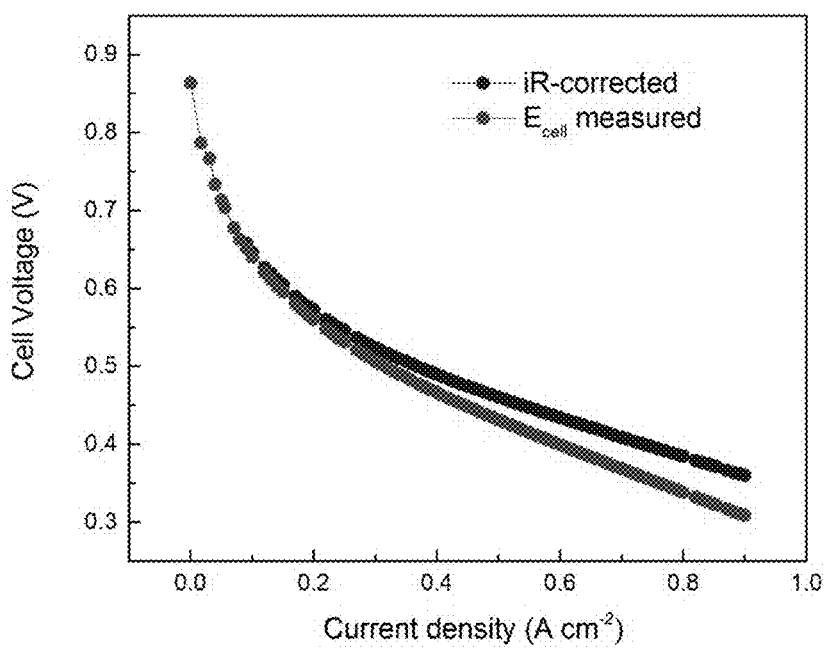

FIGS. 19A-B display the polarization and power density curves of the iR-corrected voltage and calculated PPD. The OCV of the ion exchange membrane-free DAFC with porous PTFE thin film is 0.87 V, which is 0.01 V higher than A901. In the low current density region (<580 mA cm$^{-2}$), it was noticeable that the power density of the ion exchange membrane-free DAFC with PTFE thin film is 274 mWcm$^{-2}$, which is 7.14% higher than that of A901 membrane. It indicated that the cell performance can be improved significantly by reducing the ohmic loss, which guides the future design of PTFE thin film separators to be small in resistance. The porous PTFE thin films have the ability to provide a conductive path for OH$^-$ ion migration and to prevent the crossover of the liquid fuel and the oxidants. The cost of porous PTFE thin films used in this work was ~$8.06 m$^{-2}$. Commercially available anion-exchange membranes (A901) cost ~$992.1 m$^{-2}$. Suppose that 6×7 cm is needed per MEA, PTFE thin film would cost ~$0.035 per MEA, which is much less than anion-exchange membrane A901 which is ~$4.3 per MEA. An estimate based on the price of PTFE thin films and anion-exchange membranes (A901) shows that PTFE thin films cost substantial less than the A901 membranes. Further, modifying and developing the porous PTFE thin films can provide the feasibility for large-scale ion exchange membranes.

Fuel Cell Performance Degradation

FIG. 20 shows the 80 hour durability test of ion exchange membrane-free DAFC at a constant density of 50 mA cm$^{-2}$. The durability test was used to evaluate the endurance of the PTFE thin film. It was observed that cell voltage decreased with the discharge time, i.e., 6.05% drop in the cell voltage over in the period of 80 hours. The cell voltage decreased with time but was partially recovered after every interruption (20, 40, 60, and 80 hours) for the stop/restart procedure. The cell voltage turned back nearly to the last voltage peak due to the stop/restart procedure, but still exhibited a slight performance loss that could not be recovered. The degradation of the fuel cell can be either the reversible or irreversible degradation (Cha et al., "Investigation on the Durability of Direct Methanol Fuel Cells," *Journal of Power Sources* 192(2):451-456 (2009), which is hereby incorporated by reference in its entirety). The voltage that could be recovered by the stop/restart procedure was defined to be reversible degradation, while the voltage that could not be recovered by the stop/restart procedure was defined to be irreversible degradation (Kundu et al., "Reversible and Irreversible Degradation in Fuel Cells During Open Circuit Voltage Durability Testing," *Journal of Power Sources* 182(1):254-258 (2008), which is hereby incorporated by reference in its entirety). The irreversible degradation rate decreased from 1201.1 µV h$^{-1}$ to 782.5 µV h$^{-1}$ over the 80 hour period. The irreversible degradation loss might be triggered by a change of the microstructure of the catalyst such as agglomeration, dissolution of catalysts, inactivity of active sites due to fuel crossover, and long-term operation. As a result of the slow rinse of the thin film by the electrolyte, the internal resistance decreased from 26.2 mOhm to 21.1 mOhm over in the 80 hour period. The cell voltage after IR correct has slightly increased in ion-exchange membrane-free DAFCs, as shown in FIG. 21. The conductivity of the hydroxyl ions increased as the discharge time increased, which reduced the ohmic loss. In addition, KOH in the fuel solution enhanced the ionic conductivity of the membrane, making the porous PTFE thin film have the features of alkali-doped polymer membrane (Zhao et al., "Anion-Exchange Membrane Direct Ethanol Fuel Cells: Status and perspective," *Frontiers of Energy and Power Engineering in China* 4(4):443-458 (2010), which is hereby incorporated by reference in its entirety). In addition, a decrease in the internal resistance might indicate that the reactants were not diffused uniformly in the porous PTFE thin films. The decrease in internal resistance was also attributed to the additional hydroxyl ions in the fuel solution that enhances the ionic conductivity and mass transfer of the membrane.

Electrode Degradation on Anode

FIGS. 22A-B show TEM images of PdAg particles supported on CNT before and after the durability test. The bimetallic PdAg nanoparticles were well dispersed on CNT with uniform particle size distribution. The average particle size measured is 2.9 nm. The TEM results identified that the average particle size of the anode catalyst increased from 2.9 nm to 3.7 nm after the durability test, which reduced the electrochemically active surface area and hence caused a decrease in the anode performance. A small amount of the agglomerations of the PdAg particles appeared on the CNT support, while PdAg particles have also grown, thus broadening the average particle size to 3.7 nm. The growth caused by the random cluster-cluster collisions accompanied by liquid-like coalescence of the particles contributed to the agglomeration and growth of the catalyst particles (Wu et al., "A Review of PEM Fuel cell Durability: Degradation Mechanisms and Mitigation Strategies," *Journal of Power Sources* 184(1):104-119 (2008), which is hereby incorporated by reference in its entirety). XRD patterns for PdAg/CNT catalyst before and after the durability test are shown in FIG. 23. The peak of 25° C., which is the wide graphite (002) peak, suggested that CNT support has a good graphite characteristic. It was observed that there is no further peak shift (111, 200, 220, and 311) of PdAg/CNT before compared with PdAg/CNT after the durability test. Therefore, it could be logically concluded that PdAg/CNT remains alloyed and crystalline after the durability of 80 hours. In summary, the decrease in the cell voltage after a long-term discharge is mainly attributed to the loss of the anode performance.

Conclusions

In this example, ion exchange membrane-free DAFC was developed using a porous polytetrafluoroethylene (PTFE) thin film as a separator. Ion exchange membrane-free DAFC using PTFE thin film achieved a maximum peak power density of 214.7 mW cm$^{-2}$ at 80° C. The pore size effect of the thin film layer showed that the larger pore size of PTFE thin film distribution assists the mass transport process to maximize the fuel cell performance. DAFC employed with PTFE thin film and A901 membrane were investigated for comparison. Further, the cell performance was improved and enhanced significantly after correcting the ohmic loss. The durability of porous PTFE thin film in DAFC was tested. The 80 hour durability test indicated that the major voltage loss occurs in the initial discharge stage, but the loss becomes smaller and more stable with the discharge time. The voltage loss was mainly caused by the performance reduction at the anode due to the agglomeration and the growth of the catalyst particles from 2.7 to 3.9 nm. A 6.05% decrease in the cell voltage over an 80 hour durability test was found. It was also found that the internal resistance of the ion exchange membrane-free DAFC was decreasing with the discharge time. The ion-exchange membrane-free approach developed in this work breaks the paradigm and demonstrates PTFE thin films capable of operating with lower ionic resistance than benchmark state-of-the-art anion exchange membranes.

Example 4: Membrane-Free and Metal-Free Cathode Direct Biomass Fuel Cell

The use of a selective ion-exchange membrane, catalyst, and fuel in the fuel cell systems raises concerns about the overall cost. One embodiment of the present invention relates to a membrane-free, metal-free cathode direct fed fuel cell with crude glycerol and bio-oil. This fuel cell is using a porous PTFE substrate, N—S-CMK 3 cathode, and crude fuels. Further, optimization and search for new materials with low cost and developing cheap materials will lead to new development and possibly practical deployment of direct alcohol fuel cells. This work opens opportunities for developing inexpensive fuel cells.

Membrane-free, metal catalyst-free, and direct crude biomass fuel cells achieved a peak power density of 76.0 mWcm$^{-2}$ with 3.0 M 99.9% glycerol and 63.7 mW cm$^{-2}$ with 30 wt % crude glycerol (Table 6, FIG. 24).

TABLE 6

Comparison between High Purity Glycerol (99.9%) with Crude Glycerol

| | Peak Power Density (PPD) mW cm$^{-2}$ |
|---|---|
| 3.0M 99.9% glycerol | 76.0 |
| 30 wt % Crude (88.5%) glycerol | 63.7 |

Membrane-free, metal catalyst-free, and direct crude biomass fuels (30 wt % crude (88.5%) glycerol and 30 wt % bio-oil) fuel cells achieved a peak power density of 63.7 mW cm$^{-2}$ and 18.1 mW cm$^{-2}$, respectively (Table 7, FIG. 25).

TABLE 7

Comparison between Crude Glycerol and Bio-oil

| | Peak Power Density (PPD) mW cm$^{-2}$ |
|---|---|
| 30 wt % bio-oil | 18.1 |
| 30 wt % crude(88.5%) glycerol | 63.7 |

Example 5: PdAg/CNT Catalyzed Alcohol Oxidation Reaction for High-Performance Anion Exchange Membrane Direct Alcohol Fuel Cell The short multi-walled CNT (10-20 nm outer diameter, 0.5-2 μm length) was purchased from Cheaptubes Inc. H$_2$PtCl$_6$~xH$_2$O (~38% Pt basis), Pd(NO$_3$)$_2$.2H$_2$O (~40% Pd basis), AuCl$_3$ (99%), AgNO$_3$ (99%), potassium sulfate (99%), polytetrafluoroethylene water solution (60%), potassium hydroxide (85%), 1-propanol (99.5%), methanol (99.8%), ethanol (99.5%), ethylene glycol (99.8%), and glycerol (99.5%) were purchased from Sigma-Aldrich Co. The catalyst 4020 was ordered from Acta, Inc. Sodium borohydride (99%) and sodium citrate dihydrate (99%) were manufactured by Acros Organics. All the chemicals were used as received without further purification.

Preparation and Physical Characterization of Different Catalysts with X-Ray Diffraction (XRD) and Transmission Electron Microscopy (TEM)

All the monometallic and bimetallic catalysts, including Pt/CNT, Pd/CNT, Au/CNT, Ag/CNT, PdAg/CNT, and PdAg$_3$/CNT (20% metal loading) were prepared using an aqueous-phase reduction method. In a typical preparation process of Pt/CNT for example, the catalyst precursor was first dissolved in citric acid water solution. Then the reducing agent solution was prepared by ultrasonically dissolving sodium borohydride into a citric acid water solution. The precursor solution was quickly poured into the reducing agent solution under vigorous stirring, leading to a hydrosol solution of nanoparticles. Both catalyst precursor and sodium borohydride reducing agent were stabilized by citric acid so that the reducing process was controlled at an appropriate rate which ensures that the size of the nanoparticles is small enough for a large surface area. If the citric acid were not added, the sodium borohydride would decompose to hydrogen so the catalyst precursor would not be fully reduced. Short CNTs functionalized by carboxylate acid groups were sonicated in water for 15 min with shaking. The CNTs water mixture was added into the hydrosol solution immediately after the reduction of the precursor, followed by 12 hours of dropwise addition of potassium sulfate solution into the mixture to facilitate the deposition of nanoparticles. The carboxylic acid groups make CNTs more hydrophilic leading to improved dispersion in water. Therefore, the as-prepared nanoparticles hydrosol will make a better contact with the CNT supports during deposition. After being filtrated and dried overnight in a vacuum oven at room temperature, Pt/CNT catalyst with a loading of 20 wt % was obtained.

The structure and morphology of all the catalysts were characterized by X-ray diffraction (XRD), and transmission electron microscopy (TEM). A Scintag XDS-2000 θ/θ diffractometer employed to collect the XRD patterns produces Cu Kα radiation (λ=1.5406 Å) operated under a 35 mA filament current and a 45 kV tube voltage with a continuous scan rate of 1.2 degree per minute. Due to its relative isolation, the (220) peak was selected for calculating the mean crystallite sizes of all the catalysts based on the Debye-Scherrer formula:

$$L = \frac{0.9\lambda_{K\alpha}}{B_{2\theta}\cos\theta_{max}} \quad (9)$$

where L is the mean crystallite size, λ is the wavelength of the x-ray (1.5406 Å), B is the full width at half-maximum of the peak (rad) and θmax is the Bragg angle (rad) of the (220) peak. The transmission electron microscopy (TEM) images were collected on JEOL JEM-4000FX with an accelerating voltage of 200 kV.

Electrocatalytic Activities of Different Catalysts with Respect to Alcohol and Aldehyde Oxidation in a Three Electrode Half-Cell System A three-electrode, water-jacket-integrated glass cell (AF-CELL3, Pine Instrument) including a glassy carbon working electrode (AFE3T050GC, Pine Instrument), a Hg/HgO reference electrode (MMO, CHI152, CH Instruments), and a platinum wire counter electrode (AFCTR1, Pine Instrument) was employed to perform cyclic voltammetry (CV) tests. After being shaken in an ultrasonic ice-water bath for 2 min, 2.5 mg catalyst in 4.0 mL 1-propanol and 1.0 mL DI water formed a uniform black colored catalyst ink with a concentration of 0.5 mg mL$^{-1}$. The DI water improved dispersion of CNT supports with hydrophilic carboxylic acid groups. The catalyst ink was added dropwise onto the surface of the glassy carbon electrode (GCE) with a glass syringe. For monometallic catalyst, the weight of metal on the GCE was 1 μg. For the PdAg bimetallic catalyst, the weight of Pd on the GCE was 1 μg since silver is relatively cheap and inactive with respect to alcohol oxidation within the fuel cell anode potential. 1.0 M potassium hydroxide (KOH) and 0.1 M aldehyde or alcohol was used as the electrolyte for the CV tests. With a scan rate of 50 mV s$^{-1}$, the CV tests were conducted at room temperature in a nitrogen atmosphere.

Typical core criteria for catalysts evaluation includes activity, selectivity, durability, and reaction conditions, among which turnover frequency (TOF) is the most important parameter reflecting a catalyst's intrinsic activity. $TOF_{e^-}$ is defined with respect to transferred electrons as instead of converted substrates as follows:

$$TOF_{e^-} = \frac{I}{F \times ECSA \times m \times SAD} \quad (10)$$

where I is the current in the external circuit;
F is the Faraday constant;
ECSA is the electrochemically active surface area;
m is the mass of metal catalyst on the electrode; and
SAD is the surface atomic density of difference facets (Table 8).

$$ECSA = \frac{Q_{ox}}{m \times q_{coulombic}} \quad (11)$$

where $Q_{ox}$ is the integrated charge of the metal oxide reduction peak,
m is the mass of the metal catalyst deposited onto the electrode, and
q is the coulombic charge of different reduction peaks corresponding to the scan range.

The ECSA of Pt/CNT (Wiberg et al., "Establishing the Potential Dependent Equilibrium Oxide Coverage on Platinum in Alkaline Solution and Its Influence on the Oxygen Reduction," *Journal of Power Sources* 217:262-267 (2012), which is hereby incorporated by reference in its entirety), Pd/CNT (Chierchie et al., "Structural Changes of Surface Oxide Layers on Palladium," *J. Electroanal. Chem.* 135: 211-220 (1982), which is hereby incorporated by reference in its entirety), Au/CNT (Tremiliosi-Filho et al., "Limit to Extent of Formation of the Quasi-Two-Dimensional Oxide State on Au Electrodes," *Journal of Electroanalytical Chemistry* 422:149-159 (1997), which is hereby incorporated by reference in its entirety), and Ag/CNT (Alia et al., "Supportless Silver Nanowires as Oxygen Reduction Reaction Catalysts for Hydroxide-exchange Membrane Fuel Cells," *ChemSusChem* 5:1619-1624 (2012), which is hereby incorporated by reference in its entirety) was calculated corresponding to coulombic charge of 0.420 mC cm$^{-2}$, 0.385 mC cm$^{-2}$, 0.245 mC cm$^{-2}$ and 0.400 mC cm$^{-2}$, respectively (FIG. 44). To evaluate the specific activity, the ECSA of Pd in the Pd-based bimetallic catalyst was calculated by intergrating the reduction peak of palldium oxidation.

TABLE 8

Particle Size, Electrochemically Active Surface Area (ECSA) and Surface Atomic Density of Pt/CNT, Pd/CNT, Au/CNT, and Ag/CNT

| Catalyst | Particle size (nm) | | ECSA ($m^2 g^{-1}$) | Surface atomic density (nmol cm$^{-2}$) | | |
|---|---|---|---|---|---|---|
| | XRD | TEM | | (111) | (100) | (110) |
| Pt/CNT | 1.3 | 1.8 | 72.7 | 2.496 | 2.161 | 1.528 |
| Pd/CNT | 2.0 | 2.5 | 114.1 | 2.534 | 2.195 | 1.552 |
| Au/CNT | 3.8 | 4.1 | 49.0 | 2.325 | 2.014 | 1.424 |
| Ag/CNT | 13.9 | 17.7 | 19.2 | 2.292 | 1.985 | 1.404 |

Direct Alcohol Fuel Cells with Pd-Based Anode Catalysts

The fuel cell test stand (850e Scribner-Associates) was operated in scan current mode to collect polarization curves within a 0 to 5 Å current range. The experiments were performed under ambient pressure and at various temperatures without setting any vertex current. The fuel cell temperature was controlled by a feedback loop composed of electric heating rods and a thermocouple-based thermometer in the stainless steel end plates. The anode catalyst ink (10 mg$_{catalyst}$ cm$^{-3}$ concentration) was prepared by mixing catalyst and polytetrafluoroethylene (PTFE) (95:5 mass ratio) in iso-propanol solvent by ultra-sonication in an ice-water bath for 10 min with shaking. The cathode catalyst ink containing 30 wt % of ionomer (AS4 Tokuyama) as binder and anion conductor was prepared similarly to the anode catalyst ink using 1-propanol as solvent. The Pd loading on the anode catalyst-coated carbon cloth was controlled to be 0.5 mg cm$^{-2}$ by alternately weighing and spraying the anode catalyst ink onto the carbon cloth substrate. The cathode catalyst-coated anion exchange membrane was fabricated by airbrushing 3 mg cm$^{-2}$ of the cathode catalyst (4020 Acta) onto an anion exchange membrane (A901 Tokuyama). The 5 cm$^2$ membrane electrode assembly (MEA) was prepared by combining standalone anode (catalysts coated carbon cloth) and an integrated cathode with an anion exchange membrane (catalysts coated anion exchange membrane with carbon paper as backing layer). The MEA was placed between two serpentine graphite flow field plates that were further pressed from both sides by two gilded plate current collectors. The default testing conditions (Qi et al., "Surface Dealloyed PtCo Nanoparticles Supported on Carbon Nanotube: Facile Synthesis and Promising Application for Anion Exchange Membrane Direct Crude Glycerol Fuel Cell," *Green Chem.* 15:1133-1137(2013), which is hereby incorporated by reference in its entirety) were anode fuel: 6.0 M KOH, 3.0 M alcohol, 4.0 ml min$^{-1}$; cathode fuel: 200 ml min$^{-1}$ O$_2$, ambient pressure; temperature (anode fuel/cathode fuel/cell): 25/80/80° C. or 25/60/60° C.

Product Analysis of GOR in AEM-DGFC with PdAg/CNT Anode Catalyst

Solution containing 23.5 ml of 1.0 M glycerol+6.0 M KOH was cycled between a plastic vessel and the anode chamber via a closed loop by a peristaltic pump (1.0 min$^{-1}$ flow rate), while the high-purity O$_2$ (>99.999%) was fed into the cathode compartment at a flow rate of 100 sccm min$^{-1}$ under ambient pressure. The electrocatalytic GOR was conducted by controlling the fuel cell voltage of 0.2 V. Samples were analyzed by an HPLC using an Alltech, OA-1000 column equipped with a refractive index detector (RID, Agilent G1362A) and a variable wavelength detector (VWD, 220 nm, Agilent G1314A). 5 mM of aqueous sulfuric acid eluent at a flow rate of 0.3 ml min$^{-1}$ was applied to the product separation. 20 µl of the diluted sample (10 times) was injected into the HPLC system. Products were identified and quantified by comparison with authentic samples. The product selectivity, glycerol conversion, and fuel efficiency were calculated by the following equations:

$$S = \frac{\text{moles of } C_2 \text{ or } C_3 \text{ product}}{\text{total moles of } C_2 \text{ and } C_3 \text{ products}} \times 100\% \quad (12)$$

$$X_g = \left(1 - \frac{\text{residual moles of glycerol after reaction}}{\text{total moles of gylcerol}}\right) \times 100\% \quad (13)$$

-continued $$\varepsilon_f = \varepsilon_e \times X_g \quad (14)$$

$$= \frac{n_{actual}}{n_{completely\,oxidized}} \times X_g$$

$$= \frac{Q}{n_{completely\,oxidized} m F} \times X_g$$

$$= \frac{\int_{t_1}^{t_2} I dt}{n_{completely\,oxidized} m F} \times X_g$$

where S is the selectivity of one $C_2$ or $C_3$ product;
$X_g$ is the conversion of glycerol;
$\varepsilon_f$ is the fuel efficiency;
$\varepsilon_e$ is the electron efficiency;
$n_{actual}$ is the average number of electrons transferred from a single glycerol molecule in the electrochemical GOR;
$n_{completely\,oxidized}$ (=14) is number of the electrons extracted from single glycerol molecule when it is completely oxidized;
Q is the actual charge integrated from the I-t curve (FIGS. 45A-B);
m is the molar amount of glycerol consumed in the electrocatalytic GOR;
$t_1$ and $t_2$ are the reaction time bounds for integration;
I is instantaneous cell current; and
F is Faraday's constant.

Supplementary Calculations for Explanations of Ag's High Activity with Respect to Aldehyde Oxidation All the orbital energy calculations were performed with the Gaussian 09 program package (Frisch et al., Gaussian 09, Gaussian, Inc., Wallingford, Conn., USA (2009)). Orbital energy levels and the isosurfaces of the frontier orbitals of aldehydes containing C, H, and O atoms (FIGS. 67A-E) were computed at Modified Neglect of Diatomic Overlap (MNDO) (Dewar et al., "The MNDO Method. Approximations and Parameters," *J. Am. Chem. Soc.* 99:4899-4907 (1977), which is hereby incorporated by reference in its entirety) level of theory to properly fit the experimental data of ionization energy and electron affinity. Different methods (Austin Model 1 (AM1) method (Dewar et al., "AM1: A New General Purpose Quantum Mechanical Molecular Model," *J. Am. Chem. Soc.* 107:3902-3909 (1985), which is hereby incorporated by reference in its entirety) and Parameterized Model number 3 (PM3) method (Stewart, "Optimization of Parameters for Semiempirical Methods I. Method," *Journal of Computational Chemistry* 10:209-220 (1989), which is hereby incorporated by reference in its entirety)) were used to calculate the chemical hardness to check reproducibility and accuracy by comparing the calculations with experimental results (Table 9).

Results and Discussion

FIGS. 45A-F show the TEM images of carbon nanotubes (CNT) supporting Pt, Au, Pd, and Ag nanoparticle catalysts. The average particle sizes of Pt/CNT, Au/CNT, Pd/CNT, Ag/CNT, PdAg/CNT, and PdAg$_3$/CNT measured by randomly counting 100 particles are 1.8 nm, 4.1 nm, 2.5 nm, 17.7 nm, 2.7 nm, and 2.8 nm, respectively. The particle sizes of supported Pd nanoparticles prepared by electroless procedures usually range from 3 nm to 25 nm (Bianchini et al., "Palladium-based Electrocatalysts for Alcohol Oxidation in Half Cells and in Direct Alcohol Fuel Cells," *Chem. Rev.* 109:4183-4206 (2009), which is hereby incorporated by reference in its entirety). The aqueous phase reduction method prepared Pd/CNT, PdAg/CNT, and PdAg$_3$/CNT have well-distributed Pd-based nanoparticles with an average measured particle size less than 3 nm.

The XRD patterns of Pt/CNT, Au/CNT, Pd/CNT, Ag/CNT, PdAg/CNT, and PdAg$_3$/CNT are depicted in FIG. 47, with peak positions of (1 0 0), (2 0 0), (2 2 0), and (3 1 1) facets marked. The face-centered cubic (FCC) structured Pt/CNT, Au/CNT, Pd/CNT, Ag/CNT, PdAg/CNT, and PdAg$_3$/CNT have mean crystallite size of 1.3 nm, 4.1 nm, 2.0 nm, 13.9 nm, 2.3 nm and 2.4 nm, calculated using the full width half maximum (FWHM) method at the Gaussian-fitted (220) peaks using Scherrer's equation. Earlier researchers successfully prepared Pd/C (Liu et al., "Physical and Electrochemical Characterizations of Nanostructured Pd/C and PdNi/C Catalysts for Methanol Oxidation," *Electrochemistry Communications* 11:925-928 (2009), which is hereby incorporated by reference in its entirety), Pd—S—HCNF (Hu et al., "Palladium Nanocrystals Supported on Helical Carbon Nanofibers for Highly Efficient Electrooxidation of Formic Acid, Methanol and Ethanol in Alkaline Electrolytes," *Journal of Power Sources* 209:236-242 (2012), which is hereby incorporated by reference in its entirety), Pd/CNT (Zhu et al., "High Activity of Carbon Nanotubes Supported Binary and Ternary Pd-based Catalysts for Methanol, Ethanol and Formic Acid Electro-Oxidation," *Journal of Power Sources* 242:610-620 (2013), which is hereby incorporated by reference in its entirety), Pd@WC-Mo2C/C (binary-carbide and carbon aerogel composites) (Zhang and Shen, "Glycerol Electrooxidation on Highly Active Pd Supported Carbide/C Aerogel Composites Catalysts," *International Journal of Hydrogen Energy* 38:2257-2262 (2013), which is hereby incorporated by reference in its entirety), PdSb$_{0.15}$/C (Cai et al., "Facile Synthesis of PdSb$_x$/C Nanocatalyst With High Performance for Ethanol Electro-oxidation in Alkaline Medium," *Int. J. of Hydrogen Energy* 39:18256-18263 (2014), which is hereby incorporated by reference in its entirety), PdNi/C (Shen et al., "Synthesis of PdNi Catalysts for the Oxidation of

TABLE 9

Comparison of Calculated Chemical Hardness From Different Methods With The Experimental Chemical Hardness Results

| Substrate | MNDO | | | AM1 | | | PM3 | | | |
|---|---|---|---|---|---|---|---|---|---|---|
| | HOMO energy (eV) | LUMO energy (eV) | $\eta^a$ (eV) | HOMO energy (eV) | LUMO energy (eV) | $\eta^a$ (eV) | HOMO energy (eV) | LUMO energy (eV) | $\eta^a$ (eV) | $\eta_e^b$ (eV) |
| Formaldehyde | −11.07 | 0.94 | 6.00 | −10.80 | 0.91 | 5.85 | −10.66 | 0.80 | 5.73 | 6.2 |
| Acetaldehyde | −10.88 | 0.86 | 5.87 | −10.70 | 0.97 | 5.84 | −10.71 | 0.83 | 5.77 | 5.7 |

$^a$ $\eta$ is the calculated chemical hardness of aldehyde molecules.
$^b$ $\eta_e$ is the experimental chemical hardness of aldehyde molecules.

Ethanol in Alkaline Direct Ethanol Fuel Cells," *Journal of Power Sources* 195:1001-1006 (2010), which is hereby incorporated by reference in its entirety), PdAg/C (Nguyen et al., "Enhancement Effect of Ag for Pd/C Towards the Ethanol Electro-Oxidation in Alkaline Media," *Applied Catalysis B: Environmental* 91:507-515 (2009), which is hereby incorporated by reference in its entirety), and PdAu/C (Lam et al., "Preparation of PdAg and PdAu Nanoparticle-loaded Carbon Black Catalysts and Their Electrocatalytic Activity for the Glycerol Oxidation Reaction in Alkaline Medium," *Journal of Power Sources* 297:149-157 (2015), which is hereby incorporated by reference in its entirety) for AOR with mean crystallite sizes of 4.0 nm, 5.1 nm, 10.5 nm, 6.1 nm, 3.8 nm, 3.1 nm, 3.7 nm and 3.7 nm, respectively. The mean crystallite sizes of Pd/CNT and PdAg/CNT are further reduced to 2.0 nm and 2.3 nm in the current work by the aqueous phase reduction method without using surfactants. The average mean crystallite size determined by XRD is consistent with but smaller than the average particle size measured by TEM images. This phenomenon was also observed for Pt-based (Qi et al, "Surface Dealloyed PtCo Nanoparticles Supported on Carbon Nanotube: Facile Synthesis and Promising Application for Anion Exchange Membrane Direct Crude Glycerol Fuel Cell," *Green Chem.* 15:1133-1137(2013); Yuan et al., "Significance of Wall Number on the Carbon Nanotube Support-promoted Electrocatalytic Activity of Pt NPs Toward Methanol/Formic Acid Oxidation Reactions in Direct Alcohol Fuel Cells," *J. Mater. Chem. A* 3:1961-1971 (2015), which are hereby incorporated by reference in their entirety), Pd-based (Lim et al., "Binary PdM Catalysts (M=Ru, Sn, or Ir) Over a Reduced Graphene Oxide Support for Electro-oxidation of Primary Alcohols (Methanol, Ethanol, 1-Propanol) Under Alkaline Conditions," *J. Mater. Chem. A* 3:5491-5500 (2015), which is hereby incorporated by reference in its entirety), and Au-based (Padayachee et al., "Influence of Particle Size on the Electrocatalytic Oxidation of Glycerol Over Carbon-supported Gold Nanoparticles," *Electrochimica Acta* 120:398-407 (2014), which is hereby incorporated by reference in its entirety) catalysts, which can be attributed to several possible reasons. First, particles smaller than 0.5 nm are hard to be recognized in TEM images but can be reflected by calculation based on XRD patterns. Second, XRD peak broadening is caused not only by crystallite size but also by factors such as dislocations, stacking faults, twinning, micro stresses, grain boundaries, subboundaries, coherency strain, and chemical heterogeneities (Singh, *Advanced X-ray Techniques in Research and Industry*, IOS Press (2005), which is hereby incorporated by reference in its entirety). Third, the mean crystallite size obtained from XRD patterns represents the single crystal size while the average particle size measured from TEM images includes the agglomeration effect of single crystal particles as a result of intermolecular forces (Nguyen et al., "Enhancement Effect of Ag for Pd/C Towards the Ethanol Electro-oxidation in Alkaline Media," *Applied Catalysis B: Environmental* 91:507-515 (2009), which is hereby incorporated by reference in its entirety). No obvious phase separation is observed for PdAg/CNT and PdAg$_3$/CNT since alloyed PdAg peaks are between Pd peaks and Ag peaks.

The mass activity and TOF of Pt/CNT, Pd/CNT, Au/CNT, and Ag/CNT with respect to electrocatalytic aldehyde oxidation obtained from cyclic voltammograms were compared (FIGS. 48A-F and Table 10). Formaldehyde, acetaldehyde, and glyoxylate were selected as aldehyde substrate because the aldehyde group is easier to be oxidized than the substituent connected to it. This ensures that the current generated can properly evaluate the catalysts' activity for ADOR in the potential range not high enough to oxidize the catalysts. Detailed discussion of substrate selection is summarized below. The mass activity and onset potential are two indicators of apparent activity in cyclic voltammetry, while the former is affected by the particle size of catalysts to a larger extent. The highest peak values of mass activity in the forward scan of cyclic voltammograms (FIGS. 48A-F) for formaldehyde oxidation, acetaldehyde oxidation, and glyoxylate oxidation on Pt/CNT (4.6 mA µg$^{-1}$ at 0.78 V), Au/CNT (0.8 mA µg$^{-1}$ at 1.06 V), and Pd/CNT (3.3 mA µg$^{-1}$ at 0.88 V) are positioned at least 400 mV more positive than their corresponding onset potentials (Pt/CNT: 0.33 V; Au/CNT:0.19 V; Pd/CNT: 0.44 V), and are out of the fuel cell anode potential range (from onset potential to <0.7 V vs. RHE). Taking into account the particle size and potential window mismatch factors, the onset potential rather than (peak) mass activity was employed as the major indicator of apparent activity. Accordingly, due to >100 mV more negative onset potential (Table 10), Ag/CNT and Au/CNT are more active than Pd/CNT or Pt/CNT towards aldehyde oxidation. When it comes to intrinsic activity, TOF has been defined as the molar ratio of converted original substrate and exposed active sites in unit time (Boudart et al., "On the Specific Activity of Platinum Catalysts," *Journal of Catalysis* 6:92-99 (1966); Kozuch et al., "'Turning Over' Definitions in Catalytic Cycles," *ACS Cat.* 2:2787-2794 (2012), which are hereby incorporated by reference in their entirety). To evaluate electrocatalysts' effectiveness towards series reactions or reaction networks including the original substrate and all the reaction intermediates, the TOF$_{e^-}$ was defined as the number of electrons extracted from the original reactant or reaction intermediates by each exposed active site in unit time.

TABLE 10

Apparent and Intrinsic Activities Comparison of Different Monometallic Catalysts

| Entry | Catalyst | Substrate name and molecular structure | Onset Potential (V vs RHE) | Mass Activity at 0.6 V vs RHE (mA µg$^{-1}_{metal}$) | Specific Activity at 0.6 V vs RHE (mA cm$^{-2}_{metal}$) | Turnover Frequency Range for Polyciystalline catalysts at 0.6 V vs RHE(s$^{-1}$)$^a$ | | |
|---|---|---|---|---|---|---|---|---|
| | | | | | | Minimum | Medium | Maximum |
| 1 | Pt/CNT | | 0.326 | 3.085 | 4.242 | 17.622 | 20.348 | 28.777 |
| 2 | Pd/CNT | Formaldehyde | 0.186 | 1.703 | 1.493 | 6.103 | 7.048 | 9.967 |
| 3 | Au/CNT | =O | 0.086 | 1.990 | 4.060 | 18.100 | 20.900 | 29.558 |
| 4 | Ag/CNT | | 0.026 | 1.640 | 8.543 | 44.619 | 44.593 | 63.064 |
| 5 | Pt/CNT | | 0.726 | 0.013 | 0.018 | 0.074 | 0.086 | 0.121 |

TABLE 10-continued

Apparent and Intrinsic Activities Comparison of Different Monometallic Catalysts

| Entry | Catalyst | Substrate name and molecular structure | Onset Potential (V vs RHE) | Mass Activity at 0.6 V vs RHE (mA µg$^{-1}_{metal}$) | Specific Activity at 0.6 V vs RHE (mA cm$^{-2}_{metal}$) | Turnover Frequency Range for Polyciystalline catalysts at 0.6 V vs RHE(s$^{-1}$)$^a$ | | |
|---|---|---|---|---|---|---|---|---|
| | | | | | | Minimum | Medium | Maximum |
| 6 | Pd/CNT | Acetaldehyde | 0.596 | 0.018 | 0.016 | 0.064 | 0.074 | 0.105 |
| 7 | Au/CNT | | 0.186 | 0.193 | 0.394 | 1.756 | 2.028 | 2.868 |
| 8 | Ag/CNT | | 0.376 | 0.124 | 0.647 | 2.926 | 3.379 | 4.778 |
| 9 | Pt/CNT | Glyoxylate | 0.426 | 0.216 | 0.297 | 1.236 | 1.427 | 2.018 |
| 10 | Pd/CNT | | 00.436 | 0.165 | 0.145 | 0.593 | 0.685 | 0.968 |
| 11 | Au/CNT | | 0.296 | 0.976 | 1.991 | 8.877 | 10.250 | 14.496 |
| 12 | Ag/CNT | | 00.226 | 0.682 | 3.551 | 16.052 | 18.535 | 26.212 |

$^a$To evaluate the range of TOF$_{e^-}$ for polycrystalline catalysts, it is assumed that the polycrystalline surface can be approximately treated as a linear combination of the major facets. For fcc structure, the minimum, medium and maximum TOF$_{e^-}$ can be calculated with surface atomic density of (111), (100), (110) surfaces, respectively.

The TOF$_{e^-}$ of polycrystalline FCC-structured Pt/CNT, Pd/CNT, Au/CNT, and Ag/CNT is within the range calculated based on (111), (100), and (110) as their major facets (FIGS. 48A-F and Table 10). At 0.6 V anode potential, the TOF$_{e^-}$ of Ag for ADOR is 1.7-2.2 times, 6.3-45.7 times and 2.2-39.5 times that of Au, Pd, and Pt, respectively. The activity sequence of different catalysts toward ADOR is Ag/CNT>Au/CNT>>Pd/CNT and Pt/CNT within the anode potential of fuel cell. Ag's high activity towards ADOR is explained below using the descriptor of orbital energy difference matching from the energy balance point of view in the charge transfer process from molecular level.

However, since the mean crystallite size of Ag (13.9 nm) measured by XRD is 10.7, 7.0, and 3.7 times that of Pt (1.3 nm), Pd (2.0 nm), and Au (3.8 nm) respectively, its electrochemically active surface area (Table 8) and mass activity are relatively low. Pd has high activity and stability toward alcohol oxidation (Bianchini et al., "Palladium-Based Electrocatalysts for Alcohol Oxidation in Half Cells and in Direct Alcohol Fuel Cells," Chemical Reviews 109:4183-4206 (2009), which is hereby incorporated by reference in its entirety), especially in the hydroxyl group deprotonation process, and its particle size is one order of magnitude smaller than Ag. So, to take advantage of the high TOF$_{e^-}$ of aldehyde oxidation on Ag in the ADOR process, the particle size of Ag is controlled by alloying with Pd so that the catalyst's surface is clean without being covered by capping agents.

Based on the cyclic voltammograms performed in 1 M KOH 0.1 M alcohol electrolyte (FIGS. 49A-D), the peak mass activity of PdAg/CNT for MOR (0.105 mA µg$_{Pd}^{-1}$), EOR (0.305 mA EGOR (2.105 mA µg$_{Pd}^{-1}$), and GOR (8.53 mA µg$_{Pd}^{-1}$) were higher than the mass activity of Pd/CNT and PdAg$_3$/CNT at the same applied potential. Moreover, the specific activity of PdAg/CNT for EGOR, EGOR, and GOR (FIGS. 50A-D) is higher than that of Pd/CNT within the fuel cell anode potential (<0.6 V vs. RHE). However, the specific activity of PdAg$_3$/CNT for alcohol oxidation reaction is lower than that of PdAg/CNT, indicating the further addition of Ag will lower down the specific activity of Pd. Alloying Pd and Ag reduces the particle size of Ag to less than 3 nm without use of surfactants (FIG. 44, Table 8), raising the catalyst's activity towards alcohol oxidation reaction network (FIGS. 48A-F and 49A-D) likely by exploiting spillover of aldehyde intermediates to Ag active sites with high TOF$_{e^-}$ toward aldehyde oxidation. In the electrocatalytic oxidation process of alcohol, some desorbed reaction products are hard to be re-adsorbed and get further oxidized (Qi et al., "Electrocatalytic Selective Oxidation of Glycerol to Tartronate on Au/C anode Catalysts in Anion Exchange Membrane Fuel Cells With Electricity Cogeneration," Applied Catalysis B: Environmental 154/155:360-368 (2014), which is hereby incorporated by reference in its entirety). Altering the active sites by spillover effects before the active reaction intermediates leave the catalyst layer can therefore achieve the deep oxidation of the alcohol. Furthermore, Ag exhibits no obvious activity towards methanol, ethanol, and ethylene glycol oxidation reactions within the whole potential window (FIGS. 50A-D), while it shows very slight activity with respect to glycerol oxidation reaction when the potential is higher than 1.0 V vs RHE. In general, it can be concluded that Ag is relatively catalytically inactive towards alcohol oxidation within the fuel cell anode potential window (<0.6 V vs RHE). The relative inertness of Ag towards alcohol oxidation suggests that a catalyst is necessary for extracting electrons from the initial deprotonation of a hydroxy group in alkaline media, which is not only a consequence of interactions between hydroxide anions, acidic hydroxyl hydrogen and a conductive electrode surface. As a result, an excessive amount of Ag in a bimetallic catalyst will deteriorate initial deprotonation of hydroxyl groups by diluting and blocking Pd active sites, as depicted in FIGS. 48A-F and FIGS. 49A-D.

To further confirm Ag-catalyzed aldehyde oxidation can facilitate alcohol oxidation, the single direct alcohol fuel cells with PdAg/CNT anode catalyst were tested. As shown in FIGS. 53A-D, low-temperature anion exchange membrane fuel cells (AEMFCs) fueled with methanol, ethanol, ethylene glycol, and glycerol have peak power densities of 135.1 mW cm$^{-2}$, 202.3 mW cm$^{-2}$, 245.2 mW cm$^{-2}$, and 276.2 mW cm$^{-2}$, which are 23.3%, 43.2%, 53.1% and 53.0% higher than that of AEMFCs with Pd/CNT as anode catalyst, respectively. By diluting and blocking Pd active sites, an increase in the Ag atomic ratio will suppress the hydroxyl group deprotonation process and accelerate the aldehyde oxidation process, which are more effective on Pd and Ag, respectively. Influenced by this tradeoff, the total electron release rate of these two processes has a relationship with the Ag atomic ratio (FIG. 52). It is noteworthy that the more hydroxyl groups in an alcohol molecule, the larger contribution of Ag facilitated aldehyde oxidation to the total discharge performance will be, owing to the existence of more possible aldehyde intermediates. The performance of AEMFC (FIGS. 53A-D and FIGS. 54A-D) with the PdAg$_3$/CNT anode catalyst will consequently be closer to that of AEMFCs with the PdAg/CNT anode catalyst when the hydroxyl group number per molecule in the substrate increases from 1 (methanol and ethanol) to 2 (ethylene glycol) and to 3 (glycerol).

FIGS. 54A-D summarize the state-of-the-art performances of low temperature (<100° C.) oxygen or air based DAFCs fed with methanol, ethanol, ethylene glycol, and glycerol. In the current work, the PPDs per mass catalyst reach 270.2 mW Mg$_{Pd\,per\,MEA}^{-1}$, 404.6 mW mg$_{Pd\,per\,MEA}^{-1}$, 490.4 mW mg$_{Pd\,per\,MEA}^{-1}$, and 552.4 mW mg$_{Pd\,per\,MEA}^{-1}$ for DMFC, DEFC, DEGFC, and DGFC, respectively, which are among the highest published results. Although the peak mass activity of DGFC (552.4 mW mg$_{Pd\,per\,MEA}^{-1}$) with PdAg/CNT anode catalyst is slightly lower than that (569.2 mW mg$_{Pt\,per\,MEA}^{-1}$) of DGFC with surface dealloyed PtCo supported on carbon nanotube (SD-PtCo/CNT) anode catalyst, PdAg/CNT is still a generally cost-effective replacement of Pt in DAFCs.

The alcohol oxidation products on PdAg/CNT anode catalyst in single fuel cell setting were further examined. FIGS. 45A-F shows C—C bond cleavage and fuel efficiency analysis of glycerol (long chain $C_3$ polyol) oxidation on Pd/CNT, PdAg/CNT, and PdAg$_3$/CNT in DGFC. For 2 hours of electrocatalytic GOR in DGFC at 60° C., the selectivity of $C_2$ oxalate on Pd/CNT, PdAg/CNT, and PdAg$_3$/CNT is 8.6%, 22.8%, and 32.0% while the corresponding conversion of glycerol is 55.3%, 49.3%, and 46.6%, respectively, indicating that the addition of silver can contribute to the C—C bond cleavage of $C_3$ glycerol to $C_2$ oxalate and lowers glycerol conversion. Balancing the tradeoff between the selectivity of $C_2$ oxalate and conversion of glycerol, a DGFC with the PdAg/CNT anode catalyst generates the highest current density and fuel efficiency during the electrocatalytic GOR. The fuel efficiency on PdAg/CNT is 28.1%, which is 4.5% and 15.2% higher than that on Pd/CNT and PdAg$_3$/CNT. After 4 hours of GOR at 80° C. on the PdAg/CNT anode catalyst, the selectivity of $C_2$ oxalate, conversion of glycerol and fuel efficiency of GOR further increases to 85.8% and 49.3%, making PdAg/CNT not only a highly active but also a highly efficient catalyst for GOR and DGFC in alkaline media.

Explanation of Ag's High Activity Toward Aldehyde Oxidation

Introduction and Background

After long-time random trial and error at lab scale and massive systematic screening, computational catalyst design employing theory and calculation has become inevitable to shorten the industrialization period of catalysts and lower their development cost. State-of-the-art theory-guided catalyst screening methods have been able to correlate appropriate theoretical descriptors with experimental activity of different catalysts (Norskov et al., "Towards the Computational Design of Solid Catalysts," Nature Chemistry 1:37-46 (2009); Norskov et al., "Density Functional Theory in Surface Chemistry and Catalysis," Proceedings of the National Academy of Sciences, USA 108:937-943 (2011), which are hereby incorporated by reference in their entirety). The dissociative adsorption energy was proposed as a descriptor and a volcano-type relationship was established between it and the reaction rate for methanation reactions (Bligaard et al., The Brønsted-Evans-Polyani Relation and the Volcano Curve in Heterogeneous Catalysis," Journal of Catalysis 224:206-217 (2004); Andersson et al., "Toward Computational Screening in Heterogeneous Catalysis: Pareto-optimal Methanation Catalysts," Journal of Catalysis 239:501-506 (2006), which are hereby incorporated by reference in their entirety), ammonia synthesis reactions (Jacobsen et al., "Catalyst Design by Interpolation in the Periodic Table: Bimetallic Ammonia Synthesis Catalysts," Journal of the American Chemical Society 123:8404-8405 (2001); Logadottir et al., "The Brønstead-Evans-Polanyi Relation and the Volcano Plot for Ammonia Synthesis over Transition Metal Catalysts," Journal of Catalysis 197:229-231 (2001), which are hereby incorporated by reference in their entirety), oxygen reduction reactions (Greeley et al., "Alloys of Platinum and Early Transition Metals as Oxygen Reduction Electrocatalysts," Nature Chemistry 1:552-556 (2009), which is hereby incorporated by reference in its entirety) and hydrogen evolution reactions (Hinnemann et al., "Biomimetic Hydrogen Evolution: MoS$_2$ Nanoparticles as Catalyst for Hydrogen Evolution," Journal of the American Chemical Society 127:5308-5309 (2005); Greeley et al., "Computational High-throughput Screening of Electrocatalytic Materials for Hydrogen Evolution," Nature Materials 5:909-913 (2006); Greeley et al., "Hydrogen Evolution Over Bimetallic Systems: Understanding the Trends," ChemPhysChem 7:1032-1035 (2006), which are hereby incorporated by reference in their entirety). Other descriptors such as number of d-electrons (Bockris and Otagawa, "The Electrocatalysis of Oxygen Evolution on Perovskites," Journal of The Electrochemical Society 131:290-302 (1984), which is hereby incorporated by reference in its entirety), enthalpy change (Trasatti, "Electrocatalysis by Oxides—Attempt at a Unifying Approach," Journal of Electroanalytical Chemistry and Interfacial Electrochemistry 111:125-131 (1980), which is hereby incorporated by reference in its entirety), reaction barriers (Hansen and Neurock, "First-Principles-Based Monte Carlo Simulation of Ethylene Hydrogenation Kinetics on Pd," Journal of Catalysis 196:241-252 (2000); Honkala et al., Science 307:555-558 (2005), which are hereby incorporated by reference in their entirety), p-band center (Grimaud et al., "Double Perovskites as a Family of Highly Active Catalysts for Oxygen Evolution in Alkaline Solution," Nat. Commun. 4:2439 (2013), which is hereby incorporated by reference in its entirety) and formation energy (Calle-Vallejo et al., "Why is Bulk Thermochemistry a Good Descriptor for the Electrocatalytic Activity of Transition Metal Oxides," ACS Catalysis 5:869-873 (2015), which is hereby incorporated by reference in its entirety) can also be used to screen catalysts or to explain their activity differences. Since it is still really challenging to experimentally prove the real elementary steps and rate determining steps for many reactions, it is worth the effort to develop theoretical descriptors and catalyst design strategies that can be linked with the experimental results, taking advantages of factors such as charge transfer and electrode polarization in electrochemical reactions.

Before charge transfer occurs, reactants should have a strong association with catalysts to be easily adsorbed onto the catalysts' surface, generating electron conducting pathways between active sites and electron sources. To evaluate the intensity of the interaction between different metal ions and ligands, researchers have classified metal ions into two groups depending on the ligand atoms of their most stable metal complexes (Ahrland et al., "The Relative Affinities of Ligand Atoms for Acceptor Molecules and Ions," *Quarterly Reviews, Chemical Society* 12:265-276 (1958), which is hereby incorporated by reference in its entirety). Others further classified Lewis acids and bases into "hard and soft acid and base" (HSAB) based on their polarizability and proposed the HSAB principle: Hard acids prefer to associate with hard bases, and soft acids prefer soft bases (Pearson, "Hard and Soft Acids and Bases," *Journal of the American Chemical Society* 85:3533-3539 (1963), which is hereby incorporated by reference in its entirety), which qualitatively indicates the difficulty of reactant association with the active sites in catalytic reactions. The electron transfer process, another key contributor to electrocatalytic reactions other than the effectiveness of association with reactants, is accompanied by orbital energy transition (Mulliken et al., *Molecular Complexes: A Lecture and Reprint Volume*, Wiley-Interscience, 1969, which is hereby incorporated by reference in its entirety). If the energy difference between energy levels of the electron donor's electron orbitals is close to that of the electron acceptor's electron orbitals, an electron in excited state from the electron donor is prone to excite the electrons in the electron acceptor from an energy balance point of view. After the excited electron loses its energy in the electron acceptor's orbital, the electron transfer will be completed, pushing forward the reaction process. In other words, if the energy change when the electron donor loses an electron is close to the energy change when the electron acceptor accepts an electron, the reaction with charge transfer will require less external energy to maintain its continuity, which can be reflected by more negative onset potential and higher intrinsic activity in the experiment. The difference between ionization energy and electron affinity (Parr and Pearson, "Absolute Hardness: Companion Parameter to Absolute Electronegativity," *Journal of the American Chemical Society* 105:7512-7516 (1983), which is hereby incorporated by reference in its entirety) is equivalent to the frontier orbital energy difference between highest occupied molecular orbital (HOMO) and lowest unoccupied molecular orbital (LUMO) (Koopmans, "Über die Zuordnung von Wellenfunktionen und Eigenwerten zu den Einzelnen Elektronen Eines Atoms," *Physica* 1:104-113 (1934); Pearson, "Absolute Electronegativity and Hardness Correlated With Molecular Orbital Theory," *PNAS USA* 83:8440-8441 (1986), which are hereby incorporated by reference in their entirety), indicating that the energy change in charge transfer process can be theoretically and experimentally linked and quantified. Based on the energy balance in the electron transfer process, it is proposed that the matchup of the orbital energy difference can be used as a descriptor for catalysts' activities in electro-catalytic reactions with electron transfer.

Polarized by an external electric field, metallic electrode materials are conductive due to the existence of nearly free electrons and the ionic lattice (Kittel, *Introduction to Solid State Physics*, Wiley, 2004; Ashcroft et al., *Solid State Physics*, Cengage Learning, 2011, which are hereby incorporated by reference in their entirety), which makes zero oxidation state metals approach their ion states. If their ion state catalytic properties can function before the applied potential is high enough to oxidize them, originally homogeneous reactions can thus be electrochemically heterogenized, which is of great importance because 90% percent of industrialized catalysts are heterogeneous (Dumesic et al., "Principles of Heterogeneous Catalysis," *Handbook of Heterogeneous Catalysis*, Wiley-VCH Verlag GmbH & Co. KGaA, 2008, which is hereby incorporated by reference in its entirety). While homogeneous catalyst heterogenization (HCH) has attracted interest among the industrial community (Petrucci and Kakkar, "Heterogenizing Homogeneous Catalysis," *Advanced Materials* (Weinheim, Germany) 8:251-253 (1996); Wegener et al., "Design Strategies for the Molecular Level Synthesis of Supported Catalysts," *Accounts of Chemical Research* 45:206-214 (2012); Genna et al., "Heterogenization of Homogeneous Catalysts in Metal-Organic Frameworks via Cation Exchange," *Journal of the American Chemical Society* 135:10586-10589 (2013), which are hereby incorporated by reference in their entirety), electrochemical HCH is different from molecular catalyst immobilization (Anwander, *Immobilization of Molecular Catalysts, Handbook of Heterogeneous Catalysis*, Wiley-VCH Verlag GmbH & Co. KGaA, 2008; Terry and Stack, "Covalent Heterogenization of a Discrete Mn(II) Bis-Phen Complex by a Metal-Template/Metal-Exchange Method: An Epoxidation Catalyst With Enhanced Reactivity," *Journal of the American Chemical Society* 130:4945-4953 (2008), which are hereby incorporated by reference in their entirety) HCH method, which usually anchors organometallic complexes onto support materials to change the dispersion status of active sites. By electrochemically heterogenizing the active sites, the average distance between adjacent active sites of different functions can be tremendously shortened to lattice spacing level (<1 nm). The reaction intermediates can thus easily reach the more appropriate active sites by spillover effects (Conner and Falconer, "Spillover in Heterogeneous Catalysis," *Chemical Reviews* 95:759-788 (1995), which is hereby incorporated by reference in its entirety), facilitating the generation of final products. Before combining well-defined active sites for multi-functional catalysts, it is consequently necessary to heterogenize the reaction to unite the relatively isolated active sites in the corresponding homogeneous reaction and thus realize the synergetic effects of adjacent active sites.

A case in point of electrocatalyst design and HCH with this descriptor is catalyst screening for the aldehyde oxidation reaction (to carboxylic acid), which contains only two electrons transfer, so the effectiveness of the first electron transfer play an important role in evaluating this reaction. The target of the present work is to screen catalysts by HSAB principle and orbital energy difference matching, followed by experimentally making zero-valent metals approach their ion-state Lewis acid counterparts via electrode polarization to enhance the adsorption and charge transfer of various Lewis bases (e.g., different aldehydes). This way, originally homogeneous reactions can be electrochemically heterogenized to separate the reactant adsorbent and ultimate electron acceptor, leading to current generation by changing electron pathway to the external circuit. In this work, combining well-defined active sites for intermediate aldehyde oxidation and well-known catalyst alcohol oxidation, the multifunctional bimetallic catalyst was also used as anode catalyst in the direct alcohol fuel cell as an application.

Results and Discussion

The catalyst screening analysis for aldehyde oxidation reaction starts from the acid and base classification of aldehydes. According to the calculation of Mulliken charge distribution (Mulliken, "Electronic Population Analysis on LCAO-MO Molecular Wave Functions," *The Journal of Chemical Physics* 23:1833-1840 (1955), which is hereby incorporated by reference in its entirety) (FIG. 68), the carbonyl group is composed of a carbon atom as an electropositive center (0.220~0.292 charge) and an oxygen atom as an electronegative center (−0.322~−0.224 charge), indicating that this $sp^2$ hybridization structure is highly polarizable, which is a common feature of a Lewis soft base. For electrocatalytic oxidation reaction, the nucleophilic oxygen electronegative center connected to the distorted π bond will be gathered near positive terminal such as an anode electrode, facilitating the adsorption of aldehydes. When an aldehyde group is bound to a hydrogen atom (formaldehyde), a methyl group (acetaldehyde); a hydroxymethyl group (glycolaldehyde); 1,2-dihydroxyethyl (glyceraldehyde); and a carboxylic group (glycolic acid), respectively, the calculated chemical hardness for the whole molecule is lower than 6.2 eV, indicating these easily oxidized substrates can be Lewis soft base to form strong covalent bonds with Lewis soft acid. Therefore, the catalysts with strong adsorption of substrate containing aldehyde group should be Lewis soft acids.

Although zero-oxidation-state metals are Lewis soft acids, their frontier orbital energy difference (e.g., 5.74-7.78 eV for zero oxidation state metals in Table 11) is far from the aldehydes' counterparts (e.g., 10.82-12.02 eV for aldehyde molecules in FIG. 68). Fortunately, metals can be viewed as nearly free electrons and positive ionic lattice under potential perturbation (Kittel, *Introduction to Solid State Physics* 8th Ed., New York Wiley (2004); Ashcroft and Mermin, *Solid State Physics*, Cengage Learning, 2011, which are hereby incorporated by reference in their entirety), which makes them conductive. With applied potential, solid zero oxidation state metal electrodes polarized can function as low oxidation state metal ions in heterogeneous electrocatalytic reactions. Without ionization, the non-frontier orbitals of those metals can be used heterogeneously facilitating charge transfer from reactant molecules. The low oxidation state ions should also be Lewis soft acids (listed in Table 11) to ensure their orbital energy difference match that of aldehyde molecules.

Qualitatively speaking, the electron donor loses electrons and releases energy while the electron acceptor accepts electrons and absorbs energy in the electron transfer process. Since the transition of energy levels requires rigorous energy matching, the closer between the orbital energy difference of electron donor and electron acceptor, the less external energy supply is required to maintain the continuity of the charge transfer process, which is the criterion to further quantitatively screen the catalyst. In the electrocatalytic oxidation reactions, electron donor's electrons first transfer from HOMO to LUMO. After being accelerated by the external potential field, these electrons will excite the outer shell electrons in the electron acceptor's orbital, followed by losing their energy and staying in the electron acceptor's orbital. Such an exchange process completes the transfer of electrons between different orbitals, rendering its difficulty reflects the efficiency of different catalysts toward catalyzing the same reaction. As an organic compound with a formyl group as the most easily oxidized functional group, an aldehyde can be oxidized to a carboxylic acid involving transfer of only two electrons. The first electron transfer, represented by frontier orbital energy gap, will thus play an important role in evaluating this reaction.

TABLE 11

Calculated Chemical Hardness and Orbital Energy Difference of Zero and One Oxidation State Lewis Soft Acid Metals

| Element | $A^a$ (eV) | $I_{1st}^b$ (eV) | $I_{2nd}^c$ (eV) | $\eta_0^d$ (eV) | $E_{gap0(cat)}^e$ (eV) | $\eta_{+1}^f$ (eV) | $E_{gap+1(cat)}^g$ (eV) |
|---|---|---|---|---|---|---|---|
| Ru | 1.08 | 7.36 | 16.79 | 3.14 | 6.28 | 4.71 | 9.42 |

TABLE 11-continued

Calculated Chemical Hardness and Orbital Energy Difference of Zero and One Oxidation State Lewis Soft Acid Metals

| Element | $A^a$ (eV) | $I_{1st}^b$ (eV) | $I_{2nd}^c$ (eV) | $\eta_0^d$ (eV) | $E_{gap0(cat)}^e$ (eV) | $\eta_{+1}^f$ (eV) | $E_{gap+1(cat)}^g$ (eV) |
|---|---|---|---|---|---|---|---|
| Rh | 1.14 | 7.46 | 18.03 | 3.16 | 6.32 | 5.29 | 10.57 |
| Pd | 0.56 | 8.34 | 19.38 | 3.89 | 7.78 | 5.52 | 11.04 |
| Ag | 1.30 | 7.58 | 21.45 | 3.14 | 6.28 | 6.94 | 13.87 |
| Cd | — | 8.99 | 16.91 | — | — | 3.96 | 7.92 |
| Os | 1.08 | 8.71 | 16.58 | 3.81 | 7.62 | 3.94 | 7.87 |
| Ir | 1.56 | 9.12 | 16.58 | 3.78 | 7.56 | 3.73 | 7.46 |
| Pt | 2.13 | 9.02 | 18.56 | 3.45 | 6.9 | 4.77 | 9.54 |
| Au | 2.31 | 9.23 | 20.52 | 3.46 | 6.92 | 5.65 | 11.29 |
| Hg | — | 10.44 | 18.76 | — | — | 4.16 | 8.32 |
| Tl$^h$ | 0.38 | 6.11 | 20.43 | 2.87 | 5.74 | 7.16 | 14.32 |

$^a$A is experimental electron affinity;
$^b$I$_{1st}$ is experimental first ionization energy;
$^c$I$_{2nd}$ is the calculated second ionization energy;
$^d$η$_0$ is the calculated chemical hardness of 0 oxidation state metal;
$^e$E$_{gap0(cat)}$ is the frontier orbital energy difference (HOMO-LUMO gap) of different metal catalysts in their 0 oxidation states;
$^f$η$_{+1}$ is the calculated chemical hardness of +1 oxidation state metals;
$^g$E$_{gap+1(cat)}$ is the frontier orbital energy difference of different metal catalysts in their +1 oxidation state, which is not frontier orbital energy difference with respect to the polarized but not oxidized 0 oxidation state metal;
$^h$Tl is highly toxic and not stable in the air so it is excluded from current research.

Quantitively speaking, electron donor's orbital energy difference should be close to the electron acceptor's counterpart. For electrocatalytic oxidation reaction occurring at the anode electrode, the electrocatalyst's frontier or non-frontier orbital energy difference should be close and slightly larger than the electron donor's frontier orbital energy difference, which is a descriptor evaluating the effectiveness of continuous catalytic charge transfer from an energy balance point of view. Among all Lewis soft acid metals (Table 11), there are four elements, Pd, Au, Ag, and Tl whose first oxidation state ions' frontier orbital energy differences (11.04 eV, 11.29 eV, 13.87 eV and 14.32 eV) are close to the average (11.44 eV) and larger than the minimum (10.82 eV) of that for aldehyde molecules.

The reason behind the activity sequence is analyzed based on the orbital transition of substrates and catalysts. In all the substrates with different side chains, the frontier orbitals surrounding the aldehyde groups have lodes with similar shapes. The flipping of nodal plane can be observed in all their HOMO→LUMO transition process, in which the HOMO-LUMO gaps of these aldehydes have less than 10% difference (FIG. 56A). Since these different side chains do not lead to significant change in the orbital transition process, they should not cover the mutual trend within the electron transfer of aldehyde oxidation. If the intrinsic activity (TOF$_e^-$) is correlated with the degree of orbital energy difference matching ($E_{gap+1(cat)}$-$E_{gap(sub)}$) as a descriptor, the trend of Pd, Au, and Ag shown as solid arrows (FIG. 56B) indicates that the electrocatalyst's frontier or non-frontier orbital energy difference should be close and slightly larger than the electron donor's frontier orbital energy difference to ensure the rigorous matching of energy level differences after the accelerating effects of external bias on the transferred electrons in the electrocatalytic oxidation reaction. Since formate derived from formaldehyde oxidation is easy to be further oxidized to carbonate on Pt, the formaldehyde oxidation will involve four electrons instead of two to an extent large enough to make the frontier orbital energy difference matching insufficient to represent the whole reaction network. For glyoxylic acid and acetaldehyde oxidation on Pt, the trend is the same as Pd, Au, and Ag, but not obvious since the potential window (<0.7 V vs RHE) selected for fuel cell anode application is not wide enough to include the relatively positive peak value of $TOF_{e^-}$ on Pt and Pd in the whole potential range. Furthermore, as d-block transition metals, Ag and Au have more excitable d electrons in their outer shells than Pd and Pt, making them better electron traps for aldehyde oxidation.

Conclusion

In summary, PdAg/CNT was prepared for AOR in AEM-DAFCs via an aqueous-phase reduction method excluding the usage of surfactant. With PdAg/CNT (0.5 $mg_{Pd\ per\ MEA}^{-1}$) as the anode catalyst, the AEM-DAFCs achieve PPD of 135.1 mW cm$^{-2}$, 202.3 mW cm$^{-2}$, 245.2 mW cm$^{-2}$, and 276.2 mW cm$^{-2}$, with corresponding peak mass activities of 270.2 mW $mg_{Pd\ per\ MEA}^{-1}$, 404.6 mW $mg_{Pd\ per\ MEA}^{-1}$, 490.4 mW $mg_{Pd\ per\ MEA}^{-1}$, and 552.4 mW $mg_{Pd\ per\ MEA}^{-1}$ at 80° C. and ambient pressure, when using methanol, ethanol, ethylene glycol, and glycerol, respectively, as fuel. The high activity of PdAg/CNT towards AOR in AEM-DAFCs can be attributed to several reasons. First, Ag/CNT electrochemically catalyzes the ADOR more efficiently than Pt/CNT, Pd/CNT, and Au/CNT. Although not active towards AOR in alkaline media, it is proposed that Ag can help Pd to accelerate the reaction rate of ADOR and thereby the whole AOR network. Second, by alloying Pd with Ag, the particle size of Ag can be greatly reduced from 17.7 nm (Ag/CNT) to 2.7 nm (PdAg/CNT) without covering the catalyst's surface by surfactants, leading to a high ECSA for both Pd and Ag components. Third, PdAg/CNT can cleave the C—C bond of long chain polyols such as glycerol, providing a high fuel efficiency. Fourth, CNT support with high electrical conductivity, remarkable mechanical and thermal stabilities, will form 3D electrode structure on MEA and enhance the mass transport of alcohol and OH$^-$, resulting in an even higher catalyst utilization ratio in actual fuel cell operation.

Example 6: Carbon Nanotube Supported PdAg Nanoparticles for Electrocatalytic Oxidation of Glycerol in Anion Exchange Membrane Fuel Cells Carboxyl-group functionalized short multi-wall carbon nanotubes (8-15 nm outer diameter, 0.5-2 μm length) were purchased from Cheaptubes, Inc. Palladium (II) nitrate dihydrate (40%), silver nitrate (99%), 1-propanol (99.5%), potassium hydroxide (85%), potassium sulfate (99%), sodium borohydride (99%), sodium citrate dihydrate (99%), polytetrafluoroethylene (PTFE) ionomer solution (60%), glycerol (99.5%), lactic acid (98%), D-glyceric acid calcium salt dihydrate (99%), sodium mesoxalate monohydrate (98%), tartronic acid (97%), glycolic acid (99%), and oxalic acid (99%) were obtained from Sigma-Aldrich. The catalyst 4020 was bought from Acta, Inc. All chemicals were used as received without further purification.

Catalyst Synthesis and Physical Characterizations

Carbon-nanotube (CNT) supported nanoparticles Pd/CNT, PdAg/CNT, PdAg$_3$/CNT, and Ag/CNT catalysts (20 wt %) were synthesized using a modified aqueous-phase reduction method recently developed (Qi et al., "Surface Dealloyed Ptco Nanoparticles Supported on Carbon Nanotube: Facile Synthesis and Promising Application for Anion Exchange Membrane Direct Crude Glycerol Fuel Cell," *Green Chemistry* 15(5):1133-1137 (2013); Qi et al., "PdAg/CNT Catalyzed Alcohol Oxidation Reaction for High-Performance Anion Exchange Membrane Direct Alcohol Fuel Cell (Alcohol=Methanol, Ethanol, Ethylene Glycol and Glycerol)," *Applied Catalysis B: Environmental* 199:494-503 (2016); Benipal et al., *Fuel* 185:85-93 (2016); Qi et al., "Electrocatalytic Selective Oxidation of Glycerol to Tartronate on Au/C anode Catalysts in Anion Exchange Membrane Fuel Cells With Electricity Cogeneration," *Applied Catalysis B: Environmental* 154/155:360-368 (2014), which are hereby incorporated by reference in their entirety). The prepared catalysts were characterized using transmission electron microscopy (TEM, JEOL 2010) with an operating voltage of 200 kV. X-ray diffraction (XRD) patterns were collected from a Scintag XDS-2000 θ/θ diffractometer using Cu Kα radiation (λ=1.5406 Å), with a tube current of 35 mA and a tube voltage of 45 kV. The mean crystallite size of catalysts was calculated using the (220) peak based on a combination of Bragg's law and the relationship between lattice and crystal-lattice spacing given by $$L = \frac{0.9\lambda_{K\alpha}}{B_{2\theta}\cos\theta_{max}} \tag{15}$$

where L is the mean crystallite size, $\lambda_{K\alpha}$ is the X-ray wavelength (1.5406 Å), B is the full width of the peak (rad) at half-maximum (FWHM), and $\theta_{max}$ is the Bragg angle (rad) of the (220) peak position.

X-ray photoelectron spectroscopy (XPS) measurements were performed using a Kratos Amicus/ESCA 3400 with Mg Kα X-rays (1253.6 eV). All spectra were calibrated with a measured C 1s peak at 284.6 eV. High-angle annular dark field images were obtained using aberration-corrected scanning transmission electron microscopy (HAADF-STEM) on a Titan Themis electron microscope at 300 KV with a super-X EDS detector.

Electrocatalytic Oxidation of Glycerol and Reaction Intermediates in a Three-Electrode Cell Cyclic voltammetry was performed in a single compartment three-electrode setup (AFCELL3, Pine Instrument), including a glassy carbon working electrode (AFE3T-050GC, Pine Instrument), a coiled platinum counter electrode (AFCTR1, Pine Instrument) isolated by a fritted glass tube from the main test electrolyte, a Hg/HgO reference electrode (MMO, CHI152, CH Instruments), with a 0.1 M KOH filling solution. The potential was applied with a multi-channel potentiostat (Biological). All tests were prepared and performed at ambient temperature and all potentials in the study were referred to MMO (1.0 M KOH, 0.098 V vs. SHE). The prepared catalyst's ink was dispersed by ultrasonication in 1-propanol to form a uniform ink (0.5 mg mL$^{-1}$). A glassy carbon electrode (GCE) was refined with an alumina micropolish solution and grinding paper to avoid contamination by metal particles. The working electrode was prepared by drop-casting 10 μL of ink for Pd/CNT and Ag/CNT, 20 μL of ink for PdAg/CNT, and 40 μL of ink for PdAg$_3$/CNT with a micro-syringe onto a polished and cleaned GCE with a working area of 0.1963 cm$^2$. 10 μL of 0.05 wt % AS-4 anion conductive ionomer solution (Tokuyama, Inc) was added on top to affix and bind the catalyst particles. The electrolytes were composed of 1.0 M KOH+0.1 M glycerol, mesoxalic acid, glyceric acid, tartronic acid, oxalic acid, lactic acid, or glycolic acid in deionized water. Prior to testing, all electrolytes were de-aerated by purging with high purity N$_2$ for 30 min at ambient temperature. Ten cyclic voltammograms (CVs) were recorded for each catalyst at a constant sweep rate of 50 mV$^{-1}$ at 25° C. or 60° C.

Electrocatalytic Oxidation of Glycerol in Anion Exchange Membrane—Direct Glycerol Fuel Cells (AME-Dgfcs)

The fuel cell tests were performed on a Scribner Fuel Cell System 850e (Scribner Associates, USA) using a self-constructed membrane electrode assembly (MEA), a serpentine graphite flow field plate, and a feedback temperature control loop composed of electric heating rods and a thermocouple thermometer. The membrane-electrode assembly (MEA), with an active area of 5 cm$^2$, included a solid anion-exchange membrane (A901, 10 μm) mechanically sandwiched between anode and cathode catalyst layers on carbon cloth. Self-prepared Pd/CNT, PdAg/CNT, PdAg$_3$/CNT, and Ag/CNT served as anode catalysts, while commercial Acta 4020 was used as the cathode catalyst.

The anode catalyst ink was made by dispersing the anode catalyst powder and a 10 wt % PTEF solution (catalyst:PTFE=8:2 mass ratio) in 1-propanol by ultra-sonication in an ice-water bath for 40 min to form a uniform ink dispersion (10 mg$_{catalyst}$ mL$^{-1}$) sprayed onto the carbon cloth with a spray gun. The mass of the catalyst on the carbon cloth was calculated as yielding a metal loading of 0.5 mg cm$^{-2}$ for both Pd/CNT and Ag/CNT, 1.0 mg cm$^{-2}$ for PdAg/CNT, and 2.0 mg cm$^{-2}$ for PdAg$_3$/CNT.

The cathode catalyst ink was prepared by blending the cathode catalyst powder and an AS-4 anion conductive ionomer (catalyst:AS-4=7:3) in 1-propanol by ultrasonication in an ice-water bath for 40 mins to form a homogenous ink dispersion that was directly sprayed on the AEM. The mass of catalyst on the AEM was calculated as providing a catalyst loading of 3.0 mg cm$^{-2}$.

Additional details of fuel cell design can be found in previous work (Xin et al., "Simultaneous Generation of Mesoxalic Acid and Electricity from Glycerol on a Gold Anode Catalyst in Anion-Exchange Membrane Fuel Cells," 4(8):1105-1114 (2012); Li et al., "Platinum Nanopaticles Supported on Stacked-Cup Carbon Nanofibers as Electrocatalysts for Proton Exchange Membrane Fuel Cell," *Carbon* 48(4): 995-1003 (2010); Zhang et al., "Supported Pt, Pd and Au nanoparticle Anode Catalysts for Anion-Exchange Membrane Fuel Cells With Glycerol and Crude Glycerol Fuels," *Applied Catalysis B: Environmental* 136/137:29-39 (2013), which are hereby incorporated by reference in their entirety).

The fuel was pumped through a peristaltic pump into the anode at a flow rate of 4.0 ml min$^{-1}$ for performance tests and 1.0 ml min$^{-1}$ for product analysis, while high-purity O$_2$ was fed into the cathode compartment at a flow rate of 0.2 L min$^{-1}$ for performance tests and 0.1 L min-1 for product analysis at a backpressure of 0 psig.

Product Analysis of Glycerol Oxidation in AEM-DGFC 20 mL of 4.0 M KOH+1.0 M glycerol solution was cycled with a flow rate of 1.0 ml min$^{-1}$ using a peristaltic pump between a plastic vessel and the anode chamber via a closed loop (Gilson Minipuls 3). High purity O$_2$ (>99.999%) was fed into the cathode compartment at a flow rate of 0.1 L min$^{-1}$. Electrocatalytic glycerol oxidation was performed at 60° C. for 2 hours at a constant voltage of 0.1 V. Product samples were periodically obtained throughout the test for analysis by high performance liquid chromatography unit (HPLC, Agilent 1100, Alltech OA-1000 column, 60° C.) equipped with a refractive index detector (RID, Agilent G1362A), and a variable wavelength detector (VWD, Agilent G1314A, 220 nm). An eluent of 5 mM aqueous sulfuric acid at a flow rate of 0.3 mL min$^{-1}$ was applied for product separation. 20 μL of sample was injected into the HPLC system. All product samples were identified by comparison with standard samples. Throughout this example, all investigated products were in their deprotonated (salt) forms in alkaline media, but for convenience of comparison with previous studies they are reported in acid forms.

The product selectivity, glycerol conversion (Xg), carbon balance, and fuel utilization ($\in_f$) were calculated using the following equations (Qi et al., "PdAg/CNT Catalyzed Alcohol Oxidation Reaction for High-Performance Anion Exchange Membrane Direct Alcohol Fuel Cell (Alcohol=Methanol, Ethanol, Ethylene Glycol and Glycerol)," *Applied Catalysis B: Environmental* 199 494-503 (2016), which is hereby incorporated by reference in its entirety):

$$S = \frac{\text{moles of } C_2 \text{ or } C_3 \text{ product}}{\text{total moles of } C_2 \text{ and } C_3 \text{ products}} * 100\% \quad (16)$$

$$X_g = \left(1 - \frac{\text{residual moles of glycerol after reaction}}{\text{total moles of gylcerol}}\right) \times 100\% \quad (17)$$

$$\text{Carbon balance} = \frac{\sum (M_{C_1} + M_{C_2} + M_{C_3}, \dots, M_{C_f})}{M} \times 100\% \quad (18)$$

$$\varepsilon_f = \epsilon_e \times X_g \quad (19)$$

where S is the selectivity of one C$_2$ or C$_3$ reaction intermediates;

Xg is the conversion of glycerol;

M is the number of moles of glycerol in the electrolyte,

M$_C$ is the number of moles of carbon in each product,

ε$_f$ is fuel efficiency or fuel utilization, and

ε$_e$ is faraday efficiency.

Results and Discussion

Physical Characterization of Monometallic and Bimetallic Pd and Ag Electrocatalysts Carbon nanotube (CNT) supported monometallic Pd/CNT and Ag/CNT and bimetallic PdAg/CNT and PdAg$_3$/CNT were prepared using a modified aqueous-phase reduction method (Qi et al., "PdAg/CNT Catalyzed Alcohol Oxidation Reaction for High-Performance Anion Exchange Membrane Direct Alcohol Fuel Cell (Alcohol=Methanol, Ethanol, Ethylene Glycol and Glycerol)," *Applied Catalysis B: Environmental* 199 494-503 (2016), which is hereby incorporated by reference in its entirety). The morphology, particle size, size distribution, structure, surface chemical state, and composition of the as-prepared catalysts were analyzed by X-ray diffraction (XRD), transmission electron microscopy (TEM), high-angle annular dark field via aberration-corrected scanning transmission electron microscopy (HAADF-STEM), X-ray photoelectron spectroscopy (XPS), and inductively coupled-plasma-mass spectrometry (ICP-MS). XRD patterns of all catalysts, collected at temperature ranging from 15° C. to 90° C., exhibited typical a face-centered cubic (FCC) patterns with diffraction peaks of (111), (200), (220), and (311) facets, respectively, as shown in FIG. 57A. The mean crystalline sizes of Ag/CNT, PdAg$_3$/CNT, PdAg/CNT, and Pd/CNT catalysts, calculated based on their (220) diffraction peaks using the Debye-Scherrer formula, were 13.9, 2.4, 2.3, and 2.0 nm, respectively. The TEM images of Ag/CNT, PdAg$_3$/CNT, PdAg/CNT, and Pd/CNT and the corresponding metal particle size histograms are shown in FIGS. 57B-E. The average particle sizes evaluated from the TEM were 13.7, 2.4, 2.3, and 2.1 nm for Ag/CNT, PdAg$_3$/CNT, PdAg/CNT, and Pd/CNT, respectively, in good agreement with the results from the XRD results. The histograms of particle sizes determined from 100 randomly chosen particles in arbitrary areas showed a narrow size distribution of 10.3 to 18.0 nm for Ag/CNT, 1.9 to 3.2 nm for PdAg$_3$/CNT, 1.6 to 2.9 nm for PdAg/CNT, and 1.4 to 2.8 nm for Pd/CNT. It can be observed that well-dispersed metal particles were uniformly deposited on the CNT support. The similar particle sizes and size distributions of these catalysts (Pd/CNT, PdAg/CNT, PdAg$_3$/CNT) provide a good platform for investigating selective electrooxidation of glycerol in alkaline electrolyte. The aqueous-phase reduction method achieved very small Pd nanoparticles under these synthesis conditions, while the Pd—Ag containing particles were slightly larger and more highly developed. Bulk metal compositions of monometallic and bimetallic catalysts were close to the set metal loading (20 wt %), indicating that Pd and Ag precursors were fully reduced during nanoparticle synthesis.

XPS was further used to characterize the surface oxidation states of the metals in as-prepared catalysts, and a survey XPS spectrum confirmed the coexistence of Pd, Ag, C, and O elements in as-prepared catalyst. The oxidation states of Pd and Ag were obtained by fitting the peaks of high resolution Pd 3d and Ag 3d XPS spectra, as shown in FIGS. 58A-B. XPS spectra of monometallic Pd/CNT revealed both oxidized Pd$^{2+}$ and metallic Pd$^0$ chemical oxidation states (FIG. 58A). The addition of Ag to Pd when alloyed prevents the oxidation of Pd, so in alloyed PdAg/CNT and PdAg$_3$/CNT the existence of only metallic Pd$^0$ in the surface oxidation state was observed. Metallic Ag$^0$ was primarily present in Ag 3d of Ag/CNT, PdAg/CNT, and PdAg$_3$/CNT catalysts, as shown in FIG. 58B. Pd$^0$, Pd$^{2+}$, and Ag$^0$ were detected, reflecting the efficient reduction of Pd(NO$_3$)$_2$: 2H$_2$O and AgNO$_3$. A greater amount of metallic Pd$^0$ in PdAg/CNT catalyst may lead to a better alcohol deprotonation effect than for monometallic Pd/CNT, resulting in higher glycerol oxidation kinetics. Furthermore, XPS were performed on as-prepared catalysts after a 2 hour reaction under hard conditions of alkaline electrolyte to observe a change in the catalysts' oxidation states (FIG. 59). The results showed no apparent change in the surface oxidation states of the catalysts, reflecting good stability of the catalysts. Wide XPS spectra of as-prepared catalysts after a 2 hour reaction revealed the additional presence of F and Cl elements among Pd, Ag, C, and O elements that originated as impurities either from the potassium hydroxide electrolyte or from the anion-exchange membrane used in the reaction (FIG. 60)

HAADF-STEM elemental mapping images are shown in FIGS. 58C-D, revealing a homogeneous distribution of Pd and Ag in a single PdAg and PdAg$_3$ nanoparticle along with well-developed crystalline structure. This further displays the alloy feature of PdAg/CNT and PdAg$_3$/CNT. The aqueous-phase reduction method achieved very small Pd nanoparticles under these synthesis conditions, while nanoparticles containing Ag were slightly larger and more highly developed, as can be seen in the HAADF-STEM images. While it is interesting to find that nanoparticles are not exactly round-shaped, this may be due to the synthesis conditions.

Electrocatalytic Oxidation of Glycerol Study of Pd/CNT, PdAg/CNT, PdAg$_3$/CNT, and Ag/CNT in Half-cell CV profiles were conducted to study electrocatalytic oxidation of glycerol over Pd/CNT, PdAg/CNT, PdAg$_3$/CNT, and Ag/CNT catalysts, as shown in FIG. 61. The results show that Pd and Ag alloyed together exhibited higher current density and lower onset potential than monometallic Pd/CNT and Ag/CNT catalysts. The onset potential of glycerol oxidation shifted more negatively with increasing Ag content −0.44 V>−0.39 V>−0.35 V for PdAg$_3$/CNT, PdAg/CNT, and Pd/CNT, but the current density for PdAg/CNT is higher than that for PdAg$_3$/CNT, indicating that further addition of Ag will diminish the current density due to blockage of Pd active sites by the additional Ag content, so the synergetic effect of PdAg/CNT improves the total reaction rate of the glycerol oxidation reaction. The Ag/CNT catalyst, however, displayed very little or no activity directed toward electrocatalytic glycerol oxidation at the same applied potential. In general, it can be concluded that Ag is relatively catalytically inactive towards alcohol oxidation within the fuel cell anode potential window (<−0.2V vs. MMO).

Electrocatalytic Oxidation of Glycerol Study of Pd/CNT, PdAg/CNT, and PdAg$_3$/CNT in Single-Cell Cell polarization and power density curves of direct glycerol AEMFC using Pd/CNT, PdAg/CNT, and PdAg$_3$/CNT anode catalysts are shown in FIG. 62. The open circuit voltage (OCV) of the direct glycerol AEMFC with PdAg/CNT was 0.83V, 0.03 V higher than that for PdAg$_3$/CNT and 0.07 V higher than that for Pd/CNT. The peak power density (PPD) of the direct glycerol AEMFC with PdAg/CNT was 76.5 mW cm$^{-2}$, 9.1% higher than that for PdAg$_3$/CNT and 29.0% higher than that for Pd/CNT. It is also interesting to observe that PdAg$_3$/CNT achieves a limited reaction rate in the higher current density region because of reactant mass transfer issues. The higher content of Ag causes the more active sites of the Pd catalyst to be covered by the Ag, leading to a decrease in performance. These single-cell performance results are consistent with half-cell results.

Glycerol Oxidation Product Distribution in AEMFCs on Pd/CNT, PdAg/CNT, and PdAg$_3$/CNT Glycerol oxidation products from using Pd/CNT, PdAg/CNT, and PdAg$_3$/CNT anode catalysts for 2 hours at 60° C. in AEM-DGFC at constant fuel cell voltage (0.1 V) were further examined. The oxidation products were analyzed using HPLC. Table 12 shows the product selectivity distribution of glycerol oxidation for Pd/CNT, PdAg/CNT, and PdAg$_3$/CNT. It can be observed that the selectivity of C$_2$ species, i.e., oxalate and glycolate on Pd/CNT, PdAg/CNT, and PdAg$_3$/CNT, increased as the Ag content increased, indicating that Ag contributed to a deeper C—C bond cleavage. Conversely, all the C$_3$ species, i.e., tartronate, mesoxalate, glycerate, and lactate on Pd/CNT, PdAg/CNT, PdAg$_3$/CNT, decreased as the Ag content increased. The corresponding conversion of glycerol is 48.4%, 55.0%, and 43.0% for Pd/CNT, PdAg/CNT, and PdAg$_3$/CNT, respectively. The increase in Ag content has resulted in higher faraday efficiencies of 58.2% for Pd/CNT, 63.1% for PdAg/CNT, and 65.7% for PdAg$_3$/CNT, while the fuel utilization efficiency exhibits a volcano trend as shown in Table 13. Since the fuel utilization efficiency has a relationship with the conversion (Fuel utilization efficiency=faradaic efficiency×conversion), a higher Ag content may block the active sites of Pd and result in a decrease in the conversion of PdAg$_3$/CNT, leading to the fuel utilization efficiency drop. It is also very interesting to observe that PdAg not only improves the faradaic efficiency by 8.4% (from 58.2% to 63.1%), but also enhances the peak power density by 29% (from 59.3 to 76.5 mW/cm$^2$).

TABLE 12

Product Selectivity Distribution of Electrocatalytic Oxidation of Glycerol on Pd/CNT, PdAg/CNT, and PdAg$_3$/CNT in AEM-DGFC

|  | Oxalate 12e | Glycolate 8e | Tartronate 8e | Mesoxalate 10e | Glycerate 4e | Lactate 2e |
|---|---|---|---|---|---|---|
| Pd/CNT | 25.3 | 8.5 | 39.5 | 3.8 | 21.7 | 1.2 |
| PdAg/CNT | 35.9 | 20.9 | 26.4 | 1.5 | 14.2 | 1.1 |
| PdAg$_3$/CNT | 39.2 | 37.9 | 13.7 | 0 | 8.8 | 0.3 |

Anode fuel: 4.0M KOH + 1.0M glycerol, 2.0 mL min$^{-1}$, cathode fuel: O$_2$, 200 sccm, ambient pressure, 60° C., The above numbers are in %.

TABLE 13

Conversion, Carbon Balance, Average Electron Transfer, Faraday Efficiency, and Fuel Utilizations of Electrocatalytic Oxidation of Glycerol on Pd/CNT, PdAg/CNT, and PdAg$_3$/CNT in AEM

|  | Conversion (%) | Carbon Balance (%) | Average Electron Transfer | Faraday Efficiency (%) | Fuel Utilization (%) | Power Density (mW cm$^{-2}$) |
|---|---|---|---|---|---|---|
| Pd/CNT | 48.4 | 94.2 | 8.1 | 58.2 | 28.2 | 54.3 |
| PdAg/CNT | 55.0 | 89.9 | 8.8 | 63.1 | 34.7 | 76.5 |
| PdAg$_3$/CNT | 43.0 | 82.1 | 9.1 | 65.7 | 28.3 | 69.2 |

Anode fuel: 4.0M KOH + 1.0M glycerol, 2.0 mL min$^{-1}$, cathode fuel: O$_2$, 200 sccm, ambient pressure, 60° C.

In previous work, a high pH alkaline environment (6.0 M KOH+1.0 M glycerol) targeting a high glycerol electro-oxidation rate was reported (Qi et al., "PdAg/CNT Catalyzed Alcohol Oxidation Reaction for High-Performance Anion Exchange Membrane Direct Alcohol Fuel Cell (alcohol=methanol, ethanol, ethylene glycol and glycerol)," *Applied Catalysis B: Environmental* 199:494-503 (2016), which is hereby incorporated by reference in its entirety). Here, the alkaline concentration was reduced from 6.0 to 4.0 M and then 2.0 M, based on considerations of environmental impact and fuel cell device material compatibility. As the KOH concentration increased from 2.0 M to 4.0 M, the glycerol conversion on PdAg/CNT jumped from 50.4% to 55.0% due to the promoted deprotonation of glycerol in a higher pH environment (Table 13 and Table 14). A higher KOH concentration also facilitates the oxidation of hydroxyl groups in glycerol, leading to higher selectivity of C$_3$ products, as shown in a previous study (Qi et al., "PdAg/CNT Catalyzed Alcohol Oxidation Reaction for High-Performance Anion Exchange Membrane Direct Alcohol Fuel Cell (alcohol=methanol, ethanol, ethylene glycol and glycerol)," *Applied Catalysis B: Environmental* 199:494-503 (2016), which is hereby incorporated by reference in its entirety). It can be noted that varying the KOH concentration (from 6.0 M to 2.0 M) has only minor effects on product distribution.

TABLE 14

Conversion, Carbon Balance, Average Electron Transfer, Faraday Efficiency, and Fuel Utilizations of Electrocatalytic Oxidation of Glycerol on Pd/CNT, PdAg/CNT, and PdAg$_3$/CNT in AEM

|  | Conversion (%) | Carbon Balance (%) | Average Electron Transfer | Faraday Efficiency (%) | Fuel Utilization (%) |
|---|---|---|---|---|---|
| Pd/CNT | 54.3 | 86.5 | 8.0 | 57.3 | 31.1 |
| PdAg/CNT | 50.4 | 93.1 | 8.8 | 62.9 | 31.7 |
| PdAg$_3$/CNT | 42.0 | 96.8 | 8.4 | 60.4 | 25.4 |

Anode fuel: 2.0M KOH + 1.0M glycerol, 2.0 mL min$^{-1}$, cathode fuel: O$_2$, 200 sccm, ambient pressure, 60° C.

Electrocatalytic Oxidation of Products and Intermediates of Glycerol in Half-Cell To further investigate the electrocatalytic oxidation of glycerate, mesoxalate, tartronate, lactate, oxalate, and glycolate over Pd/CNT, PdAg/CNT, PdAg$_3$/CNT, and Ag/CNT catalysts, CVs were conducted at 60° C., with the results shown in FIGS. 63A-F. The activities of the prepared catalysts for oxidation of intermediates were compared in a half-cell reactor by observing the oxidation onset potential and peak current density. The onset of glycerate oxidation (FIG. 63A), containing two primary alcohols and one carboxylic acid groups, occurred at a much lower potential (−0.47 V) on PdAg/CNT compared to that for Pd/CNT and Ag/CNT, reflecting the synergistic effect of Pd—Ag in promoting the alcohol group oxidation. Similarly, in the low potential range, the current density for PdAg/CNT was significantly higher than that for Pd/CNT and Ag/CNT catalysts within the fuel cell anode potential (−0.22 V vs. MMO). This is consistent with the results of electro-oxidation glycolate containing one primary alcohol and one carboxylic acid group (FIG. 63F), for which PdAg shows the lowest potential (−0.56 V). In comparison, oxalate containing two carboxylic acid groups is inactive over all four catalysts (FIG. 63E), indicating that it is a dead-end chemical because a carboxylic acid group cannot be further oxidized. It is interesting to note that tartronate and lactate are quite stable under the scanned potential range over the four catalysts (FIGS. 63C-D), even though they both contain an alcohol group. This might be due to a steric effect in which the alcohol group is protected by two adjacent inert carboxylic groups or a methyl group. Mesoxalate is relatively stable on a Ag catalyst without generating notable current density at <−0.22 V (FIG. 63B) in comparison to other Pd-containing catalysts, because further oxidation of C$_3$ mesoxalate will result in C—C bond cleavage. This result suggests that Ag itself does not facilitate C—C cleavage.

Figure 63:
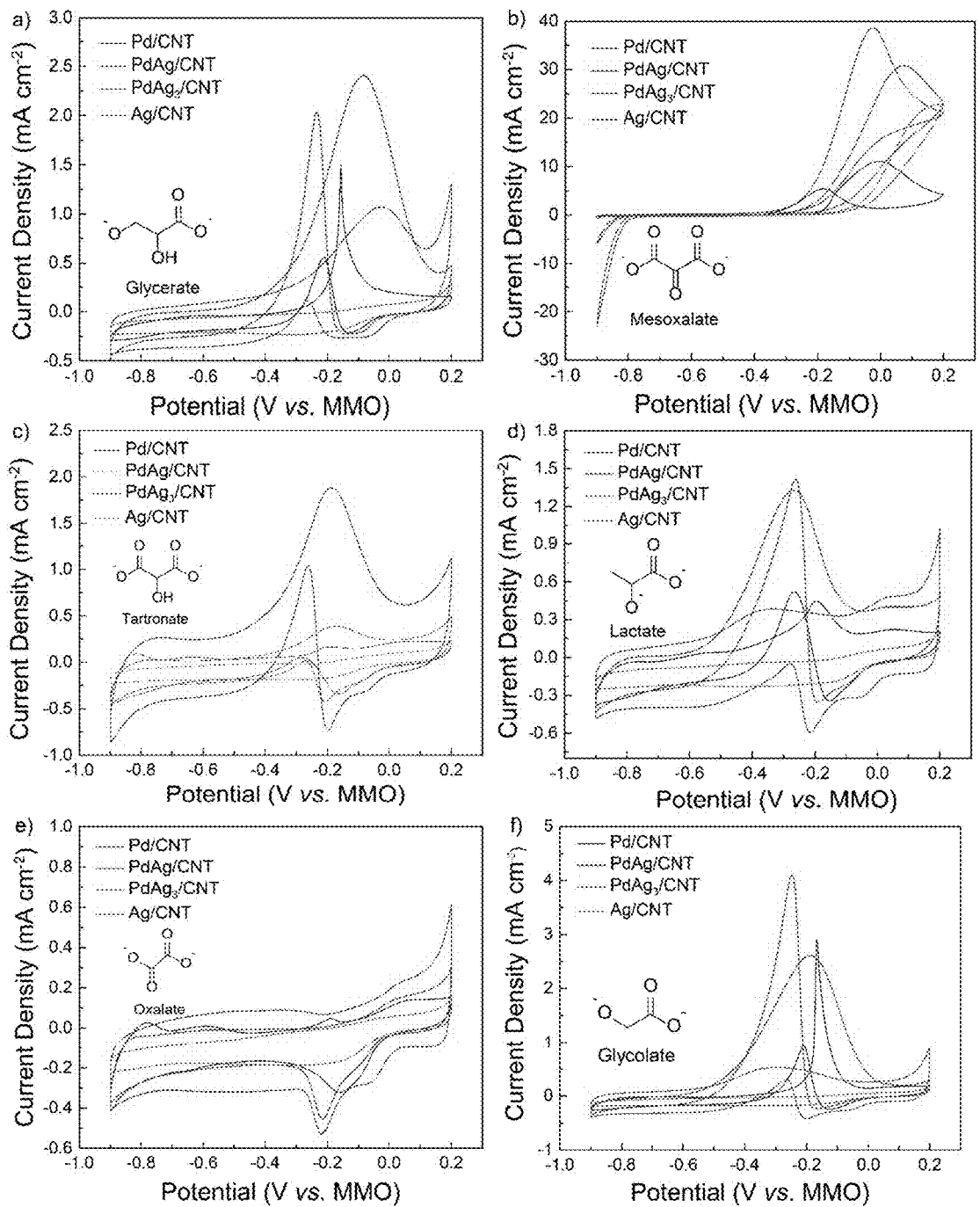
Figure 64:
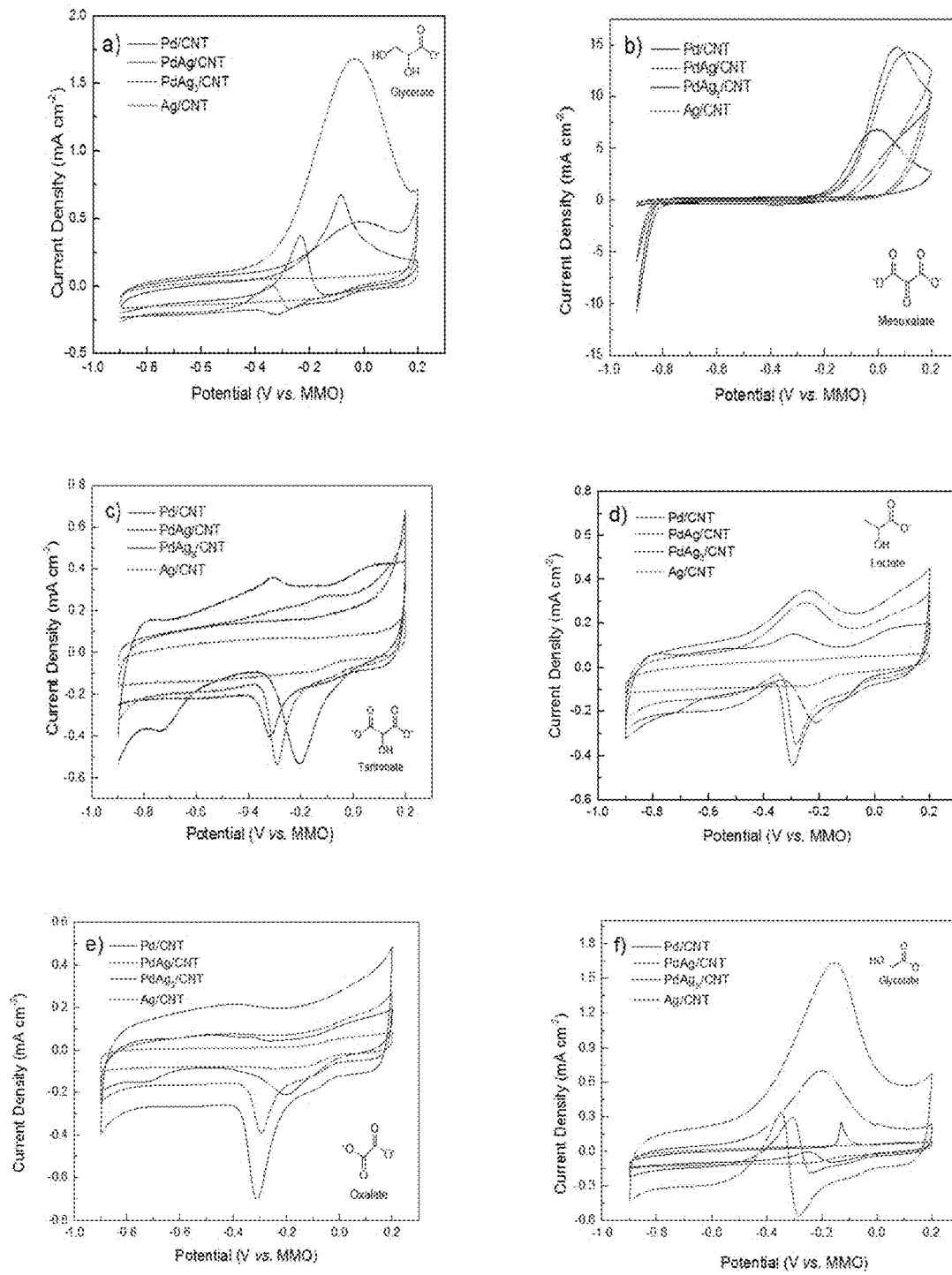

The higher Ag atomic ratio in the catalyst, along with the higher activity of the catalyst towards mesoxalate oxidation, produces more C—C cleavage of mesoxalate to C$_2$ and C$_1$ products. It was further found that desorbed tartronate as an oxidation of intermediates in the bulk electrolyte is quite stable for all catalysts. PdAg/CNT slightly outperforms Pd/CNT with respect to current density, as shown in FIG. 63C. However, it is interesting to note that tartronate is more active on PdAg$_3$/CNT catalysts at the higher temperature of 60° C., compared to its activity at 25° C. (FIGS. 64A-F). For glycolate oxidation (FIG. 63F), PdAg/CNT exhibits the best activity compared to the other three catalysts (Pd/CNT, Ag/CNT, and Pd$_1$Ag$_3$/CNT), and also a close onset potential but lower current density compared to glycerate oxidation. Ag shows virtually no activity for glycolate oxidation, and this interesting result supports the hypothesis that adjacent inert groups (methyl or carboxylic acid) could protect an alcohol group from oxidation. Glycerate has two alcohol groups: one primary, one secondary adjacent to a carboxylic group, while glycolate has one primary alcohol group, tartronate has one middle alcohol group adjacent to two carboxylic groups, and lactate has one middle alcohol group adjacent to a methyl and a carboxylic group, so the generated current density exactly follows the trend: glycerate>glycolate>tartronate≈lactate.

The electrocatalytic oxidation of glycerol intermediates over the four catalysts was further investigated by CVs at 25° C. As shown in FIGS. 64A-F, the onset potentials for these four catalysts moved to slightly more positive positions as the working temperature decreased to 25° C., while the current density decreased for all these catalysts across the whole potential range tested, indicating slower kinetics that significantly slowly facilitate electrooxidation of glycerol intermediates for the four catalysts. The curves, however, are similar in shape at low temperature when compared to those at 60° C., indicating that the reaction mechanisms do not change significantly when temperature is lowered to 25° C.

To test performance of electrocatalytic activity of glycerol oxidation intermediates over PdAg/CNT in AEMFCs, all the intermediates (glycerate, tartronate, mesoxalate, lactate, glycolate, and oxalate) were fed as anode fuel. It was observed that glycerate and mesoxalate were the only two intermediates showing stable performance under the fuel cell test conditions. Tartronate, lactate, and the other $C_2$ intermediates glycolate and oxalate showed no current generated to produce power in AEMFCs. The DGFC with mesoxalate showed a high peak power density of 15 mW/cm$^2$, while the one with glycerate produced a value of 9 mW/cm$^2$. The trend in intermediates' oxidation activity obtained from the single fuel cell (peak power density) is fully consistent with half-cell tests (current density), as shown in FIGS. 63A-F and FIG. 65: mesoxalate (15 mA/cm$^2$, 15 mW/cm$^2$)>glycerate (1.75 mA/cm$^2$, 9 mW/cm$^2$)>glycolate (0.7 mA/cm$^2$, unstable fuel cell performance)>tartronate≈lactate (hardly any current generated in both half-cell and single cell).

Electrocatalytic Oxidation of Mesoxalate and Glycerate Product Intermediates of Glycerol in Single-Cell Electrocatalytic oxidation of mesoxalate and glycerate (product intermediates of glycerol oxidation) was further examined to elucidate the overall glycerol oxidation pathway by continuously looping 4.0 M KOH+0.5 M mesoxalate or glycerate (20 mL) from a plastic vessel into the anode compartment of an AEMFC for 2 hours at a constant fuel-cell voltage of 0.1V on PdAg/CNT anode catalyst at 60° C. At lower fuel-cell voltage (0.1V) glycerol oxidation conversion would be expected to react faster (Xin et al., "Simultaneous Generation of Mesoxalic Acid and Electricity from Glycerol on a Gold Anode Catalyst in Anion-Exchange Membrane Fuel Cells," 4(8):1105-1114 (2012), which is hereby incorporated by reference in its entirety). Oxalate and formate products were detected with selectivities of 91.8% and 8.2% at 78.7% conversion of mesoxalate. Tartronate and oxalate were detected with selectivities of 53.0% and 47.0% at 91.3% conversion of glycerate. It can be seen that oxidation of $C_3$ product intermediates (mesoxalate and tartronate) of glycerol provides deeper oxidation and C—C bond cleavage to $C_2$ species, i.e., oxalate.

Proposed Reaction Pathway for Glycerol Oxidation Over PdAg/CNT

Based on the obtained half-cell and single cell activity and product distribution results, FIG. 66 illustrates the proposed reaction pathways for the oxidation of glycerol with main $C_3$ and $C_2$ oxidation products over PdAg/CNT in AEM-DGFC. The first step was to oxidize one primary hydroxyl group in glycerol to generate glycerate, making glycerate a stable reaction intermediate during the glycerol oxidation reaction. Glycerate was furthermore rapidly oxidized into $C_3$ tartronate and $C_2$ oxalate (a C—C cleavage product) with selectivities of 53.0% and 47.0%, respectively. This step was confirmed using electrocatalytic oxidation of glycerate in AEM-DGFC. The alcohol group of tartronate is surrounded by two carboxylic acid groups, so it is reasonable to hypothesize that mesoxalate is produced through the direct oxidation of the hydroxyl group in tartronate at a slow rate, with Pd the active site rather than Ag (3.8% on Pd, 1.5% on PdAg, and 0 on Ag, see Table 12).

Electrocatalytic oxidation of mesoxalate in AEM-DGFC confirmed the cleavage of C—C bond of mesoxalate to oxalate and formate as products in AEM-DGFC. This is another route to production of $C_2$ oxalate. Oxalate containing two carboxylic acid groups is inactive over all four catalysts (per half-cell results), indicating that it is also a dead-end chemical because a carboxylic acid group cannot be further oxidized, in good agreement with previous observations. The glycolate from the direct C—C bond cleavage of glycerol in the oxidation process was not detected over PdAg catalysts at this low applied cell voltage. Previous work showed that glycolate can be formed from the adsorbed glycerate and even desorbed tartronate via C—C cleavage on Au catalyst, but this requires higher applied potentials (>0.9 V vs, RHE) (Xin et al., "Simultaneous Generation of Mesoxalic Acid and Electricity from Glycerol on a Gold Anode Catalyst in Anion-Exchange Membrane Fuel Cells," 4(8):1105-1114 (2012); Qi et al., "Electrocatalytic Selective Oxidation of Glycerol to Tartronate on Au/C anode Catalysts in Anion Exchange Membrane Fuel Cells With Electricity Cogeneration," *Applied Catalysis B: Environmental* 154/155:360-368 (2014), which are hereby incorporated by reference in their entirety), further suggesting that the reaction pathways and product distributions are strongly potential dependent. It is hypothesized that lactate in small amount (<2% Table 12) is generated through a coupled homogeneous transformation of some $C_3$ intermediates (likely glyceraldehyde) in alkaline electrolyte.

Conclusions

Carbon nanotube (CNT) supported Pd, PdAg, PdAg$_3$, and Ag nanoparticles with small sizes (2.0 nm for Pd/CNT, 2.3 nm for PdAg/CNT, 2.4 nm for PdAg$_3$/CNT, and 13.9 nm for Ag/CNT) and narrow size distributions were synthesized through a modified aqueous-phase reduction method and served as working catalysts. XPS spectra show that by alloying with Ag, more metallic state Pd is presented on the surface. The higher performance of AEM-DGFC with PdAg anode catalyst compared to that with Pd/CNT anode catalyst suggests that PdAg can improve the glycerol reaction rate (kinetics). The oxidation product analysis demonstrates the selectivity of the $C_2$ species, i.e., oxalate and glycolate on Pd/CNT, PdAg/CNT, and PdAg$_3$/CNT increased as the Ag content increased, indicating that Ag contributed to deeper oxidation and C—C bond cleavage. Therefore, by employing bimetallic PdAg/CNT along with optimizing reaction conditions, high overall AEM-DGFC performances (in terms of both electrical power density and fuel utilization efficiency) can be achieved.

Electrocatalytic oxidation of glycerol and intermediates in an AEM-DGFC with product analysis, along with CVs of oxidation intermediates, was conducted to elucidate the electrocatalytic oxidation pathways on PdAg catalyst. It was found that glycerate and mesoxalate are the two $C_3$ intermediates leading to C—C cleavage product of oxalate, while tartronate is a relatively inert chemical whose slow further oxidation generates mesoxalate, lactate is possibly produced from homogeneous transformation of $C_3$ intermediates, and glycolate is not a favorable product under lower fuel cell anode potentials. The enhancement of glycerol oxidation over PdAg bimetallic catalyst is proposed to occur through a synergistic effect of Ag's promotion of intermediate aldehyde oxidation and C—C breakage of $C_3$ oxygenates along with a larger amount of Pd$^0$ presented on the PdAg nanoparticle surface (determined by ex-situ XPS), as supported by combining physical characterization, electrochemical activity tests and product analysis of relevant glycerol intermediates oxidation Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A fuel-cell system, comprising:
   an anode electrode;
   a cathode electrode;
   a separator positioned between the anode electrode and the cathode electrode, wherein the separator is not an ion exchange membrane;
   an anode catalyst; and
   a cathode catalyst, wherein the cathode catalyst is a metal-free catalyst comprising a doped carbon material, wherein the carbon material is duel-doped with nitrogen and sulfur.

2. The fuel-cell system of claim 1, wherein the separator comprises perfluorinated hydrocarbon.

3. The fuel-cell system of claim 1, wherein the separator is porous, and wherein pores have an average diameter of less than 1.0 micrometer.

4. The fuel-cell system of claim 1, wherein the anode catalyst is a low-loading precious metal anode catalyst.

5. The fuel-cell system of claim 4, wherein the anode catalyst is selected from the group consisting of a noble metal alloy; dealloyed Pt-M, wherein M is a transition metal; nanoparticles supported on carbon nanotubes or carbon black; and noble metal or a mixture of noble metals supported on carbon nanotubes or carbon black.

6. The fuel-cell system of claim 5, wherein the anode catalyst is a noble metal supported on carbon nanotubes or carbon black, and the noble metal is selected from the group consisting of Pd, Ag, Au, and Pt.

7. The fuel-cell system of claim 5, wherein the anode catalyst is a mixture of noble metals supported on carbon nanotubes or carbon black, and the mixture of noble metals is selected from the group consisting of Pd/Ag, Pd/Au, and Pd/Pt.

8. The fuel-cell system of claim 1 further comprising:
   a fuel source comprising carbon fuel.

9. The system according to claim 8, wherein the fuel is a crude carbon fuel.

10. The system according to claim 9, wherein the crude fuel is selected from the group consisting of biomass/biorefinery/pyrolytic feedstock, wastes, and residuals; biomass/biorefinery/pyrolytic streams; bio-oils; and unrefined biomass-derived feedstocks.

11. The system according to claim 9, wherein the crude fuel is crude glycerol, crude pyrolytic streams, or crude bio-ethanol.

12. A method of generating energy from crude fuel comprising:
   providing a fuel-cell system according to claim 1 and
   contacting the fuel-cell system with a crude fuel to generate energy from the crude fuel.

13. The method according to claim 12, wherein the crude fuel is selected from the group consisting of biomass/biorefinery/pyrolytic feedstock, wastes, and residuals; biomass/biorefinery/pyrolytic streams; bio-oils; and unrefined biomass-derived feedstocks.

14. The method according to claim 12, wherein the crude fuel is crude glycerol, crude pyrolytic streams, or crude bio-ethanol.

15. The method according to claim 12, wherein the crude fuel is bio-oil derived from the pyrolysis of lignocellulosic biomass.

16. The method according to claim 12, wherein the separator comprises perfluorinated carbon.

17. The method according to claim 12, wherein the separator is porous, and wherein pores have an average diameter of less than 1.0 micrometer.

18. The method according to claim 12, wherein the anode catalyst is a low-loading precious metal anode catalyst.

19. The method according to claim 18, wherein the anode catalyst is selected from the group consisting of a noble metal alloy; dealloyed Pt-M, wherein M is a transition metal; nanoparticles supported on carbon nanotubes or carbon black; and noble metal or a mixture of noble metals supported on carbon nanotubes or carbon black.

20. The method according to claim 19, wherein the anode catalyst is a noble metal supported on carbon nanotubes or carbon black, and the noble metal is selected from the group consisting of Pd, Ag, Au, and Pt.

21. The method according to claim 19, wherein the anode catalyst is a mixture of noble metals supported on carbon nanotubes or carbon black, and the mixture of noble metals is selected from the group consisting of Pd/Ag, Pd/Au, and Pd/Pt.

* * * * *